(12) United States Patent
Pryor

(10) Patent No.: US 9,513,744 B2
(45) Date of Patent: Dec. 6, 2016

(54) CONTROL SYSTEMS EMPLOYING NOVEL PHYSICAL CONTROLS AND TOUCH SCREENS

(75) Inventor: Timothy R. Pryor, Tecumseh (CA)

(73) Assignee: Apple Inc., Cupertino, CA (US)

( * ) Notice: Subject to any disclaimer, the term of this patent is extended or adjusted under 35 U.S.C. 154(b) by 1143 days.

(21) Appl. No.: 11/980,721

(22) Filed: Oct. 31, 2007

(65) Prior Publication Data

US 2008/0211779 A1    Sep. 4, 2008

Related U.S. Application Data

(63) Continuation of application No. 10/611,814, filed on Jul. 2, 2003.

(60) Provisional application No. 60/393,130, filed on Jul. 3, 2002, provisional application No. 60/458,434, filed on Mar. 31, 2003.

(51) Int. Cl.
| | |
|---|---|
| *G06F 3/0488* | (2013.01) |
| *G06F 3/042* | (2006.01) |
| *G01C 21/36* | (2006.01) |
| *G06F 3/03* | (2006.01) |
| *G06F 3/0354* | (2013.01) |
| *B60K 37/06* | (2006.01) |
| *G06F 3/0484* | (2013.01) |

(52) U.S. Cl.
CPC ............ *G06F 3/0425* (2013.01); *B60K 37/06* (2013.01); *G01C 21/3664* (2013.01); *G06F 3/0312* (2013.01); *G06F 3/03545* (2013.01); *G06F 3/0488* (2013.01); *G06F 3/04847* (2013.01); *B60K 2350/102* (2013.01); *B60K 2350/104* (2013.01); *B60K 2350/1024* (2013.01); *G06F 2203/04108* (2013.01); *G06F 2203/04809* (2013.01)

(58) Field of Classification Search
USPC ......................................................... 345/173
See application file for complete search history.

(56) References Cited

U.S. PATENT DOCUMENTS

| | | |
|---|---|---|
| 3,609,695 A | 9/1971 | Pirkle |
| 3,748,751 A | 7/1973 | Breglia et al. |

(Continued)

FOREIGN PATENT DOCUMENTS

| | | |
|---|---|---|
| GB | 2 435 369 A | 8/2007 |
| JP | 63-167923 A | 7/1988 |

(Continued)

OTHER PUBLICATIONS

Final Office Action mailed May 22, 2006, for U.S. Appl. No. 10/611,814, filed Jul. 2, 2003, 29 pages.

(Continued)

*Primary Examiner* — Seokyun Moon
(74) *Attorney, Agent, or Firm* — Morrison & Foerster LLP

(57) ABSTRACT

Disclosed are methods and apparatus, which enable the reconfigurable control of vehicles, homes, computers and other applications. Physical controls and virtual displayed controls on single and multipoint touch screens are used, separately or in combination to enable higher visibility and understanding of control information and easier operation of controls, particularly useful in stressful situations. Some embodiments use optical sensors and rear projection of displayed embodiments, and are advantageous where curved screens are desired such as in a car.

15 Claims, 67 Drawing Sheets

(56) References Cited

U.S. PATENT DOCUMENTS

| | | |
|---|---|---|
| 3,757,322 A | 9/1973 | Barkan et al. |
| 3,825,730 A | 7/1974 | Worthington, Jr. et al. |
| 3,846,826 A | 11/1974 | Mueller |
| 4,014,000 A | 3/1977 | Uno et al. |
| 4,017,848 A | 4/1977 | Tannas, Jr. |
| 4,146,924 A | 3/1979 | Birk et al. |
| 4,219,847 A | 8/1980 | Pinkney et al. |
| 4,303,856 A | 12/1981 | Serras-Paulet |
| 4,305,071 A | 12/1981 | Bell et al. |
| 4,305,131 A | 12/1981 | Best |
| 4,346,376 A | 8/1982 | Mallos |
| 4,375,674 A | 3/1983 | Thornton |
| 4,396,945 A | 8/1983 | DiMatteo et al. |
| 4,435,835 A | 3/1984 | Sakow et al. |
| 4,475,122 A | 10/1984 | Green |
| 4,484,179 A | 11/1984 | Kasday |
| 4,542,375 A | 9/1985 | Alles et al. |
| 4,561,017 A | 12/1985 | Greene |
| 4,613,942 A | 9/1986 | Chen |
| 4,629,319 A | 12/1986 | Clarke et al. |
| 4,631,525 A | 12/1986 | Serravalle, Jr. |
| 4,631,676 A | 12/1986 | Pugh |
| 4,644,100 A | 2/1987 | Brenner et al. |
| 4,644,326 A | 2/1987 | Villalobos et al. |
| 4,654,872 A | 3/1987 | Hisano et al. |
| 4,686,374 A | 8/1987 | Liptay-Wagner et al. |
| 4,703,306 A | 10/1987 | Barritt |
| 4,710,760 A | 12/1987 | Kasday |
| 4,746,770 A | 5/1988 | McAvinney |
| 4,772,028 A | 9/1988 | Rockhold et al. |
| 4,787,040 A | 11/1988 | Ames et al. |
| 4,814,759 A | 3/1989 | Gombrich et al. |
| 4,818,048 A | 4/1989 | Moss |
| 4,853,888 A | 8/1989 | Lata et al. |
| 4,948,371 A | 8/1990 | Hall |
| 4,988,981 A | 1/1991 | Zimmerman et al. |
| 4,993,806 A | 2/1991 | Clausen et al. |
| 5,045,843 A | 9/1991 | Hansen |
| 5,045,846 A | 9/1991 | Gay et al. |
| 5,072,294 A | 12/1991 | Engle |
| 5,081,609 A | 1/1992 | Getson et al. |
| 5,153,829 A | 10/1992 | Furuya et al. |
| 5,168,531 A | 12/1992 | Sigel |
| 5,212,555 A | 5/1993 | Stoltz |
| 5,227,985 A | 7/1993 | DeMenthon |
| 5,252,951 A | 10/1993 | Tannenbaum et al. |
| 5,328,190 A | 7/1994 | Dart et al. |
| 5,412,189 A | 5/1995 | Cragun |
| 5,418,760 A | 5/1995 | Kawashima et al. |
| 5,422,656 A | 6/1995 | Allard et al. |
| 5,459,793 A | 10/1995 | Naoi et al. |
| 5,483,261 A | 1/1996 | Yasutake |
| 5,488,204 A | 1/1996 | Mead et al. |
| 5,489,940 A | 2/1996 | Richardson et al. |
| 5,495,269 A | 2/1996 | Elrod et al. |
| 5,495,576 A | 2/1996 | Ritchey |
| 5,502,514 A | 3/1996 | Vogeley et al. |
| 5,510,806 A | 4/1996 | Busch |
| 5,511,148 A | 4/1996 | Wellner |
| 5,515,079 A | 5/1996 | Hauck |
| 5,530,456 A | 6/1996 | Kokubo |
| 5,559,301 A | 9/1996 | Bryan, Jr. et al. |
| 5,572,239 A | 11/1996 | Jaeger |
| 5,594,469 A | 1/1997 | Freeman et al. |
| 5,613,913 A | 3/1997 | Ikematsu et al. |
| 5,649,706 A | 7/1997 | Treat, Jr. et al. |
| 5,709,219 A | 1/1998 | Chen et al. |
| 5,712,661 A | 1/1998 | Jaeger |
| 5,726,685 A | 3/1998 | Kuth et al. |
| 5,729,249 A | 3/1998 | Yasutake |
| 5,736,975 A | 4/1998 | Lunetta |
| 5,777,603 A | 7/1998 | Jaeger |
| 5,805,145 A | 9/1998 | Jaeger |
| 5,805,146 A | 9/1998 | Jaeger et al. |
| 5,825,352 A | 10/1998 | Bisset et al. |
| 5,831,601 A | 11/1998 | Vogeley et al. |
| 5,835,079 A | 11/1998 | Shieh |
| 5,841,428 A | 11/1998 | Jaeger et al. |
| 5,859,631 A | 1/1999 | Bergman et al. |
| 5,867,149 A | 2/1999 | Jaeger |
| 5,871,251 A | 2/1999 | Welling et al. |
| 5,880,411 A | 3/1999 | Gillespie et al. |
| 5,923,319 A | 7/1999 | Bishop et al. |
| 5,933,134 A | 8/1999 | Shieh |
| 5,936,613 A | 8/1999 | Jaeger et al. |
| 5,949,345 A | 9/1999 | Beckert et al. |
| 5,977,867 A | 11/1999 | Blouin et al. |
| 5,982,352 A * | 11/1999 | Pryor ............................ 345/156 |
| 5,982,353 A | 11/1999 | Gallery et al. |
| 5,982,355 A | 11/1999 | Jaeger et al. |
| 5,995,104 A | 11/1999 | Kataoka et al. |
| 6,005,611 A | 12/1999 | Gullichsen et al. |
| 6,008,800 A | 12/1999 | Pryor |
| 6,013,956 A | 1/2000 | Anderson, Jr. |
| 6,049,328 A | 4/2000 | Vanderheiden |
| 6,054,990 A | 4/2000 | Tran |
| 6,057,540 A | 5/2000 | Gordon et al. |
| 6,061,177 A | 5/2000 | Fujimoto |
| 6,063,030 A | 5/2000 | Vara et al. |
| 6,066,075 A | 5/2000 | Poulton |
| 6,154,201 A | 11/2000 | Levin et al. |
| 6,175,610 B1 | 1/2001 | Peter |
| 6,181,328 B1 | 1/2001 | Shieh et al. |
| 6,188,391 B1 | 2/2001 | Seely et al. |
| 6,219,035 B1 | 4/2001 | Skog et al. |
| 6,256,020 B1 | 7/2001 | Pabon et al. |
| 6,278,441 B1 | 8/2001 | Gouzman et al. |
| 6,282,264 B1 | 8/2001 | Smith et al. |
| 6,289,258 B1 | 9/2001 | Carter, Jr. et al. |
| 6,310,610 B1 | 10/2001 | Beaton et al. |
| 6,323,846 B1 | 11/2001 | Westerman et al. |
| 6,326,956 B1 | 12/2001 | Jaeger et al. |
| 6,339,748 B1 | 1/2002 | Hiramatsu |
| 6,388,655 B1 | 5/2002 | Leung |
| 6,392,632 B1 | 5/2002 | Lee |
| 6,396,477 B1 | 5/2002 | Hinckley et al. |
| 6,411,877 B2 | 6/2002 | Böckmann et al. |
| 6,412,961 B1 | 7/2002 | Hicks |
| 6,414,672 B2 * | 7/2002 | Rekimoto et al. ............ 345/173 |
| 6,421,042 B1 | 7/2002 | Omura et al. |
| 6,421,046 B1 | 7/2002 | Edgren et al. |
| 6,429,846 B2 | 8/2002 | Rosenberg et al. |
| 6,441,806 B1 | 8/2002 | Jaeger |
| 6,441,807 B1 | 8/2002 | Yamaguchi et al. |
| 6,457,834 B1 | 10/2002 | Cotton et al. |
| 6,473,069 B1 | 10/2002 | Gerpheide |
| 6,478,432 B1 | 11/2002 | Dyner |
| 6,481,851 B1 | 11/2002 | McNelley et al. |
| 6,489,947 B2 | 12/2002 | Hesley et al. |
| 6,501,515 B1 | 12/2002 | Iwamura |
| 6,505,088 B1 | 1/2003 | Simkin et al. |
| 6,545,670 B1 | 4/2003 | Pryor |
| 6,563,492 B1 | 5/2003 | Furuya |
| 6,563,769 B1 | 5/2003 | Van der Meulen |
| 6,570,557 B1 * | 5/2003 | Westerman et al. .......... 345/173 |
| 6,570,584 B1 | 5/2003 | Cok et al. |
| 6,611,252 B1 | 8/2003 | DuFaux |
| 6,642,943 B1 * | 11/2003 | Machida ....................... 715/763 |
| 6,664,948 B2 | 12/2003 | Crane et al. |
| 6,690,365 B2 | 2/2004 | Hinckley et al. |
| 6,690,387 B2 | 2/2004 | Zimmerman et al. |
| 6,697,721 B2 | 2/2004 | Arlinsky |
| 6,703,599 B1 | 3/2004 | Casebolt et al. |
| 6,707,027 B2 | 3/2004 | Liess et al. |
| 6,740,860 B2 | 5/2004 | Kobayashi |
| 6,762,751 B2 | 7/2004 | Kuan |
| 6,781,570 B1 | 8/2004 | Arrigo et al. |
| 6,791,467 B1 | 9/2004 | Ben-Ze'ev |
| 6,795,056 B2 | 9/2004 | Norskog et al. |
| 6,816,150 B2 | 11/2004 | Casebolt et al. |
| 6,833,825 B1 | 12/2004 | Farag et al. |
| 6,842,170 B1 | 1/2005 | Akins et al. |
| 6,896,375 B2 | 5/2005 | Peterson et al. |
| 6,950,094 B2 | 9/2005 | Gordon et al. |

(56) References Cited

U.S. PATENT DOCUMENTS

| | | |
|---|---|---|
| 6,995,744 B1 | 2/2006 | Moore et al. |
| 7,002,749 B2 | 2/2006 | Kremen |
| 7,006,080 B2 | 2/2006 | Gettemy |
| 7,015,894 B2 | 3/2006 | Morohoshi |
| 7,030,861 B1 | 4/2006 | Westerman et al. |
| 7,079,114 B1* | 7/2006 | Smith et al. .................. 345/158 |
| 7,084,859 B1* | 8/2006 | Pryor ............................ 345/173 |
| 7,098,891 B1* | 8/2006 | Pryor ............................ 345/158 |
| 7,136,045 B2 | 11/2006 | Rosenberg et al. |
| 7,158,123 B2* | 1/2007 | Myers et al. ................. 345/173 |
| 7,170,488 B2 | 1/2007 | Kehlstadt et al. |
| 7,184,064 B2 | 2/2007 | Zimmerman et al. |
| RE40,153 E | 3/2008 | Westerman et al. |
| 7,397,464 B1 | 7/2008 | Robbins et al. |
| 7,417,681 B2 | 8/2008 | Lieberman et al. |
| 7,466,843 B2 | 12/2008 | Pryor |
| 7,489,303 B1* | 2/2009 | Pryor ............................ 345/173 |
| 7,663,607 B2 | 2/2010 | Hotelling et al. |
| 7,675,504 B1 | 3/2010 | Smith et al. |
| 7,714,849 B2* | 5/2010 | Pryor ............................ 345/173 |
| 7,970,870 B2 | 6/2011 | Hinckley et al. |
| 8,228,305 B2 | 7/2012 | Pryor |
| 8,427,449 B2 | 4/2013 | Pryor |
| 8,479,122 B2 | 7/2013 | Hotelling et al. |
| 8,482,535 B2 | 7/2013 | Pryor |
| 2001/0012001 A1 | 8/2001 | Rekimoto et al. |
| 2002/0030667 A1 | 3/2002 | Hinckley et al. |
| 2002/0093487 A1 | 7/2002 | Rosenberg |
| 2002/0109728 A1 | 8/2002 | Tiongson et al. |
| 2002/0113778 A1 | 8/2002 | Rekimoto et al. |
| 2002/0130839 A1 | 9/2002 | Wallace et al. |
| 2003/0001010 A1 | 1/2003 | Schmidt et al. |
| 2003/0038849 A1 | 2/2003 | Craven et al. |
| 2003/0072077 A1 | 4/2003 | Peterson et al. |
| 2003/0073461 A1 | 4/2003 | Sinclair |
| 2003/0076306 A1 | 4/2003 | Zadesky et al. |
| 2003/0128188 A1 | 7/2003 | Wilbrink et al. |
| 2003/0156097 A1 | 8/2003 | Kahihara et al. |
| 2004/0046741 A1 | 3/2004 | Low et al. |
| 2004/0113886 A1 | 6/2004 | Lee |
| 2004/0141157 A1 | 7/2004 | Ramachandran et al. |
| 2004/0183782 A1 | 9/2004 | Shahoian et al. |
| 2004/0227739 A1 | 11/2004 | Tani et al. |
| 2004/0227830 A1 | 11/2004 | Kobayashi et al. |
| 2005/0064936 A1 | 3/2005 | Pryor |
| 2005/0078087 A1 | 4/2005 | Gates et al. |
| 2005/0122308 A1 | 6/2005 | Bell et al. |
| 2005/0134565 A1 | 6/2005 | Hong |
| 2005/0259077 A1 | 11/2005 | Adams et al. |
| 2006/0026521 A1 | 2/2006 | Hotelling et al. |
| 2006/0047509 A1 | 3/2006 | Ding et al. |
| 2006/0150120 A1 | 7/2006 | Dresti et al. |
| 2006/0197753 A1 | 9/2006 | Hotelling |
| 2006/0227099 A1 | 10/2006 | Han et al. |
| 2007/0159453 A1 | 7/2007 | Inoue |
| 2007/0296688 A1 | 12/2007 | Nakamura et al. |
| 2008/0024463 A1 | 1/2008 | Pryor |
| 2008/0029691 A1 | 2/2008 | Han |
| 2008/0088587 A1 | 4/2008 | Pryor |
| 2008/0129707 A1 | 6/2008 | Pryor |
| 2009/0267902 A1 | 10/2009 | Nambu et al. |
| 2009/0267921 A1* | 10/2009 | Pryor ............................ 345/177 |
| 2009/0273563 A1* | 11/2009 | Pryor ............................ 345/157 |
| 2009/0273574 A1* | 11/2009 | Pryor ............................ 345/173 |
| 2009/0273575 A1* | 11/2009 | Pryor ............................ 345/173 |
| 2009/0300531 A1* | 12/2009 | Pryor ............................ 715/764 |
| 2009/0322499 A1* | 12/2009 | Pryor ........................ 340/407.2 |
| 2010/0231506 A1 | 9/2010 | Pryor |
| 2012/0287072 A1 | 11/2012 | Pryor |
| 2013/0009900 A1 | 1/2013 | Pryor |

FOREIGN PATENT DOCUMENTS

| | | |
|---|---|---|
| JP | 05-297979 A | 11/1993 |
| JP | 07-230352 A | 8/1995 |
| JP | 2000-163031 A | 6/2000 |
| JP | 2001-078279 A | 3/2001 |
| JP | 2002-533802 A | 10/2002 |
| JP | 2002-342033 A | 11/2002 |
| JP | 2003-244343 A | 8/2003 |
| JP | 2005-233679 A | 9/2005 |
| JP | 2007-107766 A | 4/2007 |
| JP | 2008-508600 A | 3/2008 |
| WO | WO-00/21795 A1 | 4/2000 |
| WO | WO-00/38039 A1 | 6/2000 |
| WO | WO-01/94156 A2 | 12/2001 |
| WO | WO-01/94156 A3 | 12/2001 |
| WO | WO-2004/008081 A2 | 1/2004 |
| WO | WO-2004/008081 A3 | 1/2004 |
| WO | WO-2004/091956 A2 | 10/2004 |
| WO | WO-2004/091956 A3 | 10/2004 |
| WO | WO-2005/026938 A2 | 3/2005 |
| WO | WO-2006/020304 A1 | 2/2006 |
| WO | WO-2007/034591 A1 | 3/2007 |
| WO | WO-2007/112742 A1 | 10/2007 |
| WO | WO 2008/045665 A1 | 4/2008 |
| WO | WO-2010/135478 A2 | 11/2010 |

OTHER PUBLICATIONS

Final Office Action mailed Jul. 19, 2007, for U.S. Appl. No. 10/611,814, filed Jul. 2, 2003, 25 pages.

International Search Report mailed Aug. 28, 2007, for PCT Application No. PCT/US2004/009701, one page.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Sep. 16, 2005, for U.S. Appl. No. 10/611,814, filed Jul. 2, 2003, 40 pages.

Non-Final Office Action mailed Dec. 28, 2006, for U.S. Appl. No. 10/611,814, filed Jul. 2, 2003, 25 pages.

Non-Final Office Action mailed Jan. 25, 2008, for U.S. Appl. No. 10/611,814, filed Jul. 2, 2003, 26 pages.

Notice of Allowance mailed Jun. 9, 2008, for U.S. Appl. No. 10/611,814, filed Jul. 2, 2003, seven pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Bales, J. W. et al. (Apr. 1981). "Marking Parts to Aid Robot Vision," NASA Technical Paper 1819, 37 pages.

Final Office Action mailed Nov. 12, 2009, for U.S. Appl. No. 11/349,350, filed Feb. 8, 2006, nine pages.

Final Office Action mailed Sep. 2, 2010, for U.S. Appl. No. 11/272,868, filed Nov. 15, 2005, nine pages.

Non-Final Office Action mailed Jan. 6, 2009, for U.S. Appl. No. 11/349,350, filed Feb. 8, 2006, 10 pages.

Non-Final Office Action mailed Mar. 5, 2009, for U.S. Appl. No. 11/272,868, filed Nov. 15, 2005, 15 pages.

Non-Final Office Action mailed Dec. 7, 2009, for U.S. Appl. No. 11/272,868, filed Nov. 15, 2005, seven pages.

Non-Final Office Action mailed Aug. 2, 2010, for U.S. Appl. No. 11/980,722, filed Oct. 31, 2007, five pages.

Non-Final Office Action mailed Sep. 17, 2010, for U.S. Appl. No. 11/832,134, filed Aug. 1, 2007, 26 pages.

U.S. Appl. No. 11/272,868, filed Nov. 15, 2005, by Pryor.

U.S. Appl. No. 11/349,350, filed Feb. 8, 2006, by Pryor.

U.S. Appl. No. 11/878,024, filed Jul. 20, 2007, by Pryor.

U.S. Appl. No. 90/010,571, filed Jun. 10, 2009, by Pryor.

Final Office Action mailed Mar. 9, 2011, for U.S. Appl. No. 11/980,722, filed Oct. 31, 2007, 11 pages.

(56) References Cited

OTHER PUBLICATIONS

Final Office Action mailed Mar. 21, 2011, for U.S. Appl. No. 11/832,134, filed Aug. 1, 2007, 33 pages.
Non-Final Office Action mailed Feb. 17, 2011, for U.S. Appl. No. 11/852,690, filed Sep. 10, 2007, 10 pages.
Non-Final Office Action mailed Apr. 4, 2011, for U.S. Appl. No. 11/272,868, filed Nov. 15, 2005, nine pages.
Final Office Action mailed Jul. 29, 2011, for U.S. Appl. No. 11/852,690, filed Sep. 10, 2007, 11 pages.
Non-Final Office Action mailed Jun. 7, 2011, for U.S. Appl. No. 11/878,024, Jul. 20, 2007, 10 pages.
Non-Final Office Action mailed Jul. 19, 2011, for U.S. Appl. No. 11/980,722, filed Oct. 31, 2007, 12 pages.
Supplementary European Search Report mailed Jul. 11, 2011, for EP Application No. 04759053.4, filed Mar. 31, 2004, three pages.
Non-Final Office Action mailed Sep. 23, 2011, for U.S. Appl. No. 12/500,973, filed Jul. 10, 2009, five pages.
Non-Final Office Action mailed Sep. 29, 2011, for U.S. Appl. No. 12/030,776, filed Feb. 13, 2008, seven pages.
Non-Final Office Action mailed Sep. 30, 2011, for U.S. Appl. No. 12/468,401, filed May 19, 2009, 19 pages.
Notice of Allowance mailed Aug. 12, 2011, for U.S. Appl. No. 11/375,418, filed Mar. 13, 2006, seven pages.
Final Office Action mailed May 9, 2012, for U.S. Appl. No. 11/980,722, filed May 9, 2012, 14 pages.
Final Office Action mailed May 29, 2012, for U.S. Appl. No. 12/500,978, filed Jul. 10, 2009, 10 pages.
Non-Final Office Action mailed May 2, 2012, for U.S. Appl. No. 11/832,134, filed Aug. 1, 2007, 25 pages.
Non-Final Office Action mailed May 23, 2012, for U.S. Appl. No. 13/310,511, filed Dec. 2, 2011, 10 pages.
Final Office Action mailed Sep. 18, 2012, for U.S. Appl. No. 11/852,690, filed Sep. 10, 2007, 13 pages.
Final Office Action mailed Oct. 3, 2012, for U.S. Appl. No. 13/310,511, filed Dec. 2, 2011, 10 pages.
Final Office Action mailed Oct. 25, 2012, for U.S. Appl. No. 11/832,134, filed Aug. 1, 2007, 27 pages.
Notice of Allowance mailed Sep. 6, 2012, for U.S. Appl. No. 13/556,019, filed Jul. 23, 2012, seven pages.
Final Office Action mailed Dec. 12, 2012, for U.S. Appl. No. 12/500,984, filed Jul. 10, 2009, 10 pages.
Ju, W. et al. (Apr. 1, 2001). "CounterActive: An Interactive Cookbook for the Kitchen Counter," Proceedings of 2001 Conference on Human Factors in Cimputing Systems, located at http://www.media.mit.edu/pia/counteractive/counteractive-final.pdf, pp. 269-270.

Non-Final Office Action mailed Dec. 18, 2012, for U.S. Appl. No. 11/878,024, filed Jul. 20, 2007, eight pages.
Final Office Action mailed Jun. 8, 2012, for U.S. Appl. No. 12/167,237, filed Jul. 2, 2008, 21 pages.
Non-Final Office Action mailed Jun. 13, 2012, for U.S. Appl. No. 12/500,984, filed Jul. 10, 2009, eight pages.
Final Office Action mailed Nov. 10, 2011, for U.S. Appl. No. 11/272,868, filed Nov. 15, 2005, nine pages.
Final Office Action mailed Nov. 18, 2011, for U.S. Appl. No. 11/878,024, filed Jul. 20, 2007, 18 pages.
Final Office Action mailed Apr. 13, 2012, for U.S. Appl. No. 12/468,401, filed May 19, 2009, 21 pages.
Non-Final Office Action mailed Dec. 8, 2011, for U.S. Appl. No. 12/500,925, filed Jul. 10, 2009, nine pages.
Non-Final Office Action mailed Dec. 9, 2011, for U.S. Appl. No. 12/500,984, filed Jul. 10, 2009, nine pages.
Non-Final Office Action mailed Dec. 12, 2011, for U.S. Appl. No. 12/500,951, filed Jul. 10, 2009, eight pages.
Non-Final Office Action mailed Dec. 16, 2011, for U.S. Appl. No. 12/500,978, filed Jul. 10, 2009, nine pages.
Non-Final Office Action mailed Mar. 2, 2012, for U.S. Appl. No. 11/852,690, filed Sep. 10, 2007, 12 pages.
Non-Final office Action mailed Mar. 26, 2012, for U.S. Appl. No. 12/030,776, filed Feb. 13, 2009, five pages.
Notice of Allowance mailed Mar. 26, 2012, for U.S. Appl. No. 12/500,973, filed Jul. 10, 2009, 12 pages.
Non-Final Office Action mailed Oct. 26, 2012, for U.S. Appl. No. 12/468,401, filed May 19, 2009, 22 pages.
Final Office Action mailed May 9, 2013, for U.S. Appl. No. 11/832,134, filed Aug. 1, 2007, 29 pages.
Non-Final Office Action mailed Mar. 19, 2013, for U.S. Appl. No. 12/468,401, filed May 19, 2009, 21 pages.
Non-Final Office Action mailed May 15, 2013, for U.S. Appl. No. 11/980,722, filed Oct. 31, 2007, 11 pages.
Notice of Allowance mailed May 31, 2013, for U.S. Appl. No. 11/878,024, filed Jul. 20, 2007, nine pages.
Notice of Allowance mailed Jul. 8, 2013, for U.S. Appl. No. 12/500,984, filed Jul. 10, 2009, six pages.
Notice of Allowance mailed Dec. 24, 2012, for U.S. Appl. No. 13/556,019, filed Jul. 23, 2012, four pages.
Notice of Allowance mailed Feb. 22, 2013, for U.S. Appl. No. 12/500,978, filed Jul. 10, 2009, eight pages.
European Search Report mailed Feb. 25, 2013, for EP Application No. 13150499.5, five pages.

* cited by examiner

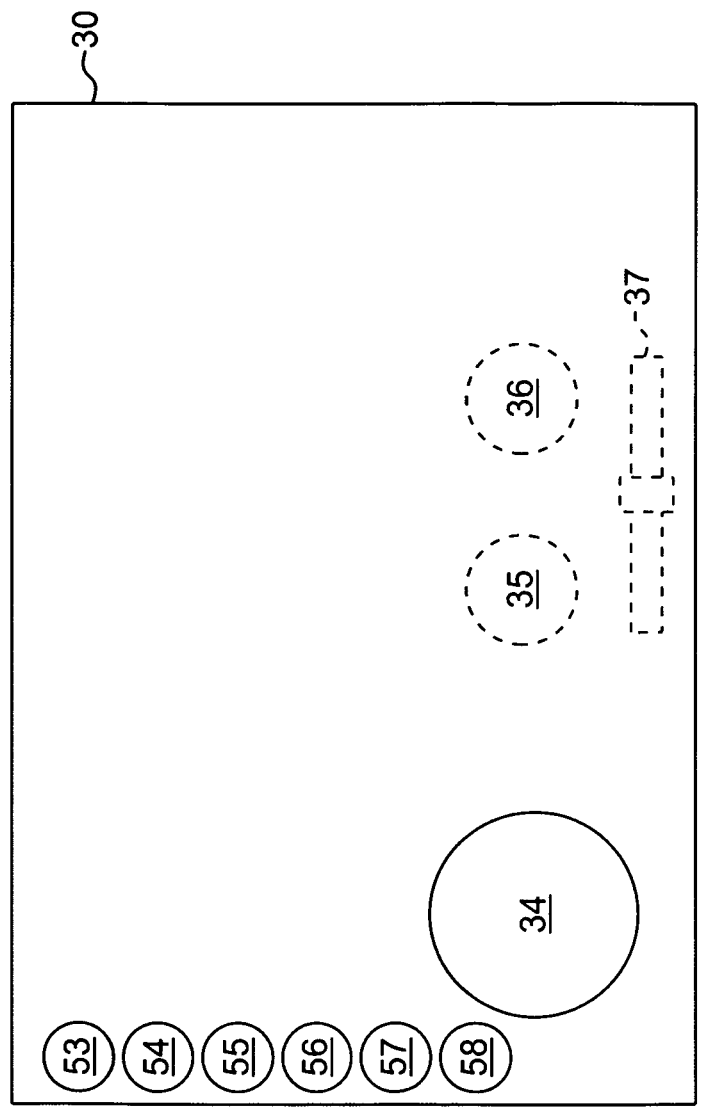

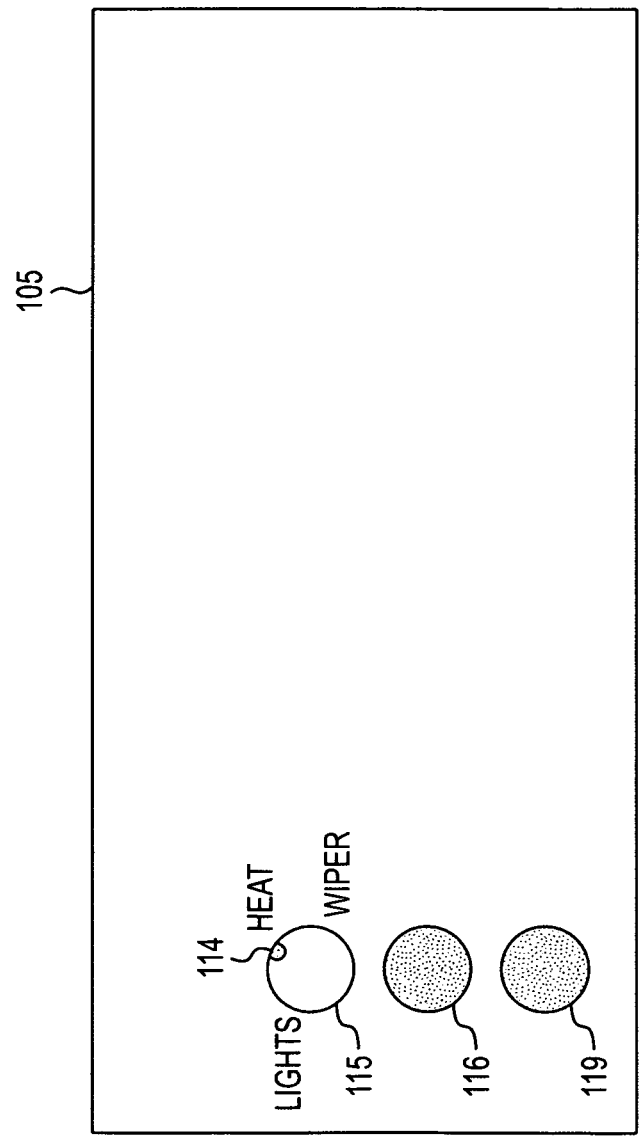

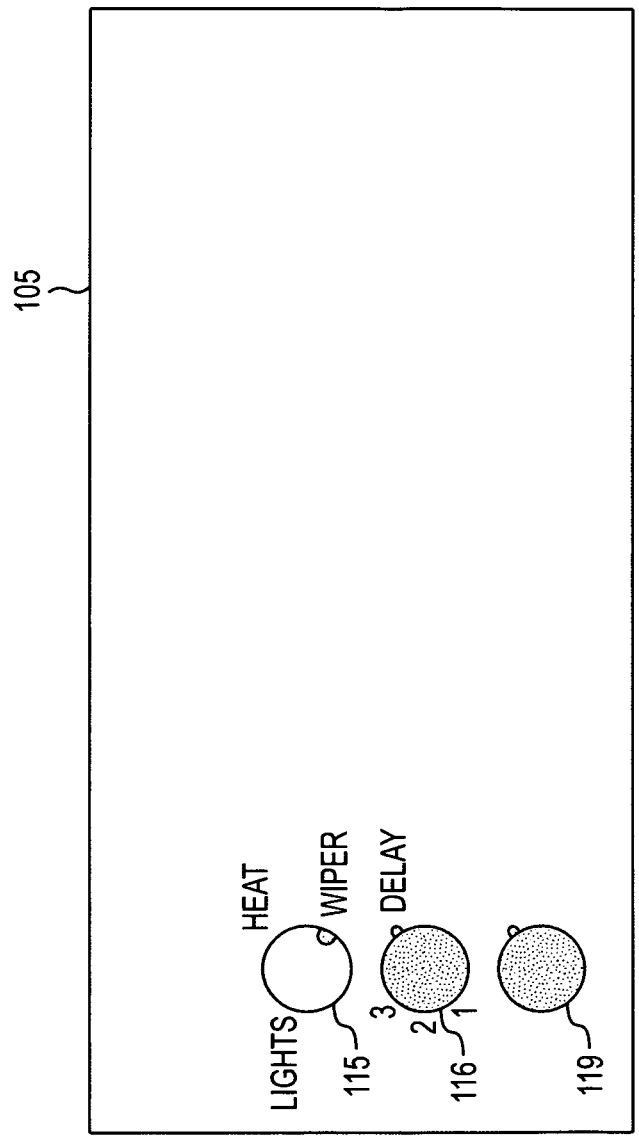

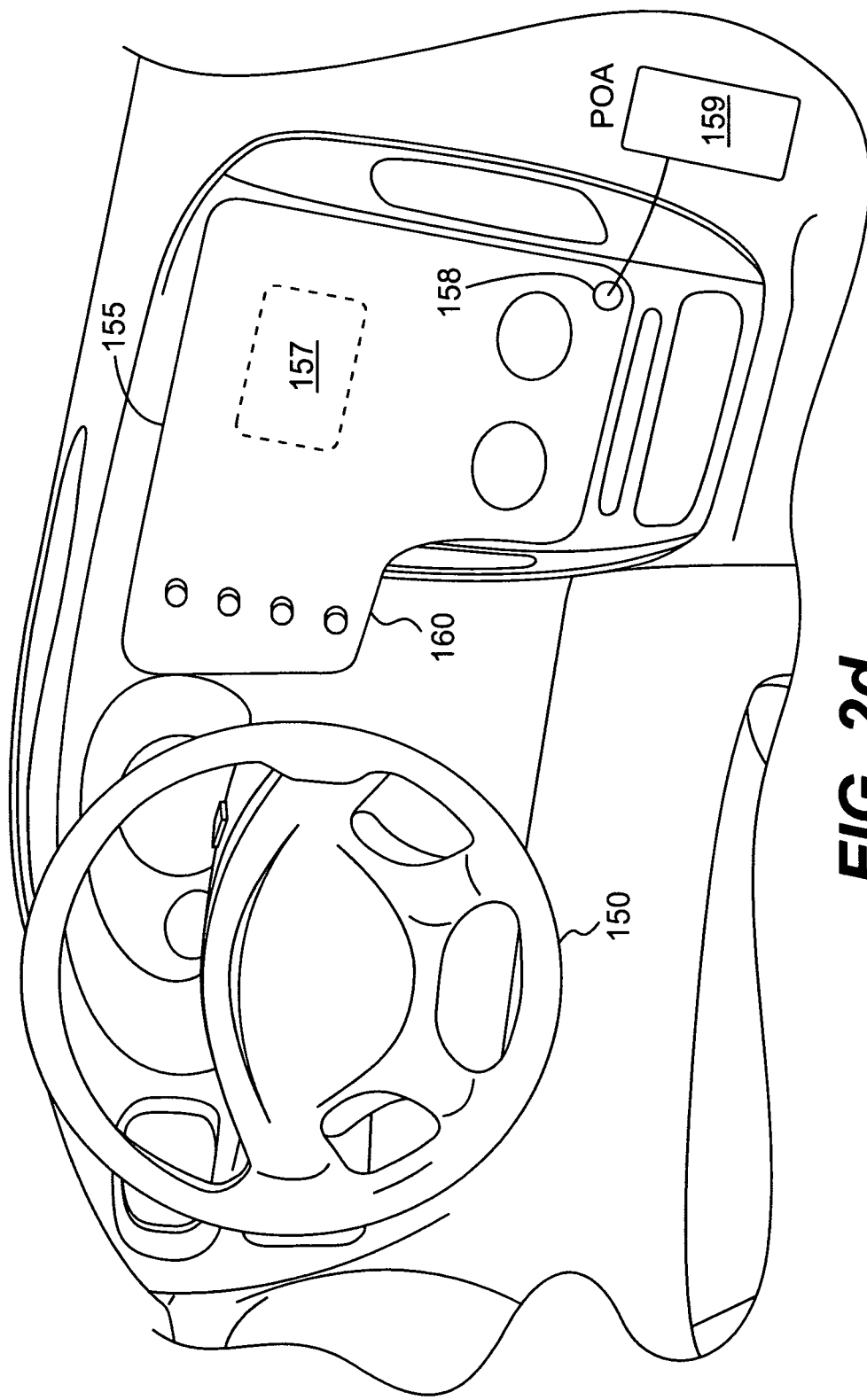

| CLOCK POSITION OF INDICATOR MARKER* | KNOB 115 | KNOB 116 BECOMES VOLUME FOR 115 CONDITION 2 (AUDIO) | KNOB 119 BECOMES AUDIO DEVICE SELECTION FOR 115 CONDITION 2 (AUDIO) |
|---|---|---|---|
| 12 | CLIMATE | VOLUME: SOFT | |
| 1 | AUDIO | | CD |
| 2 | SEATS | | FM |
| 3 | MIRRORS | | AM |
| 4 | DEFROSTER | | |
| 5 | REAR AC | | DVD |
| 6 | | | |
| 7 | | | |
| 8 | | | SATELLITE RADIO |
| 9 | | | |
| 10 | | VOLUME: LOUD | |
| 11 | | | TAPE |

*FIG. 2e*

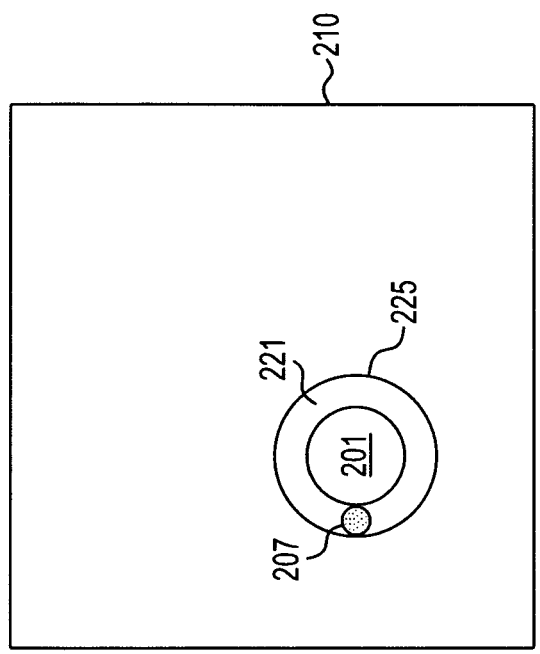

TABLE OF KNOB SETTINGS FOR KNOB 116

| POSITION | IN THREE SPEED MODE | FORCE FEEDBACK | IN 5 POSITION MODE | FORCE FEEDBACK |
|---|---|---|---|---|
| 1 | LOW | 100 HZ | ROCK | 1 PULSE |
| 2 | MED | 200HZ | CLASSICAL | 2 PULSE |
| 3 | HIGH | 300HZ | JAZZ | 3 PULSE |
| 4 | | | WESTERN | 4 PULSE |
| 5 | | | VOCAL | 5 PULSE |

*FIG. 3d*

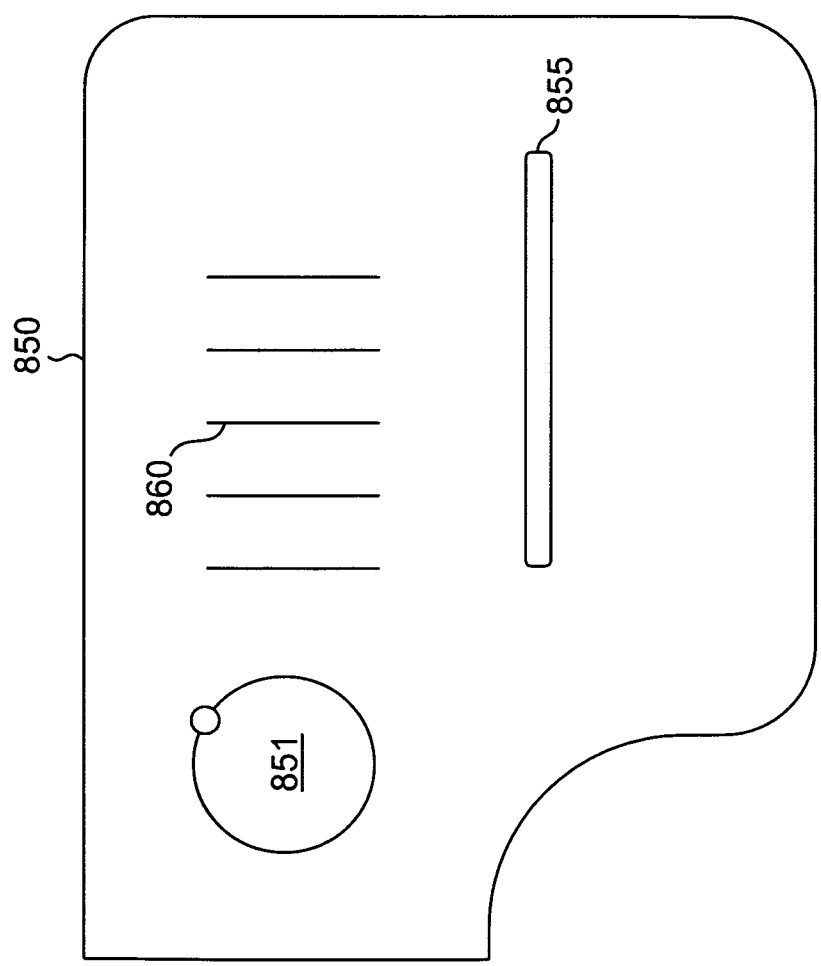

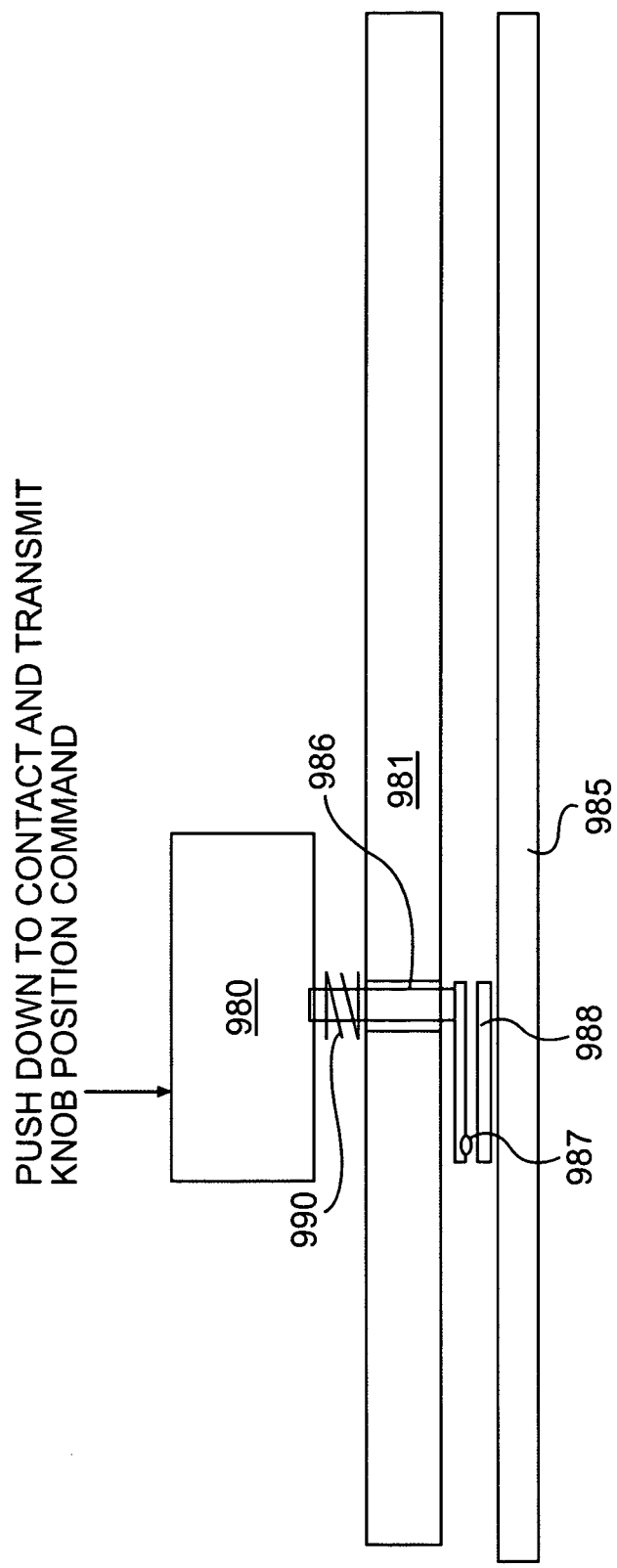

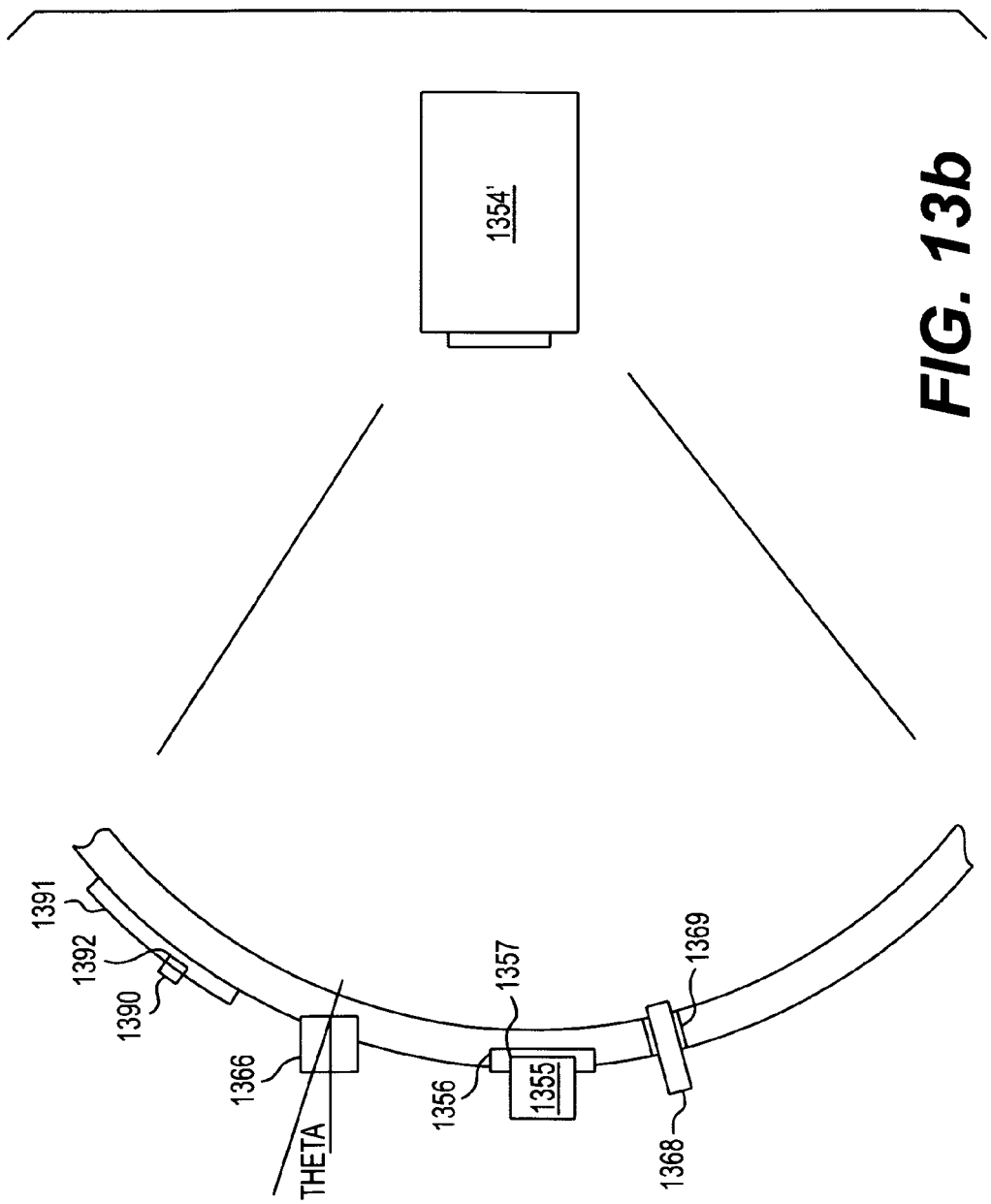

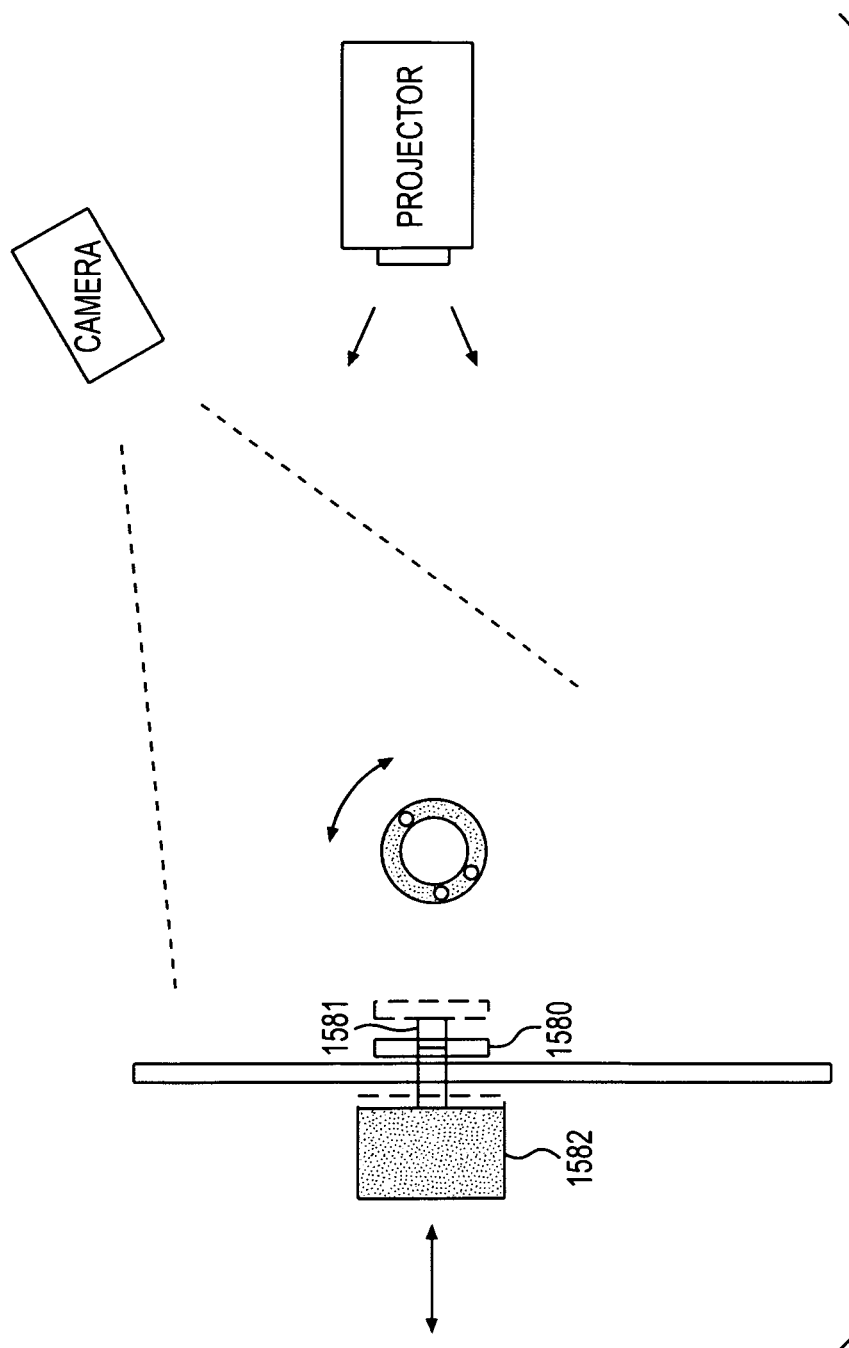

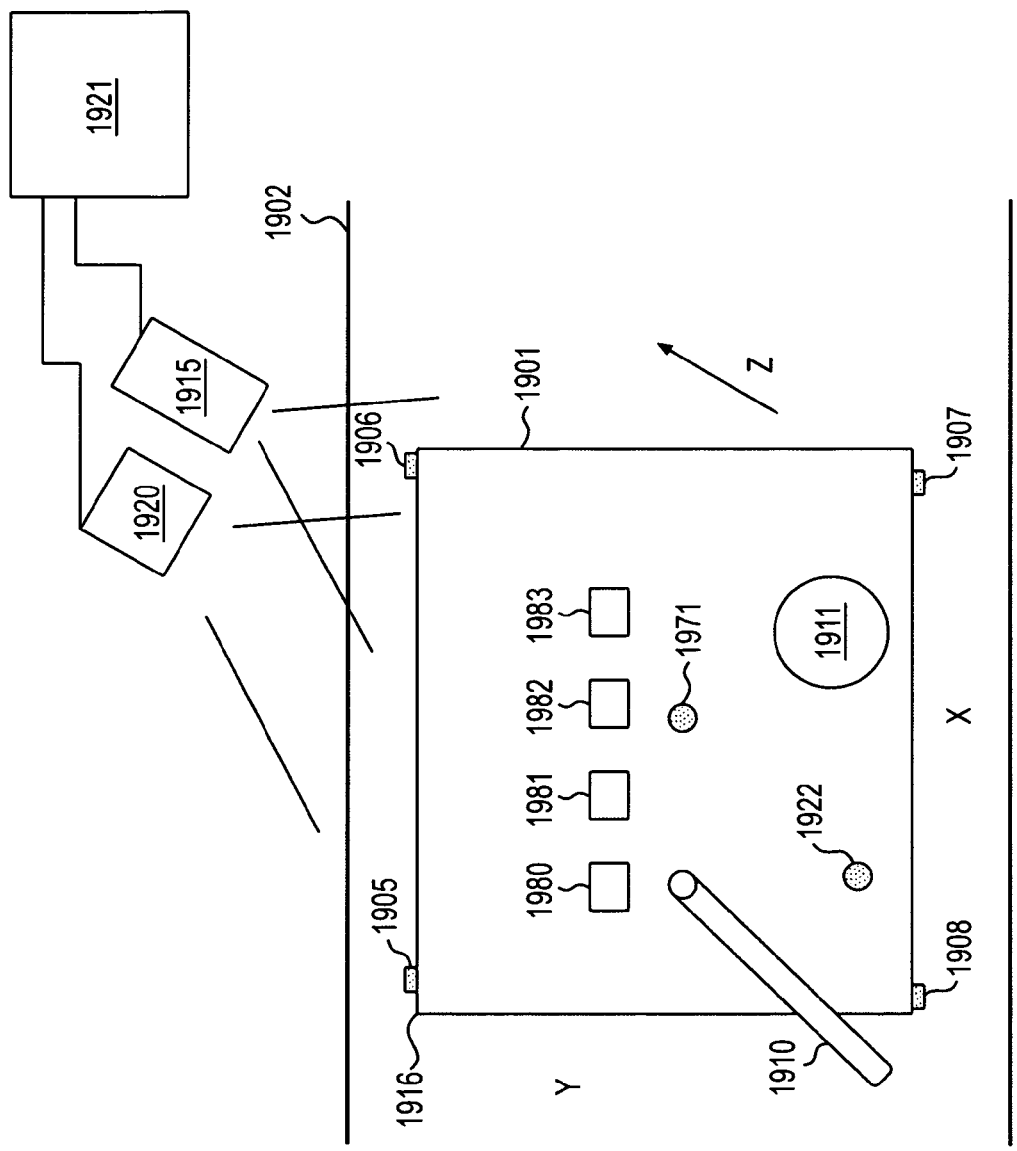

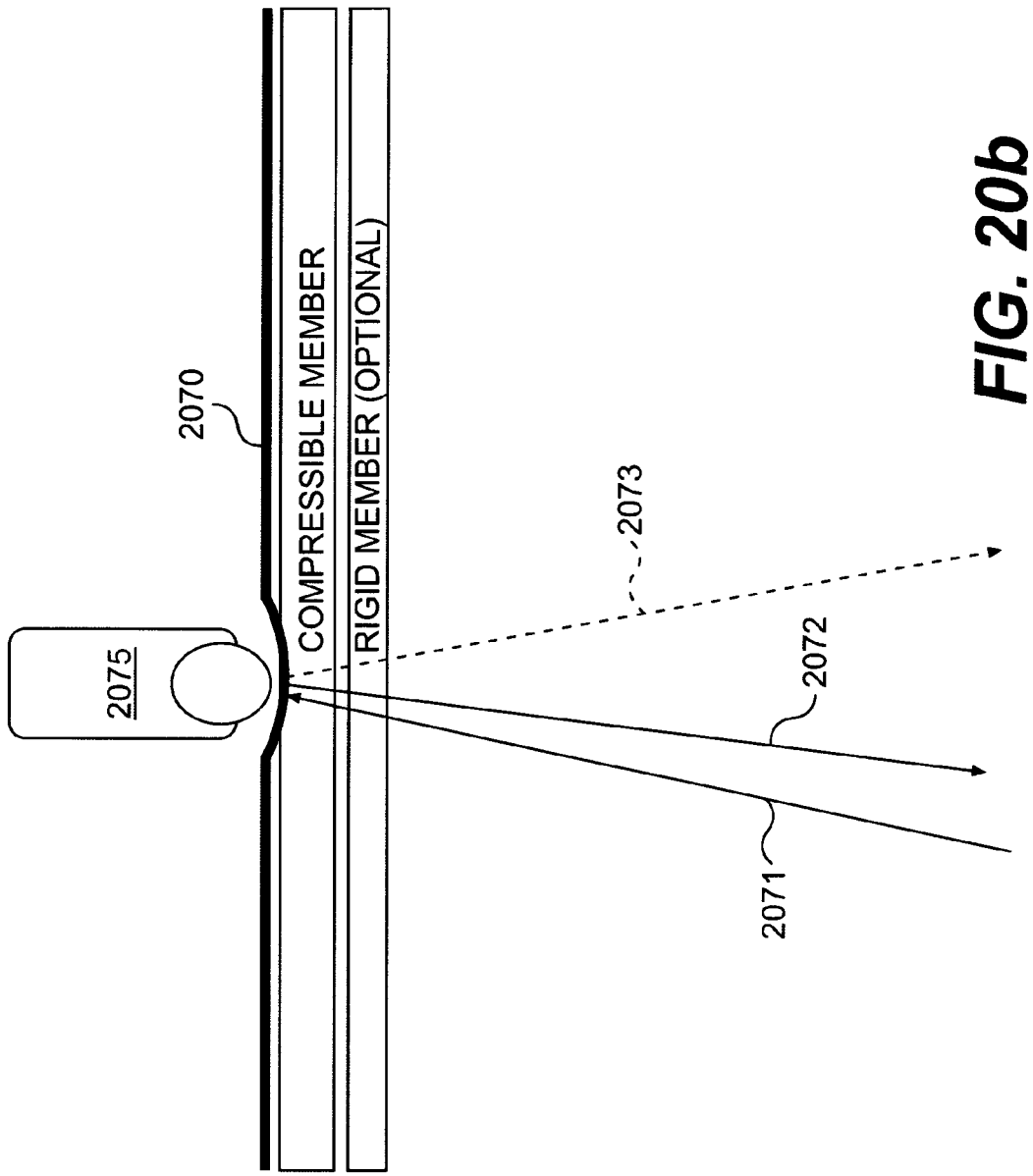

CONTROL SYSTEMS EMPLOYING NOVEL PHYSICAL CONTROLS AND TOUCH SCREENS

CROSS REFERENCE TO OTHER APPLICATIONS

This application is a continuation of Ser. No. 10/611,814 filed Jul. 2, 2003; which claims benefit of Provisional application U.S. Provisional Application No. 60/393,130 filed on Jul. 3, 2002 entitled RECONFIGURABLE TACTILE CONTROL DISPLAYS FOR VEHICLE INSTRUMENTATION AND CONTROL and U.S. Provisional Application No. 60/458,434 filed on Mar. 31, 2003 entitled VEHICLE INSTRUMENTATION AND CONTROL USING RECONFIGURABLE TACTILE CONTROL DISPLAYS. The disclosures of these applications are herein incorporated by reference.

CROSS REFERENCE TO RELATED APPLICATIONS BY THE INVENTOR

1. Programmable Tactile Touch Screen Displays and Man-Machine Interfaces for Improved Vehicle Instrumentation and Telematics, Ser. No. 09/789,538;
2. Touch TV and other Man Machine Interfaces, Ser. No. 09/435,854 a continuation of application Ser. No. 07/946,908, now U.S. Pat. No. 5,982,352, which was a continuation-in-part of application Ser. No. 08/290,516, filed Aug. 15, 1994, now U.S. Pat. No. 6,008,000;
3. More Useful Man Machine interfaces and application Ser. No. 09/433,297;
4. Picture Taking method and apparatus Ser. No. 09/568,552;
5. Methods and Apparatus for Man Machine Interfaces and Related Activity Ser. No. 09/568,554;
6. Useful Man Machine interfaces and application Ser. No. 09/138,339;
7. Camera Based Man-Machine Interfaces Ser. No. 09/612,225;

The disclosures of the above U.S. patents and co-pending patent applications are incorporated herein by reference in their entirety. Also incorporated by reference is the disclosure of U.S. Pat. Nos. 6,314,631, 6,044,183, 5,510,625 and 4,394,683 by the inventor and colleagues.

FEDERALLY SPONSORED R AND D STATEMENT not applicable

MICROFICHE APPENDIX not applicable

FEDERALLY SPONSORED R AND D STATEMENT not applicable

MICROFICHE APPENDIX not applicable

FIELD OF THE INVENTION

The invention herein continues from my copending applications and patents referenced above, and primarily concerns Vehicle Instrument Panels (also called an "IP", and in some cases a dashboard, or dash panel or dash), based on what I call a "Reconfigurable Tactile Control Display" (or RTD for short) to provide a wide range of information, and the safe input of data to a computer controlling the vehicle subsystems. The invention makes use of a unique tactile form of touch screen employing physical selection or adjustment control means which can be felt in a tactile sense, and typically utilizes electro-optical transduction of knob position, finger location, and other variables at multiple points at once. A revolutionary, yet familiar, large screen form of instrument panel enabling safer vehicle operation results which is simple to operate, stylistically attractive, customizable by the user, and programmable in both the tactile and visual sense. It is also thought to be lower in cost than most conventional instrument panels and may have applications in other fields such as military vehicles, control systems, home automation systems, CAD or Graphics terminals, and the like.

BACKGROUND OF THE INVENTION

The Automobile Dashboard or Instrument Panel (IP) as we know it today has evolved in the last 60 years or so, into a combination of control details such as knobs, switches, and sliders for actuation and selection of functions, together with analog or digital displays and light based tell-tales for communication of information to the driver. The actual provision of such components is governed in the USA by FMVSS (Federal Motor Vehicle Safety Standard) 1001: Controls and Displays. In general, this standard specifies overall ground rules for the more critical functions operated by hand by the driver, leaving non-critical functions such as entertainment to the option of the manufacturer. Even some non-critical controls however, are specified as to their design goals, to avoid driver confusion. A particular stipulation of FMVSS 101 states that the Labelling (written or pictograph) for controls must be on or adjacent the control.

The Vehicle Instrument Panel is constrained as to available space for the instrumentation and control functions. Controls used by the driver cannot be so high as to obscure the drivers vision, or too low so as to require too much angular diversion of ones line of sight while in motion (the SAE guideline is 30 degrees max from normal line of sight out the windshield).

In a right-left, or cross-car context, the hand operated controls cannot be significantly behind the steering wheel used in present day vehicles, or too far to reach over to the passenger side by even the smallest driver using them.

In order to achieve added functionality made possible by modern electronics while at the same time reducing the ever increasing clutter of further controls required to achieve even present day functions, there is a big incentive to develop Instrument Panels which can fit in the available instrument panel space yet be reconfigured to serve multiple purposes, always with safe operation paramount. In particular, there is a need to provide such IP's which can not only be used on less critical control and informational functions, but for primary control functions as well, reducing cost and complexity and increasing justification.

Examples of prior art directed at some aspects of the problem are:

U.S. Pat. No. 6,246,935 by Buckley, Jun. 12, 2001 Vehicle instrument panel computer interface and display;

U.S. Pat. No. 6,344,793 Process for assisting a user of a motor vehicle . . . , Geck et al, assigned to Daimlerchrysler;

U.S. Pat. No. 5,757,268 Toffolo, et al. May 26, 1998 Prioritization of vehicle display features (on a reconfigurable display), assigned to Lear Corporation;

U.S. Pat. No. 6,373,472, Driver Control interface System, Palalau et al, assigned to Lear Corporation;

U.S. Pat. No. 5,539,429 Yano, et al. Jul. 23, 1996 Touch device panel, assigned to Mitsubishi;

U.S. Pat. No. 6,067,081 Hahlganss, et al. Method for producing tactile markings on an input surface and system for carrying out of the method, assigned to VDO;

U.S. Pat. No. 5,956,016 Kuenzner et al Operating device for Menu controlled functions of vehicle, Assigned to BMW;

U.S. patent application Ser. No. 09/963,565 Apr. 4, 2002 by Hirose, et al. Display device with screen having curved surface, assigned to Nissan;

PCT Patent application PCT/GB99/04006, Touch Sensitive Switch, Butler et al, assigned to Ford Motor Co.;

US pat app Kind Code 20020002432 Bockmann et al. filed Jan. 3, 2002 assigned to Volkswagen. Automobile multifunctional display and control device method;

In terms of the control of the vehicle, there are basically three major components (not including foot based controls).

Data Displays by instruments either analog or digital, and accessories. Vehicle data is generally speed, fuel level, engine rpm, battery charge, etc. Some of these are rapidly varying (e.g. RPM) others slow (eg. fuel). Some are more important than others.

Hand operated controls, generally today in the form of knobs, switches, sliders, levers and dials. Switches and knobs are most common today it seems. Most are located on the instrument panel, but some are on stalks protruding from the steering column, and window and seat controls and outside mirror controls can most often be found on the doors, or seats. Some controls (such as cruise control, auxiliary radio controls etc) can be found on the steering wheel in many vehicles.

Control labeling, today nearly universally achieved with printed data (language or pictograph) on or adjacent the control, to comply with FMVSS 101. In several cases, the data cannot rotate with the knob.

Modern technology has the ability to greatly expand the amount of data which can be provided, as long as the means exists to display it safely (legibility, position, etc). However, the means to interact with the data, if required or desirable has to be present in the controls, which at the same time need to comply with regulations. The steering wheel, which is a logical place for more control functions, is pretty much constrained today in this regard by the presence of the airbag, and the requirement for slip rings or other complex wiring Central to the issue, is the question of just how the driver uses the controls? I have observed that a driver of a vehicle today, interacts with the controls of the vehicle instrument panel, primarily in three ways:

By sight only;

By touch/feel only (possibly accompanied by a sound, such as a click—usually corresponding to a feeling sensation such as provided by a detent;

By a quick glance, and then touch—possibly followed by another quick glance to check a further or final setting of a knob, slider control, etc.

Feedback as to correctness of the action taken, if not obvious from sight or feel of the controls, is often times derived from the action of the device controlled itself, for example seeing and hearing the windshield wipers moving at high speed, when they were moving at low speed at a previous control setting.

Often while driving, only methods 2 and 3 above can be effected, as the control details may be too small to read or operate (radio function buttons are notorious) and/or require too much concentration (i.e. too many glances at the controls and their lettering, pictographs, and position) while driving to allow one to take ones eyes off the road for the time required to use sight only. Accordingly, for many users today, some functions are effectively inoperable while driving, since they cannot be worked by touch only due to the crowded nature of their placement, and they are too hard to see in a glance—especially for those who cannot easily correct their vision away from the far sighted vision needed to drive.

It should be noted that certain technical papers indicate that single glances of more than 2 seconds duration are considered unsafe, and some traffic safety researchers feel the limit to do any control activity should be just a few glances of no more than 1.2 sec. each. These studies indicate in considerable detail that excessive glance time can be related to ten's of thousands of deaths per year in the USA alone.

The new Auto Industry guide lines for "Glance time" suggest that control of the vehicle function should not require one to take ones eyes off the road for than 2 sec max, and no more than 10 glances (of 1-2 sec. ea) should be required to complete the operation in question. (while seemingly are a large number, some navigation tasks in certain vehicles have historically taken considerably more than this). This would seem the minimum stipulation one could possibly recommend in light of the suggestions in many technical papers. And it suggests that indeed there is considerable room for improvement to not only the situation today, but even what is being contemplated.

Not only are there problems seeing or touching small complex controls, some controls are not intuitive, and hard for the general public to understand in the manual, even if one has time to read and comprehend it. This manual comprehension problem is increased considerably, for those buying more expensive vehicles on short term leases. These vehicles are in addition, usually the ones with the most features, (and generally therefore the smallest buttons, due to instrument panel congestion), and many persons seldom take the time to fully digest the manual. (Some manuals today for feature oriented luxury cars are several hundred pages long!)

Generally a few functions, such as turn signal stalks, transmission levers, and some knobs are big enough and/or simple enough such that only touch is needed, combined with feedback from sensing the physical action enabled (e.g. wipers switched to high speed). Thus after some acquaintance period, most vehicles enable the driver to perform the basic functions by touch alone, or just a reasonably quick glance and then touch. However, this often applies only to basic operations, given the learning curve involved and the difficulty in operation of added features, such as complex HVAC (heating ventilation and air conditioning) systems, navigation systems, and "infotainment" devices.

The present situation thus greatly constrains the addition of still further vehicle related functions, made possible by computing, electronics and communication technology. Heretofore, the addition of such functions in some cases has been distracting to the driver and thus dangerous to the public. With fixed instrument panel space, much of which is taken up by airbags, glove compartments and the like, manufacturers have resorted to the above mentioned expedient of ever smaller and more complex controls in the remaining space, in order to gain functionality. Many are in addition located out of the drivers normal line of sight, and some even require one to stare at changing numbers in an awkward location. Others require reading very small print (often impossible for those requiring reading glasses while driving—a real dilemma for many drivers over middle age particularly).

Of late, many have shown interest in "Voice Recognition" as an answer to such problems, and increasing numbers of vehicles such as the Infiniti Q45 and Jaguar "S" model, have such incorporated. Using ones voice (and the listening to computer voiced data streams) in theory could reduce the need for glancing at all.

However, voice recognition has many problems. For example, to be useful, vocal prompts for the driver are often needed, which can be time consuming, frustrating, and difficult to hear. Undue concentration on same can also cause unsafe driving, and masks the presence of sirens. In addition, voice is both linear, and sequential. Only one message/action can be executed at once, and generally needs to follow a previous one. And the whole message has to be understood by the driver, or data can be lost and the process required to be repeated, which can cause driver frustration and endanger safety in extreme circumstances.

I have felt for some time that voice is not the answer. A recent study by Dr. Ben Shneiderman at the Human Computer Interaction Lab at the University of Maryland reported in The Washington Post, Thursday May 9, 2002, noted that voice commands also require much more precious brain activity than visual "eye-hand" tasks. Thus voice cannot be good for driving safely. The Instant invention however, maximizes the efficiency of such Eye-hand tasks, making them familiar and easy to see and act upon.

Voice aside, perhaps the only way more data can be presented to, or received from, the driver is through the use of specialized displays and entry devices which can be reconfigured to suit the need of the user at the instant of use. Such displays are commonplace today in the computer world (e.g. "Windows", "Web Browsers"), so why not in a car?

Some companies have proposed or developed conventional reconfigurable computer "windows" type systems using up/down/left/right buttons or even joysticks to select the various software presented screens and menus thereon in an attempt to solve this problem. Such devices are however, not intuitive and hard to use, for at least 95% of the populace I feel. Because of such problems, even where implemented, they have been relegated to non-critical functions, such as navigation, climate control, cell phone dialing or audio system entertainment. And even here, they are intrinsically unsafe in many manifestations. There is little or no tactile feel, and too much reliance on consecutive visual recognition of displayed items—which in addition are often small in size, as noted above.

Problems with computer displays of the multiple windows type used in vehicles, are discussed in U.S. Pat. No. 5,995,104 by Kataoka, aimed at a Navigation system. Some opportunities available with computer based data presentation in visual and multimedia form are discussed in Obradovich, et al U.S. Pat. No. 6,009,355.

It should also be noted that the lack of natural intuitive tactile feel further makes such menu driven "pure computer screen" type systems slower to operate and constantly requiring visual concentration. This is an issue when the control system is used for any time-critical tasks and has obvious safety connotations.

This is not just true in cars, but in other stressful situations as well, for example in military vehicles, construction equipment, and control of home appliances by a harried housewife in the kitchen.

Another approach to reconfigurability is a touch screen, which is widely regarded as one of the most intuitive of computer interfaces. To my knowledge, the application of touch screens for computer input in automobiles was first achieved in the 1988, in the General Motors Buick Riviera using a relatively small CRT display located in the center stack, in a relatively low position. Such a display is described in U.S. Pat. No. 4,787,040 by Ames, et al. entitled Display system for Automotive Vehicle issued to IBM Corporation Nov. 22, 1988.

However, widespread employment of such touch screens has historically has been limited because it cannot be operated by feel, and requires of a driver more than a quick glance to operate successfully. This is in part I believe because there is nothing on a conventional touch screen to reference ones self to, except the displayed data itself—which then has to be continually read.

To combat this problem (experienced in the early Buick display and others), some vehicles such as the Cadillac CTS have incorporated ordinary non-touch screen LCD displays, with buttons and other conventional touch type controls around the periphery thereof to effect reconfigurable operation in conjunction with icons displayed on the screen nearby (and thus to a degree meet FMVSS 101). Taking this a step further, the Denso Company has worked with Jaguar to introduce a touch screen of the LCD type in the their X model. It has a small 7 inch screen, also surrounded by conventional buttons and touch controls, and located in the center stack. But the display itself has no reference and no feel, and the surrounding buttons are, as in many other examples, small and hard to read. Thus the fact that certain touch icon functions on the screen are reconfigurable is only a small improvement on the previous and prevailing situation.

Another example of a touch type data entry device is that of U.S. Pat. No. 6,067,081 by Hahlganss, et al., assigned to VDO corporation of Germany, an Automotive parts manufacturer. This is a device providing programmable sensations, which can be used in conjunction with a display screen, though there is no teaching that the touch is of the display screen itself, desirable for intuitive interaction. Thus the Hahlganss et al invention would seem not to comply with FMVSS 101.

Palalau et al, U.S. Pat. No. 6,373,472 includes switches on the steering wheel with a heads up display on the windshield. This is a novel approach which offers many advantages, but requires added cost and complexity, and a departure from the customary vehicle operation that drivers are used to. In addition it could be dangerous in some cases as the more fumbling with the wheel that occurs, the more the possibility of changing vehicle direction as a result. And too, the wheel, with its airbag and rotary motion, severely limits the amount of sophistication one can put in the controls thereon.

A recently published PCT application PCT/GB99/04006 by Butler et al of Ford motor company illustrates a multi-functional switching device for the operator to use whose groove aspect which bears some similarity to certain tactile groove aspects of the invention, though it is neither a touch screen nor reconfigurable per se. Like some embodiments of the instant invention, it can provide data only when needed by the user ("secret until lit" feature), but it cannot be reconfigured as to what this data is.

An alternative control device for a car having sensations of feel is a force feedback joystick coupled with a conventional (and programmably reconfigurable) display, such as an LCD based display, on the instrument panel. One example, called "I-Drive", has been introduced by BMW in its 7 series car and appears to be disclosed at least in part in U.S. Pat. No. 5,956,016 of Kuenzner et al of BMW and in U.S. Pat. No. 6,154,201 assigned to Immersion Corporation, which describes various force feedback of a conventional type to a knob useful for automotive or other use. This has some similarity to certain "programmable feel" related aspects of the present invention and its predecessors, even though the knob disclosed is not located on the screen, nor inter-related with touch characteristics of the screen as is the instant invention.

As a general comment, I-Drive does not appear to be intuitive to use, and has received considerable criticism in the Automotive press (see for example, Road and Track, issue of May 2) The manufacturer must have realized this, as in the 7 series manifestation at least, many of the functions are backed up with conventional controls. as well, thus adding cost. This also may be because the FMVSS 101 regulations require the markings of a control to be on or adjacent the control, and the joystick device by itself cannot meet this criteria.

If one can provide a reconfigurable instrument panel that can be safely used, then U.S. Pat. No. 5,757,268 Toffolo, et al. (referenced above) gives a good description of some of the opportunities available in optimizing the presentation of displays and the information provided. Toffolo however, is focused on a conventional display screen approach and is generally limited relative to the display size, two areas over come by the instant invention. And Toffolo does not address several control areas of considerable importance, such as designation or confirmation by the driver of data, or the overriding of important controls (e.g. speedometer) by visual or other data in the case of emergency situations.

Finally there are many projects around the globe aimed at sensory equipped intelligent vehicles and highway systems. Representative patent applications in this area are Ser. No. 09/963,490 Road lane marker recognition by Furusho et al, and Ser. No. 09/951,499 Lane recognition apparatus for vehicle, Shirato et al, both of which are assigned to Nissan, and utilize TV camera and machine vision technology to help guide a car such that it stays within lanes. Some of this technology however is very difficult to perfect in a full automatic mode. I know of no reference which has addressed the issue of manual assist to such systems, provided in a large screen tactile control and display device of the type disclosed herein.

To conclude, no prior art reconfigurable instrument panels known to me provide any feel on a display screen itself, as to where on the screen the users finger is, nor do they provide a method for tactilely signalling information back to the user data which would make reliance on long and dangerous glances unnecessary In addition, no prior art instrument panel uses common knobs and other selection and control details familiar to the driving public of today which can be reconfigured either physically or in terms of their displayed function, data or other variables in a manner that appears to intrinsically comply with FMVSS 101.

Furthermore, no prior art instrument panel I am aware of provides means for safely displaying real time or down loaded video data to the driver in a large enough to easily to see in a cost effective manner, vital for observation of critical events inside and outside the vehicle, as well as to make downloaded information from remote sources easy to see at a glance. And in the same vein, no known instrument panel is capable of providing large lettering for all necessary controls to aid the elderly or vision impaired driver.

And in the same vein, no prior art reconfigurable instrument panel to my knowledge, and even many controls of conventional IP's, do not utilize controls which can easily be "hit" or otherwise actuated, with just a helping glance or by feel alone. And, no prior art teaches incorporation of both knobs or other control details and tactile touch functions on an instrument panel to allow one to optimally execute functions in concert.

In addition to the prior art referenced above, there are a series of related US Patents by Denny Jaeger, some of which are in conjunction with Kenneth Twain (eg U.S. Pat. Nos. 5,572,239, 5,841,428, 6,326,936) which relate to techniques for implementing control devices such as knobs and switches on flat panel displays (electroluminescent or LCD) to achieve the benefits of controls function reconfiguration. The approach taken however, results in complex (and expensive) systems which, while programmable as to the display, do not facilitate interchange of the physical components. In many embodiments too, they require significant optical compromises in the display (such as blank spots) and the flat panels used require specialized busbars removing these displays from the mainstream activity. In some cases, intolerable leakage problems can occur as the LCD liquid crystal material can leak around the knob shafts for example.

To solve the problems encountered, some embodiments (of the many shown) of Jaeger and Jaeger et al., have attempted to use optical techniques to shoot through the screen so to speak. In the earliest example, a detector and source for each device such as a knob or switch, is located and attached to the other side of the display. It is positioned to shoot through either a specialized transparent busbar or a bus bar routing hole specially created in the display. This can work presumably, but is complex and expensive, and would appear to use up valuable display space, as well as requiring a device dedicated and positioned to operate each physical control. In LCDs requiring separate specialized backlight sources for their operation, such sensing devices would appear impractical, as they would block the radiation from the backlight.

Where optical sensing is employed in later patents by Jaeger and Jaeger et al, these inventors have apparently focused on having the sensing device (eg a phototransistor) on the front of the display, located on a member attached to the screen in some way. Either the light source is also on the front, or light from the display is programmed to interrogate the position of the sensor on the knob which senses this activity. The inventors also have disclosed sensors of this type which are largely incremental, rather than absolute, which limits some control regimes and can cause errors. Additionally, Jaeger has disclosed a small LCD device electrically placed on the front of a knob or button and controlled to change information thereon, an approach which requires specialized wiring and LCDs for every physical control detail used.

Finally, Jaegers invention are specific to flat panel displays and cannot provide curved or irregular display capability of maximum utility and style for Automobile instrument panels, and teach little or no ability to use materials other than glass as the display surface, also a requirement in vehicles (for passive safety and other reasons), especially as the displays grow in size.

The instant invention solves all of these problems, by using an electro-optical detection means, typically an inexpensive TV camera, to sense, typically from the rear of a rear projection display of nearly any material and shape, more than one physical detail and its position, and generally its absolute position as well. And it can operate on any desired combination of physical control details (such as knobs sliders etc) with only a software change. This then enables the complete interchange of the display and control surface, including any control details such as knobs, which are simple passive devices with no wires needed. In addition, the invention herein, unlike the prior art, allows an integrated touch screen capability to be provided which can be completely integrated with the physical control capability, in some cases even at no added manufacturing cost. The Instant invention is thus arguably of higher performance, simpler to maintain, and lower in cost—especially critical for high volume applications such as automobiles.

SUMMARY OF THE INVENTION

Since Voice based systems cannot be relied on for command and control functions, some combination visual and tactile system is needed, resembling to a degree the instrument panel today, which also has the advantage of ease of learning and compliance with FMVSS 101 if well designed. But how to make this reconfigurable to allow added functionality and other features? And can it be done in a way that could improve the safety of operation of vehicles over conventional practice today?

A touch screen approach becomes attractive, if it could be envisioned it as both a tactile and a visual replacement for a large measure of the automobile user instrumentation and control functions of the instrument panel of today—a dramatic move, filled with other advantages in flexibility, ease of use and user benefits, as well as potentially lower cost. If such displays could be physically larger, and operated at least in part by feel like a conventional instrument panel, then they would be much more acceptable in the car, for use by the driver. And they could thus perform more of the required control functions of the vehicle as well as telematics, communication, and other activities. And they could potentially comply with FMVSS 101 and other existing regulations.

However, as described above, no prior art touch screen type device has a "feel" or "tactile" quality to enable use by a driver of a vehicle without undue visual concentration. There is no non-visual cue, either active or passive, in the prior art touch screen display to indicate where to touch, or what has been touched. One has to physically study the display to obtain this information, which may be difficult or impossible in certain driving conditions.

The invention herein answers this need with a new form of "touch screen like" control device particularly suited for Automotive instrument panel application. It introduces the concept of a "Control Surface" which together with the associated display creates what I have called a "Reconfigurable Tactile Display" (or "RTD"). As explained further herein, it can be much larger than a conventional instrument panel display as it can much more efficiently utilize the available instrument panel "real estate". Because of this it is further capable of displaying video, textural, or graphical images in a manner which can be acted on easily by the driver of the vehicle. The RTD invention not only has a number of quasi-conventional and other tactile characteristics that make it ideal for instrument panel usage in vehicles, it also may find application in aircraft and certain military control applications, as well as in the home.

The disclosed invention, is similar in certain key aspects to the conventional instrument panel of today (for example in its use of quasi conventional knobs, sliders and switches), and appears to comply with the US National Highway and Traffic Safety Administration Federal Motor Vehicle Safety Standard 101 for Controls and Displays (FMVSS 101). It may be one of the few, and perhaps the only, fully reconfigurable device capable of doing so, an extremely important feature. And it easily meets and exceeds the recent industry promulgated guidelines in so far as glance related Driver Distraction issues are concerned. See for example, Automotive News, Apr. 5, 2002, "Automakers set Telematics guidelines—Alliance (of Automobile Manufacturers) seeks to limit driver distraction".

The disclosed invention, including co-pending applications incorporated by reference, contains unique embodiments which allow one to interact, by feel, as well as by sight and voice/hearing, with displayed data. It encompasses four main areas, generally, but not necessarily, employed in synergistic combination:

1. A display including several features commonly associated with a touch screen, but in a new and greatly expanded form which can be sensed by the driver or others in several tactile manners, as well as visually. This allows the display to double as a control surface, and in preferred embodiments the tactile sensation indicates where to touch, but does not appreciably disrupt video or other data which may be displayed in the same area of the screen. One can with this feature, find the appropriate place to touch with only a very brief glance at the screen. And in some cases by one can determine this by feel alone, using the programmable feedback aspects of the invention, or if the user has learned by previous use, the location of certain tactile points in relation say to the sides of the screen, or to knobs or other features on the screen.

2. A tactile, physical, selection or adjustment means, (also called herein a control detail), such as a knob, slider, lever, or switch, programmable in its tactile or visual nature, and generally (but not necessarily) incorporated with, and generally operated in conjunction with the touch screen just described. In a preferred embodiment one or more knobs, sliders or other details are located right on the screen, such that the representation of their meaning or magnitude can be reconfigured by programming the display and the associated readout of their angular or Cartesian position on the screen.

3. An optional programmable touch sensation generator as well as means for generating audio feedback as desired, operable with either 1 or 2 above, which further assists "eyes on the road" driving while utilizing a programmably variable control and display device. This allows the driver to determine the state of controls, and even what to do with the control, with little or no visual data needed in some cases, thus greatly enhancing utility of electronic and other features which may be provided to the driver using modem camera and computer technology, for example. In several embodiments, a force, vibration, pulsation, or other sensation felt may itself be programmably changed, adding to driver understanding, and enhancing safety.

4. In the preferred rear projection embodiment, the above features may be cost effectively provided in an aesthetically pleasing large display/control surface of maximum size in the available "real estate" on the instrument panel within easy vision and control of the driver. This large display/ control surface provides the ability to display and interact with much more data, in a much more visible and effective manner. Besides allowing the driver to optimally control the vehicle functions, video and graphic data can also be safely provided, for example, from sources within the car (such as children in car seats, or mechanical conditions, such as power or braking distribution, engine data etc), on the exterior of the car (such as obstacles, rear view TV images or curb locations), or transmitted to the car from remote sources, such as "Onstar" or TV cameras located at intersections along the roadway.

It should also be noted that the large display afforded by the invention, and its associated visibility to the driver (and especially older or vision impaired drivers) is further synergistic with some of the safety and ease of use features of the invention. The degree of synergy provided is far more than just "bigger is better", and is a critical to the safety improvements afforded and other issues of vital interest to the public.

Because of its unique design in which the control surface and the display co-exist, the invention can provide, at affordable cost, 5-10 times the effective display area (relative to conventional LCD screens used in vehicles today for navigational systems and other purposes) and provide a substantially increased control surface and its attendant ease and flexibility of operation, while still meeting the FMVSS 101 regulations regarding labelling of the controls. This means many advantages, can be provided the user. For example:

Larger lettering or pictographs can be used, making comprehension with quick glances easier. For many drivers, this could be the difference between something of great use, and something use-less. The lettering can be in ones language of choice as well.

More data of the same size can be presented at once obviating the need for frustrating menu selection.

The size of any tactile control devices such as knobs can be larger, also because they can provide multiple functions.

Because the display is also a touch device, the much bigger nature of it also allows one to more easily select, operate, or "hit", in the case of a displayed button say, the desired function.

Video and other data can be presented alongside text data.

Video data and close-ups of certain sections can be provided. Another example is a navigational display of an overall geographic region with an inset near the instant location showing detail, both side by side Video and other data can be provided for driver confirmation or designation in the case of critical images and stereo camera pairs.

One of the synergistic aspects is that at little or no added cost, the RTD can be provided in a size and configuration that can be used to safely and cost-effectively supplant many of the normal IP functions. This then lets the manufacturer standardize on the device for all customers of not only a particular model, but perhaps all models, with only cosmetic variations. This has huge savings implications, also in retooling costs.

Because it resembles today's instrument panels, and can be used for the basic control functions of the vehicle, the invention provides not only a potential means of telematic connectivity while driving (e.g. with the internet, cellular telephonic sources or the like), but a much more useful display and control system capable of many more functions—including the primary vehicle control functions, if desired. I feel that an instrument panel incorporating the invention can be built at lower cost than a conventional instrument panel, especially as vehicles become ever more loaded up with navigational systems and other electronic functions incidental to the control of the vehicle.

In addition, it can enhance safety by promoting a degree of standardization between vehicles not now practical from a marketing point of view. This is because certain functions could be common, with the decorative and other portions customizable.

Furthermore, the large display in the drivers line of sight without appreciable head movement, also provides a method to validate and confirm data from intelligent subsystems inside and outside the vehicle, and further allows the driver to assist such systems by designating areas of interest for tracking, stereo matching range detection and other purposes.

Several embodiments of the invention are disclosed herein. The preferred embodiment utilizes a compact computer controlled rear projection display which on its screen (or an overlay thereon) is located a combination (any or all) of the following elements:

knobs switches, sliders, levers, or other physical control details as desired, similar to the Instrument panel of today;

Tactile guides, either grooves or relief, or textured surface portions which may be easily and rapidly sensed by feel, but are and typically small enough in height/depth or slope so as to not appreciably disturb video images on the screen in the same location;

Programmable acoustic wave source(s) which can under computer control cause vibratory or pulse signals to be transmitted and felt by the user, whether touching or grasping a knob, or touching the screen.

In addition, the whole thing may include a touch screen on which arbitrary data can be projected and interacted with in arbitrary locations, as well as locations in which knobs, tactile guides and the like are provided.

The position or movement of any knobs (rotation) or levers (linear motion) or switches is monitored, as is the location of finger touch on the screen. In one preferred embodiment, the same machine vision system performs both functions, and is integrated with the computer control of the display and the force feedback. The total system is elegantly simple, and allows for a myriad of additional features. Particularly of interest are those in which the tactile aspects of the instrument panel can be tailored in their entirety to the needs of individual users or the desires of individual vehicle model development.

To Recap some aspects of the above discussion,

The invention seeks to maximize the available Display and Control surface "Real Estate", while greatly reducing glance time. Glance is reduced primarily because:

Lettering is bigger and easier to see. Size and type can be varied as well;

The control surface provided, and the Controls themselves are bigger to act on, requiring less fumbling, and providing more certainty of action on the "first try";

Controls can be actively or passively felt, reducing or eliminating the need for taking ones eyes off the road, using, in the active case, force based signals.

The lettering can be made larger because of two primary reasons. First, the invention, because of its placement of substantially all desired controls on the display screen, allows the display to be physically largest in the area available for same in the vehicle. And second, the controls, because they are reconfigurable, allow the lettering for any given control function of the moment, to be maximized in size, and placed optimally, in location, and orientation for driver comprehension, even in different driving situations.

There is little or no wasted space resulting from permanent lettering and spacing of control functions as exists today.

And the display can tailor the coloring to suit the driver in certain instances. For example, I am red green color blind, as approximately $\frac{1}{16}$ of males are. For me the use of these colors in little LEDs on the dash is very confusing. Were they yellow and blue for example, I would have no trouble discerning their state. With this invention they can be lettering and indicators I can see well.

The display is in turn large in the preferred embodiment, because it maximizes the limited space available and can share space between some types of control actuation functions and video displayed information. It uses in the preferred embodiment, a rear projection type display which can be cost effectively scaled to large areas of the instrument panel as desired. This allows one to entertain the idea of providing enough control functionality on the display, that a significant number of control and display functions can be incorporated, making the invention cost justifiable even on economy vehicles. This too is radically different, as advanced features such as the invention provides have heretofore only been available to wealthy buyers of high line vehicles. The rear projection display has the added benefit too of providing a cost effective way to create not only a large tactile display surface, but an odd shaped and stylistically attractive one as well, also allowing maximal utilization of the available instrument panel space.

In the same vein, the RTD invention allows the controls to be located on the display, not requiring them to be arrayed around the periphery, in order to satisfy FMVSS 101 or other criteria. This in turn allows ideal placement of lettering and other instructions. And they can be displayed programmably in the center of a device, such as a knob to save more space. And visually displayed data can in some cases be "felt". And in some embodiments, the operator can be guided to location of an input or output on the screen by feel—either passive or active.

The controls can be larger, because once again the device is reconfigurable, so large controls can be used, as their function can be changed, and or augmented by other virtual controls which permanently occupy no physical space. And because of the display construction, space wasting prior designs incorporating LCD or other displays, in a manner to comply with the desirable tenants of FMVSS 101, are not required.

The invention further discloses an embodiment utilizing an organic light emitting diode (OLED) display screen, which has a more compact layout than that of a rear projection version, while still having many useful features thereof.

Additional embodiments illustrate improved methods of sensing finger touch in order to provide "virtual" controls with little or no added cost, as well as physical reconfigurable controls—important issue in high volume applications. For automotive application, such sensing needs to be at once low cost, rugged, amenable to interior design and material considerations, and immune to common conditions experienced in the vehicle.

Further embodiments of the invention illustrate improved methods for providing data in knob and button or switch devices and interiors.

Other Embodiments disclose improved sensing of button and knob positions, also in multiple axes and in the z direction into the control surface.

An improved version for the home is also disclosed, in which commensurate savings in switch gear and displays of individual appliances and other devices such as furnace thermostats and the like can be expected. In addition, the home application in conjunction with the car further reinforces the familiarity and commonality of controls and provides added economies of scale. This application expands on the use in the home, particularly with a kitchen based control system.

In one embodiment, the control and display device of the invention is located in the center stack, and judiciously can, if desired, replace substantially all controls of the vehicle even if conventional knobs and switches are employed, while still providing added functions and display screen space for advanced features. And it can do this at less cost with significant stylistic advantages.

Disclosed is a simple and easily understood format for the control surface/display screen is disclosed which allows what I feel is the preferred transition for the average motorist from the instrument panel of today, to a reconfigurable one of tomorrow. This is based on common Radio and heater controls, and their conventional position on the Instrument Panel of the last 50 years or more.

Further embodiments include alternative methods of display and sensing on rear projection screens, including using scanned optical beams which can be advantageous for cost or signal to noise purposes. Such scanning may be advantageously provided by "MEMS" type devices, and can utilize the emerging availability of high power, "White" or colored solid state light sources such as LED's or Diode lasers which may be very desirable for high reliability in the vehicle.

To sum up, the preferred embodiment has a rear projection display, knobs or other control details, tactile guides and programmable feedback. It typically has a large screen and control surface to aid vision and interaction, and is multi-function and reconfigurable. It is capable of displaying video, textural, or graphical images in a manner which can be acted on easily by the driver of the vehicle. The RTD invention not only has a number of quasi-conventional and other tactile characteristics that make it ideal for instrument panel usage in vehicles, it also may find application in other areas such as aircraft and certain military control applications, control of heavy machinery, as well as in the home. Anywhere that for example, ease of use with familiar controls, large display areas, and ease of function in time sensitive situations are required or desirable.

Given the above it is therefore a goal of the invention to provide a safe, familiar, and easy to operate instrument panel which can reduce driver distraction and improve functionality especially for the elderly or visually challenged and for those drivers who are not technically astute.

It is another goal of the invention to provide a display screen and control surface which optimally utilize the space available in the vehicle instrument panel and minimize wasted space required today to meet regulations or provide fixed lettering and devices.

It is also a goal to place the display screen and control surface where they can be optimally seen and interacted with, including the provision of controls which are easier to see and bigger to work with than many controls today.

It is a further goal of the invention to improve safety by reducing glance time required to interact with a range of vehicle controls to well below the 2 sec minimum guidelines established. This is both with respect to the time to see the state of control, and the time to actuate and confirm same.

It is another goal of the invention to provide a display screen and control surface which have fixed, interchangeable, re-positionable, and programmable tactile references for ease of driver interaction by feel It is a still further goal of the invention to provide a means by which intelligent vehicle, transportation and highway data can be usefully presented to, and acted on by, a driver of a vehicle, and to provide a "man-in-the-loop" bridge between the vehicles of today, and the automated vehicles of tomorrow It is also a goal to make the controls easy to use without an undue sequence of glances required, indeed in many cases with no subsequent glance at all beyond a first glance, and in some cases to allow control to be entirely operated by feel if desired.

It is another goal of the invention to provide a screen and control surface and associated computer processing for driver designation of points of interest in video images for stereo measurements and image tracking or analysis purposes It is a further goal to improve utility of the instrument panel especially for those drivers with near field vision difficulty, physical difficulties such as hand movements or impaired finger function, and for those having difficulty with or aversion to technically sophisticated systems It is also a goal of the invention to provide in an economic and functional manner, large controls and easy to read data—much larger than possible today, and ideally suited for just quick glances and elderly drivers, and drivers in general who are far sighted and don't have close up glasses. In addition the focus of eye can be on objects outside the vehicle, as letters big enough to read even if out of focus.

It is another goal to provide a display screen up to 10 times bigger than conventional LCD type displays used in vehicles today for navigation and other purposes.

It is a further goal to provide a large enough display that side by side navigational or other data can be provided, with each data set fully readable It is a still further goal related to size, to provide adequate space on the display to display in-vehicle road signs, whether telemetrically transmitted to the vehicle or taken with video cameras carried with the vehicle or in other vehicles and transmitted to the vehicle.

It is also a goal to provide space for easily seen still or video data to be presented which can provide the driver with much more knowledge of up coming road conditions (with the data for example taken from TV traffic cameras at key intersections, in narrow streets, in parking garages and the like, and transmitted to the car.

It is a goal of the invention to provide a means of virtual controls which can co-exist with other displayed data, when the control function is not needed, and to make these controls responsive to touch of the driver so that he or she can find the right location to make control moves, and or determine the state or move made, without looking with more than a passing glance at the control.

It is further a goal to have a means by which a user of a virtual control can select the function and move along a line of action with a near unitary motion.

It is also a goal to provide a means by which the user can touch the control surface at a point and by which the force vector exerted can provide the control desired.

It is a further goal of the invention to provide a reconfigurable instrument panel in a cost effective manner which can allow its use on lower priced vehicles as well as luxury cars.

It is a still further goal of the invention to make possible the safe use of aesthetically pleasing programmable displays by a driver as the primary means of data input and output.

And to provide these with large area screens and control surfaces maximally utilizing the available space in the vehicle.

It is also a goal to provide means for changing these displays and inputs to suit the needs and desires of the user, and to provide means by which complex instructions for use can be presented in easily readable form co-located with the control function whose instruction is needed.

It is another goal of the invention to provide tactile displays which allow a driver to "feel", in either a passive or active and programmable manner, the control location or information desired as well as see said information.

It is also a goal to provide methods for sensing the position of knobs sliders switches, dials and other control details on a control surface using machine vision.

It is a further goal to provide methods by which a TV camera system can discern touch location on a screen surface in xy and z, as well as vector of touch It is another goal of the invention to provide a touch type screen having controls which indicate to the user via physical touch sensible signals, such as acoustic waves, a condition, such as the control device touched, the particular selection made of choices concerning same (e.g. heat or wipers), or the magnitude of the setting desired of the choice made. This can also indicate what the current value of the choice or function is at the time of touch, not just changes therein.

It is a goal of the invention to provide means by which multiple inputs and outputs (e.g. touch, voice and direct optical viewing of human or human actuated switch positions) can be used in concert.

It is another goal of the invention to provide scenarios for prioritizing data and control functions to be presented to the driver in certain circumstances in order to aid safe driving and reduce distraction, stress, and other negative influences.

It is a further goal of the invention to provide a large display and control surface which can be operative with hand held and other user devices which can be plugged into the control and displays system.

It is a goal of the invention to provide means for both z (direction into the display screen) and force based input of single or multiple human or object inputs.

It is goal of the invention to provide a device, which may also include a touch screen, equipped with interchangeable front panels or overlays which have specialized and if desired, purpose specific physical devices for interaction with the sensing arrangement used.

It is goal of the invention to provide a touch screen having a display and associated control function which moves around the point of touch, using for example a vector of touch, as opposed to requiring a person's touch to track a predetermined fixed display—a task requiring much more visual concentration (and associated glance time).

It is goal of the invention to provide a reduction in sources of anger or frustration caused by alternative voice based systems or systems having difficult to read and actuate controls or controls which are difficult to understand.

It is another goal of the invention to provide means for reading road signs and displaying same for the driver, and in some cases to automatically read and translate them.

It is goal of the invention to provide tactile control of the computer system used which can be customized not only by the user in general, but for specific purposes—what I call a "Mission specific" tactile and visual input and output. This makes it still safer by providing just the right tactile controls for the application at hand.

It is goal of the invention to provide a mechanism for utilizing completely different and interchangeable tactile and graphic information, which can be in an interface which can in addition be widely distributed at low cost.

Finally, a goal of the instant invention is to provide simple, tactile, means for people who are not computer literate, or partially disabled, to safely achieve the of enhanced vehicle control interaction and "telematic" activities.

Further features and advantages of the present invention will be set forth in, or apparent from, the detailed description of preferred embodiments thereof which follows.

BRIEF DESCRIPTION OF FIGS

Figure 25:
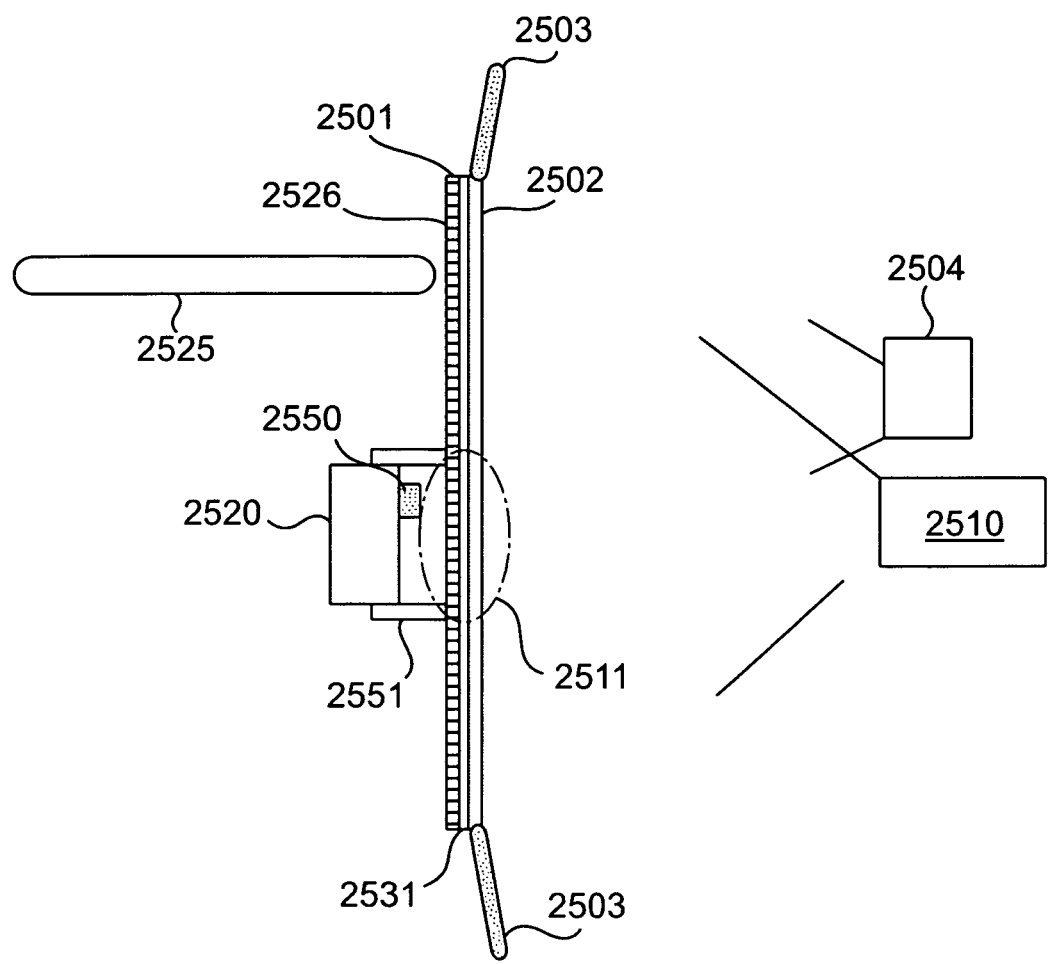
Figure 26:
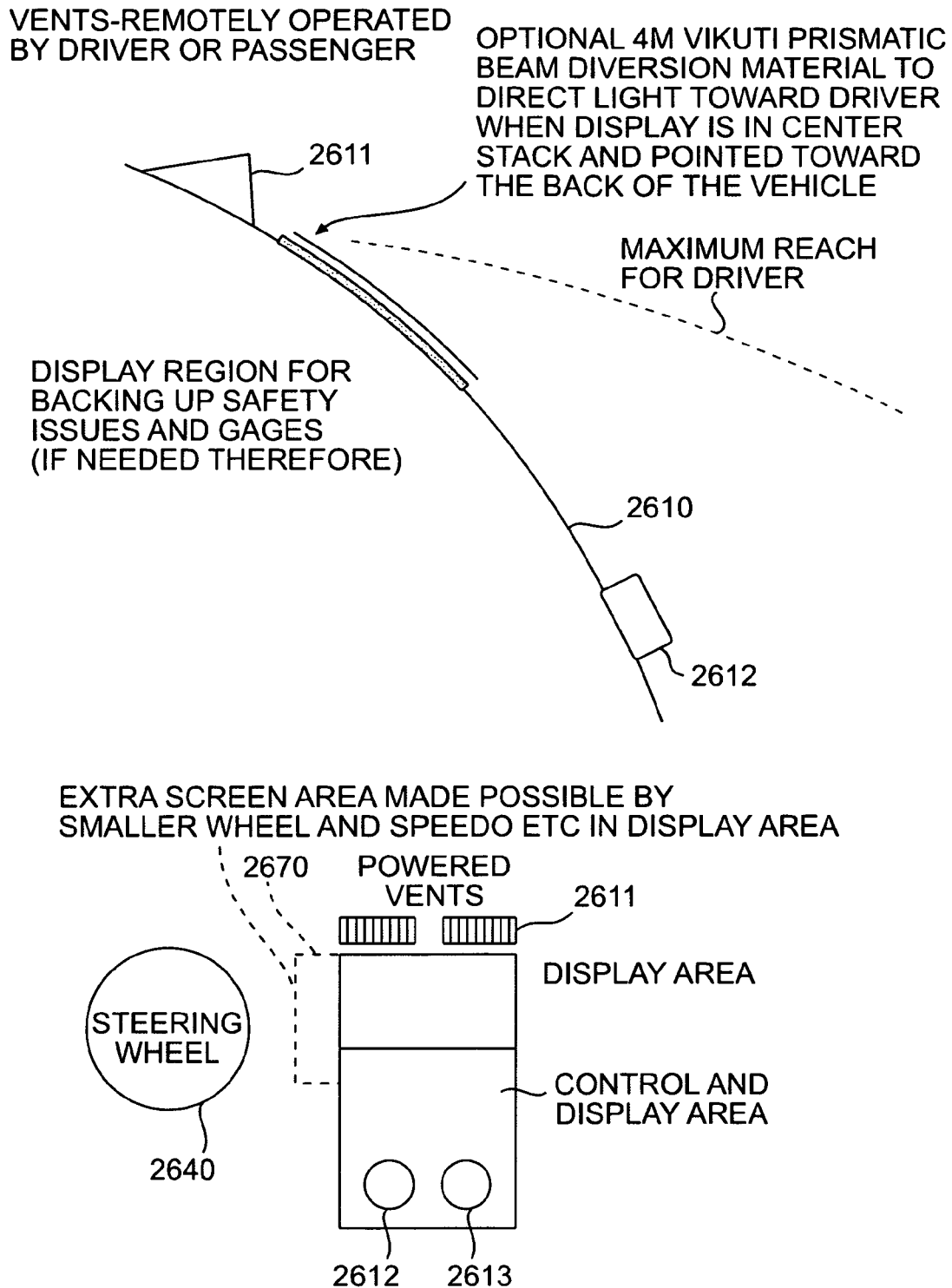

FIG. 24 illustrates an embodiment of the invention that utilizes deflection of the screen material such as disclosed in Ser. No. 09/568,554 and U.S. Pat. No. 6,008,800;

FIG. 25 illustrates an alternative OLED based display device employing camera based physical detail sensing of the invention;

FIG. 26 illustrates an advantageous arrangement of the RTD in a sloped instrument panel including power operated vents;

FIG. 27 illustrates alternative vent location embodiments; and

Figure 28:
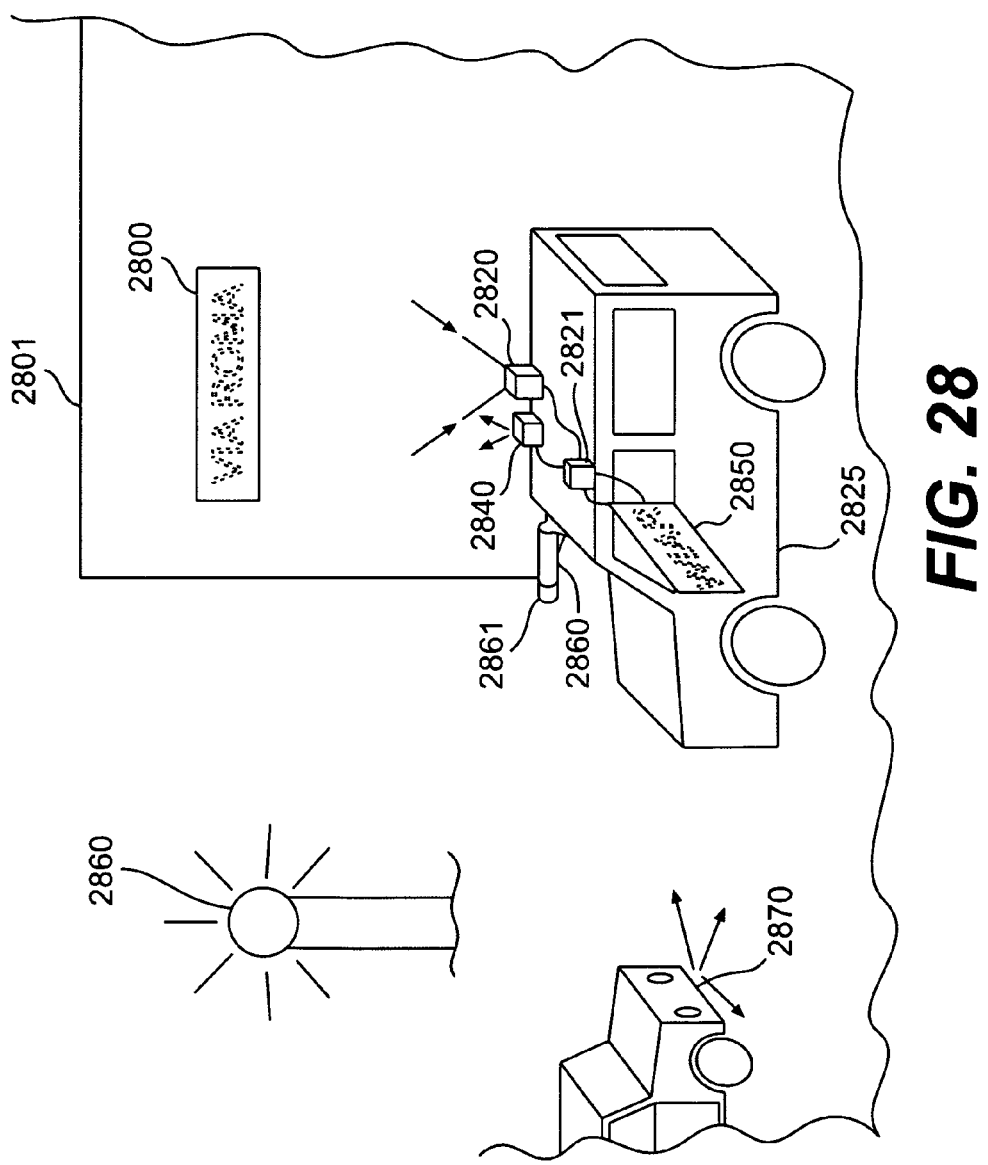

FIG. 28 illustrates further TV camera based applications also including near IR light sources.

PREFERRED EMBODIMENTS OF THE INVENTION

FIG. 1

In this application I will define the instrument panel has having both a display surface and a control surface. In a conventional instrument panel, the two are completely distinct—a Display (if any) goes in one place, knobs or other controls in another. There is seldom a link between the two, except in certain vehicle touch screens for navigation, and the BMW I-drive joystick relation to its screen (in a completely different region of the vehicle however.

In some embodiments of this invention the display and control surface can occupy the same physical area, which means that much more space is freed up for both—especially the display, relative to a conventional Instrument panel.

While the location of the invention in the instrument panel of the vehicle can be anywhere the driver needs to interact, the basic embodiment of this application (at least for near term commercialization) is located in the vehicle "center stack" region between the two front seats and utilizes both conventional knobs and other tactile control and selection means, plus unique touch screen like capabilities. As noted above, these functions are desirably (but not necessarily) achieved using TV camera and image processing computer means to determine knob or finger state or location (for example). This is preferably accomplished by using a rear projection type display, and viewing the region of the screen from the rear, with the camera located near the image projector, and both controlled by interconnected computer means. (which may be the same computer). Use of rear projection also allows a desirably large display capable of easy reading and tactile interaction to be provided at modest cost, both of the display portion and the means to read the control or finger location.

The knobs and other selection means are typically located right on the screen itself, or an overlay member thereon. This screen or overlay is thus also a control surface, on which several other forms of controls co-exist as well with the displayed data.

Figure 1A:
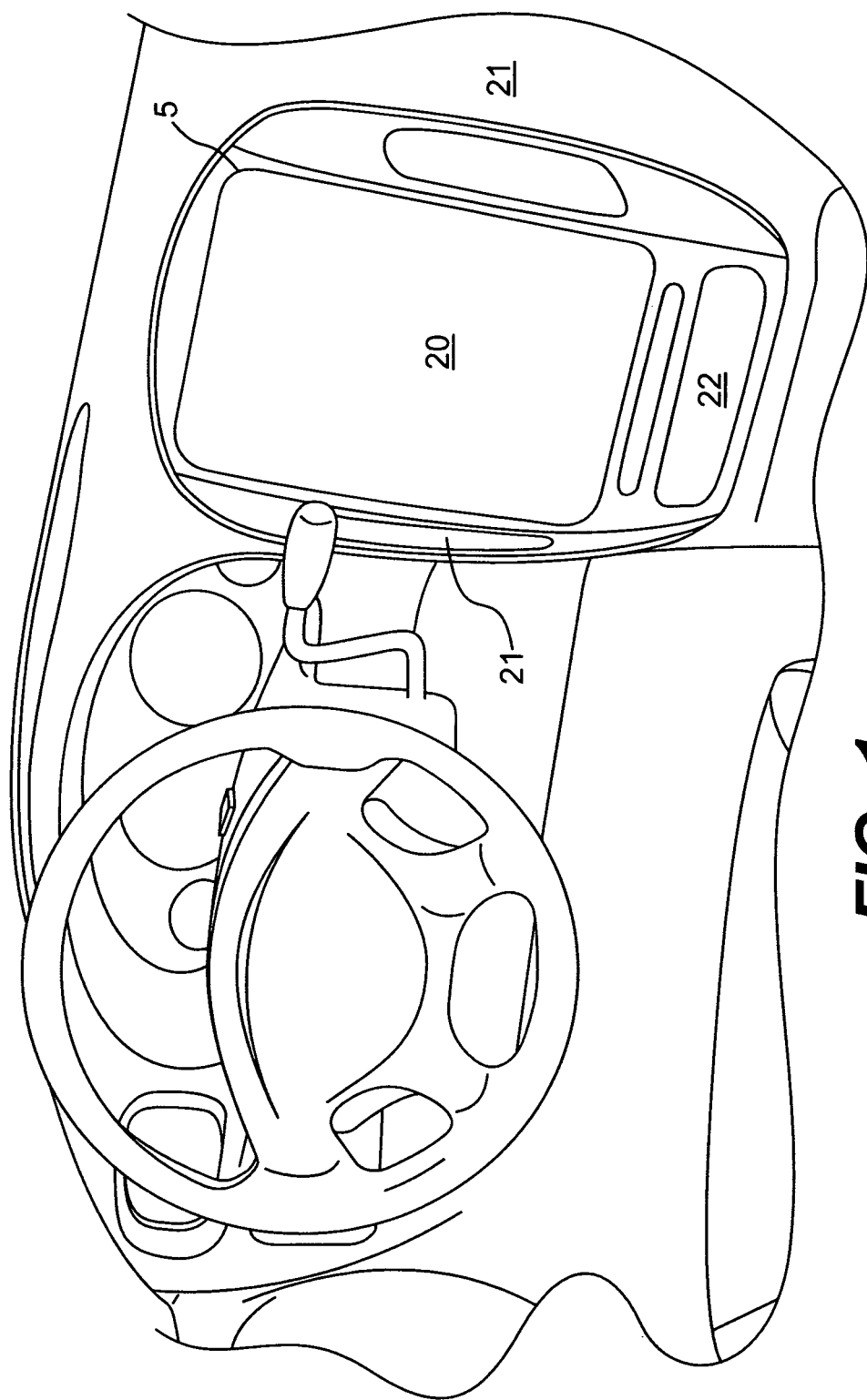
FIG. 1 illustrates an overall view of an embodiment of the invention located in this example in the center stack region of the instrument panel.

FIG. 1a illustrates a display and control surface, 5, in the center stack area 10 of a 2002 Chrysler Minivan optionally having tactile adjustment means such as knob 20 located within the display area. Side vents 21 and lower vent 22 are provided if needed for air distribution.

This type of layout, safely provides for control functions on a large screen area and can be adapted to many variations of considerable utility, while providing all the advantages and safety of large screen display and control surface, and interaction therewith, which will be come evident in consideration of the invention embodiments and related disclosure herein. In the preferred rear projection arrangement, at little additional cost the screen can be made still bigger to incorporate more and more of the total control functions of the vehicle.

There are a great many configurations possible with the invention, each with many permutations. For example the display and control surface 5 can be featureless as shown, but still provided with tactile feedback. In addition it can have certain sections with relief features acting as tactile references. And, as often would be desired, it can also have conventional controls such as knobs switches and so forth.

For example consider FIG. 1b which shows a front view of a tactile version of a display and control surface 30, like 5 of FIG. 1a, but with a different aspect ratio. This tactile version in this example has a knob 34 and six (for example) shallow indents 53-58 which are located on the display screen 30 itself (which serves therefore as a control surface). The operation of these indents (which serve, for example, as reconfigurable virtual switches) will be more fully explained below. These indents may alternatively be outdents (bumps), and they may be of different shapes (round, square, triangular, etc) so as to be distinguished one from the other by feel. And they generally are distinguished by lettering projected on them, or adjacent to them, such lettering may be projected on all indents at once, or just on particular ones, for example those which are "active" for a given control or display situation. Besides being arrayed in a vertical line, a group of indents can be horizontal, or annularly arrayed as well (like an old telephone dial). Such an annular arrangement could for example be around a knob.

An optional second knob 35 or third knob 36 or slider 37 is often desirable, and are noted in dotted lines. The invention indeed can generally accommodate on the screen any reasonable number of knobs, switches, sliders etc that might be desired or practicable, all of which can be economically sensed to determine their position by the sensing system of the invention.

The knobs can be of clear or tinted plastic (e.g. Lexan) or other sufficiently transparent material, typically, like the screen itself, and generally with diffusive outer surfaces to scatter light there from. Such surfaces for example in one case can be made by sandblasting or coating the surface facing the driver, or providing diffusive elements such as micro beads in the material just below the surface, if for example, a smooth outer surface is desired. Or the beads may be micro spheres such as the 3M material described in FIG. 15 for example, and spaced away from the outer surface by a few millimeters or more if desired.

If the knob is transparent, the lettering can be projected on their face and always correctly oriented in the horizontal plane if desired, independent of knob rotational position. Lettering can also be projected around the knob, and lettering can be of different sizes depending on the task at hand, or some lettering can be turned off as well if not active.

Alternatively the knobs can be annular rings with the underlying diffusive screen surface exposed in the middle thereof. In either case, the area occupied within the knob circumference is largely usable for display purposes, typically of knob position or function related data. And area between knobs, or between the knob and screen edges is also available for projected data. Some of this data can relate to the knobs function, and such a system complies with FMVSS 101 which states that a control, such as a knob, must have data concerning its function on, or adjacent, said control.

Permanent lettering may also be used on the screen surface to denote knobs or indents or other control features. Generally however, the lettering is electronically projected, in order that it can be programmably changed, as the function of the device is changed.

The use of one or more "classical" tactile physical selection or adjustment means (such as knobs) common to instrument panels today is a big advantage in that it is visually and tactilely closest to the instrument panel of today, yet offers the full programmability required tomorrow and it is also thought to promote safer driving.

What makes it novel and exceedingly useful is that it has programmable visual and tactile aspects approaching, and in some cases exceeding, the utility and capability of today's IP's, while at the same time being reconfigurable as needed to provide added features and enhanced versatility. By doing so, safety is improved, and user value is enhanced.

Elements have been disclosed in the referenced co-pending applications. Additional details are provided in other figures. While primarily here illustrated using a preferable rear projection display, it is not limited thereto. The rear projection display is thought preferable for cost reasons (in larger displays at least), and enables an elegant solution to the sensing of detail and finger positions, and the provision of tactile feel.

Typical maximum screen/control surface sizes with the invention when located in the center stack region are for example in a Minivan: 15 inches high by 12 inches wide, and in a Luxury car; 13 inches high, by 10 inches wide. Both these estimates assume the screen comes up to nearly the top of the instrument panel, but not high enough to obscure vision.

If a horizontally extensive arrangement is provided typical width can be 16 inches wide. Even wider screens/control surfaces can be used, but the steering wheel on one end, and the persons reach limitations on the other will limit where the control features can be placed. An example of such an arrangement is shown in FIGS. 2d and g, the screen is odd shaped to fit the space—another advantage of the rear projection arrangement. While most such screens/control surfaces are flat, they are not so limited. Again the rear projection, allows within reason curvature of the screen in either plane over some or all of its face-within the limits of the optical system to provide sufficiently sharp focus at the points in question. Such curvature can be stylistically desirable. With some added complication, the control features can also be provided on the curved surface as well.

It is noted that in one mode, the status of control can be determined by illuminating only that indent which applied to the control being worked of the moment—e.g. heat. After some time period, all the indents could be illuminated with their selection information. If the indents were used for the same functions all the time then their positions would become learned, and the status of that function could be checked at any time by touching the indent in question.
FIG. 2

The embodiment of FIG. 2 senses positions of screen mounted knobs and other conventional tactile selection and adjustment means (hereafter generally called "Control Details" herein) mounted to the screen of the rear projection display, or to a cover plate in front of the screen toward the user. Sensing can be performed by a variety of electrical, magnetic, acoustic or other means known in the art, but is preferably illustrated here as electro-optically based, which has the advantage of simplicity and non contact operation.

In the near term, this is probably the preferred embodiment, because the knobs and other control details are familiar to the driving public. Other aspects of the invention could be provided in addition, but the user could in the preferred near term example, always revert to familiar control detail based operation of the necessary portions of the vehicle.

Figure 2A:
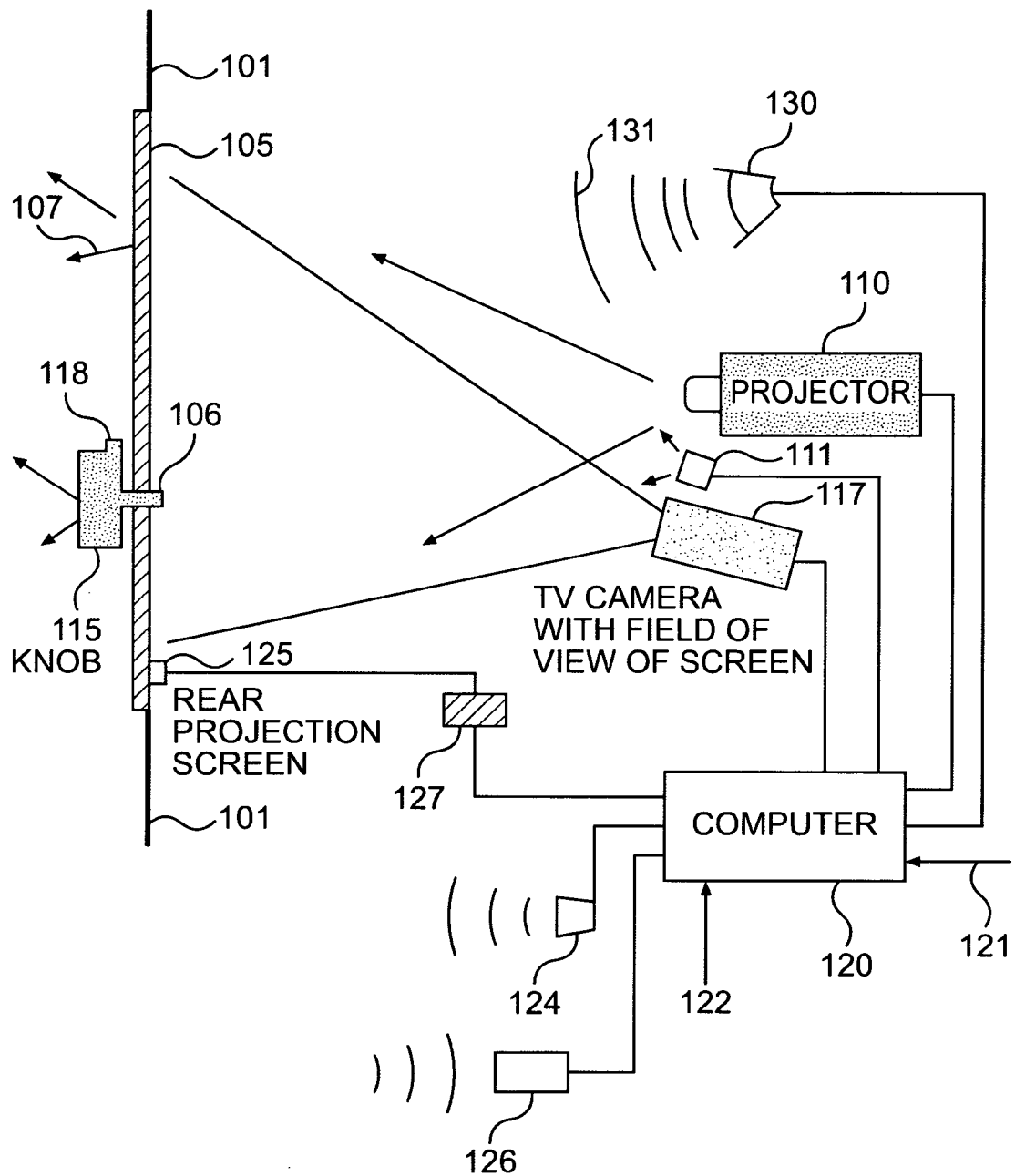
FIG. 2 illustrates further the embodiment, including detail concerning knobs and other controls, and examples of their use.

As shown in the diagrammatic side view of FIG. 2a, a center stack of an instrument panel 101 is equipped with a large screen panel 105 made of Plexiglas for example, having scattering characteristics (typically on its outward surface) so as to act as a rear projection screen for a LCD, DMD, or other type of computer controlled display projector 110 positioned behind it when viewed from the drivers side, and controlled by computer 120. This screen is diffuse in order to scatter light such as 107 from elemental portions on its face. To improve performance, similar to rear projection televisions common seen in homes today, this screen may further include a lenticular screen or holographic grating if desired to preferentially distribute light sideways (and in some cases vertically) in the passenger compartment. And it may have a fresnel lens incorporated with it if desired to collimate or otherwise re-direct light from the projection source. (see for example U.S. Pat. No. 6,185,038 for examples of such construction) And too the rear projection system can incorporate novel features to suit the particular automotive application, a subject discussed further below.

Computer data including messages and other communications 121 down loaded to the computer 120 from external sources by known means, or from sources 122 within the vehicle itself, can be thus projected on the screen.

In this embodiment, knob 115 similar to knob 20 in FIG. 1, and if desired, further knobs or other control details, are mounted, for example with pin 106 directly to the screen 105 so as to be rotatable thereon to various positions which are sensed (for example by electro-optical means such as camera 117 which looks at points such as mark 118 on the back of the knob 115 or other wise related to knob rotational position) and reported to the computer 120 which in turn calculates the knob position, functions or other data and executes the control function desired by interfacing with the cars electrical and control system and further causes the display device 110 to project suitable information concerning same onto the screen. This information is typically data concerning the knob position and the setting resulting there from. The same camera can view and provide data used to determine the state of a host of different tactile physical selection or adjustment means such as knobs sliders, dials, or switches on the screen. In addition, their various positions and changes therein can be analyzed nearly simultaneously by the computer 120 and appropriate control and display responses made.

The new state of knob position after turning by the driver can be determined by computer 120 by simply the fact that it is in a constant position after a movement has occurred. Alternatively, is noted that knob 115 may also be constructed in a manner which can be pushed in the direction of the pin 106 in to make a selection (e.g. the driver turns to the appropriate location and pushes the knob in to select). The state of being pushed in can be determined by piezoelectric force sensors under the screen as described in other embodiments such as FIGS. 7 and 9, or it can be seen by camera 117 which can determine that two or more marks on the rear of the knob in known relationship and spacing, or the apparent diameter of the knob has changed by the change in magnification being closer to the camera. A stereo pair of cameras can be used to provide more resolution if desired.

To make a better feeling and operating knob, it many be desirable to use a metallic pin 106 sliding in a metallic bearing 144 (dotted lines) inserted into screen 105. This pin and bearing can also be equipped with a detent device (not shown for clarity) as well. What ever diameter is taken up by the detent mechanism and the metallic bearing components, cannot have light projected through it. Thus the center portion of an other wise transparent knob with a diffusive surface would not be available for image projection. However, the knob could be held by an annular race from its periphery, allowing the center to be free.

While a specialized light source such as LED array 111 can be used to illuminate the knobs and other desired features on the screen, in many cases the projector 110 may be used to provide illumination. Since one can control various aspects of the projector, one can choose the light projected for example to clearly illuminate a distinctive feature on the knob (or a connected member rotate-able in unison therewith) such as a marker—which itself may be preferentially reflective (or alternatively non-reflective) of a certain color which may be instantly recognized in the color image obtained by camera 117 typically a solid state matrix TV camera (typically today of the CMOS or CCD variety). Identification of the marker is also made easier by the fact that its relative position is approximately known to be in a certain region of the screen.

The knob rotation can optionally have mechanical detents known in the art at different positions in its rotation function, and/or in an another example, a feeling sensation dependent on rotational position (or a variable controlled thereby), can be alternatively provided by an acoustic source such as 125, (typically a piezo-electric crystal transducer known in the art) programmed by computer 120 and driven by drive electronics 127 which, on command generates acoustic waves 126 in the screen panel 105 which can be felt by the user operating the knob or touching the screen. An actual detent feel for a knob can be programmably achieved with added complexity using rotational actuators for a specific knob in question as described in U.S. Pat. No. 6,154,201 by Rosenburg et al, for example.

To provide excitation waves or pulses to be felt by the user without resorting to electrical contact with transducers on the screen, an acoustic source can be employed to send bulk waves thru the material, or to generate surface waves on the screen. Alternatively, transducers can be used to excite the whole screen as a member, for example using piezo transducers in the corners of the screen. (see FIG. 7 below). A simple vibrator such a pager motor can alternatively be used to vibrate the screen. Such a vibrator device, used for a different purpose of confirming that touch has occurred, is described in Bloum U.S. Pat. No. 5,977,867.

By sharing the display area between the knob selection or adjustment functions (and their written or pictographic description), and the display functions (e.g. display of navigational charts), space is saved on the IP and larger knobs and lettering may be provided (especially given the programmably reconfigurable operation). This then promotes safety immediately by making it easier to see what is desired, or has been affected. For further flexibility and utility, the screen can also function as a touch screen as disclosed herein.

Contributing even more to safety, the tactile feel of the knob, or other tactile physical selection or adjustment means, can itself be programmable, for example using programmable acoustic wave pulses providing many added benefits, and discussed further below and in respect to FIG. 7. Note that such a reconfigurable tactile control response can be programmed to change with function selected, and/or variable affected And can operate statically too, to give the driver a chance to tell the setting of the knob by feel alone. In addition, conventional cues to the driver such as the displayed values or computer generated speech can be used as well or instead.

While described as a knob movable rotationally, other tactile physical selection or adjustment means like sliders, switches, levers or the like which are movable linearly, angularly, or in other manners can be used in a similar manner. Some have been shown in co-pending applications.

Let us consider in more detail the operation of the invention described above. As shown in front view 2b, (this time illustrating display screen 105 having a different aspect ratio) three knobs, 115 and 116 and 119 are provided, preferably large for ease of use. While illustrated as vertically arrayed, a horizontal or any other positioning of such knobs or other tactile selection and adjustment means can be used. In one exemplary arrangement, knob 115 might be chosen for function selection (e.g. between heat, radio, and so forth), and 116 for the amount (e.g. amount of heat). Knob 119 is shown for selection of vent location but it is realized however, that all functions can be changed as programmed into computer 120 and this change can be made responsive to the drivers actions, and in some cases to external triggers (such as a crisis or special information situation).

Labelling too is programmable. Not only are the functions of knobs, switches and the like programmable and reconfigurable (also in some cases physically), but all function labels for a given knob for example can be displayed, or just the value selected. This too can be time dependent, with the just selected label version only coming on after selection is made, or some other action is made which makes this appropriate. Conversely the totality of possible choices can be projected only as a result of some other action. In the cased of knobs, the label can be projected at appropriate positions around the knob as is common today, and or the instant label can be in the interior of the knob as disclosed herein.

A driver can look at screen/control surface 10S and see the displayed lettering projected in big letters on or next to knob 115 indicative of its presently chosen function, e.g. the word "HEAT" as shown. If he needs to keep his eyes on the road he can, as he touches the knob, receive a sound sensation via the cars loudspeaker system 124 or a physical sensation due to the acoustic source such as vibrator device 125 exciting the screen.

For example, if the driver touches the knob 115 either to turn it, or to indicate change in status in some other way such as push it in or pull it out, or move it sideways, or some other function, the computer 120 can cause the driver to feel for example, a 100 hz vibration via transducer 125 which indicate that the knob, is a function selector knob and its current state of programmed operation—in this case HEAT. Sensing can be accomplished by the machine vision system determining that a knob position related condition for example, has changed. In another example, the 100 hz vibration pulses might mean that it was on the heater function (if there was no doubt as to what the knob was for—i.e. having a sign with big lettering right next to it.).

Such a status signal can optionally be initiated through a voice command received by microphone 126 and recognized by software such as IBM ViaVoice, in computer 120.

Alternatively, the definition of the setting can also be actuated by voice. To check status of a display having all live video data for example obtained from cameras outside of the car while in traffic, one might say "status", and a microphone array mounted in the screen 105 or near by, picks up the voice, and computer 120 processes it to determine that a status should be displayed, and subsequently, the HEAT indication is caused to be displayed. Possibly accompanied by an enunciated computer voice saying HEAT as well or alternatively. The lettering can change in size or color when selected as well.

In any case as the knob is moved, the lettering projected is typically changed to indicate the new position. For example in one program, as the knob 115 is turned 20 degrees rotationally, the function changes to wipers from heat, and in so doing the acoustic source causes 2 hertz pulses, (or another choice of signal like alternating high low pulses etc) which signify when learned, that the wiper function has been selected. Alternatively, or in addition to these pulses, an identifying sound, such as a familiar "click", may also be generated on command of computer 120, using for example stored Wave sound files in the computer, which sounds may be broadcast thru the cars audio entertainment system to loudspeaker 124 or separately.

FIG. 2c illustrates a second position of knob 115 in which a wiper function has been chosen. In this case, knob 116 is labelled as signifying three wiper speed positions, and a delay position. If delay is selected, knob 119 data is illuminated in this mode, and becomes the delay selection knob. Alternatively, delay positions can be included in the rotational positions of knob 116, and knob 119 can be for something else—for example headlights. This would be of interest if the screen in question was a high priority screen, in which lights and wipers were displayed—two safety items of more importance than climate or audio for example.

The display need not be only in the center stack. FIG. 2d illustrates an arrangement (in this case having two knobs and 4 illuminated on demand indent switches (to be described further below) in the minivan example of FIG. 1 using all the instrument panel space from a few inches to the left of the edge of steering wheel 150 (around which it is difficult to reach, and thus not suitable for controls needed while driving) to the farthest reach point to the right capable of driver interaction Note that the rear projection display makes it possible to have a screen/control surface shaped like 155, where the region 160 is contoured to clear the drivers right leg.

For illustration and comparison purposes a typical 7 inch diagonal rectangular display such as that used in the Jag X car (and one of the largest provided in vehicles today), is shown in dotted lines 157. The ratio of areas of the two displays is approximately 9:1. This difference is one of the features that makes possible the presentation and action on many new types of data (such as video), possible and provides for dramatically improved visibility of all data and interaction therewith using the invention.

The 3 knob based layout similar to that used in many vehicles today (and thus familiar in this sense) where one knob is function, one knob is amount (magnitude), and one knob a selector related to the function.

It is noted that while one knob such as 115 can be fixed in function like knobs in conventional vehicles today, for example always to act as a function select, or it can also be programmed to change its nature once selected (i.e. once heat is selected, the selection knob momentarily becomes a distribution knob for example, obviating the need for third knob 119 to perform this function). Alternatively, it can be always a selection control but the complete nature of what is being selected changed.

For example, FIG. 2e illustrates a table of values where all functions selected by knob 115 are in the secondary category—i.e. not critical to the vehicle operation. This screen/control surface having this arrangement might only be in place when needed, and the screen could for example revert to a critical category after passage of time, or on cue from the driver or some external signal indicating need for critical functions.

In this example, when the knob 115 is turned to Audio, knob 116 becomes a volume knob with a spectrum of analog settings, and knob 119 becomes the selector of an audio device, all with lettering or pictographs or both to match. In one example, the choices available can be arrayed around the knob at the different clock positions, while the actual choice made can be displayed in large letters in the middle of the knob—or elsewhere on the screen, say even momentarily As noted above, and elsewhere throughout this application, the knobs shown can be augmented by programmable switches and other functions having tactile feel as well. Or the knobs can instead be sliders, or levers or dials for example. And virtual function selectors or adjusters can also be used alternatively or in addition.

For each set of choices, a table of values like table 2e can be created. This can be fixed for the vehicle, or for a particular driver of the vehicle, or can, if desired, be varied by the driver. There are a great many possible combinations, in particular since the physical presentation can also be changed, ranging from a pure blank screen with no knobs to a knob, switch, and slider filled screen with no virtual characteristics at all. (nearly the same as the classical version of the last 50 years—but with the possibility of reconfiguration and force feedback feel sensations to ones fingers in working the controls).

Figure 2F:
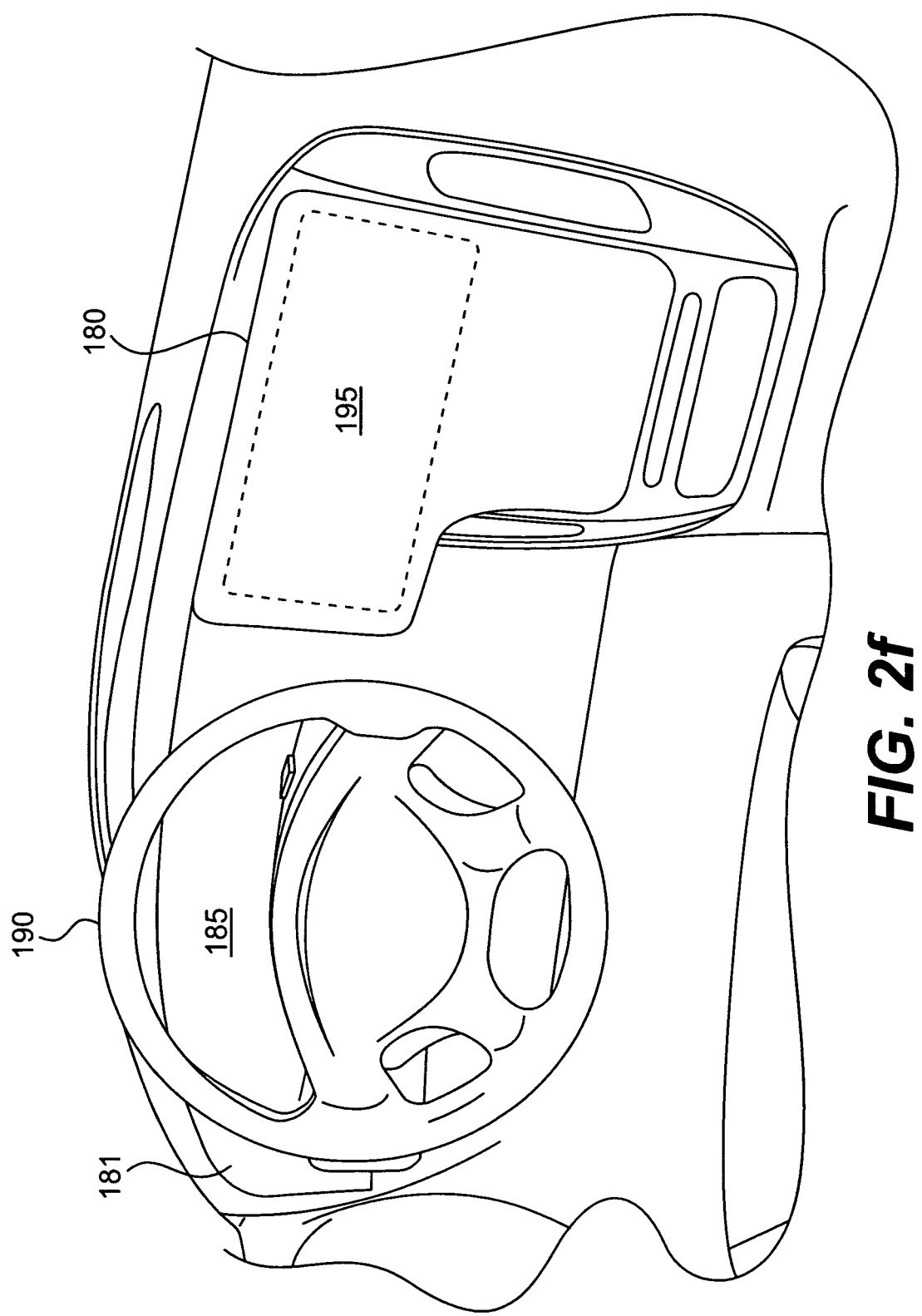

FIG. 2f illustrates a further layout capable of driver interaction spanning all areas of the dash on both sides of steering wheel 190 using two screen/control surfaces 180 and 181, each with a separate projector and camera system. This arrangement can replace all the instrumentation and controls of the vehicle, since all data such as speed, fuel etc can be displayed, and all necessary control functions can be within reach of the drivers right or left hand. With smaller diameter or other alternative steering wheels of the future, additional control functions can be placed directly in front of the driver.

Note that rear projection also makes it possible to have portions of a screen/control surface (for example portion 185 of 181 in the area of the steering wheel), at different depths and accordingly distances from the projector. In this case the "f-stop" of the projector is preferably chosen to provide a significant depth of field, to allow all areas to be substantially in focus. This is made easier if the projected data is large, so that fine focus is not required.

The display software, in one simple example to provide speedometer readings, can be generated using LABVIEW by National Instruments Co. More specialized instrument panel images can be created with the aid of "SPEED" instrumentation design software provided by eGenuity Co. of Montreal, Canada.

It should be noted that the function of a particular control such as a knob, can revert back to a standard state for example, after some elapsed time period, or upon a signal such as an alert from a sensor that this state should be resumed. Much the same applies to the whole screen/control surface, if its function has been momentarily changed—for example to present a video image of a critical accident threat for example. When the threat is diminished, the normal control functions can be reinstated for example. Or they may be reinstated in order of some priority, with the most critical to overall well being first, or those with the least time latency first. For example, headlights once on, likely can stay on with little time consideration associated with them. But wipers may need to be turned on or changed in speed relatively quickly. (unless automatic rain sensitive systems are provided for same, useful with this invention to all controls to focus on other matters).

Clearly there is a vast array of possible layouts of knobs sliders, switches levers and so on, not to mention the ways in which different data can be displayed to enable their safe use. Some aspects of the operation of these controls will be discussed in FIG. 3, and other types of controls which can be used alternatively or in addition are then disclosed.

A complete automotive control and information system can be built in a novel manner as has been disclosed above. In the form above it represents in essence a programmable and reconfigurable approach to the conventional instrument panel of today. And it can even be completely reconfigured physically, as discussed further below (see for example, FIG. 8 illustrating substitution of screens or portions thereof).

However, the invention also comprehends the use of a touch screen capability, logically integrated with the features above, which can as disclosed operate using the same basic machine vision measurement principles. This is both elegant, and cost effective. And it is non-contact, allowing interchange of the complete user interface including the touch screen and control details such as knobs.

In the portion 195 shown in dotted lines of the screen 180 or any other desired portion, may be reserved in certain operation modes for video or graphical data presentation. Alternatively, or in addition in can also include a touch screen input capability for example that of FIG. 4 below or using resistive, capacitive, acoustic, or other touch screen means known in the art, including those in my co-pending applications.

The system is totally programmable—the degrees of turn to create a new choice of selection or function, the acoustic pulse choices, the responsive sounds, and the visual display of lettering (and language thereof too) are all programmable in the computer control unit such as 120.

This system has the ability to have its data read in a quick visual glance and/or touch and visual confirmation too after a move is made. Voice input or output can also be used. For example when the knob is stopped from being turned, the computer can cause a text to voice program such as that of Fonix corporation to annunciate its position. Or the person can tell the system via a microphone connected to the computer equipped with a voice recognition program (not shown) what he wants the knob to represent (e.g. climate control) and the knob function and its associated display can be changed accordingly by the computer and display projector.

FIG. 3

FIG. 3 illustrates further details of the sensing employed in the preferred embodiment. For example, FIG. 3a is a rear view of the screen 200 illustrating one method of sensing of knobs 201 and 202, with camera 205 located behind the screen, whose image data is analyzed by software such as Matrox MIL machine vision software resident in computer 206 to determine the position of markers (or other knob features) 207 and 208. Illumination of the knobs can be using the data projector, or a separate source, such as 111 in FIG. 2a. In the case illustrated the markers on portions of knobs on the drivers side of the screen are imaged through the screen, and the markers appear bright on the dark background of the knob image (alternatively one might chose that they appear dark on a bright background. Or they could be distinguished by color with respect to another colored background). In this case too, the knob is opaque throughout. An alternative arrangement can have the marker located on a member on the camera side of the screen, and attached to a pin such as 106, in FIG. 2a, such that it is turned when the knob is turned.

Figure 3A:
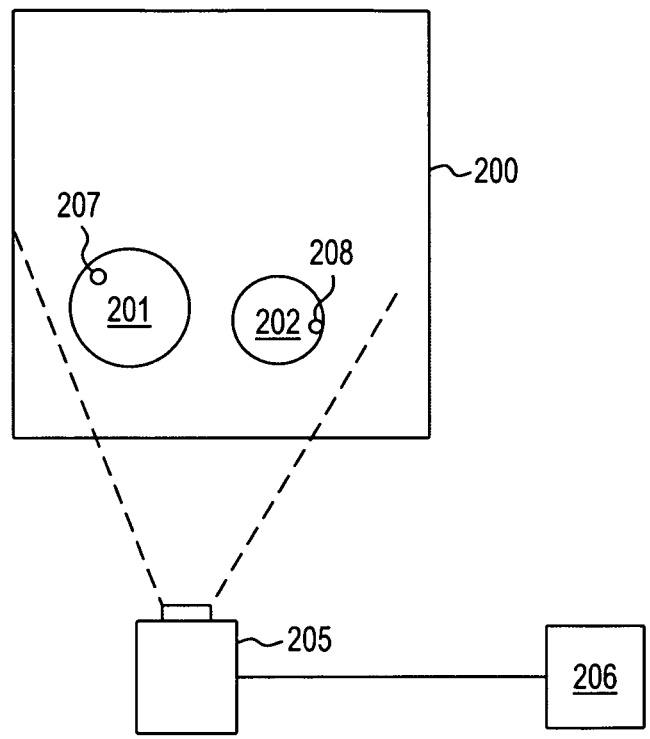
FIG. 3 illustrates further details concerning control details of the FIG. 2 embodiment.
Figure 3B:
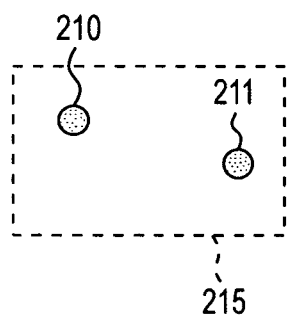

FIG. 3b illustrates images seen of the knob markers in a first condition where knob 201 (in this case used as a function selector knob) is on "Climate" at a position at 11 O'clock in this case (when viewed from the back as shown), and the knob 202 (in this case used to ascribe a magnitude relating to the function selected) is at 3 O'clock, corresponding to a low setting of that variable. When commanded by the computer, or alternatively in free running mode, every 1/30 second say, the camera system 205 obtains an image of the region within the outer circumference of the knobs, including the images 210 and 211 of markers on the knobs. Regions outside the outer circumference are in this knob position interrogation case, ignored.

The image of the markers is obtained and the rotational position of the two knobs determined by computer 206, which then may compare the circumferential location of the marker to a look up table for the knob in question.

In order to determine the marker locations, the image is in one embodiment, thresholded, to provide a thresholded image 215 to determine marker location. In one example the marker is typically brighter than that light in the image returning from the region of the surrounding knob. By applying an intensity threshold, only image data brighter than a certain amount within the region of the knob (dotted lines for example) is provided. Since the knob is in this case opaque, even with sunlight behind the knob, the region of the markers is bright.

Alternatively in other cases the marker could for example be could be chosen to be darker than its surroundings, or of different color, or a shape which would all be distinguishable in image 209 processed by the image processing system of computer 206, for example using the Matrox MIL 4.0 standard image processing library in a Pentium 4 PC.

Another example, is shown in FIG. 3c where the projector illumination is tailored to suit the region where marker location is expected. The image processing system, using projector illumination projected in an annulus 221 around the periphery 225 of the knob 201 for example, is used to determine that marker 207 is in the 9 O'clock position. It is noted that the camera can be used to determine the position of a physical control detail such as a knobs at multiple locations in its travel, and is even so accurate that every degree of rotation of the knob can be determined. Similarly linear positions of a slider can be determined to high degree if desired, as the position can be solved to sub pixel accuracies if need be.

It is further noted that the projector may project higher intensity into the annulus than in the surrounding area, as the annulus is blocked from human vision by the knob annular section which is opaque. This allows higher signal to noise from the knob marker or other knob features detected.

It is also noted that the projector can in general project IR or other invisible wavelengths which can be used for detection, but unseen by the user. This can also be done selectively around knobs and other tactile features where human interaction is likely.

The magnitude of data input by control knob 202 and represented by the control could be temperature, or fan speed for example. Or the knob 202 could be used to select vent outlet settings, if desired, with individual vent settings stored in the computer 206 and when the knob position determined, an appropriate lookup table accessed to provide data to the vent motors or other actuators to open or shut them appropriately. The further settings not covered by knob 202 can be achieved by further use of the knob, or of the touch screen or other aspect of the invention.

Detents of the classical mechanical kind can be built into a knob or slider and its mounting. In addition, the computer 206, like that 120 may also control vibrator wave source like 125 to provide a "programmable" feel in conjunction. This can give a different feeling or vibration for each position of knob 201 or 202 for example. And one can have different frequencies, or amplitudes, or other characteristics, than the other, so as to be distinguishable one from the other. The actual location of the settings can be determined by the point at which the feel is felt, as a programmable position detent, so to speak. In this case the display may be varied as well. The sensed indicator of the marker in one of the rotational positions such as those of table 3d is used to provide input to control the programmable wave source 125.

For example consider FIG. 3d illustrating a table of values of display and force feed back for a knob with 3 settings, with information to match, and at a later time, after reconfiguration, the same knob having five settings. The displayed data which may be completely different indicative of other functions. And in this case, the user feels something change three times in the one example, and five in the other. The change can be the same each position, like a classical detent, or can actually have different values. This would be low medium and high frequency vibration for the 3 position case, and in a completely different sequence, 5 levels of pulse counts for the 5 position setting (e.g. 1 pulse 2 pulses . . . Up to 5 pulses).

In another instance, the selector knob 201 could be been moved to audio, and the magnitude knob (in this case 202) is used for volume or station tuning. The programmable detents used in the first instance are not generally as desirable here, though they could be if just a fixed set of stations was desired, one at each detent location (but with those varied to suit a selected condition say, classical music, vs. another set for Rock).

For example in the selector mode, when you begin turning the knob 201, a first wave function say with a certain frequency can be generated, to indicate you are on heat. But as you turn to the audio setting desired, the frequency is caused to increase, where as going counter-clockwise on the knob causes decrease in frequency. Each function of the knob can have its own pre programmed feel, and/or with audio feed back via a loudspeaker if desired. Added knobs or slides can also be provided on the screen to selector adjust further functions. Virtual controls can alternatively be provided, which are described below. These have the advantage of not permanently taking up space on the screen, but are less intuitive perhaps for some drivers, especially the elderly who are accustomed to classical physical knobs and sliders and switches. With the invention, each person can take delivery of the vehicle the way they like (assuming safety regulations are met) or convert it with aftermarket add on screens and software.

Similarly as you go to turn the magnitude knob, the programmable pulse feedback "detents" can, for example, be of long duration for high volume, and short duration for low volume.

While the pulses are here shown thru the screen to ones fingers turning a knob or sliding a slider or pressing a switch (all physical tactile devices), the same vibrations or different choices of vibration, pulses or other physical wave signals can be used to signal a persons touch on the screen surface or a tactile relief portion such as a ridge, groove or indent in the screen as well, examples to be discussed in figures below. Since the driver of a car typically only contacts one such function at a time, (being typically limited to one handed function since the other hand is on the steering wheel), the pulse can be known to the driver to be associated with a knob or a virtual position on the screen, whatever is reasonably able to be used at the time. Alternatively certain programmable wave functions could be reserved for certain things. For example vibrations under 400 hz could be for knobs, 400-600 hz for sliders, and over 800 HZ for touch portions of the screen. This is just one example of many permutations of vibrational frequency, pulse length, pulse sequence and the like.

Figure 3E:
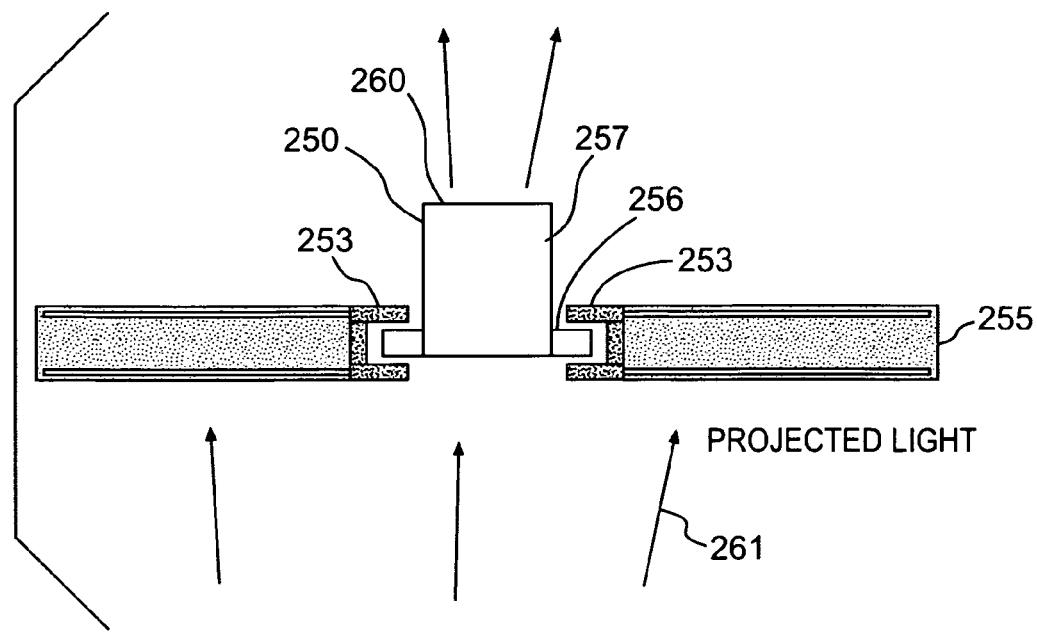

FIG. 3e illustrates a sectional view of a screen 255 where the addition of a slider mechanism 250 sliding in a metallic insert 253 placed in a portion of the screen and with projected light visible through the slider if desired.

In this case an opaque metal insert 253 has been placed in the screen to allow more precise action of a sliding metallic slider control 256 with a clear plastic inner portion 257 having a diffuse scattering surface 260 such that projected light thru the slider can illuminate the region to be touched in addition or alternatively to illuminating the region of the screen nearby.

Figure 3F:
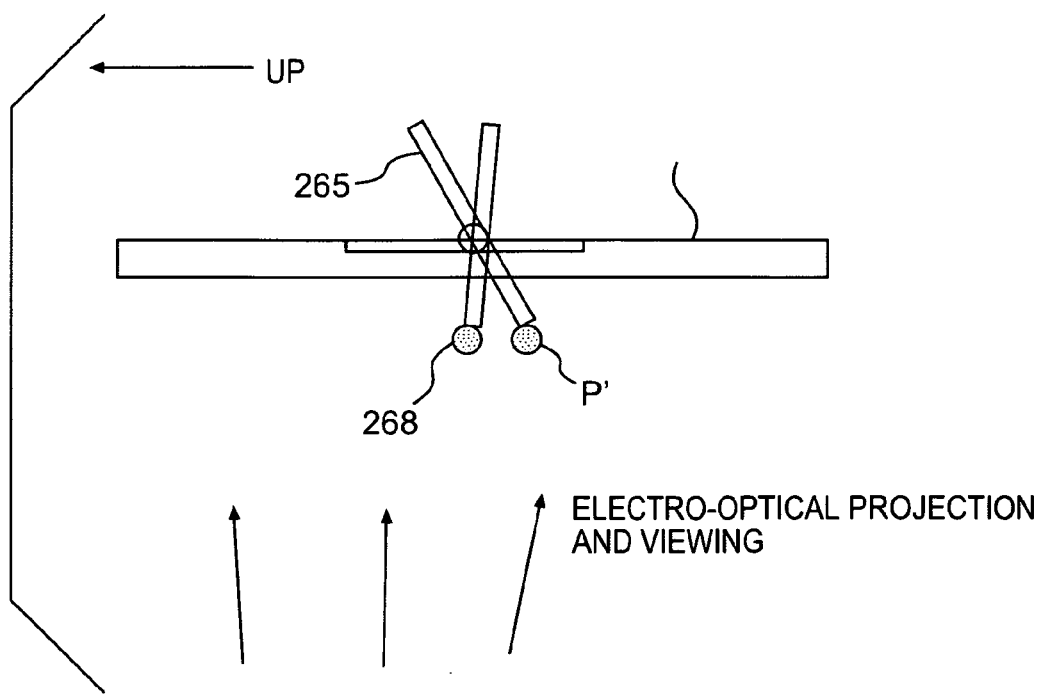

FIG. 3f illustrates another type of switch 265, inserted into the screen 266, in this case of a three position lever action type, common to window lift controls. The switch of known construction is spring loaded to return to center, where the marker 268 is in the position shown in dotted lines. As it is pressed upward, marker 266 moves to position P' for example. Typically such a switch is held there until the device in question (seat, mirror, window, radio seek typically) comes to its desired location. When the this happens the user releases the device and the marker returns to its original position. In this case the original position as well as the new positions P' up and P' down can all be determined by the camera system of the invention. Thus a complete return to zero state is not required in order to determine that motion should cease. Similarly, one can use the camera system to determine more than just the extremes of up or down. The lever can have two positions for example in the up direction, such as slow and fast which can both be determined.

Use of the metallic insert in the examples above makes it easier to mechanically provide a precise detent and/or sliding mechanism in this case can be used to advantage to allow the slider to be used for transmission gear selection in a "drive by wire" mode. The standard gear identification, for example the historic PRNDL is projected next to the slider detent positions whose position is referred to datums on the screen and is correlated with the vision system. However by changing inserts to have added positions these can be changed for example to provide 5 forward gear selection locations.

When a knob, for example, is at the point desired in the circumferential direction, it can be left there and after a momentary and typically pre-programmed dwell time, the computer may be programmed to register the reading desired (e.g. wipers at the second position, illustrated in FIG. 2c). Or, in another exemplary mode of operation, the knob function can be changed. For example, when at the "wipers" position, the knob can be pushed in by the driver to register this choice (wipers) and then after that the knob function and the display associated with the knob are changed, for example to indicate wiper speed delay and other wiper function settings at the different circumferential positions desired.

Note that the unit may have different functions made possible for the knob or other devices when the car is stopped or in some other state. For example the knob might indicate wipers, heat and radio when in motion, but additionally when stopped could have email, internet surfing and other functions which might be too dangerous to access while in motion.

It is noted that the knobs or sliders can provided in a manner which can also be moved transversely, for example about a pivot, such as vertical or horizontal or in any other direction with respect to the screen to which they are effectively mounted (whether on the screen proper, or a member such as an overlay attached thereto).

In this manner they may be used to signal added data to the computer. Especially useful in this case is a knob with multiple markers or other features, such as now shown. This allows determination of knob position not only rotationally, but in directions transverse to the knob axis as well.

Figure 3G:
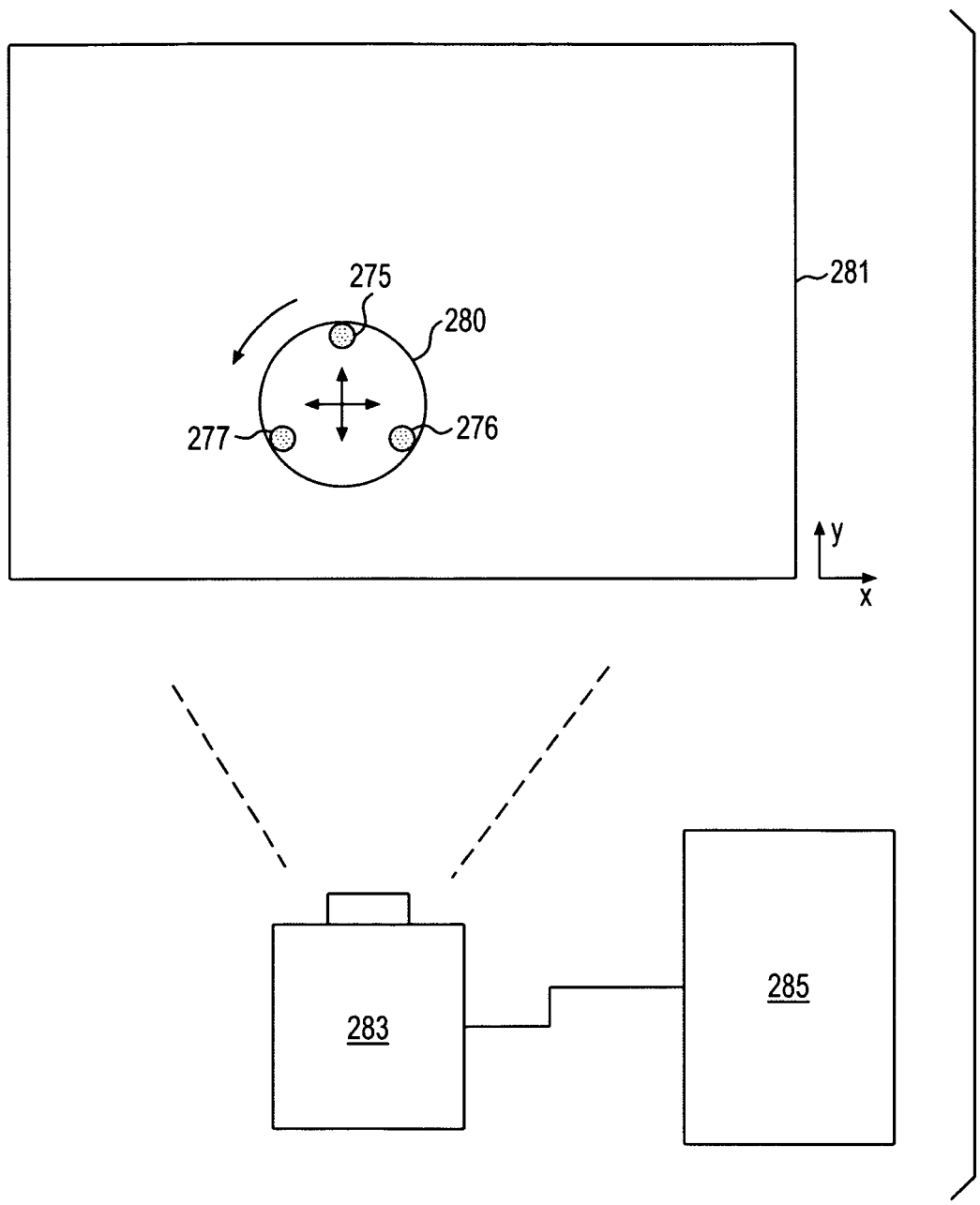

As shown in FIG. 3g, the datums 275 and 276 and 277 on knob 280 on screen or other surface 281 allow the camera 283 and computer 285 to solve from the image of the datums on the knob, not only the rotational position of the knob but also the transverse position or movement therein as well. This allows added-data to be provided to the system, as to any translation of the knob as well.

For example, a screen mounted joystick-like device of the invention can be provided in which a lever can be moved in any direction, moving one or more target datum accordingly. This allows one to provide functions typical of a mirror adjuster or radio speaker balancing.

Another example is to employ a knob which can be rotated to a desired position, and then energized by hand by pushing side ways to select a function. And another desired input can be achieved by pushing vertically or in other directions. The function selected can always be the same, that is corresponding to the rotational position of the knob, or it can be something also relating to in which direction or amount the knob is pushed in x or y from its normal rest position, or a combination of both.

In the example shown, this knob is used to adjust seats via up down left right, after rotating the knob to "seats". Or when rotated to right or left outside mirror, those as well. And it can be for speaker functions, selecting those in right front left rear etc, by pushing the knob in the direction of 11, 1, 5, or 7 o'clock, where a compound x and y answer is of interest. In each case the display changes to the desired function, when the knob is rotated to the function of interest to be selected. In each of these cases the longer the knob is pressed in the direction desired, the move that function is activated, similar to today's controls for all of these functions on Chrysler cars for example.

This type of knob can be arranged in another fashion, where selection is made by some other means than use of knob rotation, and that knob rotation is used to control the movement magnitude, rather than the time the knob is pressed in a given xy direction.

FIG. 4

FIG. 4 illustrates additional detail and features of the previous embodiments, here further incorporating a touch screen function (which may be used alternative to, or in combination with, the knob or other physical tactile selection or adjustment details described previously).

The touch screen function may be provided by means known in the art, such as acoustic wave, resistive capacitive and so forth such as those made Microtouch Corp, and Dynapro corp. Of particular interest of the conventional types known in the art are piezoelectric or other stress or strain gage based systems such as further described in figures below.

However it is also possible to see the finger touch optically. In this example, one or more TV cameras are used, which generally is the same camera such as 117 used for sensing physical details such as knobs as disclosed above. Just as in the case of the knob 115 of FIG. 3, the driver's finger or an object held by the driver (or alternatively, a passenger) may be illuminated using light from a rear projection source used to project displayed information on the screen. Alternatively, sources of light in the vehicle can be used, such as ambient prevailing light or special lighting such as IR LEDs.

Several methods of electro-optically determining the location of physical touch are disclosed in this section:

The first observes the users finger through the screen, with the finger substantially in contact with the screen, using light projected from the rear (typically provided by the projector displaying images on the screen).

A second method observes the finger of the user at some distance outward from the screen Another method observes the shadow of the users finger on the screen, generally while in contact with the screen, using light projected from the passenger compartment side.

Another example of an optical method to determine finger presence and even depth of push by determination of screen distortion is also disclosed in the referenced co-pending applications and patents.

Figure 4A:
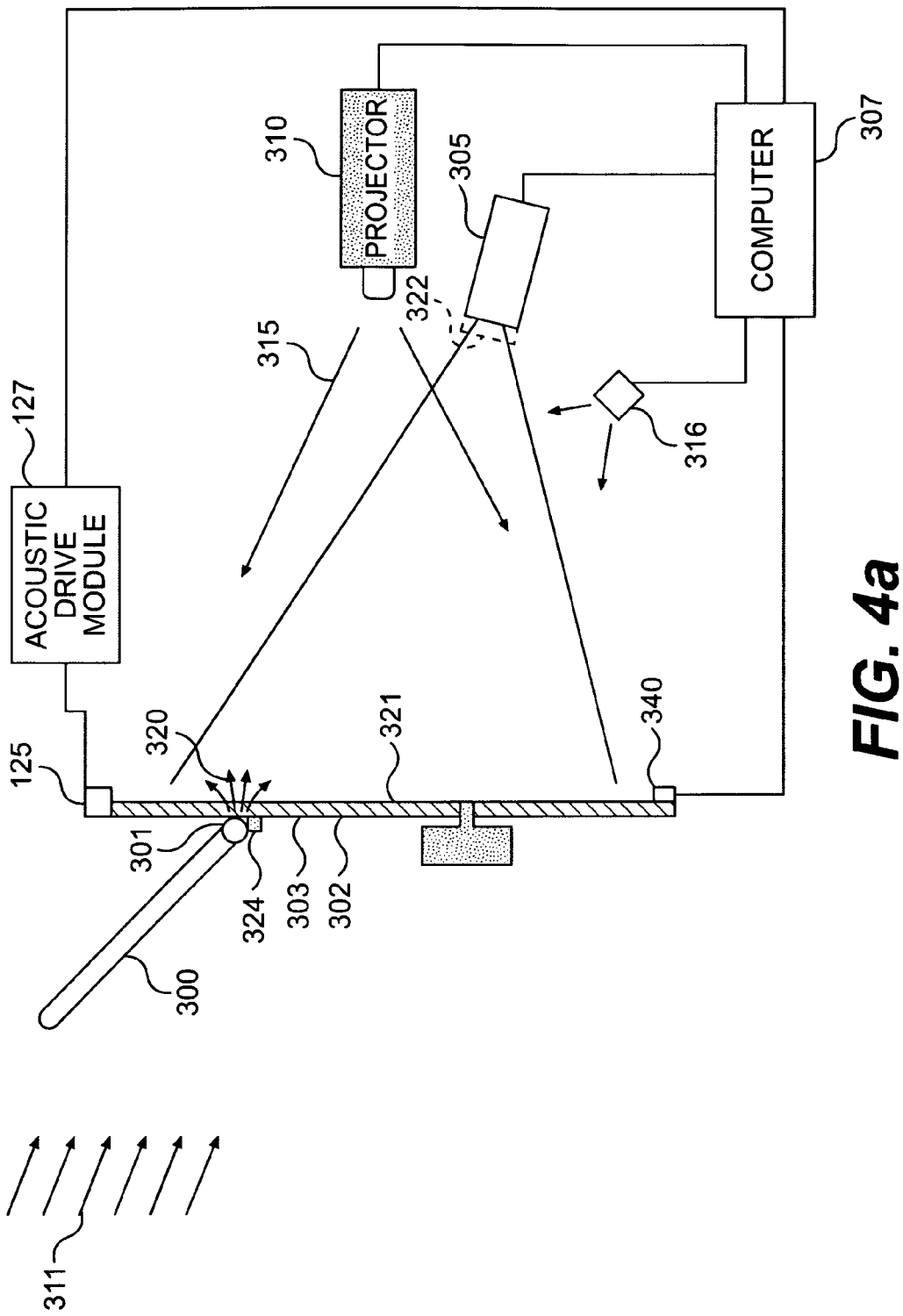
FIG. 4 illustrates additional detail and features of the preferred embodiment additionally (or alternatively) incorporating a touch screen capability (which may also be in combination with the knob or other physical tactile selection or adjustment detail)

Consider FIG. 4a, wherein finger 300 of a user touches screen 302 which is sufficiently transparent and having, for example, a diffusive front surface 303 facing the driver. TV Camera 305 is located behind the screen and out of the way of the displayed image projected by projector device 310. Camera 305 is used to view a region of the screen 302 from the rear. The camera image of features on or near the screen is processed in system computer 307, for example employing a SONY Pentium 4 at 1.7 Ghz and standard image processing software such as MIL (Matrox imaging library) from Matrox, in Montreal, Canada. The camera may be for example a Sony progressive scan type with IEEE 1394 connection to image processing computer 307, which may be the same computer as 120 used to sense knobs and the like, if desired.

In a first case, the tip 301 of finger 300 in contact with the screen 302 is front illuminated through the screen using light 315 from the projector 310 (or optionally by a separate source such as IR LED's 316 (dotted lines) located behind the screen, whose light, like that of the projector, passes through the screen from the rear. The reflected light 320 from the finger (primarily from the tip 301 in contact with the screen), is sensed through the screen by the camera 305 as shown. The screen can be of ground glass or ground plastic, 3M Vikuity or other types, and may have diffusive regions inside the screen material or on the front or rear face. A fresnel lens can be used before the screen (projector side) if desired. This somewhat blurs the image however, focus usually does not have to be precise to detect finger presence at a given location.

Given the screen scattering properties required to make the projected display image visible to the driver and passengers in variant positions, the user's finger (or fingers) should be close to, or in contact with the screen for best results. In some cases the finger tends to fill in the screen front surface to reduce scattering effects caused by surface roughness of the outside surface 303 of the screen (assuming the scattering is from the front surface, and not from scattering elements within the screen or elsewhere).

For best results in the presence of bright projection images, it is generally desirable where possible to apply a vacuum deposited or other anti-reflection coating 321 to the back of the screen to reduce backscatter reaching the camera from the projection source. (if the camera is operating using the projection light, and not separate IR sources for example). For the same reason, the camera 305 may be purposely located such that it is not at the angle of direct reflection off the screen from the source.

If a separate quasi monochromatic source such as IR LED, or LED array, 316 is used to illuminate the knobs, details, or fingers on the screen, a band pass filter at the source wavelength such as 322 (dotted lines) can be placed in front of camera 305 in order to preferentially pass light from the LED source, and not from the projector (which projector could also include a band blocking filter at that wavelength-desirable in some cases anyway to limit heat reaching the screen.

It is noted previously (and discussed further in FIG. 5) the touch screen can desirably have relief features such as indents or ridges, which may be for example shaped as a circular groove or as shown a linear ridge 324 in screen 302, in order to guide the users finger tip such as 301 to a certain location on the screen where for example the starting point of various command movements might be made. The indent or ridge can be shallow such that it can be felt, but not deep enough to cause excessive refractive gradients which would disturb an image say of a map or video display that might take up the whole screen surface in a navigational mode for example. Ridges and depressions in smooth surfaces of even 0.003 inches for example can be sensed (thickness of human hair), while even 0.020 inches deep or high can be used with little optical effect in many cases especially where slopes are small.

The relief feature may also be an area of different texture, for example a region rougher than the surrounding screen surface. This can be quite easily felt in many cases by persons (though not with gloves on—a drawback in some cases)

Where the screen is divergent via scattering microspheres (eg 3M Vicuity) on the rear surface thereof, a variance in texture on the front surface does not cause undue change in the projected image viewed.

The image of finger tip 301 can be further, or alternatively, distinguished by other methods. For example the camera 305 may be a color TV camera, and if the light projected by projector is white in nature, the color of the imaged light from the finger tip will be flesh colored, and only flesh colored images can be looked for by image analysis software in computer 307. Since each driver's flesh may be different in color, one can teach the camera computer system during a set-up phase, by simply putting ones finger on a square or squares on which white (or another color) is projected. It is thus desired to match the return from one or more projected colors with an indication of the persons finger. This simplistically could also be used to identify a driver for theft prevention purposes. Indeed certain aspects of the finger print can also be seen by the camera too—especially if the finger pressed in against the scattering surface.

If the user wears gloves, the system can be retrained for the glove color, if required. The enlarged finger size can accordingly be accounted for as well as gloved finger contrast. Where near IR sources (eg 905 nm) are used, I have found good reflection from almost all gloves tried, black or colored.

Another aspect of teaching is to for the camera computer system to "learn" the approximate size of the users finger contact on the screen in typical use, as determined by the camera system (by thresholding the image for example, and measuring the extent in width and/or height, or area, of the image at that threshold). This provides added value in that it can be used to roughly determine force. For example, the camera computer system can be taught a normal touch and a "push in" state of touch-just two highly differentiated states, which clearly will have a larger finger contact area in the "push in" state. This ability to designate a new state by pushing can be used to act as a selection method of a position reached by touching.

Other Z axis or force related sensing means can alternatively be used to determine the location of finger touch or the movement/force in Z which can be used with the knob states in addition. Such a suitable means can use the piezo-electric force transducers located for example at the screen corners, such as 340 (those on other corners not shown for clarity). See also for example FIG. 7 or 9.

Figure 4B:
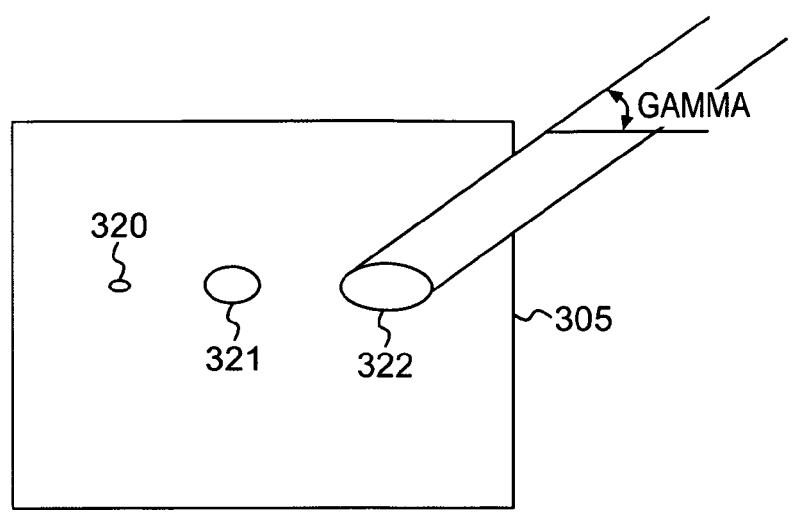

To illustrate, consider FIG. 4b which shows the image obtained by TV Camera 305 of three touch states—light touch 320 indicative of the finger tip approaching the touch condition and just touching the screen, the normal touch state 321 where one wishes to indicate touch at a certain x-y point on the screen (i.e. in the plane of the screen), and the pressing mode state 322, typically used where one may wish to indicate that a condition at that point is to be selected (note that the light touch state can also be used for other conditions on occasion). There can also be degrees of pressing, such as normal and hard, for example as well. In one example, a complete range of 5 analog pressing values could be obtained.

Another means of distinguishing ones finger is by image sharpness and contrast. Since the surface of the screen 302 is typically scattering, objects that aren't in direct contact with the screen will be seen less clearly from behind—and can become un-discernable if the finger or other object is too far from the screen in the direction away from the camera. Thus a criteria for determining finger presence on the screen is both sharpness and color, as well as degree of light return (brightness) and size (most finger touches being within a size range on the order of 10 millimeters on the screen, but quite variant, also with the force of touch).

To avoid having the camera and computer system exposed to images which don't represent an intended touch type signal, it is possible to sense independently that a touch condition has occurred, for example with piezoelectric transducers located to determine forces of the screen plate such as 340 in FIG. 4a whose information is processed by computer 307 and then use this signal to cause the camera computer to analyze images on the screen. When a force or other touch condition is detected the system is programmed to look, minimizing the chance of false signals due to unusual lighting conditions. It is noted that in some cases piezoelectric transducers can also be used to excite the screen (and fingers touching same) for data feedback to the driver as well. This is discussed elsewhere in the disclosure in more detail Another variant discussed in co-pending applications, is to see the deflection of the screen or other indicator of finger location, and using this knowledge, then localize the search for the finger image. Conversely, one can get a rough finger image, and then localize the region of search thru other means, which could be acoustic, optical or other.

Another point, apparent from FIG. 4a is that finger 300, with tip 301 in touching screen 302 effectively shadows the view of the finger tip contact with the screen as seen from behind the screen by the camera. This is very useful as it shields the camera (or other electro-optical sensing device, such as used with flying spot scanners for example) from excess light falling on the screen from within the passenger compartment in bright sun conditions for example. As can be appreciated, in a car with a sunroof, or a convertible with the top down, direct sun on the screen is possible. And even in other vehicles, grazing sun through the side windows or the windshield can fall directly on the screen.

It is noted that typically such sun conditions completely wash out the image of normal instrument panels (with LCD or LED displays for example) in cars, but in this one it may not due to the intense power of the projector, a major plus.

The image of the region of contact such as 321 may be analyzed by the camera and computer system for any of color, brightness (intensity) and sharpness and shape or area of contact. If desired, and screen design and camera resolution permitting, fine detail in the finger contact can be examined, like a finger print. This can be to identify that the finger is in fact in contact, but also to identify the person.

It is noted that if the screen is positioned to the right of the driver in the center area or center stack, as it would be if located to the right of the steering wheel on the dash in most countries, the finger will generally approach the screen at an angle GAMMA as shown in FIG. 4b—this effect can make it easier to discern the point of finger contact as a longer extension of the finger edges can be used to perform the calculation of the point of contact from the TV image.

The extension portion of the finger 360 also shadows the screen to a degree, and this shadow edge can also be seen to help identify where the finger is pointing, and where the tip lies. Close to the screen the extension region can be seen in reflection as well using the light source(s) from behind the screen.

Figure 4D:
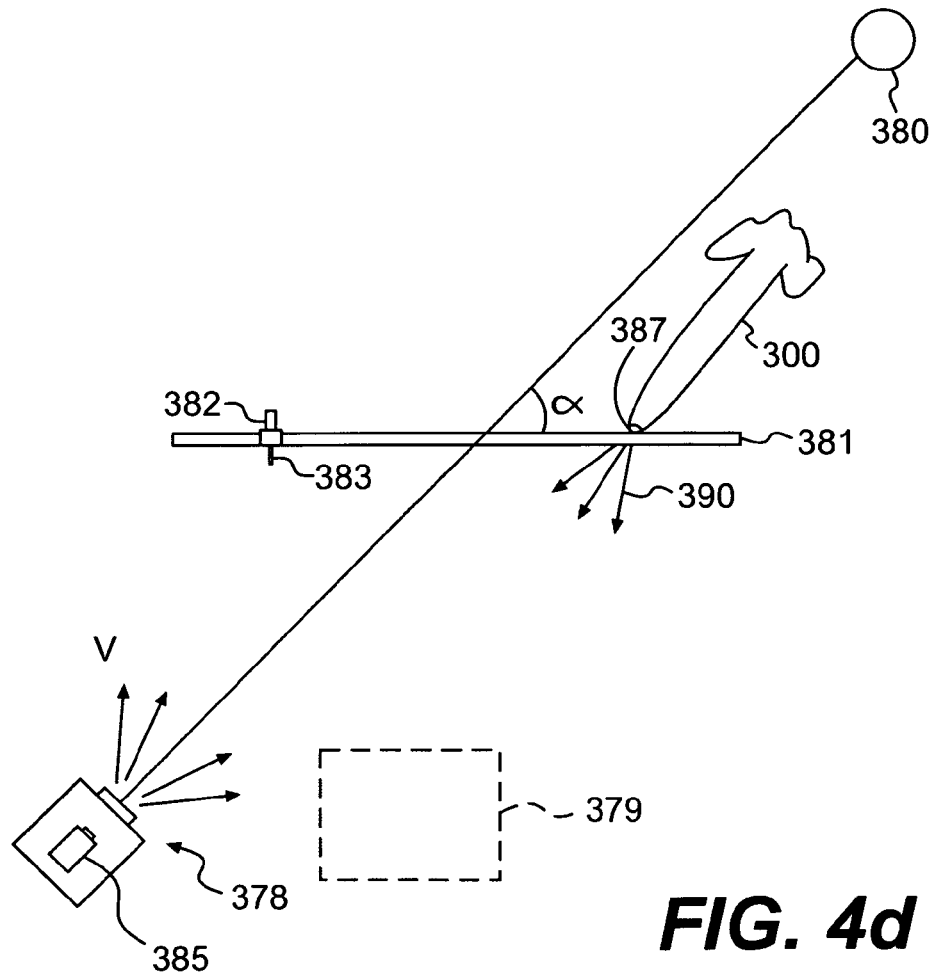
Figure 4C:
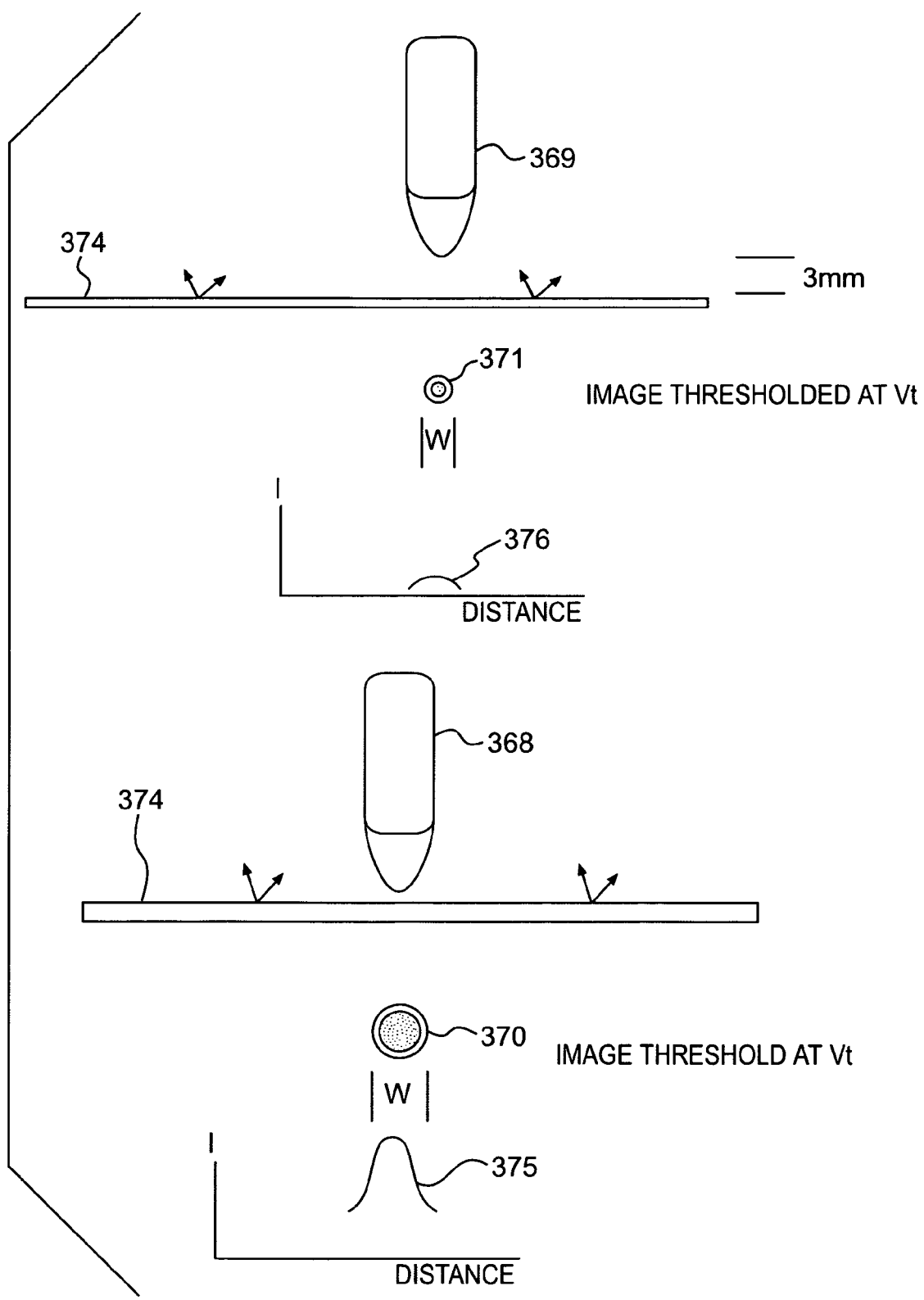

FIG. 4c illustrates a comparison of a conditions when a finger 368 is pressed at its tip in contact with the screen with the condition of a finger 369 whose tip is spaced away from the screen. Finger image 370 (viewed by a camera such as 305 not shown in this figure) is generated when the finger is in direct contact with the outer screen surface 374, while finger image 371 is that seen with a finger 3 mm. approximately away from the screen. In each case the images are thresholded to the same intensity value which produces a larger image width w (and area) of 370 than in the spaced away condition, 371. Note too that the edge contrast as illustrated in the intensity profile 375 of image 370 is much higher than the corresponding profile 376 of image 371, Contrast can also be used, like the size dimension or area of the image at one or more image intensity threshold intensity values, to discriminate the two conditions. In some cases for example, one may wish to ignore finger indications where the finger is not in contact with the screen.

FIG. 4d illustrates an angled projection situation where the projector 378 is aimed toward the driver 380 with the projection axis making an angle alpha with respect to the screen and control surface 381. a slider 382 traveling in a direction out of the plane of the paper has a retro reflector 383 which is illuminated by the projector, is seen by camera 385 located close to the projection axis. The projector also illuminates the drivers finger tip 387 as well, allowing its position and other variables to be determined as just discussed.

This arrangement has an advantage that the light from the projector reflected from the surfaces of the screen is directed away from the camera, which then has less optical noise to contend with, since the light 390 scattered from the finger tip back to the camera and the light retro reflected, can come back along the camera axis.

The projection object plane (LCD for example) is typically canted at an angle proportional to alpha so as to keep the projected image in focus across screen 381 as is known in the art. This results in a variable magnification across the screen which can be compensated for by processing the image data to be projected accordingly in computer 120 controlling the display.

This arrangement has two other advantages as well. First, the projector may be located closer to the screen in the depth direction which may be helpful in certain packaging situations. Second the camera which is located off to the side, may be less affected by sunlight which may enter through the screen.

This arrangement maximizes the light intensity as seen by the driver and makes other artifices such as lenticular screens to spread the light in the horizontal (cross car) direction unnecessary (at least for the driver). However, as noted it may be desirable to spread the light vertically to suit the driver, given the relatively larger angles subtended by his vision in the vertical direction.

Note too that by angling the projector as shown, it becomes relatively easier to position an optional airbag such as 379 (dotted lines) behind the screen, such that it can blow thru the screen in the event of an impact. In this case the screen should have a tear strip or other means to allow it to give way and not hurt the passenger. While illustrated here in the center stack, such airbags are usually positioned in front of the passenger—though a passenger could sit in the middle front seat in this case. Or they are positioned in the steering wheel, where the display can also go with some packaging constraints. If new forms of control are used, other than steering wheels, this arrangement could more easily be in front of the driver.

When using rear projection it is desirable for best contrast to shield the unit where possible against off axis direct sunlight entering the display. Such shielding can generally be judiciously achieved by the placement of the device in the instrument panel vis a vis the driver. Alternatively or in addition, techniques such as the microlouvers described in Blanchard, U.S. Pat. No. 5,543,870 can be employed Finally it is also possible to use back illumination of the users finger. In this case, also illustrated in FIG. 4a, the camera 305 sees the dark or "shadow" image of the finger 300 touching the screen 302, when back illuminated by light 311 from the users side (in this case light inside the car. This works well during daylight and in relatively well defined situations, but poorly at night unless auxiliary lighting is provided inside the vehicle (e.g. from IR LED's which can be placed for example in the roof of the vehicle behind the front seats, which are not disturbing as they are invisible). The camera is ideally used to see the finger touch location in x and y screen coordinates when the projector source is sufficiently dimmed to eliminating background noise from the screen. The projector can in some cases be switched off or its displayed image darkened only momentarily, to avoid the impression of it being off, which can disturb the user.

It is noted that the finger of the user does not necessarily have to be in contact with the screen, but can be some distance away, the distance being dependent on having sufficient lighting conditions which create a detectable shadow image.

As in FIG. 3, The camera utilized can be any commercial camera, capable of producing images which can be interrogated as just discussed in order to see the finger(s) of the person touching the screen, or something proportional thereto. And the same image when analyzed can contain information as to knob slider or other control such as discussed in FIG. 3 above As also noted in FIG. 3, best results may be obtained in some conditions of operation by using a CMOS or other type camera which can be addressed on a pixel basis, to achieve faster operation. This will be discussed later as well While the discussion above has been concerned with finger or other images illuminated with light in the visible or near IR wavelengths, alternatively, self generated radiation of a finger or other portion of a body can be used, detected with IR TV (e.g. pyro-electric) cameras 305 operating in longer wavelength regions. In this case it is desirable to use if possible a "Cold" light source in the projector, such as LEDS or light conducted to the projector by fiber optics from a remote light source.

It is also noted that one can project light into the inner region of the knob, even if the rest of the screen is black, since the knob blocks the projection (if not open in the middle). and one can in any case preferentially project more light in inner region of knobs so one can more easily and rapidly discern their position with the camera.

Note that one can also project more Infrared when something is detected, such as a finger or knob turning. The human doesn't see it, but the sensor does.

FIG. 5

Let us now reconsider the screen of the above embodiments, which for example could employ a touch screen type just discussed, or other touch screen types known in the art where appropriate On a touch screen display, it is desirable to have tactile indication of where to touch, ideally so one would not have to take ones eyes off the road or other activity (for example watching for enemy aircraft in a military sense, or watching the stove in the kitchen in a home sense). This ability is provided in the invention in three ways;

Relief details permanently on the screen surface which may be interchanged when the screen itself (or an overlay thereon discussed further in FIG. 8) is changed;

A movable and/or removable relief finger guide; and programmable acoustic wave based force feedback sensations The use of such relief details was mentioned above relative to the above figures and is further elaborated on here. For example consider in FIG. 5a, relief details on screen 400 comprised for example of 6 indents (circular depressions) 401 to 406, and a further detail comprised of a thin horizontal ridge 407 sticking up 0.003 inches for example from the surface of screen 400. Alternatively the ridge could be a groove, and the indents, bumps. In addition the screen could be flat, raised or indented portions provided on an overlay member placed over the screen, either wholly covering it, or only in part—for example on the drivers side. Typically the surface most outward toward the driver is made diffusive to scatter light to him and other passengers from this outer surface, but it is not necessary to do so.

Figure 6:
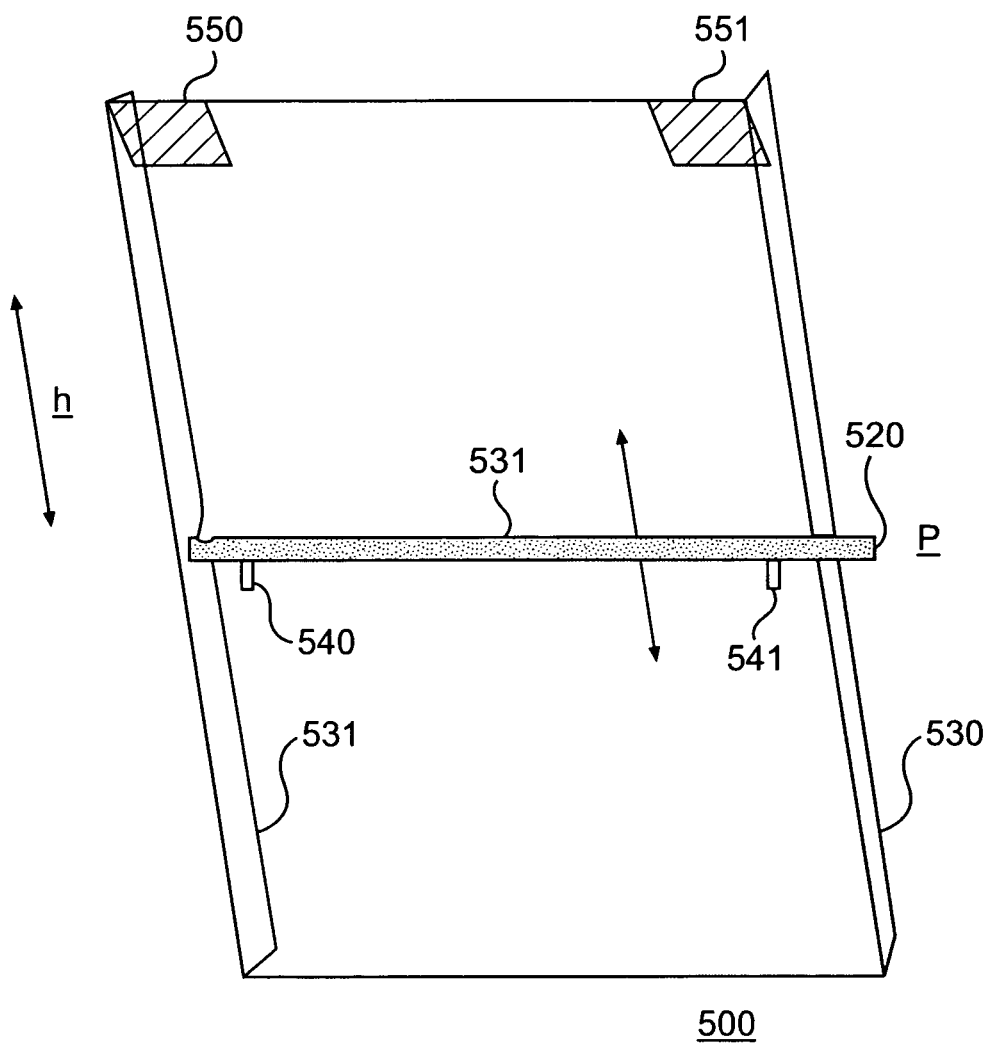
FIG. 6 illustrates alternative tactile screen designs with removable or adjustable large finger resting details and multiple "switch" or other control location details.

The indents can all be alike as shown, or if it is desired to differentiate them as it could be if they were to indicate numbers of a phone dial for example, the indents can be made of different shapes or sizes, or curvatures, depths, textures or other characteristics that impart a different "feel" (also programmably, see FIG. 6). For illustration a further indent 408 has been shown to be square in shape to enable it to be so distinguished, while indent 401 is shown to be shallower for an indication.

The relief details are aides to facilitate the driver finding the correct location on the screen for input action and/or as locations to receive tactile data feedback as to certain variables via force sensations.

In the automobile application, the screen/control surface 400 may optionally be sloped at an angle with respect to the vertical, to increase surface area (for a given height above the floor in the passenger compartment) and to better provide a resting location for the driver or passenger in the operation of the device. In some other applications, the screen/control surface can even be horizontal.

As noted previously, The use of transparent local protrusions or indentations such as 401 make finding their location on the screen possible by feel, while still allowing image projection on the screen at their location. Generally, it is preferable that the protrusions or indentations be small in height or depth, on the order of 0.020 inches or less for example (with correspondingly small slopes if a smooth indentation), such that minimum discontinuity to the eye occurs when images are on the screen at their location. If it is not needed to display images with good visual quality at these locations, then the grooves or ridges can be anything desired.

Figure 5A:
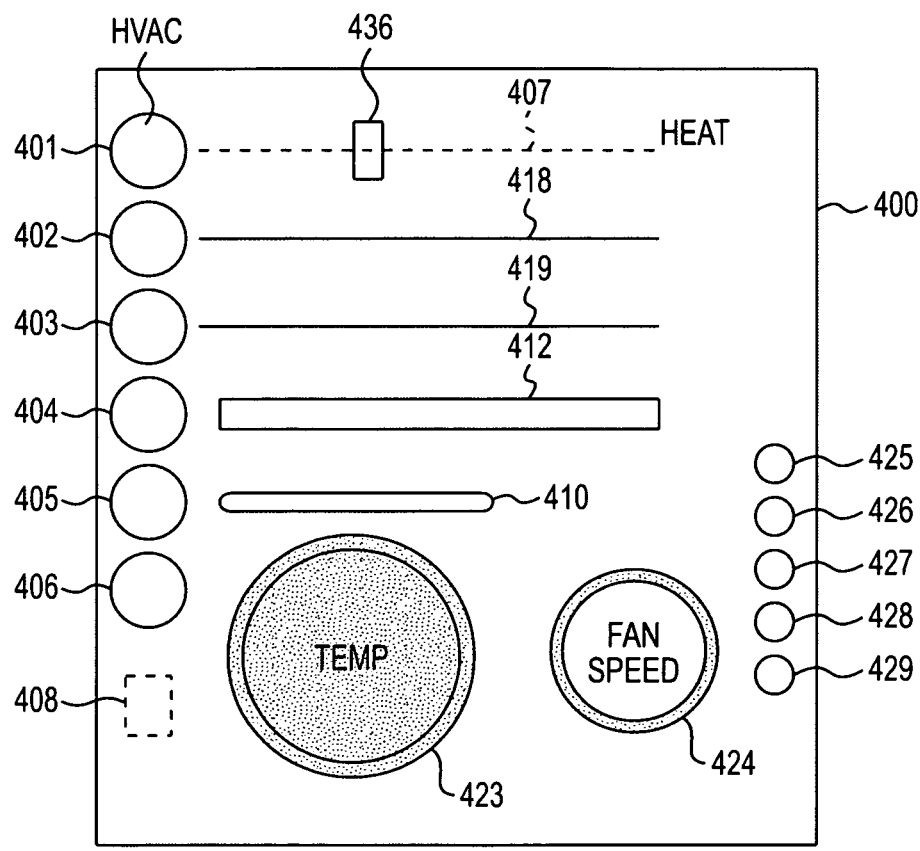
FIG. 5 illustrates a touch screen like FIG. 4, and having indented or raised portions of the screen or overlays thereon.

In FIG. 5*a*, two optional knobs are also shown, 423 and 424. In the configuration shown, these represent temperature and fan speed respectively. When reconfigured, one might alternately use the TEMP knob for distribution of air, and alternatively select the temperature for example with a sliding finger gesture along ridge 407. There are many possibilities, most all programmable.

A heat bar, as shown in FIG. 11, or other graphic can be projected along a ridge "line of action" such as 407. In this case the user just moves his finger along the ridge (or alternatively a groove), and his finger position is detected as disclosed. The projector program in the computer (not shown) is adjusted to move the projected virtual slider 436 along the bar as he does so, while providing an appropriate heat control signal to the vehicle. Added information, such as the actual degrees setting arrived at can be shown as well.

The line of action, if next to the selector indent in this case, can be reached with an almost continuous motion after the selection is made.

Such heat bar gestures can also be done free form without the ridge or groove for guidance, as is shown in FIG. 12.

Let us consider another example, with the same basic screen. The screen of FIG. 5*a* can also use indents 401-406 for locations of projected station call letters projected in the indents to correspond to radio station presets. Optional Knob 423 can also be used to tune the radio to a station, while knob 424 could change the volume. Finger touch along Ridges 407, 418 and 419 could control fader, balance and tone, as another example.

In this case, and in this mode, the indentations 401-404 are used for function selection. Thus if the driver changes the function of the screen from indents representing radio stations (such as 5*b*) or phone dial numbers to driver input functions, and his finger went over to touch the indentation in the approximate zone near indent 402 (which he had learned where it was related to edge 415 and 416 (at right angles) of screen 411, he would know by experience he was touching heater speed, controlled along line of action 418, for example. If he moved his finger vertically upward to the next indentation further up, 401, he would know that was wiper speed controlled line of action 407, and so forth. He would not each time have to look at the screen—even though he could do this as lettering would be projected on or near those tactile features to assist him. The lettering could also be exceptionally big, if he had difficulty with near vision, often the case with older drivers who are far sighted.

Alternatively, two (or more) sets of indents could be provided for example, one set along the left side of the screen for selection features, and the other such as 425-429 on the right side for example, for radio presets. It should be noted that voice signals or knob selectors can also or alternatively be used for function selection.

It should also be noted that of the indents 401-406, it may be desirable that under some computer display and control program regimes that only one of the indent "buttons" might be illuminated. In other words the driver should only hit that one, if he wants to. The ability to selectively illuminate with information particular tactile features on the display is unique to this invention, and very useful in helping the driver cope with the amount of information it is possible to display and act on.

Similarly, if the driver's finger found ridge 407, (which might be one of any number of ridges, or grooves, such as groove 410) he could know from the displayed information "Heat" that the ridge 407 was for example heat temperature, and he would slide his finger along the ridge in the x direction accordingly to indicate how much heat was desired, for example. If he wanted wiper delay, he could slide along another ridge (not shown) if this was projected by the computer controlled display as being for wipers. In either case, all functions, once learned, could be found by feel. Ideally this would be possible by a very quick observation if one was driving a rental car for example.

Material change rather than physical relief can also be used to delineate a region of interest to the users touch. For example, consider strip 412 in screen 400. This strip (or spot, or other shape) may be of softer or more elastic material, inserted into a hard screen material, and ideally having reasonably similar indices of refraction, so as to not disturb the projected images. One example of quite different touch materials would be a strip of latex inserted into a Lucite screen. This can clearly be felt, both in texture and in hardness, yet images can be projected through it.

Alternatively or in addition, strip 412 may be for example may be a part of the screen 400, made thinner (by molding or machining etc) than the screen around it, such that when pressed it deflects locally, providing another feeling which can be transmitted to the driver, indicative that his finger is located on strip 412. In addition, it is contemplated that different signatures of vibration under excitation by the piezoelectric or other actuators of the invention will be noticeable also at the strip 412 in comparison to the surrounding screen.

Figure 5B:
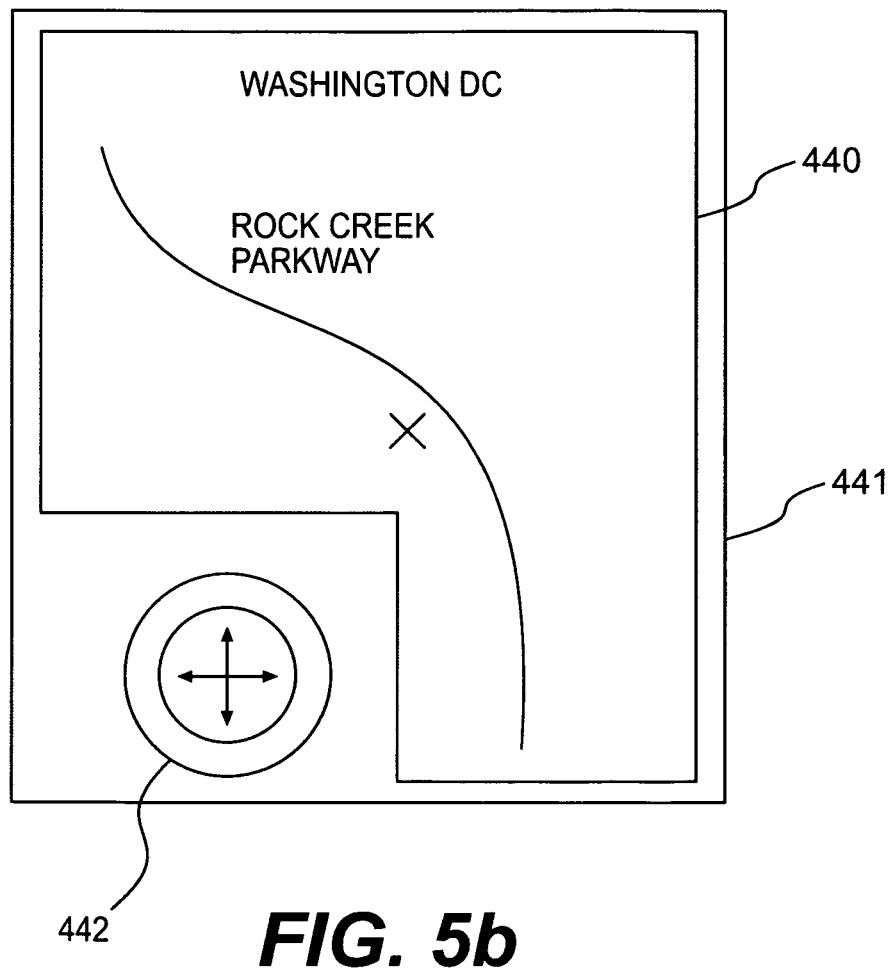

FIG. 5b illustrates an arbitrary image such as backing up image from a video camera or in this case a map 440 projected on screen member 400 of FIG. 5a however, at another point in time. Image 440, in this case a map of Rock Creek Park in Washington, D.C. is projected as large as possible, and thus overlaps the indents, with the latter providing (if of relatively small slope or depth) minimal alteration of the image as projected. In addition the image is caused to "wrap around" the annular ring knob 442 used in this instance for map control which is fixed on the screen. Such images can thus be temporarily displayed to the driver in the largest possible manner, without impacting the control features of the invention. This is a huge advantage where space is limited, as it is in automobiles and military vehicles as two important examples.

As illustrated in FIG. 5 above the provision of tactile cues on a display screen used for automotive control activities allows the user to "feel" where he should touch the screen, as he searches tactile-ly by scanning his finger over at least some of the screen the surface. When he touches it, he can signify that he has reached the point or value desired by leaving his finger there for a dwell period recognizable by the computer. Or he can use other means, one means being to push in on the screen, which can be sensed, for example with the piezo electric force transducers described elsewhere in the disclosure, or by electro-optical analysis of his finger indication.

The driver may also touch the screen and move his finger along the screen, thus also indicating that he has selected this function, and then let his finger dwell or push in. For example sliding his finger along ridge 407 of FIG. 5b as the heat bar is displayed, to indicate a different desired heat settings.

Alternatively, he can dwell and then move. In this case, as he first touches the point this one of several possibilities can be that the display presented on the screen, provides an indication of a state or setting presently active, with that setting represented at the point touched (e.g. a heater blower on speed #2). Then as he slides his finger away from this point in one direction or another, the display can change accordingly to show the new setting (e.g. he moved his finger to the right to higher values, such as speed #4).

While smaller ridges have been emphasized so as to not disturb the displayed images, allowing the display to be used for general image presentation, larger ridges or grooves may be used for the convenience of the user. Particularly of interest for driving are large ridges acting as a sort of shelf in the horizontal direction, say for example 0.2 inches high, which can serve as finger resting places as well as provide lines of action for inputting data commands. Such shelves will distort images projected thereon, but in some cases this can be mitigated by either projecting black lines where the ridges are, or having the shelf be itself opaque, or be slidable to different locations on the screen or removable out of the way when desired (see also FIG. 6).

The touch screen and related aspects of the invention open up new vistas for adding useful functions for improved control or enjoyment. And the completely programmable nature of the device, provides a future ability to insert new devices However, it is often difficult for persons to learn how to use the functionality deliverable by the invention. This is particularly true if the person has just gotten into a rental car, say. Illustrated a useful embodiment of the invention, wherein the instructions for operation of a device (e.g. the heat control knob and associated computer display screen or screens) is displayed right along with the device on the tactile display or touch screen of the invention.

For example, consider that in employing the apparatus in FIG. 2 for example, brief written or graphic instructions for use can be down loaded from computer to the image projector or other display mechanism and displayed right next the knob or slider or whatever is desired to be used for control of a function. This makes the understanding much easier, than for example the simple storing of a manual in the computer for later presentation. This is particularly possible when the display is large, and the instructions, and the controls easy to see.

For example, as the person touches the knob, the touch can be sensed, and the instructions projected if desired, assuming an instruction mode is activated in the control computer. The instructions and (or other control device) are preferably large enough so that no difficulty is encountered seeing both together in one view.

This aspect of the invention is also very helpful with often complex functions. For example, when the knob 423 is switched to Temp as in FIG. 5a. A thermal bar graph display for example is activated which then itself is energized and used to set the temperature. The instructions then for this function may also be displayed to allow the user to at all times be informed as to what is desired.

It should be noted that because the display and tactile physical selection or adjustment means providing control functions and feedback are both programmable, one can have programs which vary by driver. Indeed, one can even take your program with you, for example if renting a car having a similar display and a data input device for your to enter your program in (e.g. via a CD or DVD Rom for example using a version of the CD player of the car). Or your program can be downloaded from remote sources such as your home computer or the internet (where a selection of programs might be found, say on a DaimlerChrysler web site)

The Sequence of actions undertaken then using the embodiment in one preferred version and aspect is:

Glance;

Touch;

Move;

Confirm (tactily and/or visually—much like today's Instrument Panels—but generally with even more tactile feel relating to the position, and larger lettering which can be better seen at a glance).

Alternatively, one can do it entirely by feel, using the techniques described herein where the programmable acoustic source is used to input to the user the data needed (even to include the initial starting point of the knob position such as a short pulse burst, with a long delay until the next one to indicate a first position, or the end point, which might be three short pulses with a long delay, to indicate position 3 for example. Other pulse frequencies or codes could signify different programmed knob functions if desired, like wipers or heat, or whatever. Or voice can be used as discussed, or combinations thereof.

Also gestures can be used, such as hand or finger position or movement, as disclosed in my co-pending applications for example. The gestures can be on the screen as touch, or detected in front of the screen, or in the passenger compartment of the vehicle.

It is also noted that electro-optical sensing of commands provided by a finger touch or features of physical tactile devices such as knobs as described can be usefully accomplished in many cases by change detection, accomplished for example by subtracting images in a quiet previous state (i.e. static) from instant images. Both finger touch and knob turning represent image change which can be identified. And the region, and magnitude, of change pinpointed (the identity and region being linked tin the computer to the data projected and/or the force signals provided).

Its also noted that one can calibrate the camera system each time a measurement is made as well, if the movement is known—e.g. a knob turn to the next position with fixed detents provides a known rotational degrees of movement to one or more markers or other knob position related features. In addition the markers on knobs or screens which are in fixed relationship to each other (and known to the computer) can be used to correct changes in magnification and alignment of the camera system. This is useful too when screens and overlays are interchanged.

With the invention an elongate groove such as 410 in the screen (or an overlay thereon) may be illuminated with data in the groove or adjacent to it relative to the value to be selected by running ones finger in the groove. This may be as simple as an on-off function, or the selection either analog or digitally of an number of magnitudes of a variable, such as temperature, wiper speed, radio volume or frequency, etc.

This groove embodiment has certain similarities to the multifunction groove switch of Butler et al referenced above, but here is part of a programmable display, rather than a fixed function display. In addition, the position of the finger in the groove may be sensed without requiring specialized switches, and the groove of the invention when not used as a selector, allows a variable display to be made in the same region as the groove. Furthermore, the groove of the instant invention, can not only be a straight groove of constant depth as disclosed by butler et al, but may also have variant depth, and/or variant contour side walls which can indicate positions along its length indicative of a variable of choice. And it can be part of a two dimensional groove arrangement as well. The screen containing the groove of the invention is also able to communicate back to the user by the force feedback methods noted.

Figure 5C:
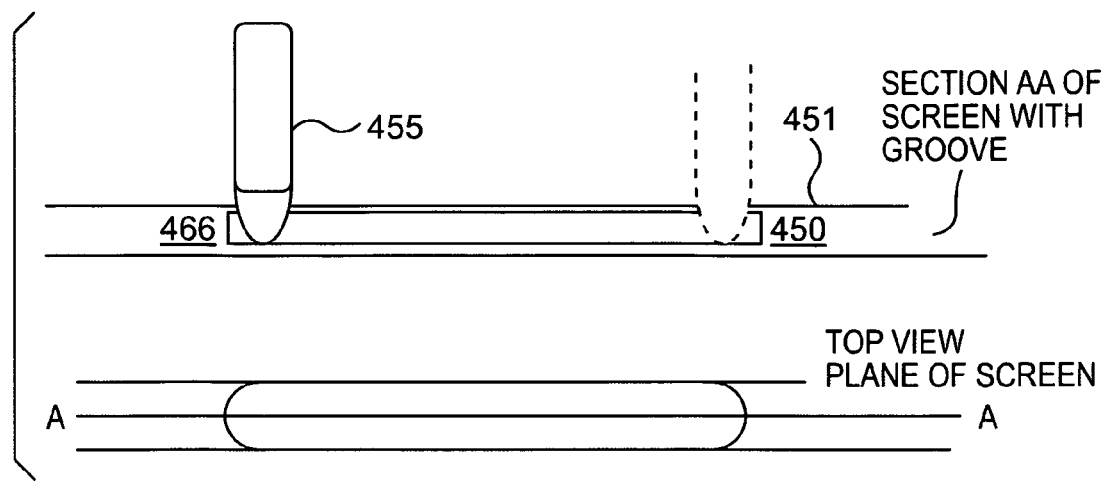
Figure 5D:
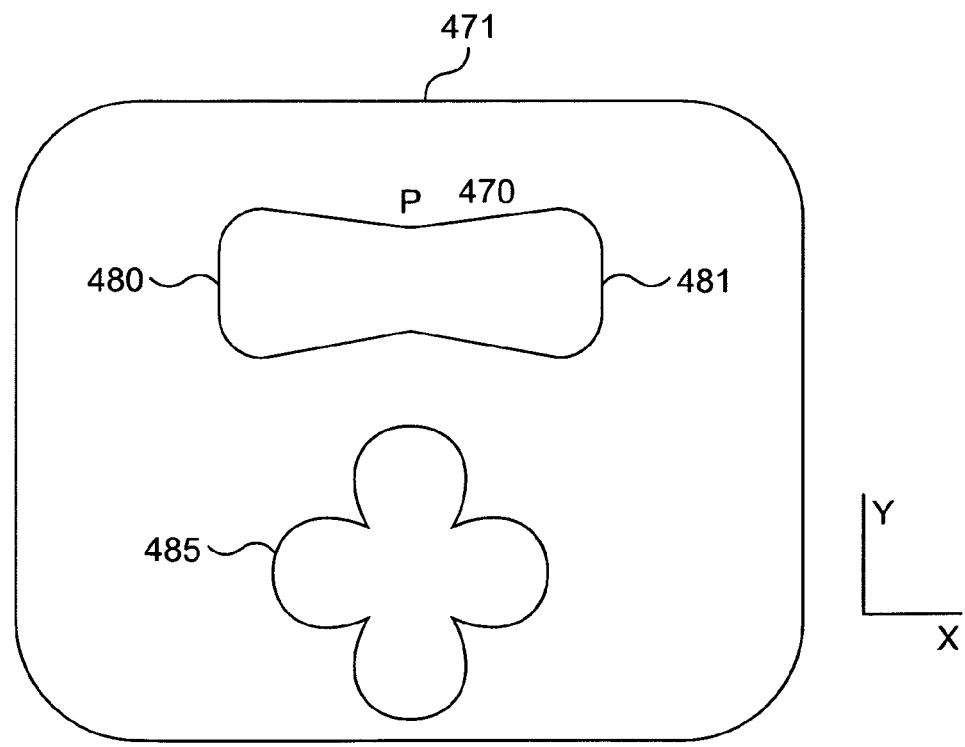

For example as shown in a side view of FIG. 5*c*, the groove 450 in screen 451 is contacted by finger tip 455, shown at the left edge 460 of the groove, which could represent an "off" position. For example an of a function, when the driver moves his finger to position 456, (shown in dotted lines), this new finger position can be sensed by the machine vision and computer system as an "on condition, for example.

The groove can also be for example a different configuration at different points, which can also lend itself to provision of a plus/minus type of rocker switch, commonly used for "Seek" functions on car radios or CD players. For example, in FIG. 5*d* consider front view of a different kind of groove 470 in screen section 471 of this nature, illuminated by projected image from an image projector not shown to illustrate plus and minus positions. The illuminated indication can be desirably in the groove and/or next to the groove (shown). The operator clearly can feel that the region to the left of the narrowest portion 475 at the groove midpoint is a minus quantity, and the region to the right is a plus. Note that this can even vary the rate of change, by having the system speed up movement as the finger is detected closer to the end points of finger travel in the groove, 480 and 481 respectively.

It is noted that groove depth may also or alternatively be encoded to allow a "Feel" of position to be gained, for example the depth of the groove at the end points 480 and 481 can be deeper than in the center (or conversely).

The indication of being in the bottom or top position is detected by the electro optical sensor of the invention (e.g. TV Camera) and can be signalled by sound using the computer such as 120 to drive a loudspeaker with a high or low frequency sound for example depending on which side of the groove one is in. Or as taught above a force pulse or vibration can be generated in the screen to allow the persons finger to "feel" the indication, for example two states of pulse frequency corresponding to either a plus or minus seek state.

In a similar vein, a cross shaped groove such as 485 in screen 471 can be employed to allow a driver to select rear view mirror or seat position functions for example in two Cartesian axes x, and y, plus and minus from center.

Figure 5E:
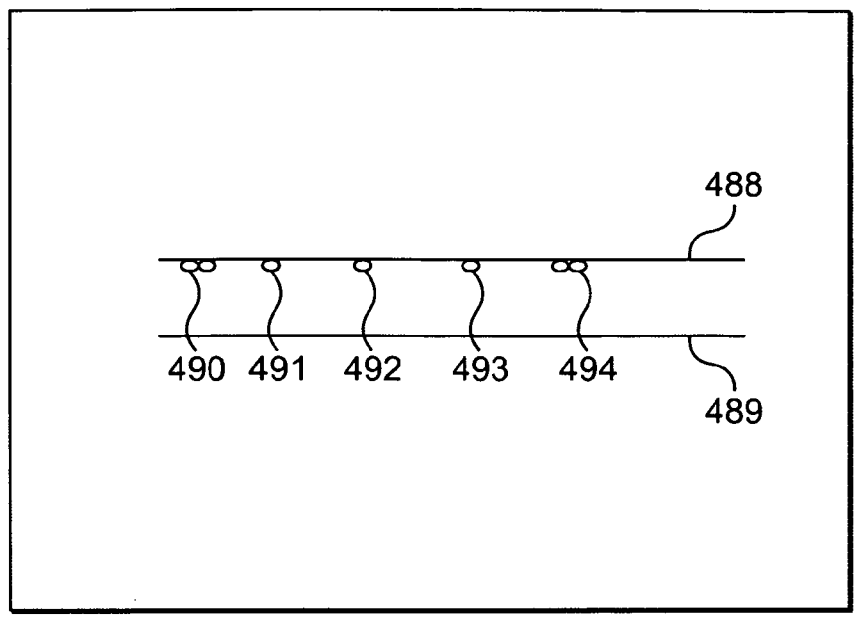

FIG. 5*e* is an alternative elongated relief member embodiment, in this case a pair of ridges 488 and 489 rather than a groove, which illustrates other position coding methods. Along the edge are bumps such as 490-494 which can be felt to indicate the position of ones finger along the relief member. In this case the bumps can be coded if desired, as shown the middle bump 492 has one bump, while bumps 490 and 494 at the plus and minus extremes have two close spaced bumps each.

As noted previously, a desirable aspect of such ridges, grooves and the like, is that in linear form they can provide a "line of action", so to speak, which the driver can trace his finger along, in the example from cold to hot, as one goes left to right. The ridge or groove can be under or on top, or surrounded by the display as desired.

Figure 5F:
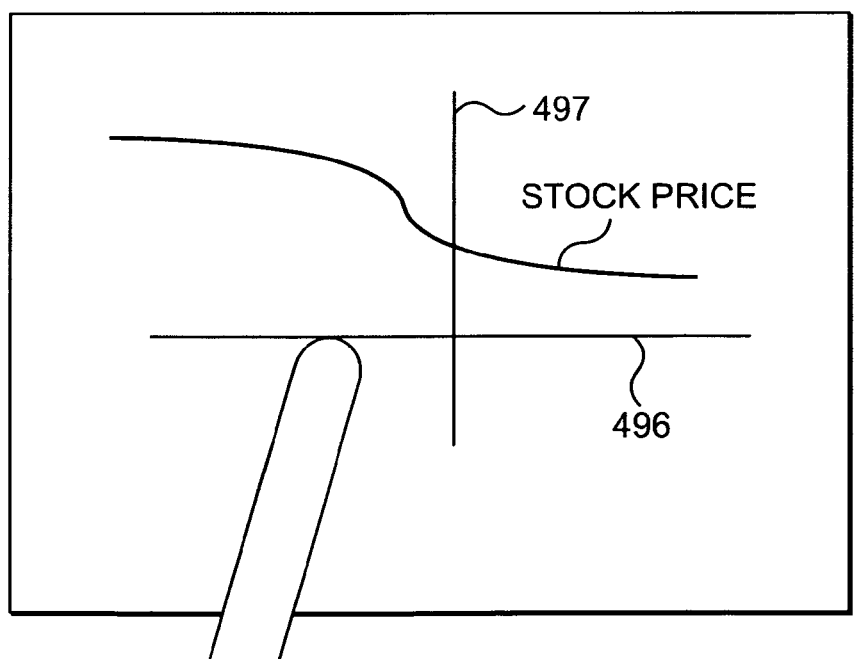

In FIG. 5*f*, a more sophisticated situation is illustrated wherein a plot of stock prices for the day has been displayed (in this case in the same region as the previous heat control, as a stock price selection has been made), and the driver with a quick glance can tactily slide his finger 495 along a horizontal tactile ridge or groove 496 to the point of the days trading (say 4 pm near the right of the chart) that he wants more information on. Such lines of action" can be vertical as well as horizontal, and more than one can be on a screen (e.g. 497 in the vertical direction). And as disclosed above, the line can be on a screen overlay which may be interchangeable, to accommodate different purposes. Today, such data is generally prohibited by law from being presented to the driver. But with the invention it may be possible to do this in a manner which can be safely accomplished.

While illustrated relative to stock prices, the graphical information however displayed could be fuel economy for the trip, or tire pressure or other things relevant to the vehicle operation too.

It is once again noted, that the switch or seek functions of FIG. 5 preferably can be sensed with the same machine vision system used to see knobs and other functions on the screen, or the finger position at other points on the screen, either free form on flat surfaces, or at positions with tactile relief features. And the finger can be on an overlay over the screen, which overlay can be more easily changed.

FIG. 6

It is noted that the relief details utilized do not necessarily have to be on the screen or even an overlay thereon, but can be on a separate moveable member. Illustrated are alternative tactile screen designs with removable or adjustable large finger resting details and multiple "switch" or other control location details. Further illustrated is optional replacement of air vents with display surfaces.

Consider screen 500 for use in the minivan embodiment of FIG. 1 above. this display screen/control surface is provided with what ever knobs, tactile guides, and other features the customer or manufacturer has selected (realizing that such screens and appropriate software can even be sold in the after market). But in addition, it is shown here with a guide 520, which can be separate from the screen (or an overlay thereon) and suspended above it, for example riding on rails 530 and 531. In this manner it can be located at any point such as "P" along the rail length (in this case in the height "h" direction of the screen) and locked in place for example with thumb screw or other suitable means. it can also if desired be slid off the rails and removed entirely.

The function of the guide is two fold. The first is to provide a simple rest for ones finger(s) at a convenient height on the screen. The second alternative application is to act itself as a guide, such as ridge 407 on the screen itself. In this case the actual location of the guide can be even determined by the camera system of the invention, using for example target datums such as 540 and 541 on the guide which can be viewed by the camera either thru the screen if the datums are in close proximity there to (as shown) or just beyond the edge of the screen, and within the camera field of view. Alternatively, one can, in a set up mode, touch the screen with ones finger while resting on the guide and the guide position P be determined by the camera sensing your finger. From that point on, until a new registration occurs, that guide position can be used to control the display and other functions accordingly, similar to fixed guides on the screen itself as described in FIG. 5.

Because of the design of a rear projection device, the air vents located at the top of the instrument panel can alternatively be in the screen and if desired be interchanged for the screen or a portion thereof. For example, one can vent air from the region behind the screen through slots such as 550 and 551 at the screen edges, or elsewhere on the screen. Or the region in which the vent located can be replaced with a screen portion not having a vent, if this is ok with the customer for climate control purposes. In other words, the customer can choose whether he wants lots of central air venting, or can live without such, in favour of more display screen space. To make this substitution, may require in certain cars a change in the programming of the climate control algorithms used. The projection and detection of light in providing function of the invention, does not get in the way of the air molecules which can be vented through the screen.

FIG. 7

Figure 7A:
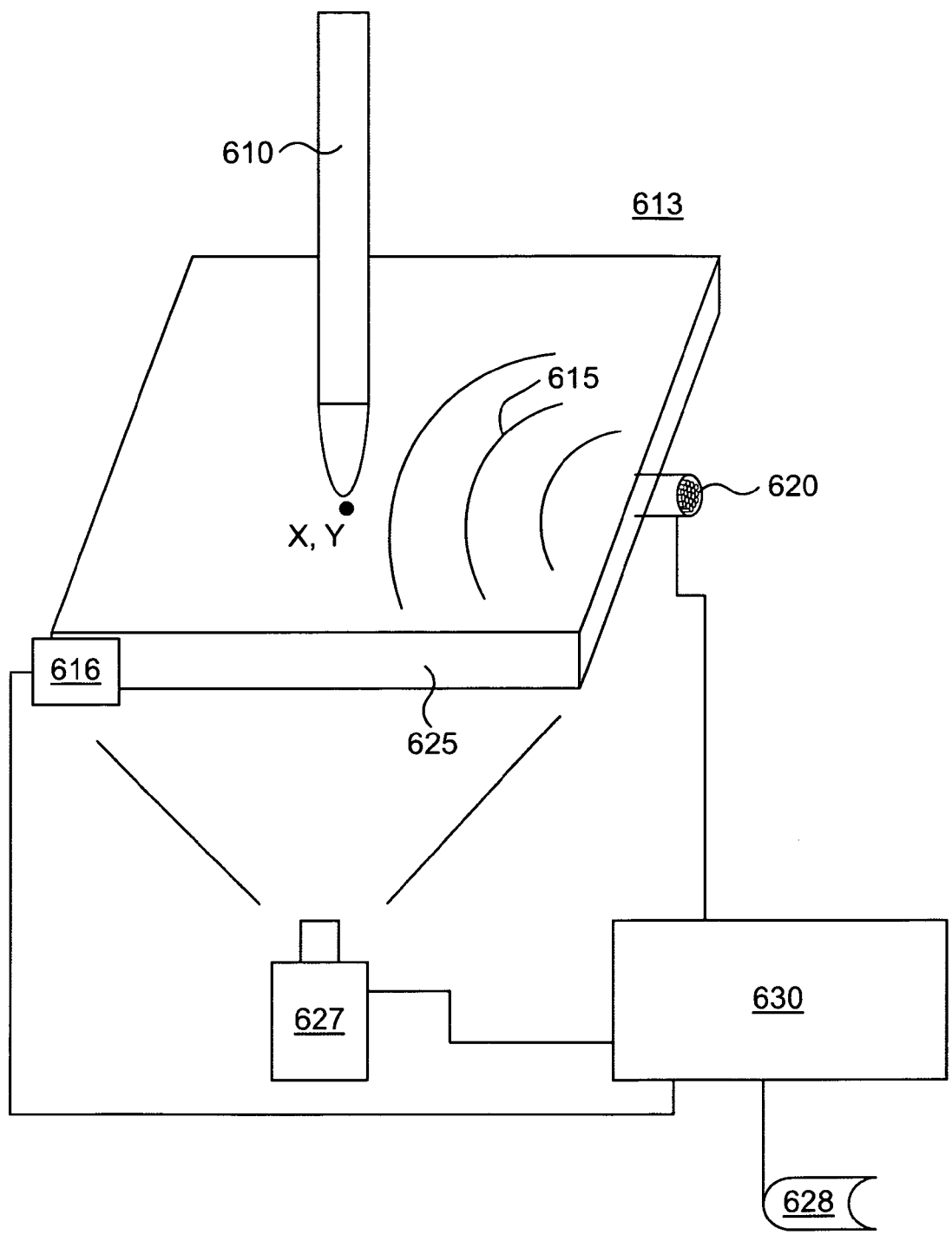
FIG. 7 illustrates acoustic or other mechanical wave generation capable of providing a programmable force based response to inputs, or control states. An optional sound based response can also or alternatively be provided, such as a loudspeaker sound.

FIG. 7*a* illustrates piezoelectric or other mechanical wave generation means such as a vibrator of the type used in pagers and able to pulse with varying pulse widths capable of providing a programmable tactile definition of a control state or response to operator inputs, or changes in control states. Typically such waves are in the acoustic frequency range operating in the range of 50 hz or more and are generated in the screen material or on the surface of same so they can be felt by the user touching the screen, an overlay in contact with the screen, or operating controls attached to the screen such as a knob. An optional sound based response can also or alternatively be provided, such as a loudspeaker generated "Click" sound.

The signal provided can be a function of position or change in position of a tactile adjustment or selection detail, e.g. via a knob or other such device. Or the force response can be in regard to location of a finger touch in response to virtual or other data on the screen. And the it may also provide a force type input to the operator of current or future states of various systems or settings, or to indicate that an event has occurred, including random events such as an alarm.

In the basic arrangement, as the driver's finger 610 touches the screen 613, the touch is sensed by suitable means, (generally by not necessarily optically based, such as camera and computer means as disclosed herein) at the location x, y in question, and an acoustic wave 615 is accordingly generated, for example by vibrator 616, or alternatively (or in addition) by transducer 620 exciting the screen material 625. The acoustic wave may be alternatively generated by piezo-electric transducers at the corners such as 340 etc. in FIG. 4*a*. The waves are generated as a result of comparing in computer 630 the touch location x-y on the screen (for example determined with camera 627) with the screen projection data file 628 used by the computer to drive the display projector (not shown) to determine what information the users touch has registered, if anything.

Information which should be communicated by a feeling sensation to the users finger 610, is then determined by software in the computer, and a suitable acoustic wave is generated and subsequently felt by finger 610 which then may or may not engender another response by the user, such as moving his finger to a new location such as P' on the screen/control surface.

Figure 7B:
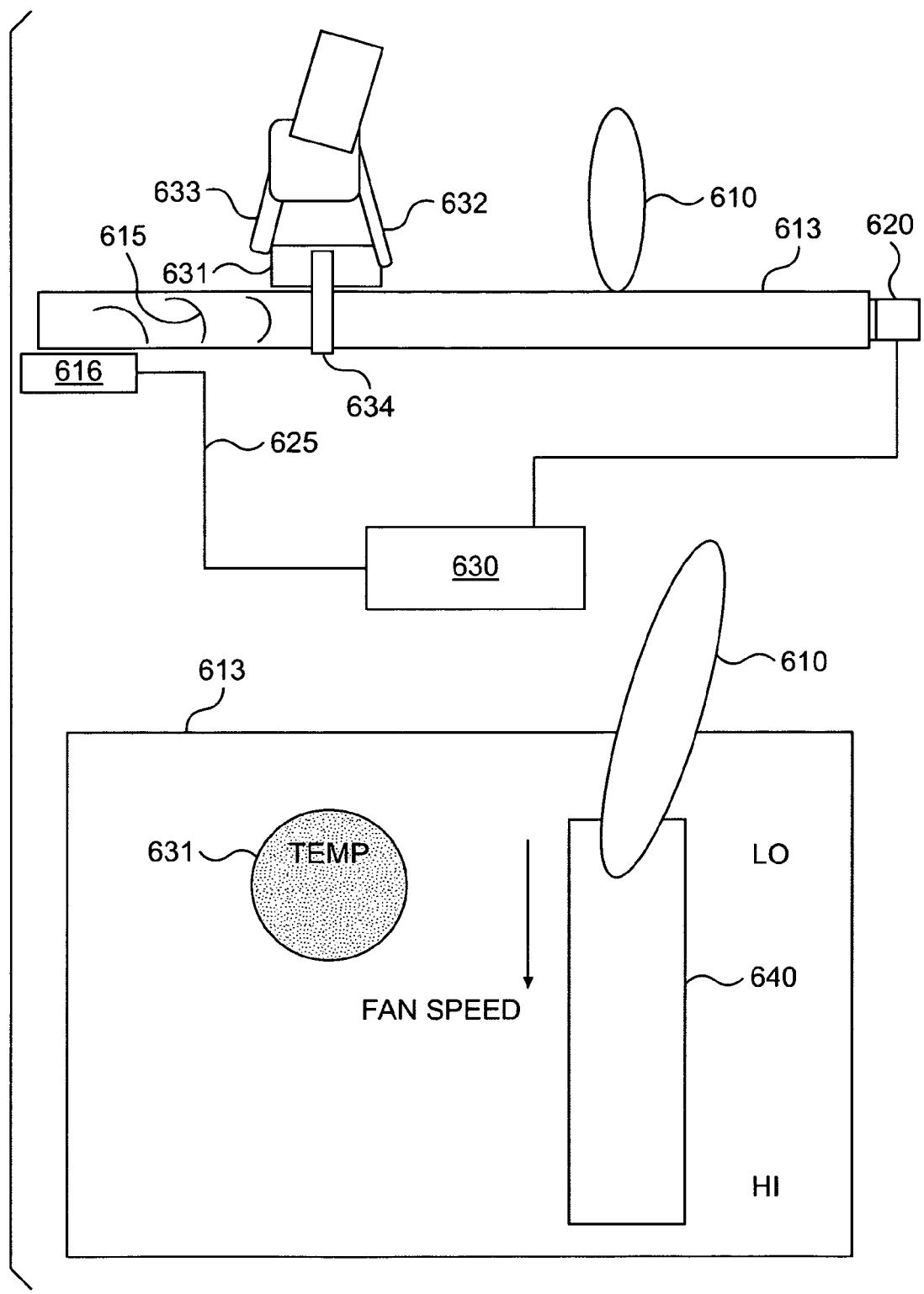

As shown in side view of FIG. 7*b* it should be noted that the acoustic wave can be generated in order to excite a detail connected to the screen, such as a knob, 631, secured by pin 634 to the screen/control surface 613, and the force felt by ones fingers, such as thumb 633 and forefinger 632, through that detail (e.g. while turning it), as opposed to a finger touch.

In another mode, the degree of touch can be used to control the amplitude or the frequency or another characteristic of the acoustic excitation to signal to the user something for example related to the force of touch. In other words as one presses in more, the degree of pressing is determined using for example the method of FIG. 4, and the signal fed back can be increased. This would typically be in conjunction with a suitable change in the projected image concerning this input as well.

Note that the signals driving the transducers exciting the screen (or tactile devices thereon such as knobs) can be alternated in nature to create different modes of excitation discernable by the user. For example as one grabs a selector knob and begins to turn it, the excitation can indicate what position of the selector was on. For example three pulse bursts 0.1 sec. each, could indicate the climate control setting. Two bursts alternatively, might signify the audio system.

As shown in the front view, a bar 640 is projected on the screen 613. The person moves his finger 610 along the bar, in this case from top to bottom (LO to HI), for example to increase the speed of a heater fan. As the movement takes place the piezo-electrically driven excitation pulse rate changes from a low of 100 hz, to a high of 300 hz. Thus by feeling the pulse frequency, and when, if desired, possibly glancing at the display, the driver can determine the approximate fan speed (words for which such as Low or Hi can also be displayed).

As noted the force generating transducer, in one example, can be located at one or more corners of the screen in order to excite the screen as a plate (and so excite any finger in contact with it or a knob, for example, secured to it). Or the transducer, such as 620 can generate shear or bulk waves in the screen in order to effect the function.

Figure 7C:
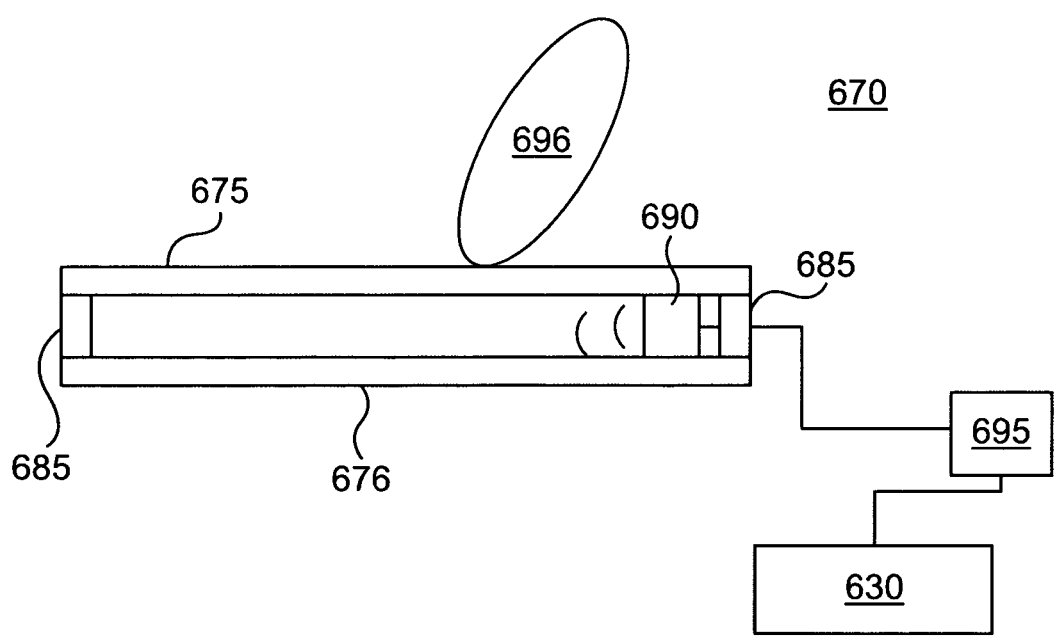

As shown if FIG. 7*c*, the screen can be alternatively composed of a laminate, for example 670 having thin plate members 675 and 676 and a liquid within 680 (sealed around the periphery by seal member 685 and excited by piezoelectric transducer 690 driven by high voltage supply 695 under control of the system control computer such as 630 to provide the desired affect in response to signals from the camera or other subsystem used to determine information entered such as by touching with finger 696 or knob turning or the like. Since the operator typically only touches one point at any one time, it is not generally necessary to selectively excite only a portion of the screen.

Illustratively, a force feedback signal to the users finger in which an acoustic wave in the screen signals to the users finger that an event has occurred It can be pulsed, or of constant frequency, or varying repetition rate or frequency, or of varying amplitude and is an alternative to providing the user a beep tone for example to indicate that an action has registered.

As an alternative to an acoustic source such as 125 physically connected to the screen to signal a "feel" of a variable and programmable nature to the user, a sound generator loudspeaker 130 shown in FIG. 2a can send waves 131 thru air against the whole screen 105 which can be sensed at the point touched. In both cases the feel is felt by only one hand, finger(s) of the user at any point on the screen, while the magnitude at different points varies due to the mechanics of the wave coupling and the manner in which the screen is constrained The frequency, pulse rate, or duration of acoustic information is however generally similar.

It should be noted that the force feedback can be prioritized for example, in one case it might be that the user didn't like the force feedback, and it could be turned off entirely. In this case the user could augment the visual presentation of data, using the conventional control details of the invention, together with relief based tactile cues, and if desired, voice to effect control functions.

Force feedback may be used as a primary feedback mechanism, for those so inclined. It is contemplated that for such persons, the adaptive feedback of much of the vehicular operational data could be programmed into the system and learned by the operator. Or the operator could chose his desired settings for each situation, and teach the system those. For example, for every touch of a knob or the screen some kind of desired and taught programmed force feedback would signal the user that the certain knob or point had been touched, and the state thereof. The user could activate the function as desired—for example indicative of his finger in the middle of the screen. He can then teach the system in this case (via keyboard entry using an optional plug-in keyboard, or otherwise) that 100 hz vibration of the screen is desired for this condition, in general. Or it might be that he would program this only when heat mode has been selected. There are many possible permutations.

Figure 11A:
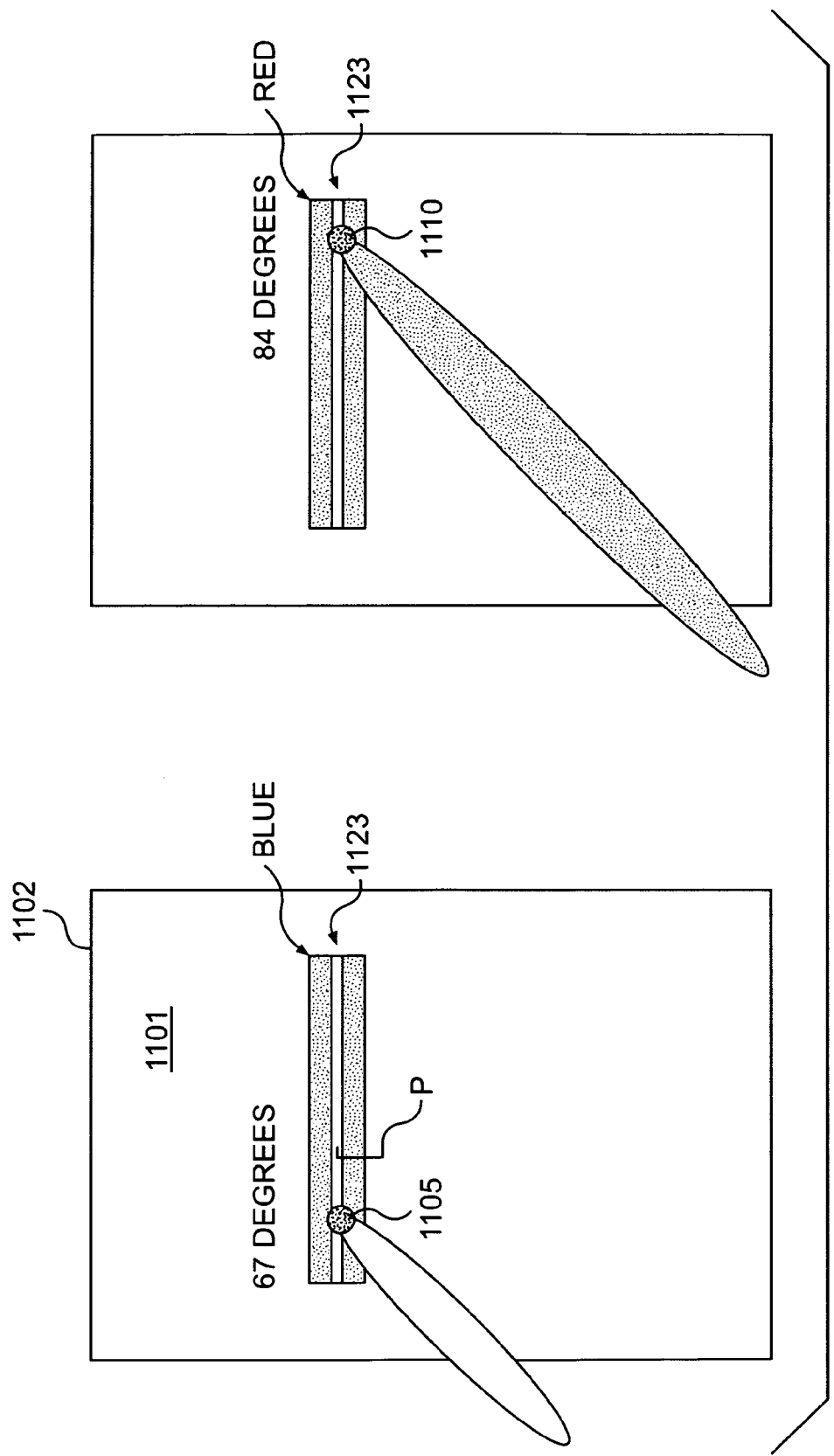
FIG. 11 illustrates a vector of touch aspect of the invention.

Note that the benefits of tactile relief guides for finger movement and the programmable force feedback just described, can in a sense be combined, which allows one to achieve a tactile guide even on a flat screen with no relief. Using programmable force generation of the invention, you can be guided to keep your finger in bounds within vertical limits in moving across the screen on a virtual displayed horizontal bar for example. In this case, in one mode, the computer is programmed such that when it senses your finger in the correct location vertically vibration amplitude is programmed to be maximized. That is, when you feel the screen vibrating maximally, you know you are on the projected bar (such as depicted in FIG. 11a). As you stray off it up or down however, the vibration amplitude is programmed to be rapidly reduced. And in one example, as you move across, the frequency (as opposed to amplitude) of vibration is programmed to change, for example increasing the temperature from low to high heat condition as you go from right to left. By providing both frequency and amplitude cues, one can navigate the control surface with minimum visual attention.

FIG. 8

FIG. 8 illustrates embodiments of the invention including interchangeable screens and overlays containing control surfaces, either full screen size so to speak, or partial.

It is once again noted, that the same machine vision or other electro-optical sensing system may be used to determine position or movements of multiple knobs and other tactile adjustment and selection details on the screen, or the drivers finger position at points on screens with flat surfaces, including those with tactile relief features.

The screen alternatively can be a plain flat (or even curved) screen, covered by an overlay member containing the tactile details and features desired. Such an overlay is typically transparent and can be more easily changed than the screen itself in many instances. When the overlay is used, its outer surface (facing the driver) is preferably diffuse, with little or no diffusive properties incorporated into the screen member in the region of the overlay.

In one example the complete screen surface such as area 155 in FIG. 2D can be interchanged to suit. In another example, perhaps only the region of the knobs would be changed. Or for example, a particular side region of the display could be overlaid with a replaceable overlay. In this case one might put the overlay in a region of the screen which had no relief detail of its own, putting any such detail or knobs on the overlay for example.

Other ideas for interchangeable screens and overlays will become apparent in the following discussion.

For example, one can have a rear projection based touch screen display and control surface, equipped with interchangeable screens or cover plates overlaying the screen of the type just described which have specialized physical devices for interaction with the sensing arrangement used. In this manner one can actually add, in an interchangeable manner, new screens or overlays thereon to your instrument panel which can be used for different purposes. This can enable one to do tasks by feel not otherwise possible, or to tailor the instrumentation to suit individual drivers, or to provide different functions to suit different travel regimes or business purposes. The overlays can have printing on them, data projected on them, of variant material and so forth.

Alternatively, one can optionally provide screens and control surfaces for completely different purposes all together, which may even be unrelated to the vehicle and its transportation function. For example, in a military context, the screen and its tactile details may be easily changed, (plus all software relating the projection and sensing associated therewith) in order to provide a fire control screen for an anti-aircraft gun mounted to a Humvee vehicle. When that function is not needed, a vehicle control screen is put back in place of the gun control screen. Some basic critical vehicle functions could be separately controllable.

In the case of a rear projection system, the screen can be easily replaced or interchanged with out damage to the optical system, especially if a protective window is provided to seal the optical system when the screen is removed. This glass window, which adds an additional optical element to the system, may be anti-reflection coated to minimize unwanted reflections.

Consider the case of a tactile display/control surface of the type disclosed in FIGS. 2-5 above using optically sensed selection and control details indicative of the position of various control items used. In this instance the control items are able to be interchanged. A group of levers could be on one screen, knobs on another, sliders on a third, and so forth. Or one screen could have markings on its face for email and stocks, with sliders and knobs to suit, etc. Alternatively such markings can be projected on the screen, but in some cases an opaque area of the screen might be desired for example, where permanent writing or pictographs or diagrams could be employed.

It is possible to have screens and control surfaces, where only a portion of the screen or overlay thereon is changed as will also be described.

The tactile control of the computer system used can in this manner, be customized not only by the user in general, but for specific purposes—what I call a "Mission specific" tactile and visual input and output. This makes it still safer by providing just the right tactile controls for the application at hand. Such an application could be a simplified screen and control surface for a non-technical user, who borrows the car. Or a screen related to a specific project, for use on a long trip. Generally it is not just the screen that is interchanged, but the software for generating and reading the display and its controls as well. The software may be permanently stored, or inputted by CD ROM or downloaded from external sources, to name a few possibilities. A mission specific screen or portion thereof is particularly interesting in military vehicles, where one might indeed set-up a particular Humvee or other tactical vehicle for a specific mission, with control layout and software to match. A knob on the screen of the control in this case might be specific to positions representing other team members vehicles, or air support, or whatever.

Figure 8A:
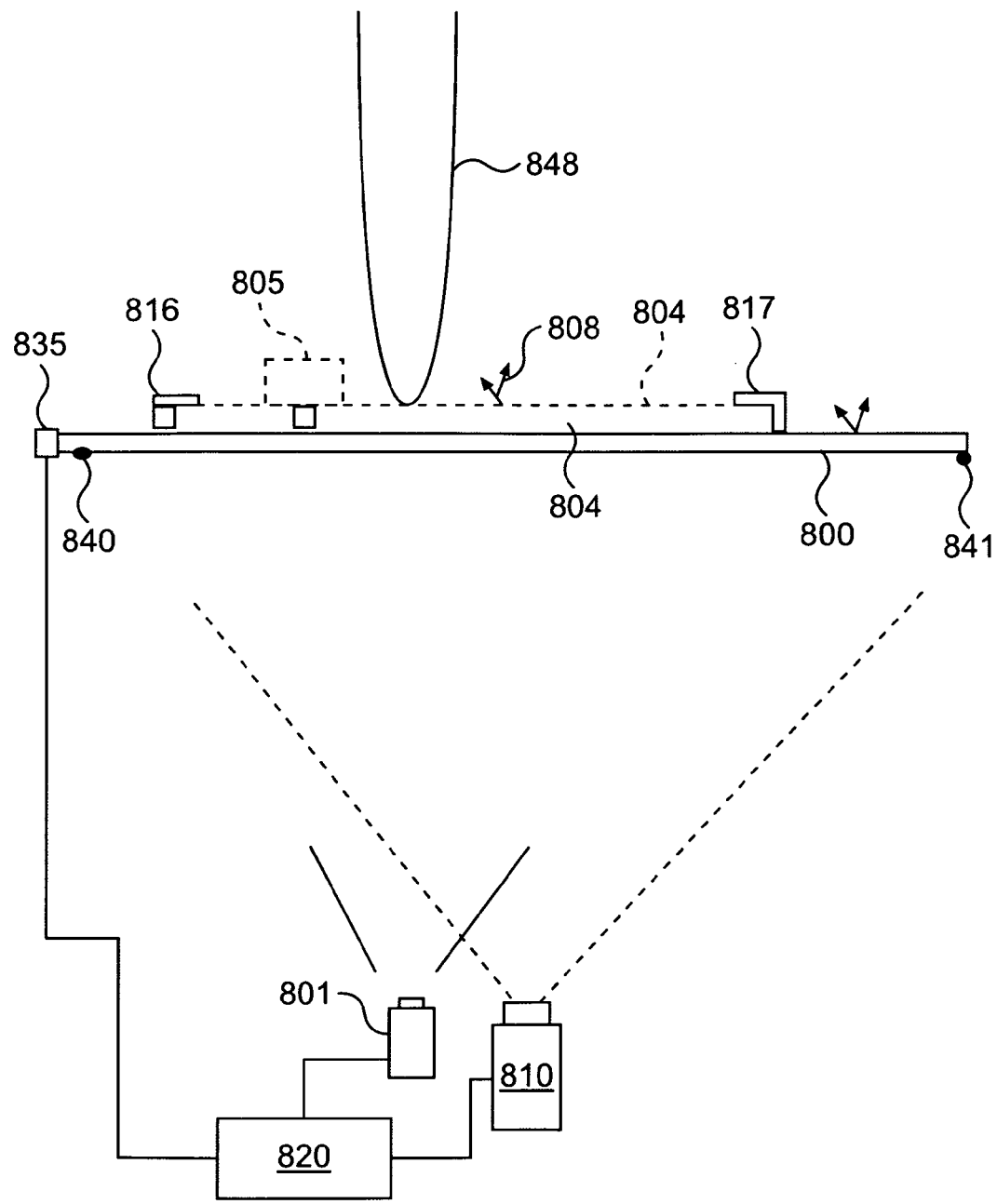
FIG. 8 illustrates embodiments of the invention including interchangeable screens and overlays.

To illustrate the case of an overlay, consider FIG. 8*a* which shows an optional removable (and interchangeable) tactile screen overlay member 804 (dotted lines), in this case a piece of plastic shaped like a 3×5 inch card, and containing a knob 805 (also dotted lines) as described above whose position can be determined (optically via camera such as 801, as disclosed above, or otherwise). This overlay is placed over a transparent screen base member 800. In this case, the region of 800 on which card overlays are to be provided is preferably not diffuse, such that the card itself can contain the scattering properties to scatter light such as 808 in order to diffuse the information projected by projector 810 to the driver. Alternatively, the screen base member 800 can be diffuse, and the overlay transparent.

This card member can be inserted to provide different tactile relief areas or to change the function of the tactile portions, or for example to include, as illustrated in this case, an additional knob as a tactile physical selection or adjustment means. In one preferred embodiment, the card member can be placed in slot between guides 816 and 817 (which could be dovetailed to assist). Data concerning the function of the knob in this particular case can be provided to computer 820 by any means desired, including downloads from the internet, magnetic or optically encoded data on the member 804 (which can in some cases be read by the camera 801 from behind, thru screen 800) or whatever. Note that the same camera 801 can be used to see other control functions at different screen locations as disclosed above, assuming sufficient resolution.

The card member 804 as well can have printing on it, and may be transparent in areas desired to allow data from the display behind it to indicate data relating to the knob 805 position or other variables. The use of data permanently printed on the card and visible to the driver might befit a mission specific or one time use card, for a particular project, or a particular drive to work. Note that the card could also correspond to just one function, like an internet music source selection card, that you could use just for this purpose, removing and storing it when you wanted to put another card in, to free up the display area for other information, or other one time use cards. Such cards have a very interesting use as single use, or mission specific controls for certain purposes, and provide additional freedom in choice of tactile physical selection and adjustment means.

It should be noted that an acoustic wave force source such as 835 providing programmable feel, can couple to this insert-able card member as well.

As has been noted, the screen can be diffuse, with the card transparent. Or in some cases the overlay card can have a diffuse surface, with the screen transparent in the region of the card. It is noted that data on the back of the card can be read by the camera used to see the knob or finger data, in order to identify the card, or otherwise input data to the system. In this case the degree of diffusion of the screen behind the card should be sufficiently small to allow accurate reading of the data through the screen.

This overlay can be of ridges, as just discussed for example in FIG. 5, or can actually include various real knobs and switches.

The interchanged portion, whether screen or overlay, can include marks such as 840 and 841 on screen 800 which can be seen by the camera 801 and identified in the camera field in order to align via alignment algorithms known in the art the location of the screen or overlay in the computer, to allow the displayed data to be corrected for slight errors in miss-positioning While it is desirable to have relatively precise location devices such as dovetails or dowel pins in order to minimize any alignment correction required, computer alignment correction can allow even Velcro to be used to attach a temporary overlay for example.

FIG. 8*b* illustrates another example in which a the whole screen and control surface is interchanged, for example to provide an alternative to that of 155 shown in FIG. 2*d*. In this case the interchanged control display 850 has different tactile touch points such as knob 851, groove 855, and ridges 860. By using virtual controls on this screen completely different arrangements of tactile relief touch locations can be provided. For example, one screen could be interchanges which had controls specifically for phone connections, in which a numeric key pad of indent buttons was provided, as well as let us say 3 rows of 5 positions containing ridges next to which persons names could be displayed, directory fashion. These could be felt by feel after a glance for example. Alternatively when not needed for phone communication, the screen could serve to display video images, and the control ridges and grooves serve purposes related to vehicle systems.

The software can instruct the driver rapidly what functions may be provided, and the driver learns quickly by feel and sight where the points of interest are for interaction with the control system of the vehicle.

FIG. 9

Figure 9A:
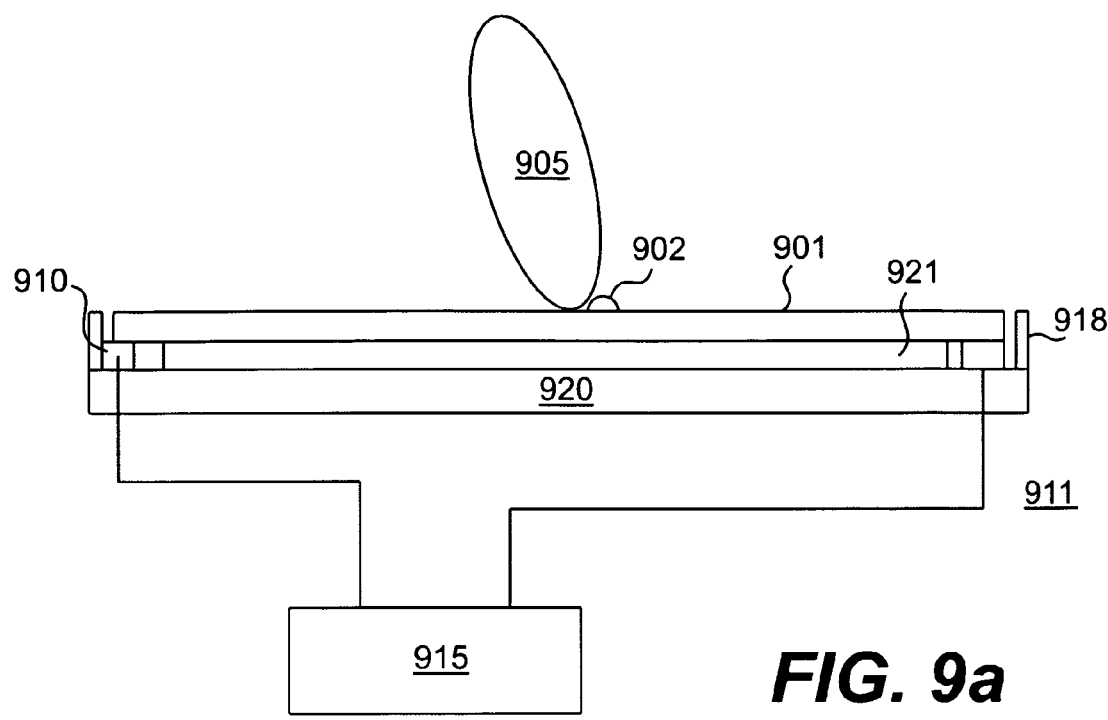
FIG. 9 illustrates a conventional LCD display based version of the invention equipped with an overlay containing tactile adjustment details of the invention and an optional touch screen.

The figures above have all-illustrated projection display based embodiments of the invention. In FIG. 9 a conventional LCD flat panel display based version is illustrated, equipped with an overlay containing tactile relief details of the invention and, utilizing conventional touch screen technology (which alternatively or optionally can be employed in the other embodiments as well). The relief details may alternatively be provided on the screen of the LCD display itself.

Consider in FIG. 9, an overlay member 901 having ridge or other small protrusion 902 on its surface, is supported by 4 piezo-electric based transducers at the corners such as 910 and 911, over LCD flat panel display 920 with screen outer member 921. The transducers allow the xy location of point of touch to be determined, by comparison of force signals using computer 915 (see for example, DeCosta et al U.S. Pat. No. 4,355,202 for an example of such an arrangement or Flowers et al., U.S. Pat. No. 4,918,262, for an example employing a somewhat analogous wheatstone bridge based strain sensing arrangement).

The use of transducers 910 and 911 (with similar transducers at the other corners) allows a degree of touch proportional to the force of touch to be determined by summing the transducer signals in computer 915 (equipped with suitable signal conditioning and data acquisition devices not shown), allowing a selection of a given state to be made by pressing in at varying degrees of effort on member 901, for example with finger 905. (called elsewhere herein a "Z Axis" input). This is particularly easy to achieve, and can be easily added to the basic rear projection systems above, also allowing easily interchanged screens. Such systems easily can sense a dynamic change, which occurs by pushing at what ever point one is at on the screen, either the push in of a knob, or the push of the screen with ones finger.

In addition one can sense not just a switching function (pushed/selected or not) but also sense the amount of push exerted by the driver or other user of the device. One such technique is to measure z force into the plane of the screen at the touched or gripped point, which then can be used give the desired input-what ever It was. One example would be if the particular input corresponded to a heat knob, whose push into the screen was interpreted to the blower speed desired.

In another example, a TV camera may be used to identify that the driver has touched a particular screen location (e.g. where an indent exists, and/or projected data exists), and it is desired not just to sense this state, but further and optionally to sense the push into the screen at that point.

In an optional case, the transducers just mentioned are also able to be excited (much as piezo electric sonar transducers can both send and receive) in which case they can be used to generate a programmable force signal to the users finger as well, in the manner of FIG. 7.

The ridge 902 (also noted in FIG. 5 and elsewhere), provides a tactile relation between the users finger and the overlay 901 and flat panel display 920 (which typically incorporates liquid crystal material, a pair of polarizers, suitable drive circuitry and an light source, all not shown for clarity for one such device). This allows the finger to easily find a set point or line of action on the screen without looking. Typically the slope or height of the relief detail used such as a ridge or an indentation is small, so as not to unduly disturb the light field of the screen. However, larger relief details can be used if desired.

Other relief configurations can be implemented too as has been illustrated in FIG. 5 using grooves/indents or ridges/bumps of various widths depths or spacings to convey information to the driver using them, either constantly or reconfigurably under program control (as to their meaning).

Alternatively the location of touch of a finger such as 905 shown resting against ridge 902, can be determined by any other suitable touch screen device member such as a SAW type touch screen, for example a Mass Multimedia/Elo brand, model M14-SAW In this case the touch screen would typically be incorporated into member 901.

Note the overlay as noted can be interchangeable with other overlays. In addition the fitment of a touch screen of other conventional technology is also possible, for example of the resistance or capacitive type. However, if member 921 does incorporate such then it may not be possible to use a solid overlay as shown (in which the finger does not itself touch the screen), but rather one which is slotted to allow the finger to come through the overlay and touch the screen. This is similar to overlays on keyboards, and is not as desirable. Not only does it feel funny if the overlay lifted off from the screen, but it restricts all use of the screen to the regions having the cutouts. Such a cutout overlay is shown in FIG. 9b.

Another difficulty with conventional touch screens is because one typically in the car instrument panel case at least would rest ones finger on the tactile ridge, indentation or other relief item. This would cause a permanent signal and to alleviate this problem, one can, using computer 915, take successive readings and look for changes in location (or even magnitude if such data is obtainable) of the finger touch, and when change occurs, then begin tracking the finger to its final position—which final position then constitutes the location desired. Alternatively, in some cases the path or other characteristic of the movement may be used to determine the data needed. This same approach can be used in the other embodiments too.

Piezo-electric transducers usefully can determine force changes, due to positional movements.

Figure 9B:
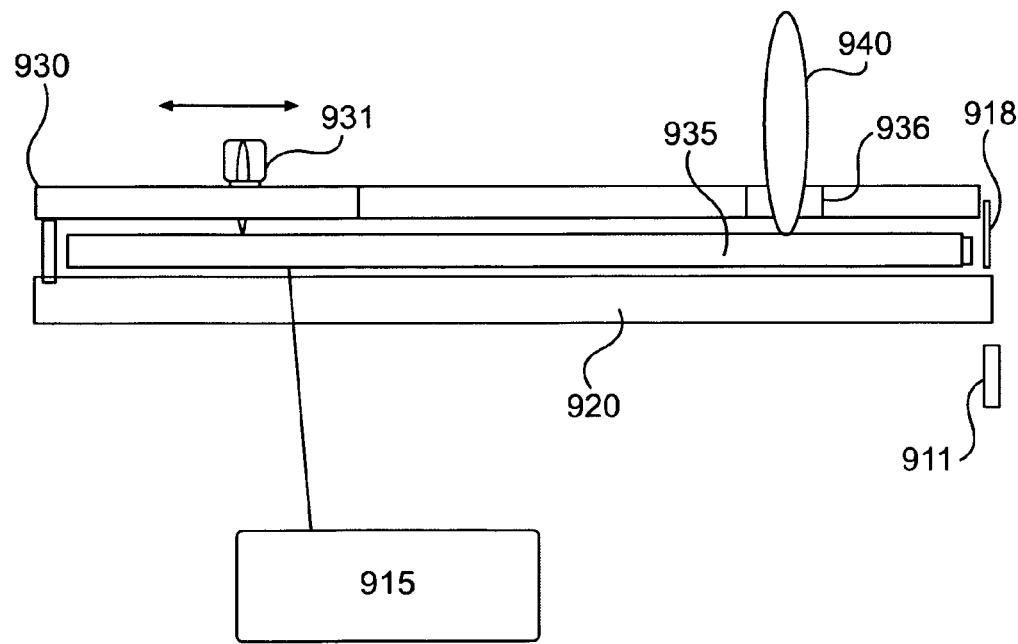

FIG. 9b shows a overlay 930 on conventional touch screen 935. A slot 936 is cut in the overlay, to allow the drivers finger 940 to contact the touch screen only in the slotted region, forming a linear path in this case, if the slot is linear.

FIG. 9b also shows also shows use of a conventional touch screen 935 with a sliding contactor 931. To avoid the problem just mentioned, in the case where the touch screen is like many conventional types that can sense only at one point, (rather than the type shown in U.S. Pat. No. 5,982,352 which can sense at multiple points and thus does not have this problem) the contactor is normally not in contact in a manner sufficient to register a touch signal. In this embodiment, where a conventional touch screen is used, the contact becomes so only when the slider of FIG. 9b or the knob of FIG. 9c is pushed in. This can occur while turned or slid as the case may be, the device can be turned and then pushed to register the touch just at the new position. The overlay itself may provide the elastic spring back to keep the contactor normally away from making sufficient contract. Or the knob or slider may be spring loaded to do so, for example with spring 990 (in FIG. 9c)

The knob or slider is always in the same place on the screen, so is known that that's what it is at that set of possible points on the touch screen (that is at those points it cant be a finger). The finger could be anywhere, though if the slotted overlay is used, that localizes the points as well.

FIG. 9c illustrates the case of a knob 980 mounted to overlay 981 via pin 986 connected to member 987 which serves to rotate in an arc out of the plane of the paper contactor 988 when the knob is rotated by the user. When the knob is pushed in against the urging of spring 990 in FIG. 9c the contactor contacts the touch screen (for example a resistive type, or the acoustic SAW type mentioned above, and a touch is registered in computer 915 indicative of the knob rotational position.

FIG. 10

FIG. 10 illustrates several embodiments improving safety of vehicle operation using real time data made possible by the big screen area which the invention enables—both to make it easier to see data, and to interact with it.

The invention comprehends that preferred embodiments will utilize a big screen and control surface. The available display area can be, and likely will be, much larger than conventional devices today which have at most a 7 inch diagonal. This is not because larger displays are not available, but rather that the instrument panel real estate today doesn't exist with conventional controls. Put another way, it is not just that the screen is bigger to facilitate many aspects of the invention, the screen can be bigger because of the invention. Thus large displays are made practical both because the real estate can be made available, and because the invention makes large sizes practical from a cost viewpoint.

In any given instrument panel space, there is for example approximately twice the screen size made possible because the controls can be on the screen, rather than adjacent thereto. This is for the same type of control, such as a switch or knob. In addition, considerably more space is freed up as many functions can be virtual (using touch properties which can if desired exist everywhere on the control and screen surface) and not require space to be shared at all with the display. Indeed, The invention comprehends displays of 4-10 times the area of present day Instrument Panel displays, such as for navigation systems for example, having 5 or 7 inch diagonal rectangular screens. In addition the screen (which is shared with the controls, and is thus a control surface itself) can go right to edge of the available instrument panel area due to rear projection and fact that controls are on screen and don't use surrounding area.

In addition, the screen/control surface can be odd shaped, to fit around the drivers right knee for example. And it can be curved or even indented in portions if needed largely due to the rear projection aspect. Again maximum utilization results. Room on the periphery may be for hard core control functions, or can be made decorative or personalized using the ability of the projection device to display images which arbitrarily may be entered (if so equipped).

In addition, lettering can be placed in the normally unused portion in middle of knobs since the lettering can stay fixed in the horizontal plane, even as the knob is rotated. And if not on the knob, the lettering can be ideally spaced around the knob. And important for space efficiency, the virtual physical touch characteristics allow a tactile screen which can also display images where the tactile indications are.

Much the same arguments apply to the controls, which can be bigger because they can in many cases be virtual, and take up no permanent room at all. In other cases they can be physically located on the screen, share space with lettering etc. And since data can be projected into the middle of knobs, the knob can be bigger on the outside, since large lettering may not be needed around the periphery.

Lettering is recommended in human driving ergonomic studies to be at least ¼ inch high if located in the center console area, but larger letters are desirable if people driving do not have corrected near vision, as is the case of many older drivers who use reading glasses. This is not easy to achieve or any significant amount of lettering if a display is small. For example, a 5 inch (approx) diagonal LCD display of the brand new 2003 Lincoln Navigator, is only 3×4 inch approx.

The lettering of the invention can be bigger as one might expect, because the screen is bigger. But that isn't all. The lettering can be made larger because the controls, being reconfigurable, allow the lettering for any given control function of the moment, to be maximized in size, and placed optimally, in location, and orientation for driver comprehension, even in different driving situations (discussed further below). The display again because it is reconfigurable, can allow for limited periods, the largest possible expanse of visual display space, as normal control functions such as speed or fuel or other relatively constant items can be replaced by urgent visually comprehended data. This can be either written (such as a critical road sign or incoming message), or visual such as a TV image of a dangerous situation (e.g. someone passing on the right in ones blind spot.).

As pointed out elsewhere in this disclosure, the invention is thought to provide, by a substantial margin, the largest size display economically possible in the instrument panel of a typical vehicle used by the motoring public. This large size of the display (and the controls) in turn makes possible some further aspects which I believe could not otherwise be safely undertaken. Some of these are for example:

bigger and easier to see printing and pictographs;

the ability to display two (or more) sets of data together (each one being readable);

the ability to provide video images in which the relevant detail can be easily and quickly discerned. On example is in video signage from road transmitters or on board TV cameras.

The big screen provides a mechanism by which one can safely and correctly designate displayed data items for further study or action. This includes, for example; intersections, other vehicles or objects, lane markers, occupants and all kinds of objects within and without the vehicle as well as information from computer memory based sources or download.

The screen provides a method to confirm the operation of onboard or external sensors in intelligent vehicle systems, or of the mechanical and electrical system of the vehicle.

Features 2-3 above in turn allow one to provide at low cost, usable and easily viewable videos or video stills to the vehicle from roadside TV camera sources, TV sources within other vehicles, or other sources of all kinds which can be stored or live. And this data because of its large size, can be reasonably and safely evaluated by the driver.

The ability of the invention to enable a much larger display and associated control surface enables many safety related possibilities, making the invention the logical stepping stone to the intelligent vehicles of tomorrow. For example, at the present time there is a great deal of work going on world wide relative to adaptive control of intelligent vehicles, in order to reduce traffic deaths and injuries. The human factors issue is as difficult as the automatic control. The invention is felt to provide a needed link, by making the large display and control surface possible, and in turn providing the means by which the operator of the vehicle can perform two main functions not now available in an easy visual way. (nor really even discussed in the various technical papers I have found). These are, for example;

1. To confirm data delivered by another source for action (or in action—i.e. a false alarm);

2. To designate, on the data presented, an region for action.

Figure 10A:
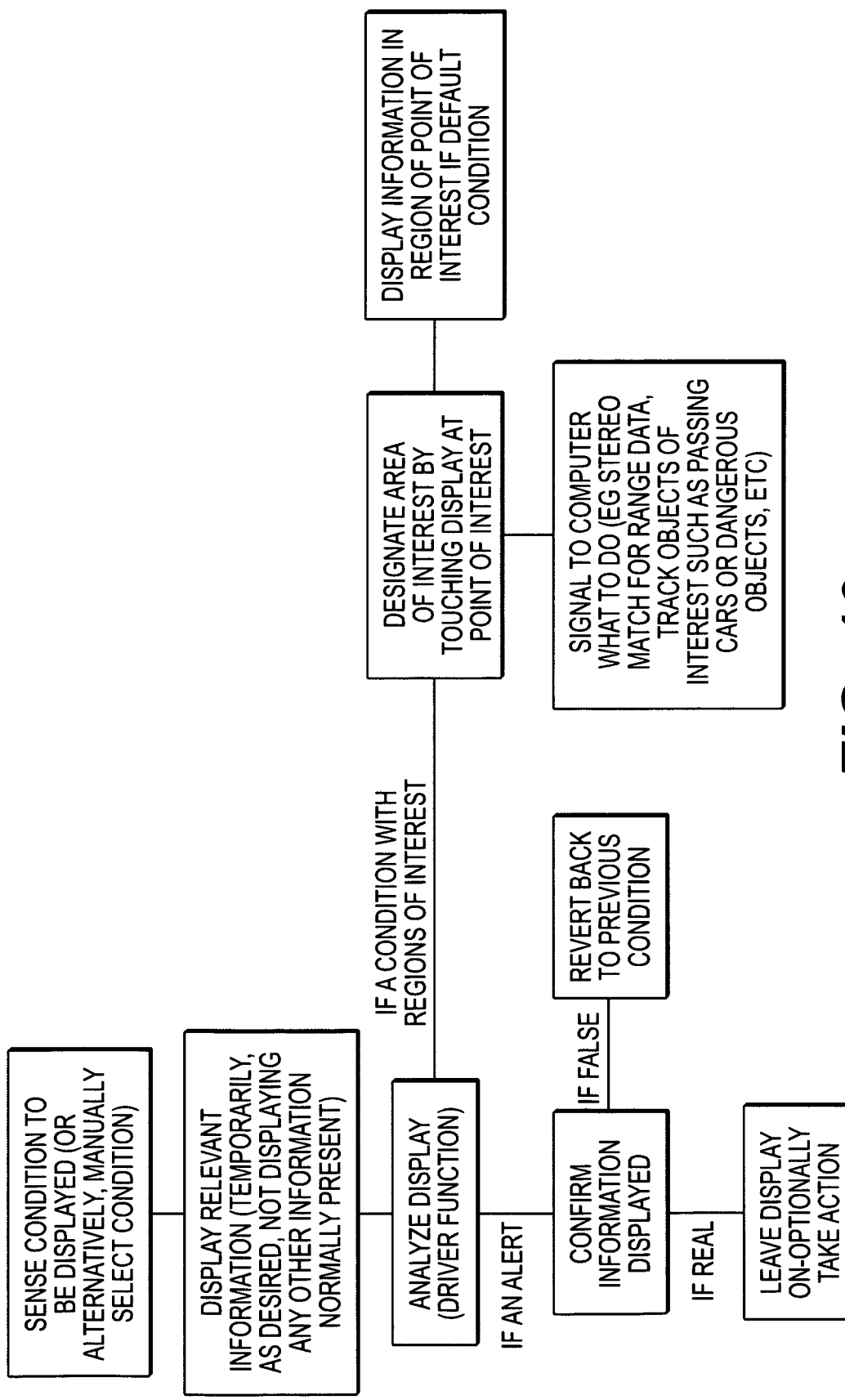
FIG. 10 illustrates several embodiments improving safety of vehicle operation using real time data made possible by the big screen area in which the invention enables—both to make it easier to see data, and to interact with it.

FIG. 10a is a block diagram of visual based control by the driver in the case of both alert type information and information to be designated, displayed on the screen of the invention, for example the large screen of FIG. 2d. This information can be the result of sensory data indicating a certain condition to be presented for action, or can be at the drivers choice.

For example, coming into any special place where added care is needed, sensors could trigger such a display. Clearly sensors onboard, such as malfunctions of the cars systems, or laser radar indications of road hazards or the like could provide such a trigger. Or stress indicators could also provide triggers, such as driver heart rate, or vocal utterings.

The invention with its big display can also provide a variety of information not other wise possible. One example is to feed raw video data to the screen, particularly video stills which would not be too distracting if rapid motion occurred. These can be from a variety of sources such as road signs (where the image can be magnified, to allow one to see farther ahead—a good use in general of a specialized TV camera. Machine vision can also be used to read the sign and enunciate it vocally, or translate it if in a foreign language.

The display can also provide video feeds from cameras at intersections, in parking garages and in other vehicles. All with the purpose of giving the driver visual information of interest, but without requiring sophisticated automated systems or special networks. Most of this data can be transmitted using simple wireless means, for at least 100 feet (such as the X-10 device sold for $79 over the internet today) and likely several times this.

I believe the invention has considerable utility with respect to intelligent systems and may make it unnecessary to perfect some fully automatic systems to realize intelligent system benefits. In addition, the invention may be legally desirable for manufacturers to keep the human in the loop, again speeding introduction of life saving technologies.

For example Nissan motor company has filed U.S. application Ser. No. 09/963,490 Road lane marker recognition by Furusho et al, and Ser. No. 09/951,499 Lane recognition apparatus for vehicle, Shirato et al, both of which utilize TV camera and machine vision technology to help guide a car such that it stays within lanes. The instant invention can aid such activity by allowing the driver to see clearly the image(s) being processed, and accept them by designating them as valid to execute for a control he wishes to automatically pursue. Or he can just have the machine vision system "beep" when he strays, and he can instantly consult the screen or his own direct view to see what the situation is.

The beauty of this is that it allows one to get systems on the road, without having the total of all known conditions sorted out. And, assuming sufficient video storage capacity in the computer used for image analysis, you could record images as well in certain vehicles, developing an enormous data bank, also in conjunction with the drivers own view of the situation.

This applies not just to lane markers, but the tracking of tree lines, ditches, shoulders and other roadside hazards that one does not want to veer into.

Its noted that one other function of the invention, as noted above, is to confirm an alert, for example the beep just mentioned indicating the automatic system has seen a dangerous condition. If one saw the image and it looked correct, then the automatic system could be making mistakes and you could turn it off. On the other hand, you could confirm that it was correct, and if you wanted, even set it to a higher state of control. Only with manual backup of this sort, can perhaps such systems be made reliable.

A big problem with automated systems is false alarms—this is mentioned over and over in various world conferences. The human will not use a system which false alarms more than a tiny fraction of the time.

But unless the automated system is totally perfect (unlikely in any first system), how then can it be eased into the motoring populace—which could save lives, time, and money? Such systems can be for automated cruise control, lane change, maneuvers, and the like.

Another issue re intelligent vehicles is range detection, and more generally, 3D vision. This can be accomplished with stereo camera pairs but this is difficult to automate in the field due to the widely variant backgrounds and lighting and its effect on the image pair matching problem The invention solves this problem to a point, by allowing the driver to designate what he wants to track or see—greatly simplifying the match, as the computer need only concentrate in a given zone of the image, which has generally already been shown to have features which the driver could identify at least.

Figure 10B:
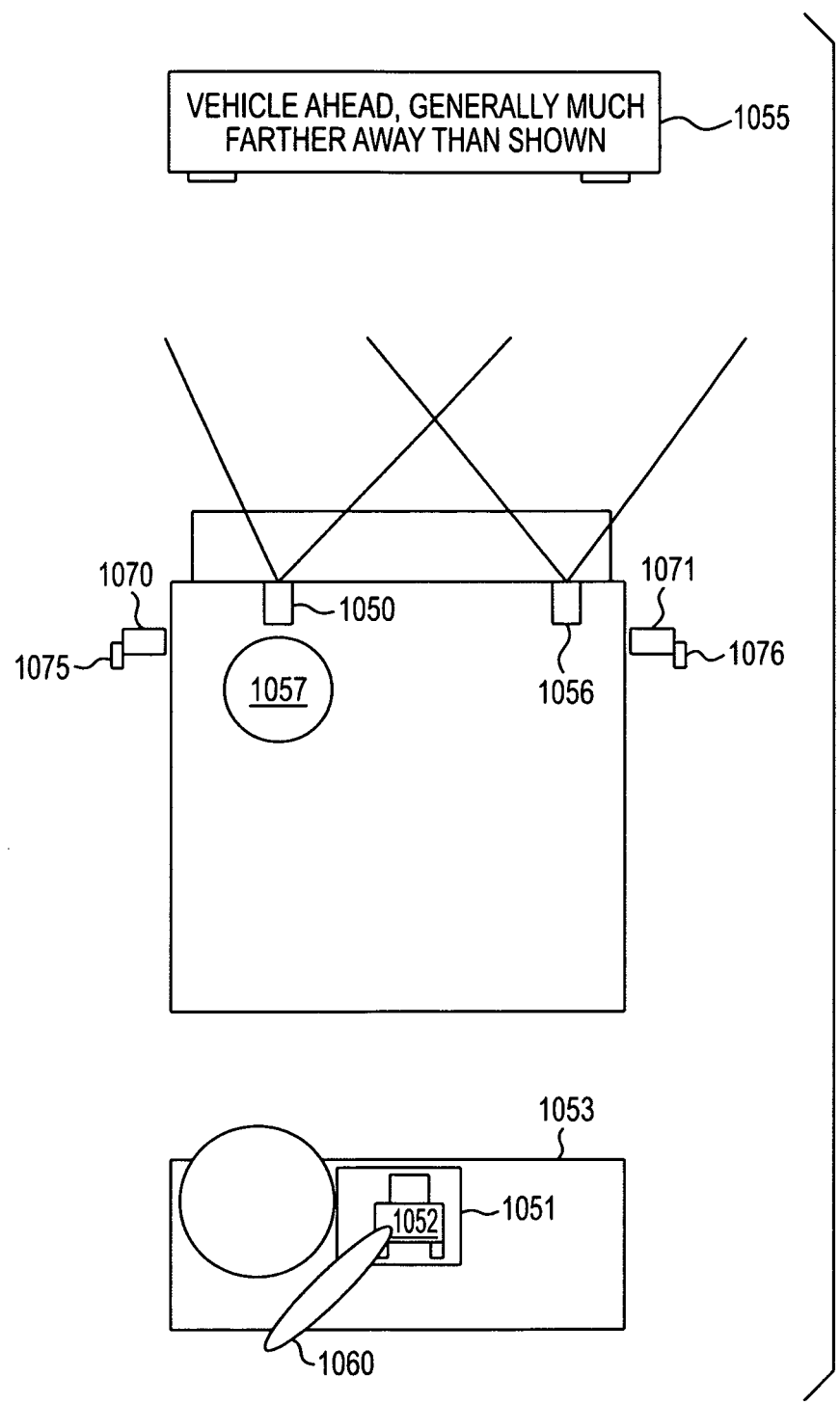

For example, FIG. 10*b* illustrates two cameras in the interior of the car in the upper part of the windshield pointing ahead. Camera 1050 is located in this example approximately above the driver so as to approximate his line of sight, and is the master camera whose transmitted TV image 1052 (of a car ahead in this case 1055) appears on the screen/control surface 1051 located on instrument panel 1053. The second camera of the stereo pair, 1056, is located on the right side of the windshield and is used to provide 3D information concerning what ever portion of the image 1052 is designated by the driver by touching screen of the invention 1051 with his finger 1060.

Alternatively in another instance the image on screen 1051 may be of a road sign, and the driver may designate it with his finger, in which case the sign is read at higher magnification for example, and, if desired, translated into English or another language more familiar to the driver using optical character recognition and translation software in computer 1065 connected to cameras 1050 and 1056. such translated data can be displayed in big letters or read verbally aloud by a text to speech program in the computer such as provided by IBM Via Voice. It should be noted that if there are not enough pixels in the camera image 1052 to allow higher magnification reading of the sign from afar, that such magnification can be done optically, for example using a separate camera and lens system. The image can also or alternatively be displayed directly on the RTD screen as is.

In another case a video camera can look sideways and acquire data from house numbers and store fronts along the route. The machine vision system can then identify them, and if a particular store name or house number has been inputted, it can say that the place in question was just about to be passed (or just was passed). The image can be displayed on the screen for confirmation, if desired.

Another example of video driving aids are the cameras 1070 and 1071 in rear view mirror housings 1075 and 1076 respectively. These serve to augment the normal rear view mirrors by providing a constant machine vision monitoring of blind spots and merging lane traffic along the sides of the vehicle. Other cameras may point ahead as well. However realizing that such systems are years into the future regarding their perfection in an automatic mode, the invention here seeks to use the machine vision capability primarily just to provide an alert, displaying the image where trouble is detected on the screen/control surface 1051 for example, where the driver can by touching the image (or a portion thereof) with his finger, or other means, designate to the computer system of the invention that he wishes to track this image and report possible dangerous conditions—realizing that the final judgement is left to the driver.

It should be noted that the human driver confirming data visually presented and designating certain data of interest, allows the human to judge the image quality being returned by the cameras and to decide whether he believes the data he receives will be satisfactory for the purposes at hand.

There are many other such examples of dynamic video aids to safe driving possible with the invention, with its big display screen and control surface. For example:

TV cameras in large trucks can show the road ahead, and this TV data be transmitted to cars behind whose vision is otherwise blocked;

At intersections such video data can also be transmitted from fixed cameras on stop lights or poles, which can notify oncoming drivers of stoplight condition or traffic in the intersection for example;

The screen can provide video data as to what is happening in ones pickup truck bed;

At sharp curves, video cameras can transmit to vehicles about to enter the curve the road conditions they will encounter;

Video data can be provided in or around a towed trailer. And the behaviour of towed items can be viewed as well if cameras are located to view same.

This can also allow better backing up, if a camera is on the back of the trailer to view the road behind.

At night, data can be provided from active infra red cameras (for example using the same cameras as just mentioned but with an auxiliary near IR source;

Camera data can be transmitted to the vehicle from inside parking garages, to show where spots exist.

The big screen of the invention allows you to look at something, when alerted (or otherwise) and confirm if something seen is legitimate by looking at screen and "seeing with your own eyes". Other examples where one would wish to confirm or reject an alert using TV data transmitted to the screen from inside or outside the vehicle, or view information are:

Baby in rear facing child seat crying;
Children in minivan third seat fighting, one screaming;
Display triggered by data from outside;
Video feed of a crossing;
Video feed from a vehicle ahead;
Camera data from a camera viewing roadside markers, house numbers or the like;
Stop light or other;
Video feed from sensor outside car—lane etc;
Kids running in front of cars;
Lanes passing etc;
Sensor signals such as suspect range data, radar etc;
Sensory alert from car sensor—image or info stored. note image could be a cartoon or other representation, rather than actual video;
Time of stress.—special screens activated
Rain snow darkness fog;
Traction charts and info;
Night or fog sensor and video;
Range data plus image;
Persons in vehicle—kids baby;
Medical emergency;
Vehicle malfunction emergency.

Finally the big screen is useful as well to display images taken with powerful near IR laser or LED sources and appropriately bandpass filtered cameras (to augment headlights for example). And it may be used to display synthetic imagery generated by sensors such as range gated infra-red, or millimeter wave radar, allowing one to see through fog for example. Longer wave IR obtained with pyroelectric TV cameras can also be displayed, as an alternative to a heads up display such as used by Cadillac today.

In addition there are many projects around the globe aimed at sensory equipped intelligent vehicles and highway systems. Representative patent applications are the aforementioned Nissan assigned Patents on TV camera and machine vision technology to help guide a car such that it stays within lanes. Some of this technology however is very difficult to perfect in a full automatic mode. I know of no reference which has addressed the issue of manual assist to such systems, provided in a large screen tactile control and display device of the type disclosed herein.

Furthermore, the large display largely in the drivers line of sight without appreciable head movement, also provides a method to validate and confirm data from intelligent subsystems inside and outside the vehicle, and further allows the driver to assist such systems by designating areas of interest for tracking, stereo matching range detection and other purposes.

The invention may operate using a powerful general purpose microcomputer such as an Intel Pentium 4, equipped with image processing software. Where general purpose processing is involved, at different points in time the processor can deal with different things. Not only can it serve, with its large display and touch screen as a computer and keyboard or other device when the vehicle is stopped for example, but the camera and sensory processing capability can be time shared with that required for the control and display of normal instrument panel functions, which at most times require very little processing power. video camera applications such as those above as well as other tasks can be economically automated in some measure as a result.

FIG. 11

FIG. 11 Illustrates virtual displays of controls with arbitrary start points on a touch screen of the invention or other touch screen capable of the required response to human inputs needed.

In one embodiment the computer instructs the display projector to cause the origin of reference of a displayed object to "jump" to the point touched which first point becomes a reference for further action.

For example in FIG. 11a. consider the projection of a thermal bar 1101 on screen 1102 When the person touches the bar at any point on the bar, the indicator point 1105 along the bar corresponding to the instant temperature is projected at the point of touch. As shown the starting point is at 67 degrees, the current cabin temperature. If the person had first touched the screen at point 'P', that point would have represented 67 degrees and the bar calibration would have been re-sized accordingly. As the person moves his finger from side to side from this point, the indicator 1105, moves accordingly to indicate the new (84 degrees) setting desired—for example to point 1110 with a rightward finger movement in the hotter direction. A groove such as 1123 can provide a convenient line of action to move along as well.

In other words the display is commanded to commence from its present state, at the point you touch. Whatever point you first touch (in a manner indicative of a selection, such as a time dwell of your finger at the point, or a push in of the screen, if Z axis sensing is provided), becomes the origin for subsequent movement of the displayed bar, knob or the like. This point can be one with an indent or other relief feature which your finger finds by feel, or it can be on a plane surface of the screen, where you push anywhere, having first commanded that "heat" is variable at issue. One way to command the variable is to touch with the finger a big displayed heat icon on the screen. Or to say the word "heat" to a voice recognition system, or other methods described herein.

When used in a car, a driver can just glance over at the screen, touch the screen at a first point desired, which then signals the computer to provide a display on the screen, of a rotary knob, slider or whatever. The display is preferably oriented so that the starting point or frame of reference of its movement is established at the point of finger touch. Alternatively, one can touch the screen at a first point, and then indicate by pushing in on the display or other means that the last point the finger reached before pushing in is to be considered the first point of reference in this context.

Such a display is preferably big so that one can easily see the initial position of the virtual knob or slider displayed. It can be big, as it is virtual, and when not used, occupies no space on the screen.

Figure 11B:
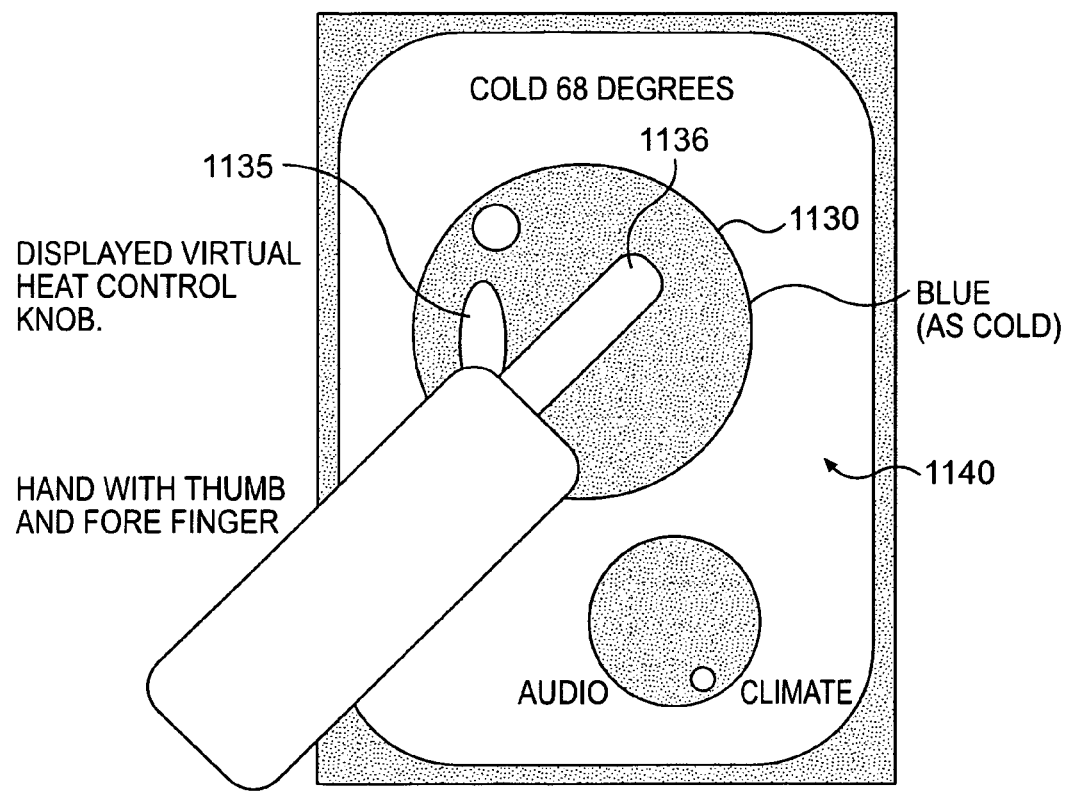

In the case of a knob, you then can turn it with ones fingers using a touch screen which has a twist motion response. (by monitoring the position of two fingers at sequential locations in a rotary manner As illustrated in FIG. 11b, as knob 1130 is twisted in this virtual manner using thumb 1135 and forefinger 1136, a movement of the knob dial with twist may be displayed on screen 140, along with possibly other changes on the screen such as colors to indicate new heat conditions. Numeric temperature data can also, or alternatively, be displayed as well.

A screen there fore could then provide the ability to at various times display and actuate touch like dials, knobs, etc on the screen, and still have them be conveniently the size of a human hand and fingers and larger. One can display data to a driver just tries to hit anywhere in the area and receives an indication back like clicks from acoustic pulse or other indicator to his finger.

This virtual approach can be followed not only by conventional knobs and the like, but also by more complex items, such as displayed seat icons shaped like seat portions (such as typically found in physical form in Oldsmobile Aurora and Mercedes vehicles). These icons can be pushed in any number of different directions, not just x and y related.

Position and orientation of the image can thus be in proportion to the absolute value of a control variable known—which modifies what the image looks like as it jumps to a logical position at the point of touch.

By having a display and associated control function which moves around the point of an arbitrary touch, this embodiment requires much less visual concentration than conventional touch screens requiring the touch to track a predetermined fixed display.

FIG. 12

FIG. 12 Illustrates the use of touch vector inputs on a touch screen of the invention, usable with either rear projection or other displays such as flat panel displays.

Figure 12A:
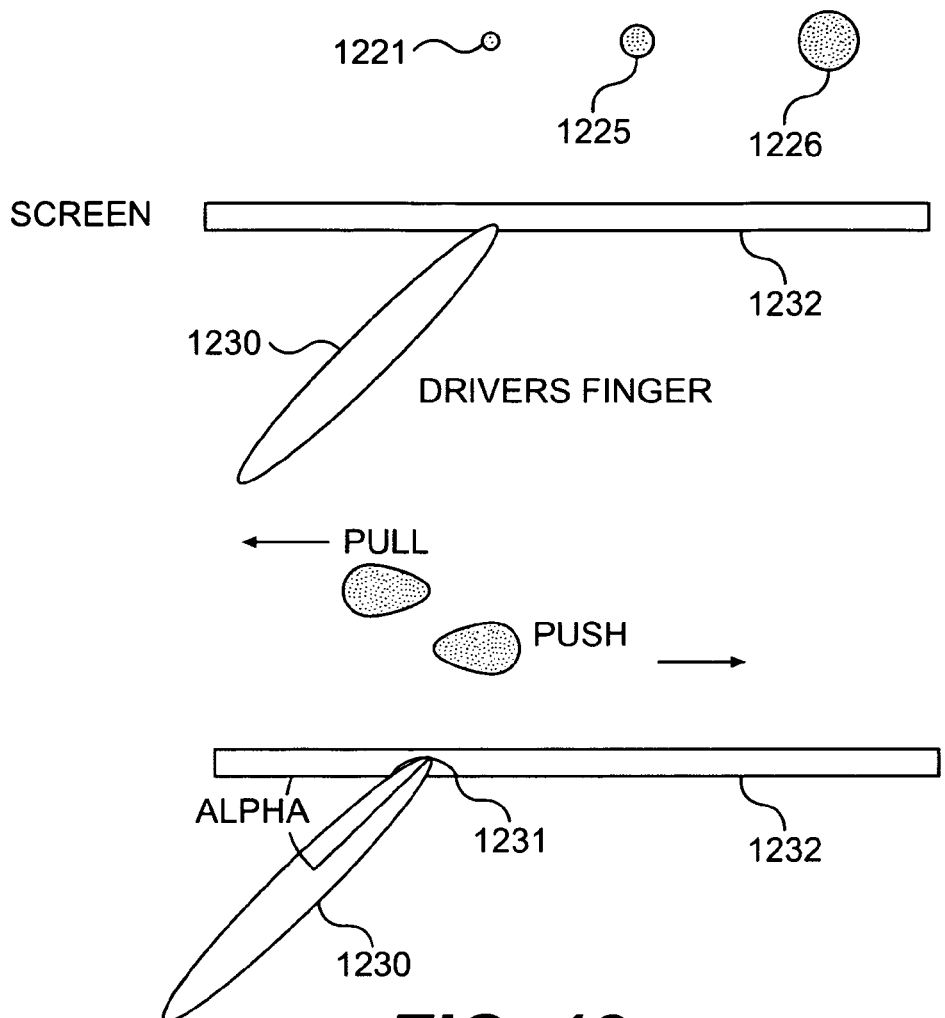
FIG. 12 Illustrates virtual displays with arbitrary start points on a touch screen of the invention or other touch screen.

As shown in FIG. 12a it is also possible in a similar manner to that described in FIGS. 4 and 5 above to determine a vector of touch from the shape of the image of the finger in contact with the surface of the screen. Consider for example that image 1225 of the finger contact region on the screen 1232, is made by the driver of the vehicle touching the screen in his normal way. However, the image 1226 is that obtained when he "pushes" the screen at the point of touch in the direction away from the driver (to the right, in North America). Image 1227 on the other hand is that when he "pulls" toward himself. This pull in this case, may mean less than the usual force, not easy to register, and in some cases difficult to tell from the "normal" case.

Such "push and pull" is however, aided by having a relief detail on the screen (or overlay) such as a groove or ridge. Consider finger 1230 exerting push or pull sideways (right-left) force on groove type indentation 1231 in screen 1232. Because of the approach angle ALPHA to the screen, and the groove shape, the finger will not appear the same in its TV camera image for each condition—normal, push and pull. These characteristics can again be taught to the camera—computer system. Typically the finger zone becomes oblique and weighted in the direction of touch one wishes to indicate.

Figure 12B:
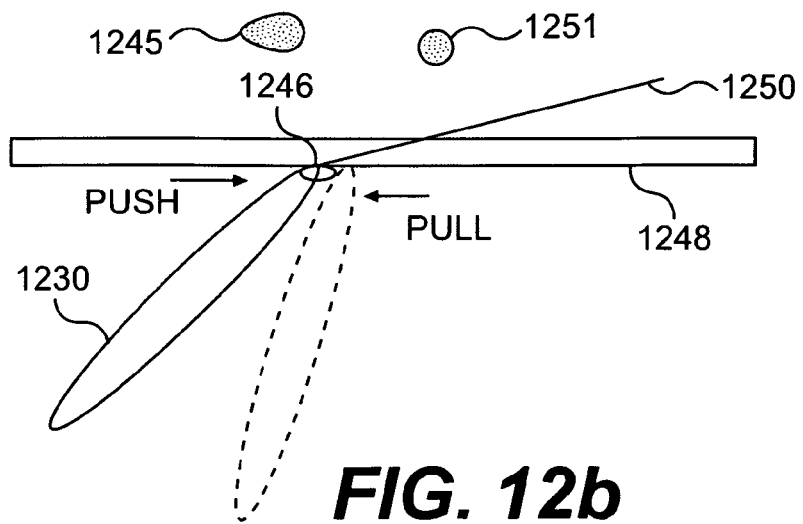

As another more pronounced example, shown in FIG. 12b consider image 1245 of finger tip 1246 pushing on the protruding relief ridge 1250, (as well as the screen 1248) versus image 1251 representing pulling from the other side of the ridge. The two image conditions are much different and easy to learn and detect, due to the presence of the finger on one side or another, and the blocking of the finger by the ridge which takes place.

A finger vector of touch can be used for control purposes. And the screen display moves around a substantially fixed initial touch point controlled by a users vector of touch (rather than move to different points on a fixed display to correspond to where the touched point is moved by the person touching). This aspect is radically different than any known touch screen operation I am aware of, and is achieved herein by having a display responsive to the vector of touch, which allows an urging of the touched point in a chosen direction to command the display on the screen.

Figure 12C:
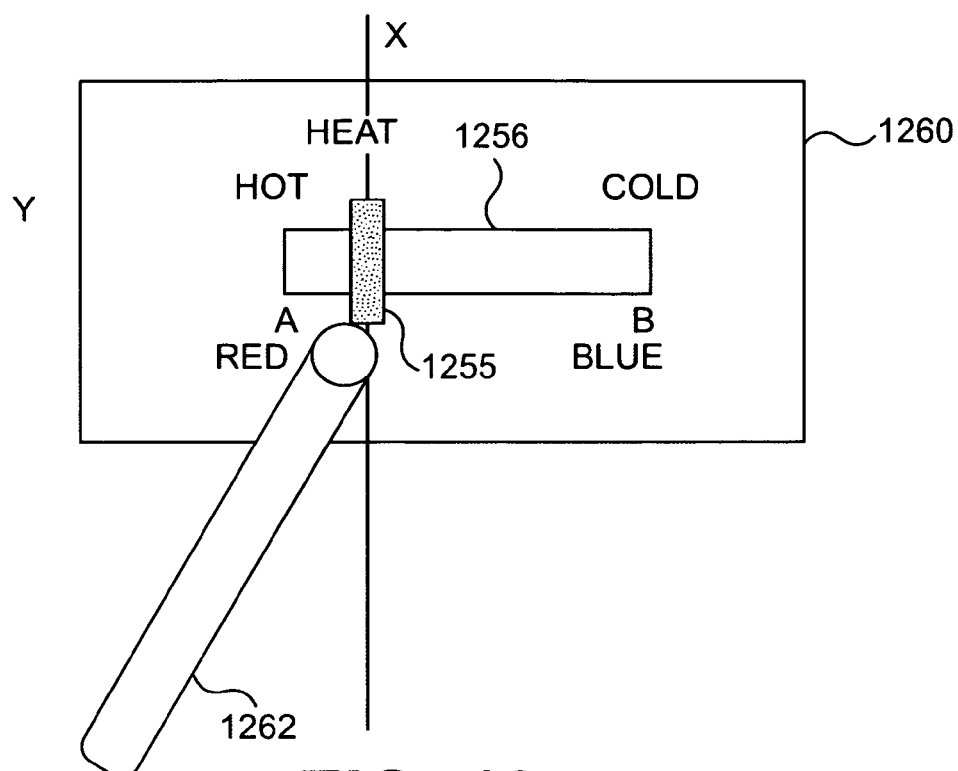
Figure 12D:
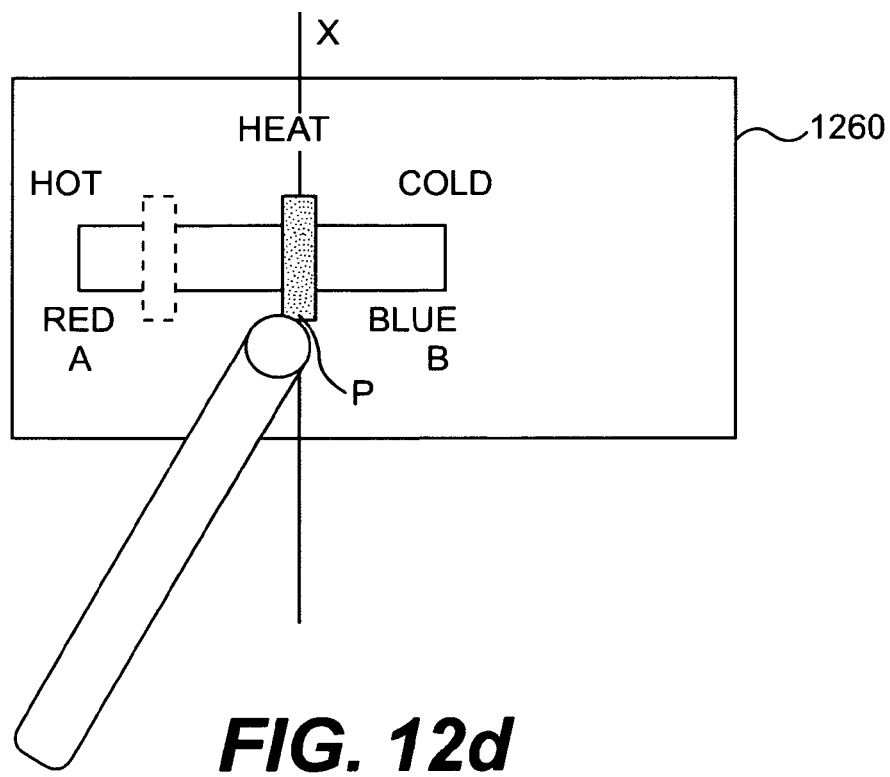
Figure 12E:
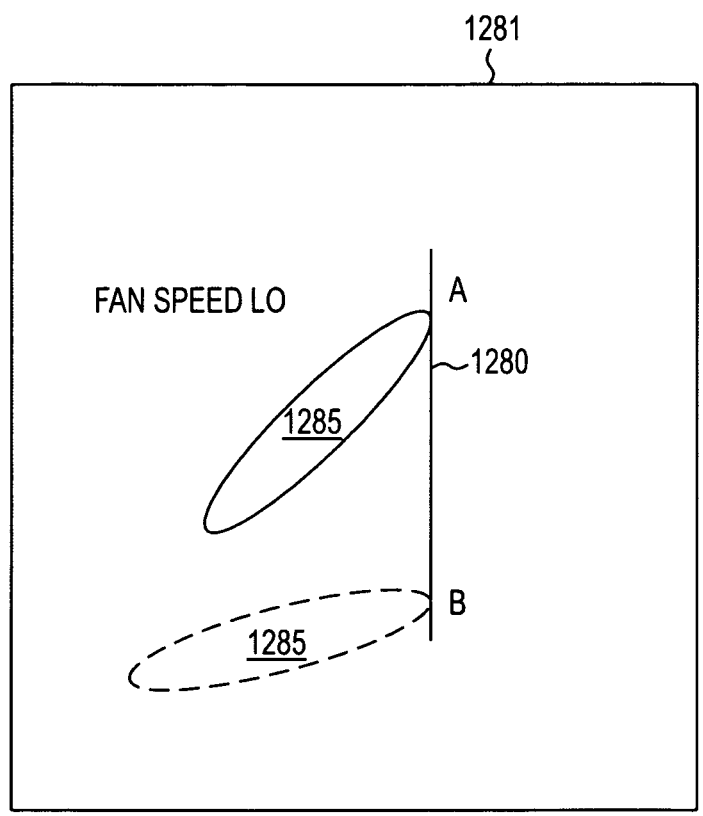

For example consider FIG. 12c where a screen 1260 is touched at point "P" by finger 1262. The display is controlled to put a virtually displayed slider 1255 right on the finger point P indicative of its position along a sliding control path (bar 1256). At a future time, the display looks like that of FIG. 12d after pushing with ones finger a given amount of time, which is related to a positive (push) or negative (pull) increment in variable value, in this case "HEAT". Note that the finger is in the same x-y location on the screen, but the display has moved, and is now indicative of an increase in the position along the path, and a corresponding increase in a variable, in this case heater blower speed. The previous position of the heater control slider is shown in dotted lines.

It should be noted that by pushing harder in one vector direction or another (and causing a corresponding change in the finger signature detected), the display (and its corresponding function controlled) can be caused to move more rapidly to a desired new state. Thus both direction and rate are controllable in this manner.

Note that the piezoelectric transducer based force or strain sensing system of FIG. 7 or 9, by comparison of the transducer signals, can alternatively or in addition be used to determine the push or pull on the screen in a particular sideways direction, since the sidewalls of the ridge or groove allow a force to be exerted in that direction. This would for example be useful in determining the touch vector of finger 905 on ridge 902 in FIG. 9.

Note that because of the angulation of the drivers finger to the screen, the most sideways push or pull generally exists on the screen when the ridge or groove is in the vertical direction. Horizontal relief details can be used, but are much easier to push down than up.

A completely different screen/control surface can be overlaid in the region such as 195 on the screen as noted previously in FIG. 2f.

It should be noted that the vector touch can provide data in more than one plane. For example, consider FIG. 12e which shows a ridge 1280 on a screen 1281 in top view. For a finger 1285 in position "A" the function when the finger urges the ridge (right or left as described above) could be heater fan speed. Whereas, at position "B" the function could be for example heater temperature. The feel of position A and B (and any other positions along the ridge) can be delineated by variations in shape, or other means as discussed herein. Alternatively or in addition, programmable wave generators can be used for this purpose.

Other arrangements can be done for all the other functions desired as well.

It should be noted that the line of action provided by a ridge or groove allows easy operation of virtually projected data in bar or column form. In addition, if the control function (e.g. heat) can be selected by just touching that bar, there is no separate motion needed. On the other hand, if there is a selection button or knob, that can be used to select, in which case the bar does not have to be present until selected.

It should be noted that in both FIGS. 11 and 12 it may be desirable to have an indent or some other relief feature in the screen for ones finger to locate in. This can be handy when driving if it is desirable that the display of data and other information be in the same place on the screen.

It is also noted that the screen may on its outer touching surface, be coated with a material whose optical properties change when touched, with the detection of said change indicating a touch in the location in question. One example are those materials which change color due to heat. Such material on a screen at 70 degrees F., when touched by a human at 98 degrees, can change color reasonably fast, such that the camera of the invention (assuming it is a color camera) can detect it.

FIG. 13

There are several types of displays which can be used by the invention, including flat panel displays such as LCD, Plasma, etc. However, it is felt that rear projection types make the simplest way to provide both the tactile benefits and visual advantages in a cost effective manner. They allow the biggest size, in curved or irregular shapes to suit best the instrument panel space available and the aesthetics desire, and providing an elegant and stylistic solution, without a lot of special tooling costs.

An example of present art in rear projection (albeit, using three CRT's rather than LCD or DMD chip based projection) is U.S. Pat. No. 6,185,038 by Yamaguchi et al, entitled "Rear projection screen with light diffusing sheet and projector using same", assigned to Matsushita corp.

Figure 13A:
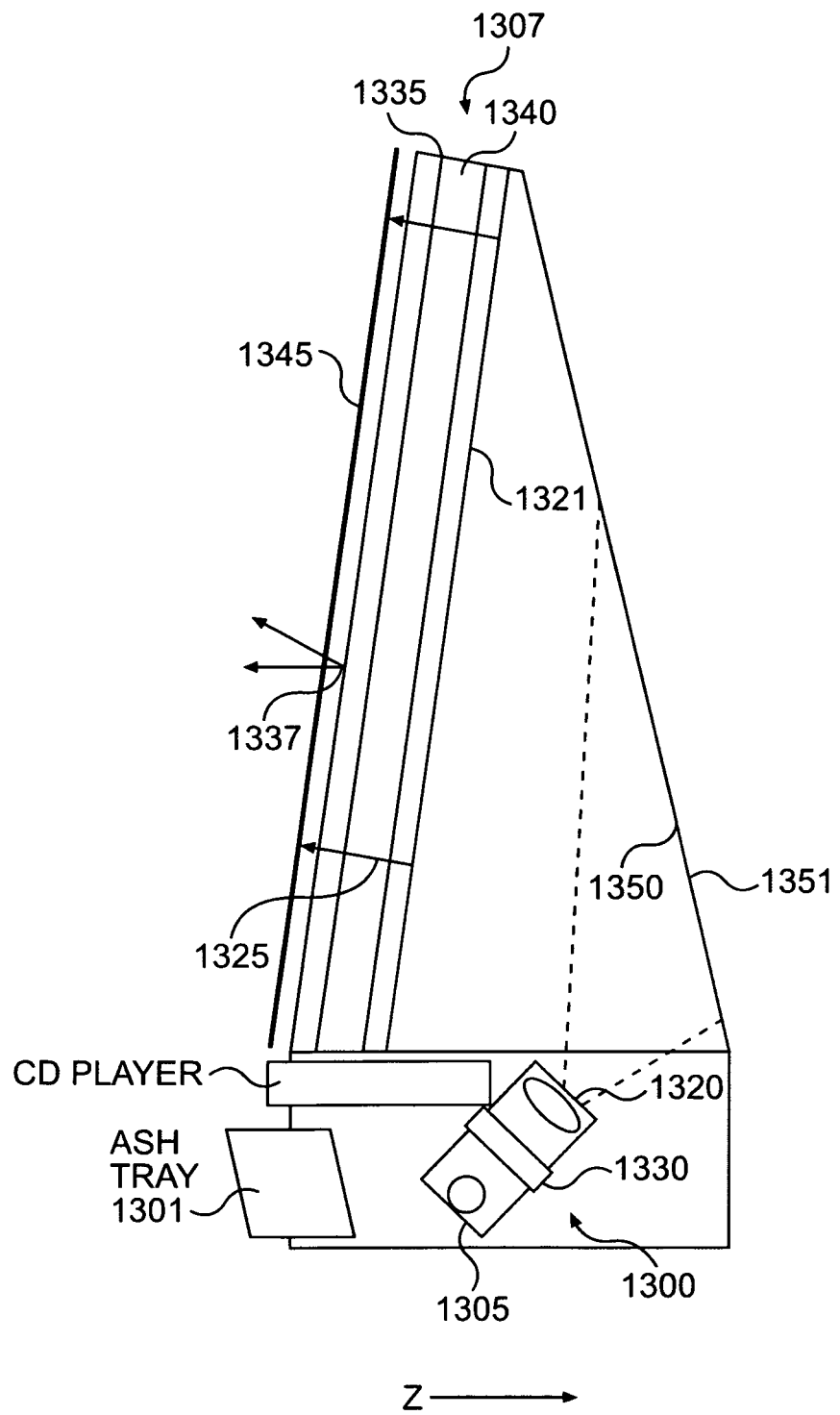
FIG. 13 illustrates rear projection display embodiments of the invention.

A typical rear projection display layout of the invention is shown in more detail in FIG. 13. In this one example (of many potential layouts) the projector unit 1300 is just behind the ashtray 1301 with its bulb 1305 accessible easily by removing the ashtray. The screen assembly 1307 generally comprises 1-3 components. The first of these, closest to the projection lens 1320, is an optional collimating lens 1321 in the form of a flat Fresnel lens 1324 that collects the expanding projection light from the projection lens and provides a uniform brightness of modulated collimated light 1325 (modulated by the liquid crystal or DMD module 1330) across the area of the screen. An outer element 1335 of the screen assembly is formed by a rear projection screen which may be formed of any suitable type of rear projection screen material. For example, the screen may be formed of a sheet of glass or transparent acrylic having embedded therein or coated on a surface thereof a plurality of diffusing particles, such as glass beads or micro-spheres, as is well known in the art. The function of the screen is to effectively diffuse the incoming image so as to enable viewing of the image from different viewing angles. Alternatively the screen surface can be roughened in order to scatter light (e.g. like a ground glass) such as region 1337.

A third element of the screen which may be on the outside, or inside as shown 1340, is a lenticular lens array or a holographic grating capable of preferentially directing light in a certain direction, typically horizontally. This is optional in the automobile case, and desirable is a holographic grating 1345 with the property of directing light preferentially to the driver and passenger locations, both horizontally and to a lesser degree vertically. Such a device could ideally account for the limited range of horizontal positions the driver can be in given typical seat locations and the change in angles of view from the top of the center stack to the bottom of the screen This is quite different from the home theatre application where lenticular screen type gratings are typically used, where the position of the users eyes can be anywhere in a large horizontal region.

The grating could alternatively also be constructed to have a zero order diffraction component to send light between the seats to back seat passengers The projected image is directed at the screen 1335 by one or more mirrors, such as 1350. In most vehicles, the largest screen in the center stack location would be 16 inches high and 9 to 10 inches wide—almost the same aspect ratio of HDTV sets, but with the long axis in the vertical direction.

The distance from the drivers eyes to the center of the screen at the top is about 30 inches, which distance however, varies by driver and their seat location.

In the example shown, the display is projected directly on the screen with no angular shift to accommodate the drivers position off the center axis of the car. However, I have found that it is desirable in some cases to shift the axis of projection to make it more along the drivers line of sight to the screen and control surface.

Note that one can "tile" the projection if desired, for example using two small projectors one above the other (in this instance), each having a display region 8 inches high, and 9 inch wide say to fill, between them, a center stack screen 16 inches high and 9 inches wide. Each unit is accordingly less deep in the Z direction, but may there may result a linear demarcation between the two projection fields which cant be used. (which might be acceptably covered by a chrome trim strip say for stylistic purposes). If this is done, it can be helpful to reserve the top portion say for video and touch screen data, while the bottom is at least largely reserved for knobs and other details. One can even tile the displays to point at different angles, to maximize light sent to the driver for example. One can also "tile" the camera systems or other means used to see the knobs and touch points, having for example one for each projection unit.

While invention has been shown with flat screens, it can be provided on curved screens as well. An example of such rear projection screen for use in vehicles (however without the control features of the invention herein) is depicted in a recent patent application by Hirose, et al of Nissan Motor Co, referenced above. The instant invention is compatible with that arrangement, and can have matching curved shaped tactile devices on its face such as sliders, ridges, grooves and so forth.

FIG. 13*b* illustrates a curved screen version of the invention on which images are projected by projector 1354, in which a knob 1355 is inset into the screen 1356 such that it rotates on a flat surface 1357. Such an inset 1360 can be made with a milling cutter for example, assuming sufficient thickness of the material of screen 1356, and the arrangement can work even if the screen is curved in two planes.

A knob can also be inset at an angle Theta to the surface normal, such as knob 1366. However this makes it more difficult to project data through the middle of the knob from projector 1354 without suffering obscuration of the projected image data.

When using a slider such as 1368, it is generally desirable if possible that it move in the plane of least curvature, in this case out of the plane of the paper. However a slider of the invention can track around a curved surface as well. And too, a tactile ridge or groove can generally follow the curvature of the surface without difficulty in use.

The knobs and sliders are detected ideally using the camera system of the invention as previously.

Figure 13C:
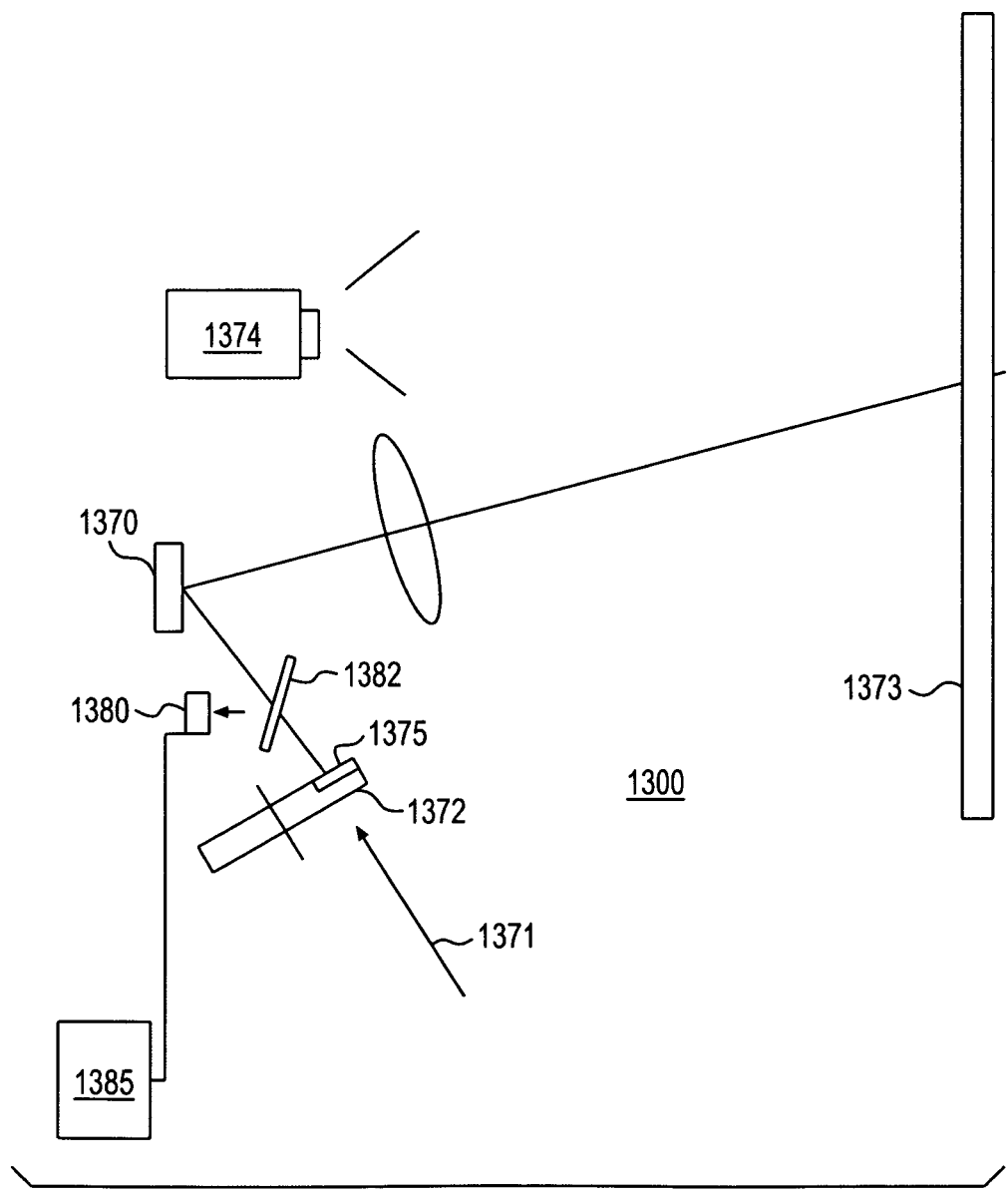

FIG. 13c illustrates an alternative projector unit 1300 which can be comprised of a DMD micro-mirror device 1370 having a motor driven rotating color filter wheel 1372 as known in the art, to sequentially filter projected light 1371 using 3 color filters (typically red, green and blue). However, we can also use this filter wheel, with an added IR filter 1375, to once per cycle project invisible wavelengths (typically near IR, such as 0.8 micron) on screen 1373 which can be seen by the camera system 1374 of the invention and not the passengers. All sensing if desired could be done during this cycle, which could occur 30 times per second say (for an 1800 rpm filter rotation, one IR filter such as 1375, per wheel). This allows the projection of any light pattern desired for sensing on to the screen, while still achieving rapid enough measurement.

Alternative to use of the camera 1374 to obtain control or touch data, one can use the DMD chip itself into a scanning system, obviating the need for a separate camera. In this case a separate detector 1380 would view the screen through the DMD field by use of beam splitter 1382. In this case during a measurement cycle, every 1/30 sec say, the DMD is programmed to scan a flying spot of light, raster fashion or other wise, whose return from the screen region is detected by detector 1380 and analyzed by computer 1385 to determine locations of knobs or finger tips or other control items discussed above. Because the knobs sliders and other physical details are in fixed positions (for the screen in question), and the finger touch is generally or exclusively (depending on the particular design) in the regions of the tactile relief details, it is not necessary to raster or other wise sweep the interrogation beam (e.g. a spot) over the whole screen region, but rather only in those areas where data is expected. In addition, once data has been determined to be in the process of inputting, it is generally only necessary in the next few seconds to scan the region from which it is detected, since the driver can generally only use one or two fingers of one hand at once. This same logic for scanning may be applied to the camera based versions above in scanning their image fields.

Some miscellaneous thoughts on aspects of the driver interaction relative to the invention are:

The driver typically grabs a knob or the handle of a slider with two fingers (and sometimes just pushes the slider with one);

The driver typically can actuate a touch screen displayed switch function by "hitting" a indicated zone with his/her forefinger (typically) in a forceful touch type motion (especially in times of stress). The driver can react to more complex video data in the same way, if it is clear what to "hit", for example a displayed picture of an object of interest;

The driver using the invention can slide a forefinger on the screen to move a virtual lever, and the invention provides unique tactile guides for this;

The driver can twist a virtual knob on the screen to rotate a virtual knob;

The driver should spend the least possible time in looking to find the control, or to determine what state it is in, or what he did with it;

In touching functions when trying to actuate something either tactilely or virtually, the control needs to be of a certain minimum size, to match the persons finger size, and be easily visible to the driver. This matching size can be altered using the invention, or left at "one size fits all". Virtual controls can be altered programmably. Physical ones require interchange of some or all of the display/control surface;

A tactile feature of the invention comprising a groove or ridge (or other indentation or protrusion) on the screen should also be matched, but cannot be too deep or sloped that it provides confusion in the video image displayed in the region where it is (unless it is planned not to present detailed data there);

It is not likely, but not impossible that the driver might use more than two fingers in working the device.

In the simplest case, the invention is likely to be operated not as a general touch screen but only as a specific location one—the points where the tactile relief features are.

And it may be operated in a manner that may be dependent on the other controls settings. For example only is shown an illuminated touch point "A", if a value of variable "B" is selected or a value of "C" appears. Clearly there are many possibilities On a given physical screen and control surface of the invention, the driver knows, or can soon learn where the physical features are. This isn't just the knobs and other physically protruding control details, but also the shallow indents bumps ridges and grooves. Note person can soon learn location of grooves relative to control data.

If the user always uses just these (at least doing one particular regime of operation of the system), then from a sensing point of view, this simplifies image processing considerably The camera can preferentially be windowed so as to only look in the known regions when this regime is operative. This is a major processing difference, and it may also be simplified further if the types of driver inputs looked for are limited. (one example would be an instrument panel which was limited in the regime in question to responding to Knob turning and finger line of action movements in certain regions).

One arrangement of controls is to have a knob closest to driver be a selector of real time functions. Lights wipers, downloads, communication, video to hit etc. The secondary functions are in a further away knob such as climate, audio etc.

Before considering further details of the function of the invention, three illustrative examples of the utility and synergy of the big screen (by automotive instrument panel standards) and tactile features enabled by the invention are now presented.

One of the most exciting examples of application is to an economy car, which often must economically appeal to two sets of customers with much different outlooks and needs:

Retired persons on a budget, whose first concern is safety and ease and familiarity of normal operation, and who may be reluctant to try new things College kids, who are technically astute and given to try new things.

Historically economy cars have been simple, with minimal equipment, which means little if any added functions were available to the driver. However, the invention can provide, in a single affordable system, vastly different features and benefits to these two classes of drivers (and everyone else in between). And the invention can provide new intelligent safety features for both.

Elderly persons will appreciate the large displays and easy to operate knobs, while the young will appreciate the vast ability of a completely reconfigurable dash to access technical and telematic features. It should be noted that not only would the software and displayed digital data and Video be different, it is very likely the two cars would have different tactile layouts as well—made easy by the interchangeable screen and control surface aspects of the invention herein.

In a family travel example of the invention, let us consider the screen of FIG. 2 similar to what could be installed in a 2002 Chrysler Minivan. The family is driving down the road and is able to access via telematic means lists of motels in the vicinity to include large pictures which can be displayed on the screen, able to be seen by the driver and other passengers. Alternatively, the screen can display pictures of the kids in the third seat, or a baby in a rear facing child seat, taken using low cost cameras within the vehicle. When inclement weather approaches, the screen provides a display of infrared able to see thru fog or at night using an infrared camera located in the front of the vehicle, a feature now available on some vehicles, but requiring an extra "heads up" display. Again, the large display, typically located high in the center and center left portion of the dash, allows the driver to see easily. Other display locations can also be employed.

The same vehicle as either example above for example, can also be fitted with the invention with a layout aimed at safe telephone communication and project activity while driving, two concerns of the business user. The dash of this car, can at virtually no extra cost, be laid out quite differently than say a vehicle aimed, temporarily at least, at serving a family vacation function. (since the layout can be changed via the invention, the vehicle can be one and the same)

For example, for the business user, the rapid access to lower level vehicle functions such as seat and mirror adjustment, or even climate control and entertainment system is of relatively small importance, compared to the ability to easily use the controls related to telematics and business project activity (for example relating to tasks involved in formulating a proposal capable of winning a big order).

The reconfigurability of interchangeable and fixed screen aspects of the instrument panel can provide specialized computer generated and mechanically different screens for young or old, those with bad eyesight or hand coordination, (accessibility), those with difficulty understanding technological functions, and the like. Red-green Color blind drivers can tailor their instrumentation to suit as well. For example, Blue and yellow are much easier to see than the common red and green used historically to signify certain conditions.

Totally unique is the fact that the physical layout of the dash control surface can be changed as well as the computer represented "Computer screens" of the display, with the two aspects synergistically in concert. In addition, some changed portions can be in effect, sub screens, which can be created at home, purchased in stores, delivered in cereal boxes and a host of other things, not necessarily solely limited to vehicle control.

While shown with one projector in rear projection embodiments above, a number of projectors for example in FIG. 3 may be used in a "tiled" fashion, much as one sees "video walls" today. Each projector displays on a portion of the total screen area. This also can be advantageous in that it subdivides the area into different regions—some maybe more important than others, perhaps having more reliability, or resolution, or some other feature. One can also consider having screens of the invention used in concert with sections of conventional controls.

It is noted that more than one camera can be used to see the control details and other information such as finger touch locations on the screen, in order to provide more resolution.

It should be noted that displayed data next to (or even within same, if the device is big enough) a knob or other tactile physical selection or adjustment means usually at a minimum displays the selection or adjustment choices—e.g. wipers, heat, air, cruise; or lo, med, hi for example. Alternatively or in addition, pictographs, colors or patterns may be used for example.

In addition other information can also be displayed, such as more detail about what the choice means. This can even include effectively displaying the instruction manual for that function if desired.

The displayed data possibilities above do not represent the totality of novel functions which may be provided, but are ones that I feel are of considerable utility. They may also have:

An ability to switch automatically to a new safety oriented state on input of data from sensors which indicate such is called for. This state can be activated manually as well;

an ability to switch among several screens;

an ability to be switched from one to another, as well has have individual functions triggered from a variety of human command inputs, including touch related activities of various sorts.

Stylistic Issues

The screen is typically clear high optical quality plastic (E.g. Lexan, Plexiglas) with a diffusive outer surface. The screen material may be darkened if desired, to make the system innocuous and or invisible when not turned on. This is also achieved by having myriads of diffusing beads, which make vision into the device impractical. 3M Vikuiti black beaded screen material also is specially designed to be dark for contrast enhancement purposes, and fulfills this goal as well. This material exists as a film with embedded beads which can be laminated onto most screen materials. For example in some cases it may be desired that the screen be extra rugged, for example of laminated bullet proof plastic in a military vehicle. Or one might alternatively chose a softer material with more "give" in case of accident. It can for example be of colored plastic such as black, which while attenuating projector light in rear projection (and thus requiring more lamp power, also reduces sunlight entering the optical system and prevents visual sensing of the innards of the device.

The screen can be surrounded with a bezel, such as brushed aluminum or wood, which can also be removable to attach interchanged screen faces. An overlay on the screen can also be so composed.

Generally speaking excessively variant form or texture on the screen surface is not desirable for either display or touch purposes. However, if used, the location of significant texture details can be sensed when the system is in a set up state, and stored in memory so that these details do not interfere with data to be sensed.

The invention has been described herein primarily for automotive instrumentation use. However some of the embodiments are useful for home automation, military vehicles and fire control systems, and video gaming. Everywhere that intuitive and reconfigurable controls are needed with little learning curve. Reconfiguration ability may be desirable where space limits having numerous different devices too.

I should note that the whole device might be removable from a vehicle, and able to be taken inside the home, where the projector system could become a home TV. If one changed projection lens focal length, and removed the screen, one could project on the wall of ones home! And external input devices such as keyboards can be plugged into the system if desired, to allow the display and computer to function conventionally when the vehicle is stopped.

Also noted is that the display of the device, could display information from PDAs or lap top computers or cell phones, if same were plugged in. Particularly of interest are small devices for example Palm pilot PDA, 159, and cell phones, whose normal controls are hard to use. They may be connected into the system of the invention, for example through a USB port or firewire (IEEE 1394) port of computer 120, perhaps using a connector plug right into the screen/control surface of the RTD itself such as receptacle 158 in FIG. 2D. With suitable software for the RTD control panel in question, one could then employ the various knobs, buttons and virtual displays of the invention for use in activities connected with the plugged in device or devices, for example searching a contact list on a PDA using a knob of the RTD. The RTD has an advantage here too, like the CD example mentioned elsewhere, that information concerning the connection of something electrical can be displayed right next to the connection if desired, helping understanding. Or it can be displayed in Big letters say, somewhere else. One region of the screen for example, could be reserved for such information, allowing one to form a habit of looking there for same.

While machine vision and electro-optical techniques have been shown to determine control detail and/or finger position, other non contact techniques, while less preferable may be used such as inductive or capacitive devices. It is possible to consider sensing methods contacting the screen as well, but the elegance and interchangeability of the invention is diminished.

It also should be noted that while automotive applications have been highlighted, because of their need for tactile function, the invention is usable for a multitude of such as point of sale devices, to Information kiosks, to home automation and control functions, to factory controls, etc.

The screen layouts of the invention above do not represent the totality of novel functions which may be provided, but are ones that I feel are of considerable utility. Generically, these novel screens generally have one or more of these common threads:

An ability to switch automatically to a new safety oriented state on input of data from sensors which indicate such is called for. This state can be activated manually as well An ability to switch among several screens, both computer generated virtual displays, and inter changeable tactile screens;

An ability to switch (line of site, larger print), to higher clarity for key data and/or elimination of non critical information. This also be a function of the individual safety or other needs of different drivers;

An ability, related to the above, to reduce distraction via a choice of distraction reducing screen which provides minimal vehicle information, but maximum assistance with distracting influences An ability to be switched from one to another, as well has have individual functions triggered from a variety of human command inputs, including touch related activities of various sorts, plus hand motions, head motions, finger motions, and the like.

In operating the invention or other novel instrument panels, there are various ways to signal the system (for example to change the function of the screen or a portion thereof, aside from the actual turning of a knob say, controlling or selecting the function in question. For example, voice recognition to determine a desired action from the drivers spoken word or words. For example, One can say "Heat" and after the voice recognition program such as IBM Via Voice recognizes the word(s), the heat screen related portions can be displayed. This could be a complete heat related screen, even including graphs of temperatures, temperatures in and outside the car and so forth, or it could just be the heat portion of a screen which would continue to display other information.

Such signalling can also be done using proximity/range detectors, such as shown in U.S. Pat. Nos. 5,362,970; 5,880,459; 5,877,491; 5,734,172; 5,670,787 and others by the inventor and his colleagues, to determine the position of a persons hand or finger which he can wave or point at some aspect of the device which would cue the function desired.

It should be noted that the sensing of a persons finger position or motion gesture thereof in the air in front of the display or other instrument panel portion is made easier, as one typically knows where to look. (e.g. near a particular knob). And the illumination is also controlled in the sense that the projector of the display, maybe used to favourably illuminate the region as well.

The invention allows the driver to signal the control system in some additional ways which can be quite useful. For example, using the invention's unique ability to determine finger gestures from screen indications.

Let us further consider the situation of using the system to sense locations and gestures where the fingers are either in contact with the screen or very near it. This is the sensing situation illustrated in FIG. 4 above, but in this case with several other examples of finger combinations or movement.

Some choices are:
Number of fingers touching the screen can signify an answer: one or two fingers typically, usually right thumb and forefinger;
Cartesian position of one finger on screen, typically right forefinger;
Difference in position of two fingers (spacing)—typically thumb and forefinger;
Angular position of axis line between contact points of two fingers (knob twist/rotate gesture)—typically thumb and forefinger. See description of function in FIG. 11;
Angular pointing direction of one finger.

These commands are quite powerful, and several are innately intuitive.

They are sensed by sensing finger position or change in position of one or more fingers, using any of the means disclosed, and where applicable, analysing with a computer sequential readings in order to determine the result desired For example, One finger hit could be on, two is off.

Alternatively one can touch the screen with two fingers if you hit the left one twice, or leave it on longer, you signify something different than doing the same with the right one, and so on. Or you can just hit the right side of the screen with one finger, or the left side to signify something It is further noted that the methods of detecting touch disclosed above are able to detect the touch of multiple points at once—a major advantage over many conventional touch screen devices. This allows unique advantages. For example functions to be touched can be interconnected in their operation. It is possible to with one finger touch a point on a card of the invention signifying a person, while with the thumb or other finger touch a icon signifying a telephone (thus commanding the computer of the car to call that person). While this could be done in sequence, it is often easier to just rest ones fingers simultaneously.

Note that the screen surface, or an overlay thereon, can be changed to create different indented or raised styles to suit different user needs. These could be specified when ordering from the factory, or dealer installed, or even user interchangeable. They can also incorporate customized printed on writing or designs, or contains specially added features, such as more knobs, or bigger knobs or keys (for elderly drivers, say). Similarly, the projected images could be bigger too.

It should be noted that displayed data next to (or even within same, if room exists) a knob or other tactile physical selection or adjustment means usually at a minimum displays the selection or adjustment choices—e.g. wipers, heat, air, cruise; or lo, med, hi for example. Alternatively or in addition, pictographs, colors or patterns may be used for example.

In addition other information can also be displayed, such as more detail about what the choice means. This can even include effectively displaying the instruction manual for that function if desired.

The camera system of FIG. 2-4 as noted can be completely separate from the projector, if an auxiliary light source is used. Particularly of interest are long lived solid state sources such as white light LEDS or IR lasers.

It should also be noted that using the computer controlled projector (or other screen) display, a variety of visual cues can be used to signal a function or state has been reached. For example, not only can one display a word such as "high" to indicate high heat on knob 116, but one can also have it blink 3 times when reached. This could correspond to an acoustic or other tactile signal comprising three pulses, or a sound generated, as well. The sound too might be coded by three beeps as well.

Also it is possible for the colors or patterns of the words or figures to be changed programmably. For example, in the FIG. 1 case the whole knob, or its surroundings could be illuminated through use of an appropriate computer program for the display, in bright red when the highest heat position was chosen (with blue, for the lowest, for example). And for example, the knob surroundings could be projected on the display in polka-dots, if the knob was not in a position that actuated a function (e.g. a dead zone).

Where desired (e.g. with elderly drivers) the writing on or near the knob, might be in large letters, which could even be so large that the words, such as "high", for a heater blower speed selected, would need to be abbreviated as HI" for example. And in addition, if desired for maximum comprehension, the word H E A T could even be displayed in giant letters across the screen, optionally with the temperature setting desired, or actual or both.

While the projector source disclosed may be used to light one or more features of any knob slider, switch or other selection or adjustment means, or a marker or other member whose position or movement is proportional in position thereto, a separate light source such as a LED or laser light source can alternatively be used. In this instance, the camera, can for example see as is known in the art, using an interference filter placed in front of the lens or camera array, a filtered image responsive only to laser light, the knob mark reflection. This makes the sensing of knob position independent of what is being projected, and it can operate with no projection at all. Its noted that if the laser (or alternatively for example an LED source) is in the near IR (e.g. 0.9 microns) the user will not see any indication of this. if desired for further contrast, the knob can employ a dichroic mirror reflecting only laser light substantially.

More commonly, the projector source itself is used for knob (or other feature) illumination. The illumination while it can be anything desired on the screen, is typically chosen to provide a uniform light intensity in the region of the datums on the knobs (or other feature) which are being observed in order to determine their rotational position. Since the knobs periphery can actually block the light, it can be seen from FIG. 3*b* that it is possible to project light for knob detail illumination purposes which is not apparent to the passengers of the vehicle.

The Toffolo invention referenced above has a desirable property of making an optimum display. The invention herein goes further and has a programmable "fitting" program to maximally fit as large as possible version of the desired video or other download information to be displayed on the display, using the fit program to take into account the knobs and other tactile control features (not present on the display of Toffolo). Or there can be fit programs which keep data away from tactile ridges and knobs. And unlike Toffolo, data can be momentarily given precedence over other features of normal importance.

It is again noted that one can have knobs or other controls whose function goes back to standard function after amount of time. Then std function changeable if conditions change. For example if rain detected, goes to one where wiper speed and selection is one of knobs (where ordinarily wiper issues would have been a secondary function).

And at night, headlight and viewing aids such as IR may become part of standard screen and control surface, which would not be the case in daylight. This is commonly sensed by a photo detector today.

The user can select in some versions if he wants one knob to all the time be something.—eg heat speed or heat items constant. For some users constancy is a desirable trait. For others it is inhibiting.

The driver can signal the system by voice as well as touch. And he could even do unusual things such as wiggle in his seat. In this case something could change, and logically a seat control could be presented. Or an internal comfort screen which could include not only seats but window positions, and other things Also note indents (or bumps or other tactile relief items) on the screen/control surface of the invention could be selectively lit up at various times, For special apps., or only when touched for given length of time or with a push in.

The camera utilized can be any commercial camera, such as a CCD type capable of producing images which can be interrogated as just discussed. However, best results may be obtained in some conditions of operation by using a camera which can be addressed on an individual pixel basis, to achieve faster operation. In such cameras, typically of the CMOS type, one can interrogate only those areas of screen 200 of FIG. 3*a* for example, known to contain pixels of interest. For example these would in FIG. 3*c* be the regions where one might find the location of what ever knobs or other control details were on the screen. In this case of knob 201 this would include the pixels in an annulus 221 (the same ones preferentially illuminated if desired by the projector for example).

The regions of interest may include other pixels as well, for example those near tactile relief items used to input data. By only looking where data is known to be, the camera speed can be increased to even 1000 frames of data pixels a second for a screen having only a few control details to be interrogated. This is more than ample for any control purposes (typically 30 frames per second is sufficient, the rate of change of manually controlled functions being generally slow (though tracking finger tips and other functions of the invention to be further described can require higher frequencies).

It should be noted too that once a single knob for example is detected to be being changed in its position (by comparison in computer memory for example, to its previous position), the camera can often be directed to concentrate image processing activity largely in this specific location as the driver in the general case does not usually with one hand turn two knobs at once, as an example.

It may be desirable in situations of high ambient sunlight in the car passenger compartment to use a camera such as the FUGA 15 or the color version FUGA 15 RGB (www.vector-international.be) which is pixel addressable as well. This camera has a logarithmic response curve, and can resolve data over huge dynamic light intensity range. Thus in a situation where sunlight was entering the passenger compartment and hitting the screen 200 in FIG. 3a right next to knob 201, the intense light would not disturb the camera in its ability to see marker 207 on the rear of the knob, which knob would act to shadow the sunlight in the annular region in question (or over a whole circular area if the knob was opaque rather than transmissive in its center portion. Other types of cameras, particularly CCD types, can "Bloom" under such conditions, and destroy data of neighboring pixels.

Similarly ones finger tends to shadow the finger tip seen by the camera through the screen from the rear, when touch location or other touch variables are of interest.

One can also control light the light source whether the projector, or a separate source. For example, if the camera unit when set at the maximum integration time conducive with not causing bad effects such as blooming at near by pixels, has insufficient light to determine the presence of marker 207, the light source intensity if desired can be increased for the time needed to make the measurement, thus allowing higher signal to noise and/or faster measurements.

In addition it is contemplated that the projector could have a function (discussed also in FIG. 13) where it projects infrared radiation just outside the visible range such that nothing on the screen can be seen (or a dull red background for some people with enhanced red vision), and then the measurements of knob position etc taken during the brief period when this situation is the case.

A pixel addressing camera such as the Fuga 15 can also have application to other high dynamic range sensing applications within the vehicle such as the many camera based ones mentioned in copending applications, and in my applications copending with Peter Smith or Shesh Sharma as co-inventors.

Applications can include looking at objects in the car such as children or pets, or in a towed vehicle such as a house trailer. Or a camera (or pair for stereo) can be used behind the towed vehicle to provide information about vehicles following. OR a camera can be located in a pickup bed, to allow the display of the invention to see objects in the bed, or in an enclosed truck or pulled boat or anything else where such things would aid in vehicle navigation (e.g. backing up) safety or relieving distraction influences.

FIG. 14

Let us now consider another camera application of importance in saving lives. A co-pending application by myself and Shesh Sharma describes a camera based system, which may be advantageously connected to the display made possible by this invention, which allows observation by the driver, of a baby in a rear facing car seat, usually in the back seat. The camera as shown in that application is located in headliner of the vehicle (an application also suggested by Donnelly Corporation of Holland, Mich. in their Babyvue product) or in the child seat itself.

Figure 14:
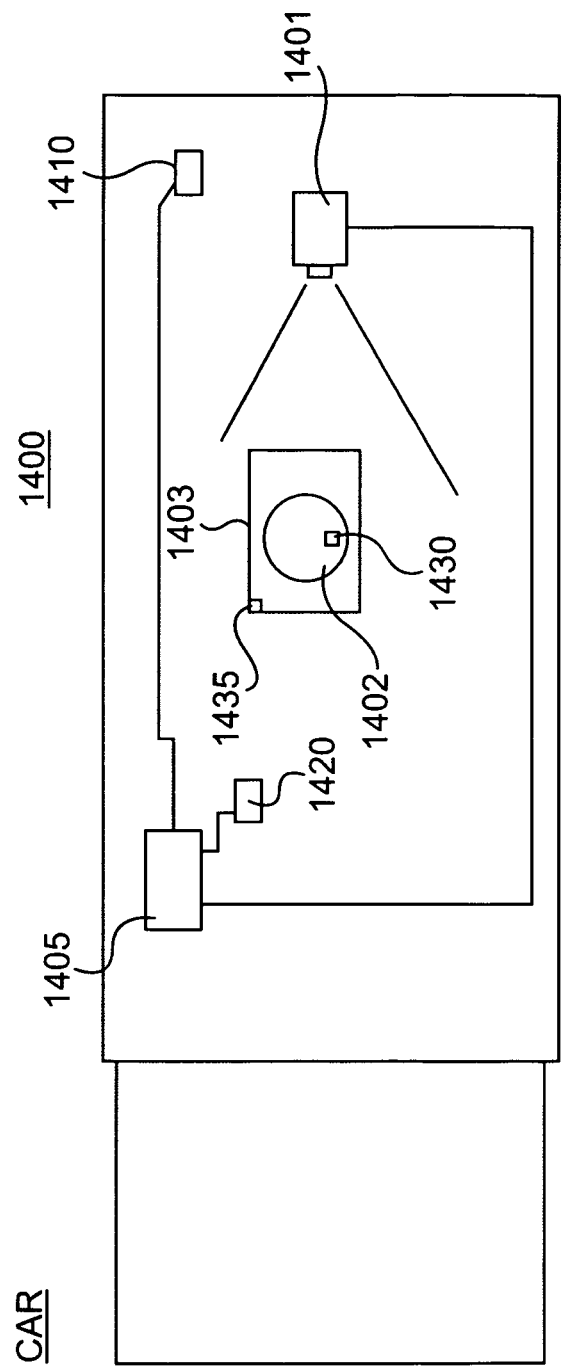
FIG. 14 illustrates a camera based application of the invention for prevention of child deaths in vehicles.

As shown in FIG. 14, data from a camera 1401 observing the baby 1402 or other children (or pets) in the car 1400 is processed by computer 1405, which in the simplest case may have no other input indicative of child condition. The presence of the child can be determined by seeing the child, determining that an outline or other characteristic image of the child exists, and also to compare images and determine motion between them, indicative that a child is present (realizing that most children make some movements at some time in the seat).

Alternatively a simple way to determine that a child 1402 is in the child seat 1403 is to look at the child and seat, and if the image of a feature of the seat such as 1430 is blocked, the child can be determined to be in the seat (this data can also be used for airbag control if desired). In this case it is desirable to see feature 1435 as well, not blocked by the child in use, so as to ascertain that the seat is present. Such features can be preferably be highly reflective, or otherwise easily distinguishable by color or shape. Other means such as weight measurement and change therein on the main car seat can also be used for child presence determination.

However done, data is used to determine that the child or baby is in the vehicle. In addition, one can use data such as that provided by the camera 1401 to more particularly determine via computer analysis of image data, that the child is not happy (the case if not comfortable)—typically manifested by agitation, which can be determined by motion detection between images. This is particularly used to trigger the display of this invention to provide a display of the child to the driver.

But what if the driver has left the child unattended in the vehicle, a tragic killer of children every year?. The data in this instance, is used by a program in the computer to attempt to provide relief and to summon help. Typically, such data would be augmented by data from other sensors such as a microphone 1410 to input data to a computer based voice recognition program to determine if the baby was crying (or if a pet, a dog barking for example). Such can be determined by signature analysis, also including magnitudes, recognizing the sound is likely to be loud.

Of critical importance is the situation where the child or animal has been left in a vehicle during weather conditions over a time period which could cause its death or injury. In this case temperature is a desirable variable to provide to the computer 1405, for example with temperature sensor 1420 which could be a thermistor or other device known in the art, often included in vehicle climate control systems today.

Time is also a variable in this circumstance and it may be desirable as well to determine a time period from when the car was turned off, or the doors locked (if power door locks are present as is increasingly the case).

When a condition that indicates that there is cause for alarm, the invention herein first determines same, namely that the car has been left unattended, that the temperature is in a dangerous zone for a period of time, and that a child is present (and optionally unhappy, though this does not have to be an essential criteria). If these criteria are met, the invention first puts the windows down slightly (Assuming power windows, and a high temperature condition). If a cold temperature condition is determined, the windows are left up (or put up, if down) and the horn and lights can be sounded, just like a burglar alarm. And if equipped, a signal to the driver can be sent via wireless means.

The hot weather situation is the most dangerous typically. In this case it is contemplated that if children are determined to be in the car at all, that the fan of the vehicle would be engaged at a good speed setting. Then after some short period, the windows would be lowered a little (or a sun roof opened). This period of time could be zero if desired, and a warning made to the parent even before leaving the vehicle-like leaving ones key in the lock today.

If the condition persisted some programmed time, also in consideration of the temperature conditions and their effects, and in consideration of the child's state (e.g. present, agitated, crying), then emergency measures such as horn and lights could be engaged.

The camera data as noted can come from cameras in the car or in the baby seat.

It should be noted that the ability of the invention as disclosed particularly in FIG. 10 to provide a means by which the driver can designate regions of interest greatly eases the stereo pair image matching problem, where features in one image are determined to be the same feature as identified in the other image of a stereo pair, in order to determine range by the offset in the image location.

The use of stereo cameras in vehicles is for example described in recently issued U.S. Pat. No. 6,396,397 by Bos, et al. assigned to Donnelly corporation. Such a device is limited in scope by the need to automatically match—difficult to do reliably if done in a totally passive manner without active projection light source aids. While car taillights or headlights having known spacings, colors, or other characteristics can aid in the matching, this is generally effective only at night and only when no confusion exists, as on a country road.

The invention allows the field of view of the cameras to be vastly limited to the region around the object designated, and further allows the image edge and other features of that object to be locked onto as the features to be matched. Since the camera views are relatively parallel I (i.e. the baseline between the cameras is relatively small relative to the distance to the object) the views have similar image characteristics (under normal daylight lighting conditions) though of course the images of the object obtained by the two camera are offset due to the baseline.

It is further noted that computer 120 or 1405, or other computers of the invention used to determine data from cameras used to determine information from the screen, from inside the vehicle (e.g. FIG. 14), or outside the vehicle (e.g. FIG. 10b), can have incorporated a memory such as solid-state RAM Memory or disc, which can record images obtained. These images could be recorded with a rolling 30 sec window, resulting in 900 images if obtained at 30 hz, and could allow one to diagnose after a crash what happened, at least from the video data. Brake and other data might be stored as well. The computer and memory could be protected like a flight data recorder for this purpose. Clearly more images might be stored if desired, for example if higher data rate cameras were used.

It is noted that this particular application is aimed primarily to provide a much needed control interface and information system for the driver of a vehicle. However others can make use of the beneficial aspects of the invention as well.

For example, the invention can be used for other automation or control purposes, such as machine tool control. For example a readable card of the invention such as disclosed in FIG. 11 can be shipped along with some semi-finished parts to a CNC machine tool station (or other working station) which is to finish the parts. The card is put into the slot of the control and both the program needed for that part, and the specialized operator control touch elements needed for that part are accessed by the machine computer and used to perform the operation.

FIG. 14

Figure 15A:
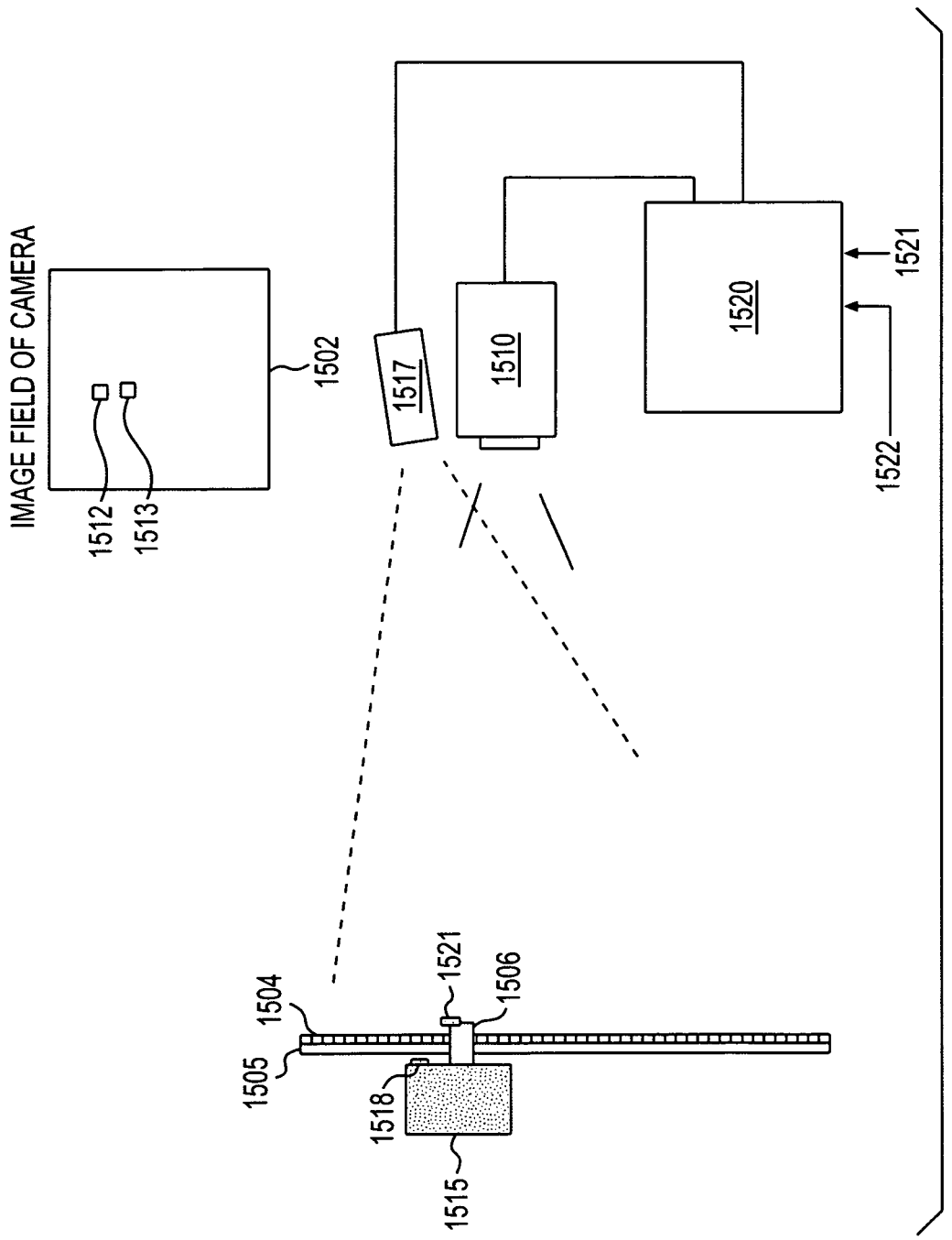
FIG. 15 illustrates additional aspects of physical details and touch features of the RTD disclosed in previous applications.

As shown in the diagrammatic side view of FIG. 15a is another example of the invention. A center stack of an instrument panel (not shown) is equipped with a large (for a vehicle e.g. 10×12 inches) rear projection screen panel 1505 preferably made of non shattering light transmissive plastic, having in this example a myriad of small glass beads 1504 on its back surface which serve to widely diffuse the light incident on them, in a manner creating minimum backscatter.

The beads are encased in black plastic, with only the tiny spherical surface near their focus (which due to their index of refraction of approx n=1.9 is approximately at their surface) protruding from the black matrix holding them. This design increases contrast of the display, and is also useful for keeping light from the drivers side from entering the optical system of the invention, and for shielding the inner workings of the device from view of persons within the vehicle. A typical commercial screen of this type is 3M "Vikuiti" XRV type NP, which is ⅛ inch thick approximately, with glass beads 0.002-0.003" in diameter.

Thicker or thinner screens can also be produced, which can be made by laminating the base film containing the beads and blackening material to another material, either flat or curved, and typically of lexan or polycarbonate plastic. For the bead type material to work as designed, the open aperture of the beads should be toward the projector.

A version of this having a fresnel lens incorporated is called "Black bead" and is made by Dai Nippon printing co in Denmark.

Alternatively screens having less dispersion vertically than horizontally can be used, as well as ones tailored using holographic diffusers or gratings or other optical elements such as lenticular arrays to disperse light preferentially to the range of viewing directions of driver locations The display screen/control surface extends out of the plane of the drawing. While shown flat in this drawing, the screen/control surface in many motor vehicle cases is curved for stylistic or other reasons. This is particularly true since the display screen/control surface is desirably large and needs to fit in stylistically with other parts of the instrument panel which are generally curved themselves. The curvature can be either convex, or concave, or compound, and can be of irregular shape, and with portions even staggered in the z axis. (see FIG. 18)

A computer controlled display projector 1510 controlled by computer 1520 illuminates the screen. This projector may be on axis as shown or located at angle to the screen normal in either plane.

Video imagery or Computer data including messages and other communications 1521 down loaded to the computer

1520 from external sources by known means, or from sources 1522 within the vehicle itself, can be thus projected on the screen.

In this embodiment, knob 1515, and if desired, further knobs or other control details not shown for clarity, are mounted, for example with pin 1506 directly to the screen 1505 so as to be rotatable thereon to various positions which are sensed (for example by electro-optical means such as camera 1517 which looks at points such as mark 1518 on the back of the knob 1515 or other wise related to knob rotational position) and reported to the computer 1520 which in turn calculates the knob position, functions or other data and executes the control function desired by interfacing with the cars electrical and control system and further causes the display device 1510 typically illuminated by a white light xenon or other lamp to project suitable information concerning same onto the screen. This information is typically data concerning the knob position and the setting resulting there from. The same camera can view and provide data used to determine the state of a host of different tactile physical selection or adjustment means such as knobs sliders, dials, or switches on the screen. In addition, their various positions and changes therein can be analyzed nearly simultaneously by the computer 1520 and appropriate control and display responses made.

Alternatively the camera can observe a datum 1521 on the back side of the screen and rotating with the pin as the knob is rotated. This gives the best contrast (as the beads or other screen diffusers don't interfere) and in this case a retroreflecting datum such as 3M Scotchlight 7615 or a corner cube can be used if desired (which otherwise has difficulty functioning with the beads), The image field of the camera 1502 for this knob situation is shown for the knob in the initial position 1512, and for rotation 90 degrees counter clockwise from this position (as viewed by the camera) 1513.

The knob does not have to be held by a pin, and can be fastened to the screen by any appropriate means, including adhesive. And it may be held from the outside circumference by a bearing, leaving the whole inside surface of the knob face clear for data display if desired.

In a similar manner other physical details can be provided on the screen such as sliders, switches and the like.

One useful projector display device 1510 are those having MEM's based Digital light processing (DLP) chips by Texas instruments. Another is a system such as employed in the 3M brand 7640i projector, having three LCDs each modulating a given color, R G or B. It should be noted that for the automotive application, high resolution is not required and relatively inexpensive MEMS or LCD "light valve" chips can be used (in comparison to HDTV applications, for example). Even less expensive are the LCOS (liquid crystal on silicon) chips on the horizon, which, like the DLP chips, operate in reflection Today projection devices such as these used for presentations in conference rooms are illuminated by white light projector lamps which are very hot, high voltage, and expensive (e.g. $400). It would be desirable to have another source for automotive use. But such conference projectors are meant for big areas (e.g. for presentations) and the vehicle only requires a fraction of the area to be illuminated (e.g. 10×10 or 100 inches squared, vs. 40×50, or 2000 inches squared—or more—for a projector. If the ratio is 20 times, the light power can also be so reduced. This then allows one to use smaller bulbs, run bulbs in de-rated manners, or the like in order to achieve minimum cost and/or maximum bulb life—an important issue for automotive use.

More appealing would be solid state sources such as diode lasers or LED's as an illumination source. We have run a test with a LumaLED brand superbright red orange LED, which produced somewhat acceptable results over a smaller area. It was 55 lumens vs. 800 to 1000 of sample small projector such as a 3M model 7640. White as well as monochromatic colored LEDS of 120 lumens are now available as well.

One generally needs to even out the light field of the semiconductor sources to get best results when using the above projected image modulating technologies. This can be aided by putting a suitable holographic diffuser in the path of light from the LED. These can be ordered from Edmund optical co, with various dispersion angles as desired.

Figure 15B:
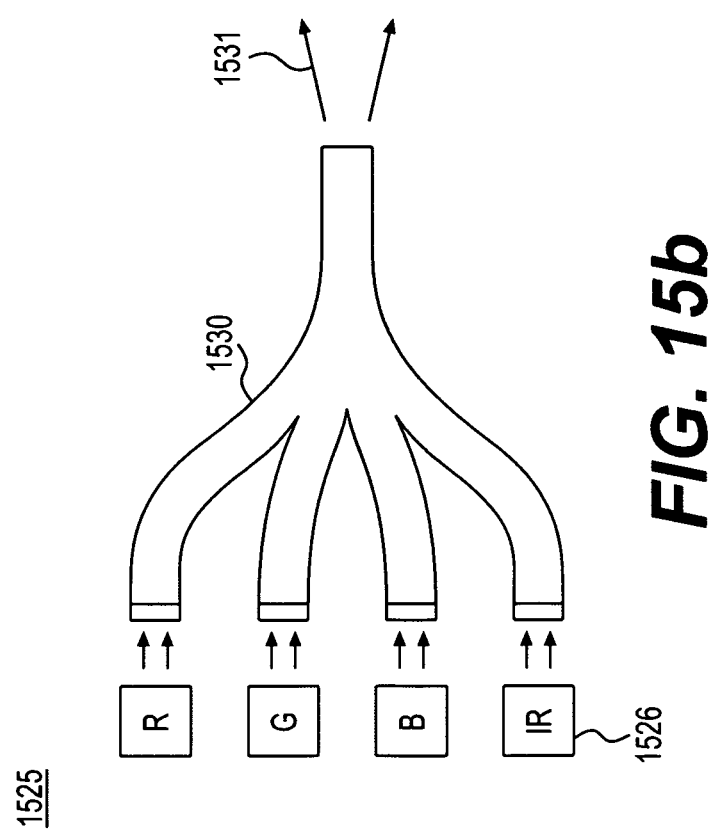

FIG. 15*b* illustrates a combined LED source 1525 which can be used in place of conventional source 1511. It has three colored LEDS, Red Green and Blue (labelled R, G, and B, respectively) whose outputs in this example are combined using a high density fiber optic bundle 1530, such that the emanating light field 1531 is substantially the same regardless of which LED is being illuminated. With some alternative time sequential combination approaches, the blue field is projected, then a green field, and finally the red (or in some other order), with each modulated over the field by the LCD, LCOS or DLP device as the case maybe. The eye combines the three fields if all projection is completed within known eye integration intervals on the order of 0.05 sec.

Note that another problem with solid state sources such as diode lasers or LEDs using combinations of colored beams of same to generate a desired color mix, is the variation and/or degradation thereof with respect to time and temperature. In this case one may wish to use a solid state color camera 1517 (rather than the monochrome one otherwise possible to use) to in addition monitor colors of light projected periodically in test patterns and to adjust accordingly the relative projected intensities of the 3 colored LEDs (RGB).

A fourth LED such as 1526 operating in the infrared can also be used to illuminate the screen and control surface to provide sensing of physical details and fingers irrespective of the projection illumination visible to the eye. In this case sensing can be done with a camera having for example having a filter having a pass band of 30-50 nm wide at for example a typical IR LED wavelength of 905 nm (thus passing light even with small shifts of wavelength due to LED temperature variation and other factors).

Or as disclosed in a copending application a DLP device itself to perform the scan of the signal to a detector substantially coaxial with the DLP device.

Even simpler systems can have only two colored LEDs for simplicity, at a color palette sacrifice in ability to generate a wide range of colors. However for the instrument panel use a complete color palette is not necessary, though desirable for maximum customer value.

Figure 15C:
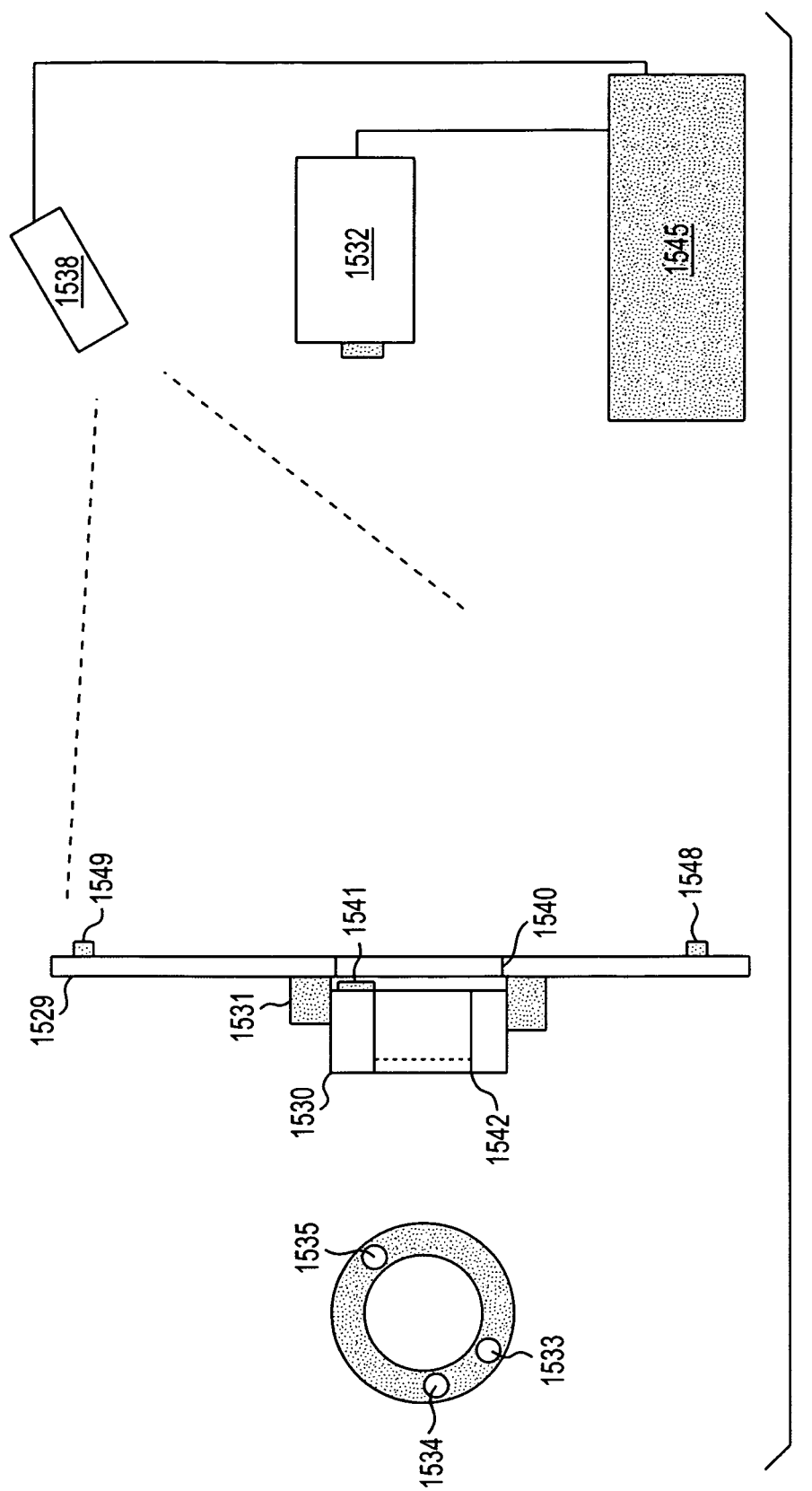

Now illustrated are further physical details and touch features of the RTD disclosed in previous applications The knob datums used in one illustrative experimental example, shown in FIG. 15*c*, were simply aluminium portions of the knob housing 1530 itself, which had been blackened (and thus made non-reflective) in all regions but where target datums were wanted. The knob as shown is held from its outside in bearing race 1531 attached to the screen 1529. The knob is hollow which allows data to be projected to the screen in the middle of the knob by projector 1532. The rear of the knob facing the camera 1538 is shown having in this example three targets 1533-1535 forming an isoceles triangle whose base line was between the two closely spaced targets, and the axis of the knob being defined as a line perpendicular to the base to the third target 1535 at the apex. This arrangement allowed the pointing angle of the axis to be determined easily by processing the image obtained by the Sony CCTV camera used. This image was first acquired, by a Matrox "Genesis" image processing board, and then using the Matrox Mil 4.0 image library, processed first to find the blobs represented by the targets, and then the triangle axis calculation was performed. In another and preferable version, an added step including first subtracting the image obtained from a previous image taken under another condition not representing the instant situation, and then finding the blobs and the triangle calculation.

Once the knob location was found, a lookup table relating to the angle obtained was entered to find a value of the variable desired to be projected. In one case the projector was controlled to project a line on a radio dial, indicative of where the knob, in this case representing the tuning knob, was in terms of frequency. In another case, the same knob was used to control the projector to project a heat bar of different color and length dependent on knob rotational position. In each case output signals were also provided to control the physical radio or heat mixing door of the vehicle HVAC system.

Figure 15D:
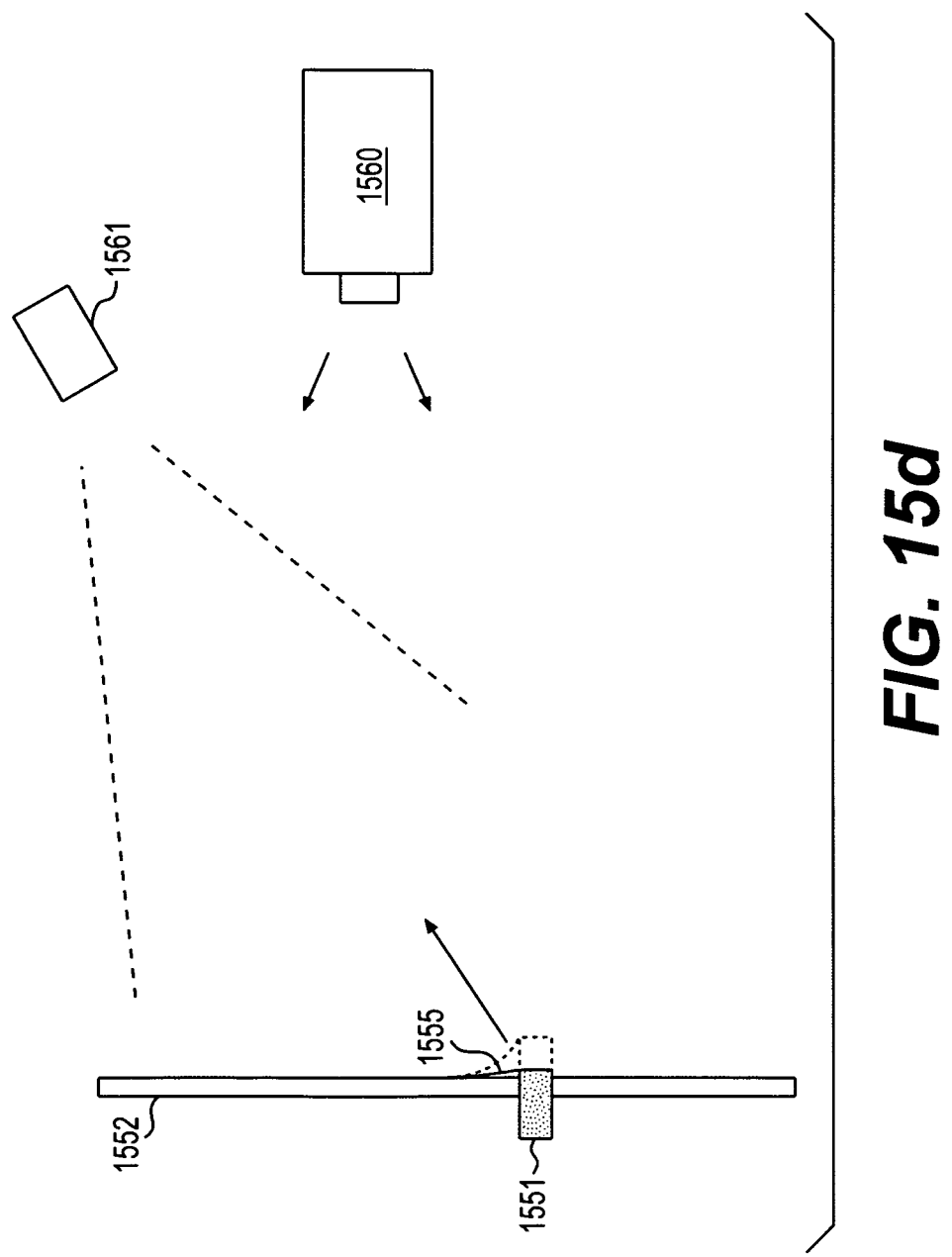

FIG. 15*d* illustrates another form of sensing, this time of the pressing in of a button 1551 into screen 1552. etc as shown when the button is pressed in, reflecting member 1555 is pushed to a new position (dotted lines) and in so doing directs more light from projector 1560 to camera 1561. The image when thresholded to an intensity between the two values, allows a determination of ON (above threshold) or off (below threshold).

Figure 15E:
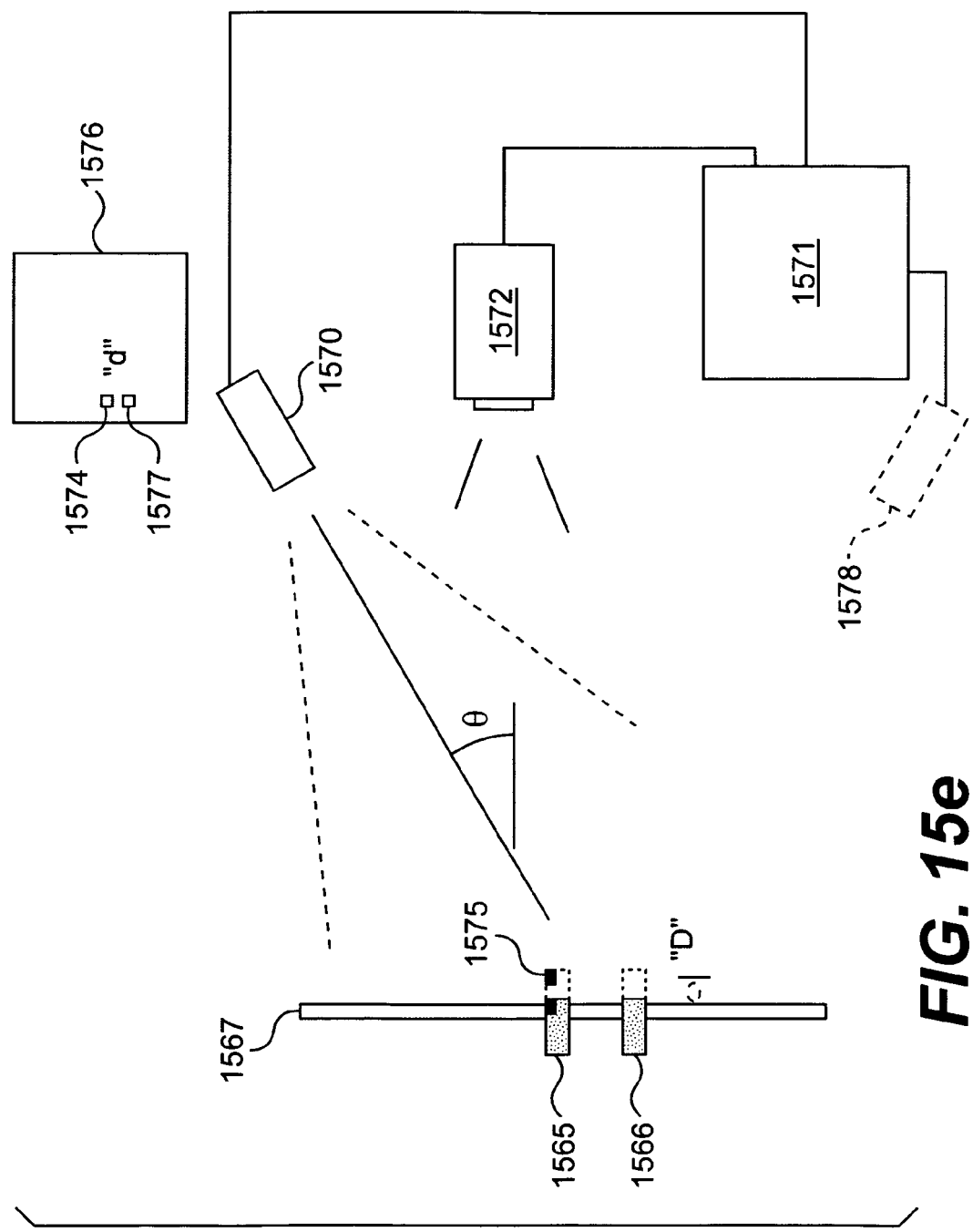
Figure 15G:
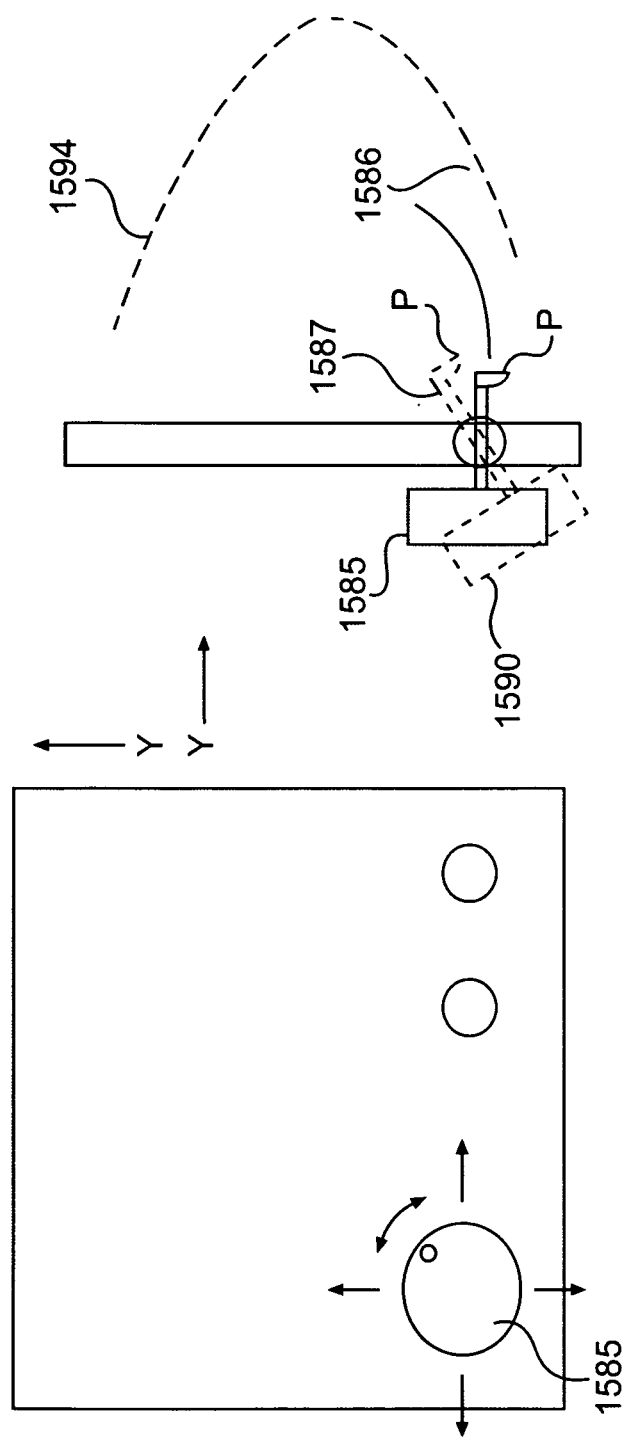

FIG. 15*e* illustrates an alternate method of determining button push which can optionally also be proportional to actual z position into the plane of the screen (in other words having a range of positions, not just on-off). For illustration purposes a row of switches 1565 is arrayed along a horizontal line into the plane of the paper. And a second row 1566 is also provided located below the first. Also illustrated is that a portion of the screen 1567 containing the second row can be spaced as well in the z direction from the other portions, as long as sufficient depth of focus exists for either projection or detection functions. Camera 1570 controlled by and interfaced to computer 1571 is used to view the switches. A projector or other illumination means 1572 is used to provide data on or adjacent each switch as to its function, with said projector controlled as well by computer 1571.

The angle Theta between switches in row 1565, and the camera axis allows one to measure of position of the switch in the z direction into the screen by triangulation. For example when switch 1565 is in its outward position, the image 1574 of reflecting datum 1575 on camera array 1576 is as shown. When pushed in a distance "D" to the location shown in dotted lines, the image position is at 1577, due to the included angle Theta. The distance d, in the image, gives a measure of D by known triangulation principles.

One an use a second camera as well such as 1578 shown in dotted lines. This allows one to see data from knobs and other details from more than one vantage point, and in some cases with higher resolution when both cameras data is combined.

It should be noted that the position of a knob pin shown in FIG. 15*a* can also be monitored in z if it is pushed in, much like the buttons of FIG. 15*e*, for example in order for the person turning the knob to register that he has reached a desired location, or to query the computer for what the present location is for example A knob having three targets like FIG. 15*c* can also register an inward push. For example consider FIG. 15*f* in which such a 3 target set 1580 is on the side of the screen facing the projector, and rotated via pin 1581 by turning knob 1582.

When the knob set is pushed in, the target 1580 moves to position dotted lines. While the image on the array is more complex than that of FIG. 15*c*, it can be solved to decouple rotational position from z axis position in the direction toward the projector. As before the camera is located at an angle theta to the screen normal to allow resolution of z by triangulation Taking this one step further, one can construct a multi-axis knob such as 1585 shown in FIG. 15 *g*. Because the position of the target image in the xy field of camera (not shown for clarity) is changed as you push side to side or up and down, but goes to points not allowed for normal knob rotational movement, one can solve for the change in position of the target such as 1586 due to rotation as opposed to displacement in the x or y direction of the screen. In the case shown, X and Y motion is created as shown, using a gimbal 1587 which converts an angular change caused by pushing the knob right or left (or up or down) from its center in to a movement in the field of the camera (1594 shown in dotted lines). For example as the knob is pushed down in the y direction to the new deflected position 1590 shown in dotted lines, the target 1586 moves up in the y direction from position p to position p'.

Note that where desired in the embodiments herein, pixel addressable cameras can be used to speed up datum tracking using such techniques such as described in co-pending applications incorporated by reference herein. With such cameras one only need scan the regions of the image where information is expected. Generally speaking, for example if one turns a knob, and the knob image is being observed to change, only the pixels that relate to this knob need be scanned in subsequent camera views unit the knob stops turning. This is because the driver cannot in general turn two knobs at once, or use a touch screen while turning a knob. This leaves a lot of computer power available to process other data of interest such as that coming from external sources such as TV cameras or Lidar sensors for example.

The camera shown can view the datum's and fingers from whatever angle is satisfactory. Using a beaded screen like 3Ms there is an approx +/−30 degrees angular attack with respect to the normal that one can get data from datum's on the drivers side of the screen thru the beads of the screen. This is not a limit if the datum's are on the camera side of the beads.

FIG. 16

Figure 16A:
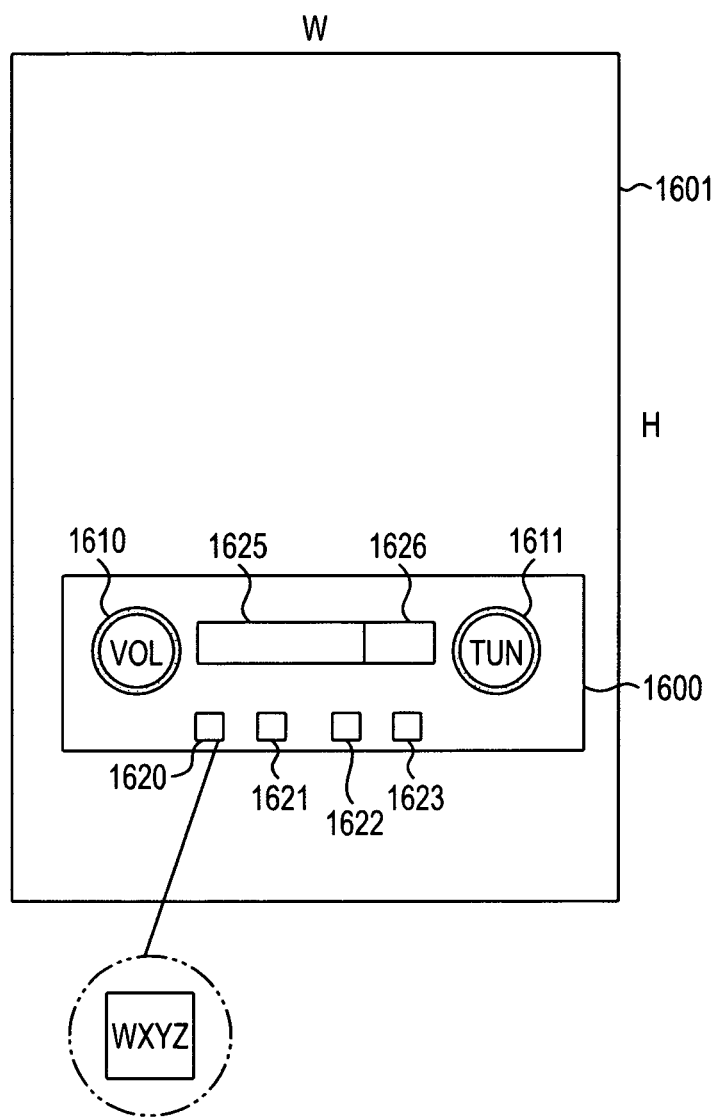
FIG. 16 illustrates an embodiment of the invention employing knobs of FIG. 1 based on a traditional Radio layout, located in the center stack region of the instrument panel and its reconfiguration under computer control into climate controls (also known as HVAC)

FIG. 16*a* illustrates a front view of apparatus along the lines of FIG. 1, in the form of an embodiment of the invention employing knobs of FIG. 1 based on a "traditional" Radio layout 1600, located on screen 1601 in the center stack region of the instrument panel.

In FIG. 16*a* example, the physical control details on the screen itself are the two knobs 1610 and 1611, and four physical pushbuttons 1620-1623, such as shown in FIG. 15. (Note other numbers and sizes of knobs and pushbuttons may also be employed, and the buttons can be virtually projected and actuated by touch if desired, rather than physical pressing in). The projected image portions on the screen are the surrounding lettering and graphics, and the radio dial numbers 1625 and indicator needle 1626. This is like many 1950's car radios, and one can even project graphical representations on the screen which can even be copied from actual radios of the era.

Projected graphics and alphanumeric characters are also used to illuminate the knobs, such as Vol and Tune shown. This illumination can be next to the knob, or if the knob is constructed as shown with a transparent center section, right in the middle of the knob.

Similarly the buttons can be so illuminated with projected radio station call signs, such as WXYZ, or the frequency, or some other delineator. The knob centers can also contain projected information if desired, as can all regions around the various controls. As shown the function of the knobs, for volume (VOL) and tuner (TUN) are displayed.

A typical height of such a device might be H=12 inches, and width W=10 inches. The region at the top of the screen most in the driver's field of view is desirably reserved for key images such as those obtained with backing up cameras or other important data. This area can also be where virtual controls operated by touch are used as desired.

Figure 16B:
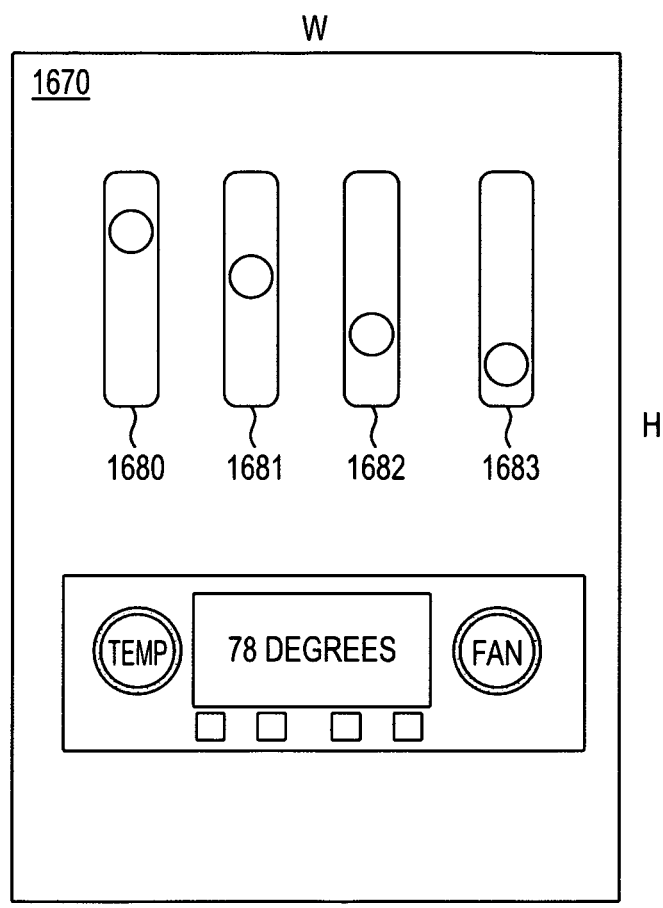

FIG. 16b illustrates the case where the function is changed from a Radio to a heater. more correctly today called Climate Control or HVAC in the trade (heating ventilating and air conditioning). The buttons and knobs are knob re-labeled in the projected data to suit the new function. For example the left knob now is the temperature (TEMP), and the right knob is now fan speed (FAN). In this example, pressing a button in (either a physical real button, or a virtual projected button as desired) may be used to control air direction choice as one example.

Entertainment and Climate are the main control sections found in the vast majority of vehicle centerstacks today. Since this one reconfigurable control of the RTD invention accommodates both, this leaves more space for an associated Video display, and/or for larger knobs and lettering, and other functions too, as desired. And they are provided in a manner very similar to today, that is with physical knobs and buttons, in the usual expected places (e.g. with knobs on both sides of scale or other display). The only difference is that the entertainment function is reconfigurable with the climate.

Figure 16C:
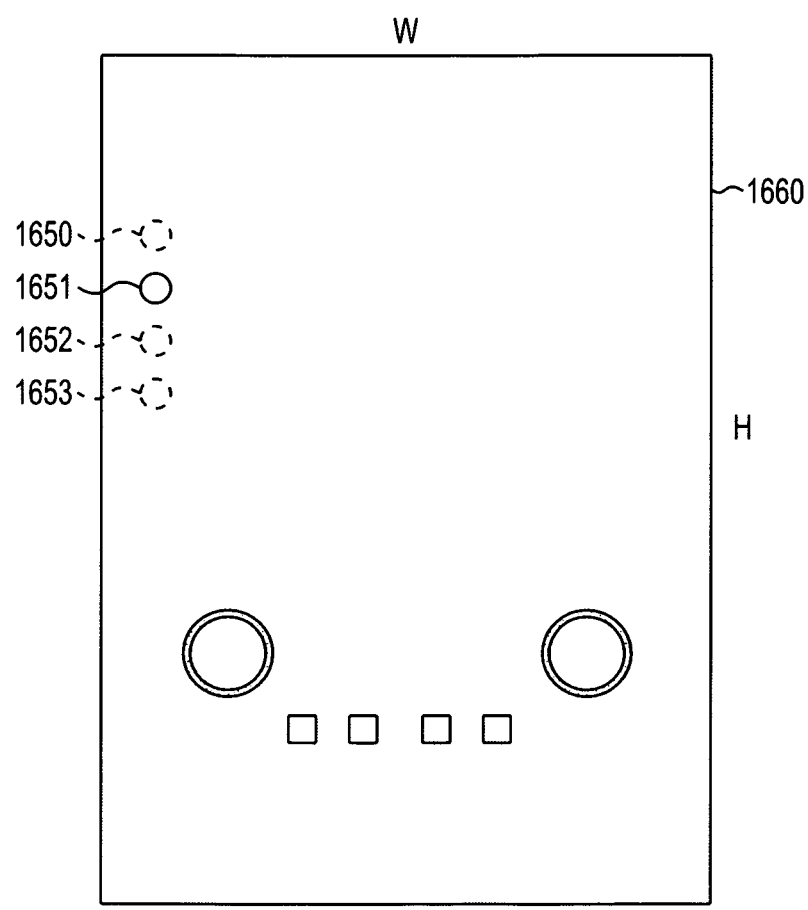

But it needn't stop there. For example FIG. 16c illustrates the screen centerstack with neither radio or heater projected—in other wards in its empty state, with the system off (except for a small ring projection at switch indent 1651). Clearly anything else desired may also be projected which could be controlled with the two knobs and 4 physical buttons shown.

Where buttons are virtual projected types, small relief details permanently on the screen such as ridges or grooves at the bottom of the button region as taught in copending applications are useful for finding the button location by feel. The buttons can be chosen to be projected at the desired locations where the relief details are, for whatever function radio, heat etc is desired.

To switch from one function to another (e.g. Radio to Heat), one can use a variety of means. For example, on the steering wheel one may include switches for the various function groups—climate, entertainment, comfort, etc. Pushing or scroll dialing or otherwise actuating a switch would switch the function to a heater for example from what ever it was (e.g., a radio). Or one can use a simple touch switch on the steering wheel or elsewhere to scroll through the functions desired. In addition or alternatively one can use voice recognition to do this, by just saying "heater".

In addition or alternatively, function switches can be on the RTD itself, and can be hard physical details like the buttons, or in the case shown, "soft" using projected icons such as 1650-1653 on the RTD screen 1660 which is equipped as disclosed with touch sensing capability to respond to finger touches thereon. These can be used with relief features to aid their finding by touch as has been pointed out in referenced applications. As shown, round switch icon 1651 is shown illuminated after a touch by a driver to select it (the function selected such as climate, can also be displayed). Conversely the illumination of icons can be under computer control and selected to only illuminate those for which action may be needed.

Other external switches can be used too, for example on the left or right arm rest. This is particularly easy if a limited number of screens are used, for example 3 or 4 (climate, Entertainment, comfort, and safety, as will be described below).

The use of soft functions allows the maximum screen space to be freed up, for example to facilitate display of TV images and other information. One such image is the region behind the vehicle, taken with one or more TV cameras as previously noted. This is ideally displayed in the region at the top of the screen along the drivers line of sight.

Selection can also be done with a multi-axis knob, which can be pushed in to select in sequence, or a 4 axis knob as disclosed above to allow one to select one of 4 displays simply by momentarily jogging the knob to one of the 4 quadrants. Thus the radio volume knob for example in the figures above could also be a selection knob for 4 different functions—e.g. Radio, Climate, CD/DVD and telecommunications.

A typical scenario for operation is for the driver to unlock the car with a radio transmitter which then signals the computer of the RTD to display in region 1670 shown in FIG. 16b the view behind the vehicle taken with camera or cameras not shown looking rearward. This view is displayed until forward gear engaged or some manual override occurs, to give the maximum time for the driver to see the image of things or persons behind him.

Also in the initial condition, the Climate control display such as that of 16b also is activated. Settings are made, or not made, by the user, and then after a few seconds of inactivity (variable by user setting) the system may default to the entertainment screen of FIG. 16a. unless the climate controls are being worked by the operator.

Other manual overrides would be to cause an additional screen(s) to be projected and set by the operator.

For those who are audiophiles, the whole region 1670 above the radio/heater section (in many cases not having physical controls but rather being reserved for video and data displays and virtual controls) could for example, be devoted to auxiliary audio controls such as for equalizers, and mixers. This could be presented when in radio mode, or when in other modes such as shown where heater (climate) function is shown in FIG. 16b using the physical controls while radio controls are in the upper virtual portion, in this case audiophile controls for example using virtual sliders 1680-83 to mix sounds from several sources. These are ideally provided in a virtual manner using the touch sensing capabilities of the invention, but can alternatively be selected with a multi-axis knob such as shown above or another type of selection device such as mouse, joystick or the like. Or alternatively provided as hard physical details.

Figure 16D:
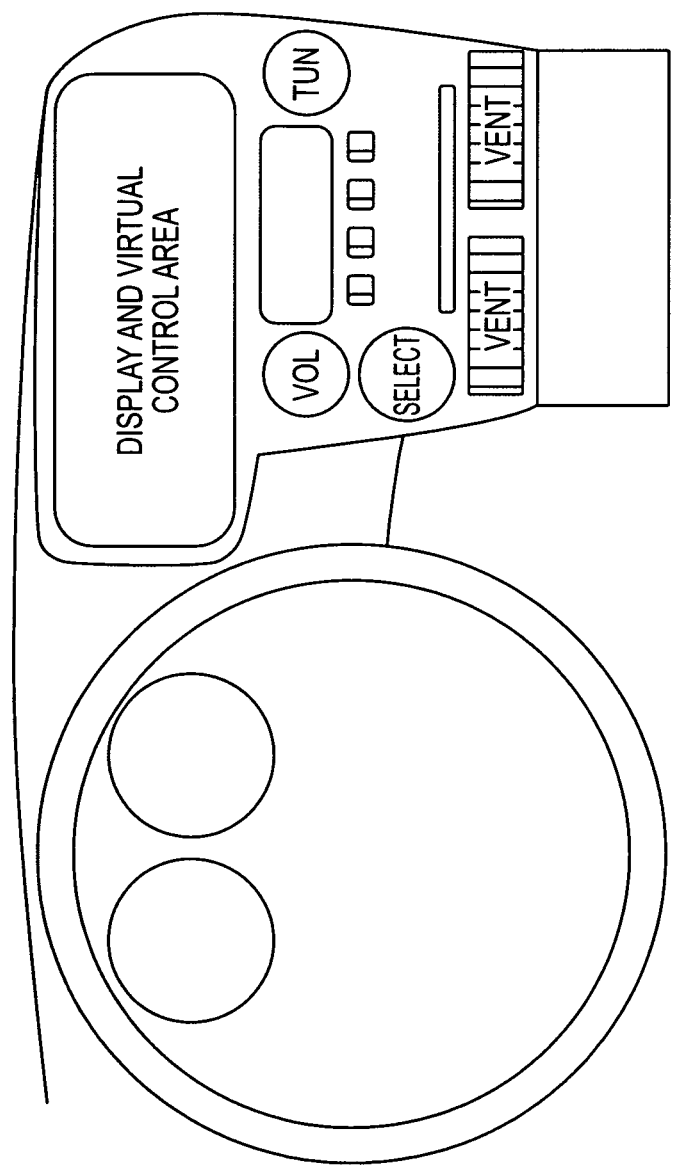

Another centerstack control combination and screen/control surface design is shown in FIG. 16d where one could have the instruments which are shown displayed in the instrument cluster in front of the driver, alternatively displayed the virtual display area of the RTD in the Center stack.

Another point illustrated in FIG. 16b is that one can have both heater and radio on the screen at once. In this case with the top one being virtual and the bottom one at least partly physical (permanently in place) controls. Or one can duplicate radio for example in both regions. As might be desired if you want to drive safely without looking down at all, and put the key radio controls (for example volume and tune) in a virtual sense right at the top of the screen, for example while driving in dense traffic. You could make them large size too.

It should also be noted that FIG. 16a-c illustrates what can for example be a very nice useful control system for use in the home, to control appliances and entertainment equipment, typically from a location on a kitchen wall where it can be easily accessed by a housewife or other person. It is once again, intuitive and easy to see and use. Here again the familiar metaphor of traditional car radios and heaters can be used, if desired, (to operate the entertainment, heating and appliances of the home) with easy to operate large controls preferred.

In the home, the screen and control surface can be much larger, if desired, than would be possible on a vehicle instrument panel. For example the buttons (physical or virtual) 1620-1623 could be used to switch from one appliance to the next, with the two knobs then reconfigured in the computer and the display to be the key controls for that appliance or entertainment device In the home application, the upper display area 1670, when not used for virtual controls, can show TV programs from a suitable source, such as a cable connection. With suitable optics, not shown and a mirror, the projected information can even be routed outside the enclosure (through a hole in the side, say) to project for example on a nearby family room screen. Or the whole RTD unit might be demountable from the wall (or other suitable location), such that it could be put on a table and used as a projector. In this case, one might just remove the front screen/control surface (held on in an easily demountable manner as with wing nuts for example), and just adjust the focus of the projection lens to cause the projected information to be thrown on a far wall.

It is noted that this function, of routing projection data to another location can also be done in a car, for example when stopped, so as to project DVDs in a manner similar to the Drive In movie of old. In a minivan, the screen could pull down from the roof, such that passengers in the 2ond and 3rd seats could view the movie projected from the RTD in the instrument panel.

Information for controlling an appliance can be communicated over a home network, which may in the future be wireless. This is perhaps the most economic solution if one were to install the RTD control in an already built home. In that case each controlled appliance or device would have the receiving and transmission capability to communicate with the RTD. This could be bluetooth or other known wireless conventions.

Alternatively, completely different control panel layouts to that shown in FIG. 16 can be employed.

The fact that I have just used FIG. 16 to illustrate both an automobile instrument panel and a home automation control, is a major advantage of the invention. If such commonality can be achieved, not only does cost drop, but usage and learning becomes easier. The famous VCR programming difficulty in the home could be mitigated if the control layout mimic-ed something one was intuitively familiar with.

In looking at the curved display screen/control surface shapes possible with the invention, for example as illustrated in FIG. 18, it is also possible to envision the invention built not only into the flat walls of homes or offices, for example, but into various elements of furniture as well where it could also provide a stylistic departure from the usual control panel flatness. Even a small curve can make it distinctive. And as noted, the curve can be compound in two axes for added distinction. It can even be re-entrant, for example S-shaped.

Since the screen can be rugged, one could even sit or lean on it, assuming the rest of the housing could support the weight. And because the system has a light source in it, this light source can be used when desired to simply act as a room light. In this regard the projector can be programmed with pleasing colors, which can also change in power and color to suit the mood desired.

Other aspects of the invention also lend themselves to innovative furniture. Where rear projection is used, features of the application can even protrude through the screen of the invention, such as for example a pole holding an awning, if the screen and control surface formed the base, since the pole could miss the key elements, and the light projected around the pole. Since the screen can be irregular, the pole (or another feature such as vase) could be indented into one side of the screen for example, like the vent 2701 of FIG. 27.

While it may be fanciful to think of sitting on ones control system when it isn't in use, such stylistically attractive controls can be of considerable interest in designing appliances for the home for example. While the RTD is well suited to controlling a group of appliances, for example with a wall mounted unit as discussed, it can also be designed into the individual appliance itself. This is made possible in the future, by vastly less costly component costs. And this appliance can thus have an irregular or curvilinear control panel as taught herein.

The TV set of the home, can be an free standing RTD, as opposed to a wall mounted device as described in FIG. 16. Here too, the ability to have not only controls for other functions incorporated with the TV, but also to have it be a stylistic piece is of major interest. However, if the curved screen is to be used this assumes that people would want to watch a TV Screen that was not flat. This may not be the case, and if not, the stylistic issue may be to provide a screen surface flat over a large area, with controls and touch functions or other things off to the side in regions which can if desired by curved or irregular.

If one considers a home RTD TV with controls on the side, the control portion could be not illuminated by the projector, during normal operation of the TV display portion. Thus the presence of the controls would not be distracting to the viewer. Then when control is desired, they could be illuminated as taught herein. It could be in this case too, that only the portion off to the side would have a touch sensing capability, with the main TV display portion not requiring same. However, it could also be so equipped.

FIG. 17

Figure 17:
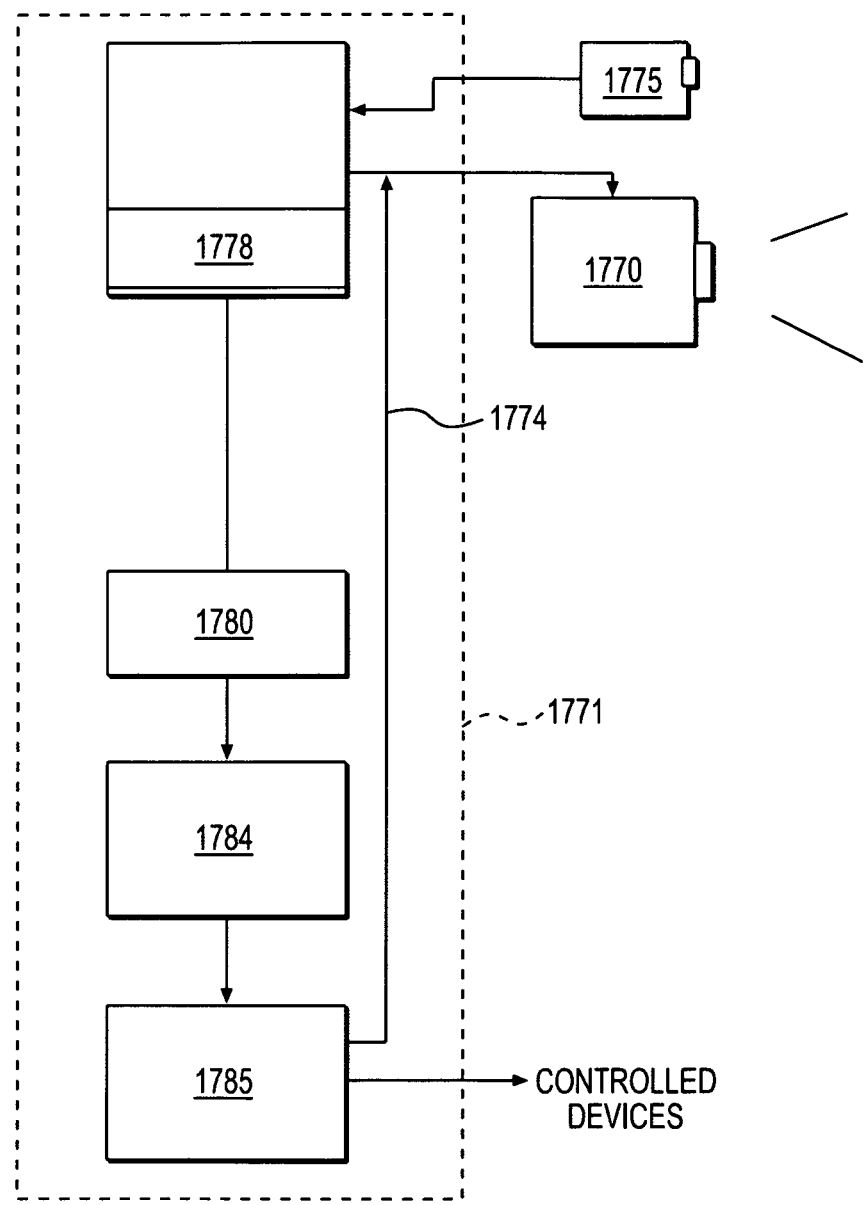
FIG. 17 illustrates the sensing and control strategies utilized in the above examples.

FIG. 17 is a block diagram illustrating control of various devices by a PC based version of the invention, in which the projector unit 1770 is controlled by PC 1771 in response to programs resident thereon. Image data 1774 from Camera 1775 is processed 1778 by Matrox MIL software resident in the PC. Data from the processing is analyzed 1780 to determine position of fingers or physical details as for example described above, and from this a determination 1784 is made as to what control actions to take, which action data 1785 are used to control devices such as motors, relays or other devices, and to generate appropriate signals to change the display accordingly.

FIG. 18

FIG. 18 illustrates an irregular shaped, curved display panel and control surface 1800, in a configuration suitable for some instrument panel center stack applications. The display surface is shown in this example as curved, irregular in shape and may if desired have a ridge, disc, or other shaped protrusion or depression such as ridge 1805 extending outward or inward of the surface, on which information may also be projected or sensed (as long as sufficient focus can be maintained, usually not difficult with relatively small depths/heights). The screen is illuminated by a projector 1810. Physical details and touch points on the screen are sensed as described herein, for example with camera 1820. It should be noted. The irregular shape shows a "dog leg" 1818, which allows the screen to be cut out for the drivers right leg clearance if it is desired to utilize all available instrument panel real estate where it can be seen and controlled by the driver.

While beam paths may be folded via mirror elements to allow less depth to be used in the instrument panel, with the convex curved screen shown it is easier to provide optical elements such as 1811 and 1821 capable of wide angle illumination and imaging of the screen (while maintaining acceptable degrees of focus). In many cases therefore the need for mirror elements is obviated, resulting in less cost, and a saving of some other space aspects. And too with fewer optical elements it is easier to utilize the total RTD device in its housing 1850 as a plenum for air distribution from blower 1854 through vents 1855 that might be provided in the screen 1800, without suffering condensation problems caused by cooled air passage. If this is a problem slightly heated windows for example can be used to shield the projector and camera optics. It is noted that vent 1855 can be clear plastic such that data can be projected on it (if diffusive), or seen through it to a diffusing screen such as 3M Vikuiti behind.

In the auto application (and others) it is desirable to have all the components of the RTD Packaged into a housing such as 1850 which can be easily inserted into the vehicle in question. In this case the minimum possible connections would be desirable from the RTD to the vehicle for power and input output cabling. It is envisioned that the computer, projection, sensing (camera or otherwise) would all be contained within the housing in most cases. However, the screen/control surface might be fastened on later, if all that was necessary was to program the system to deal with it (in other wards the projector and sensor would be focused and set up for dealing with a range of different screens and control surfaces that might be installed. This could even occur a dealership.

Mitsubishi has developed a rear projection device having a flat screen using a Texas instruments DLP light valve which appears to use at least an 80 degree field of view as taught in their recent U.S. Pat. No. 6,577,455. This unit is only 10 inches deep with a 60 inch diagonal 4:3 aspect ratio screen, and is ideal for mounting in or on the wall of a house or building.

With convex curved screens image formation is easier at least in the plane of most curvature, realizing that the instrument panel is typically can be much more curved in the vertical plane than in the horizontal, as illustrated in FIG. 18. Thus very wide angle projection systems can be used in the vehicle—especially since the application is less demanding regarding resolution and color fidelity than HDTV for example. If wide angle optics are used with a mirror, the depth in the fore-aft direction of the vehicle can be just a few inches.

Figure 18A:
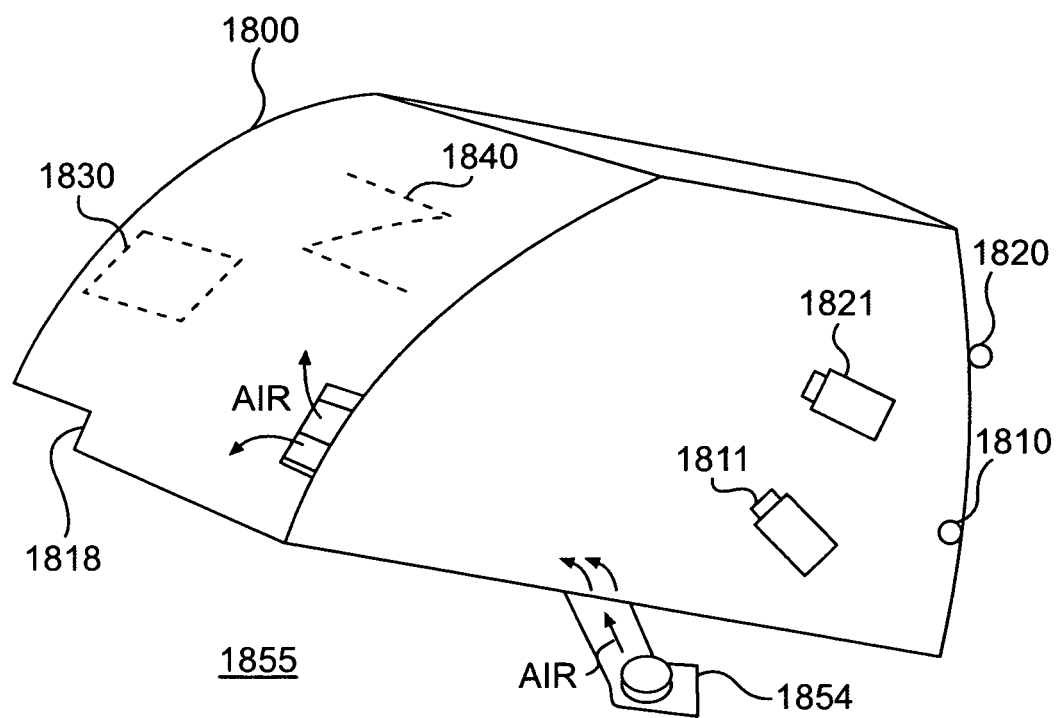
FIG. 18 illustrates a curved irregular screen/control panel embodiment further including venting.
Figure 18B:
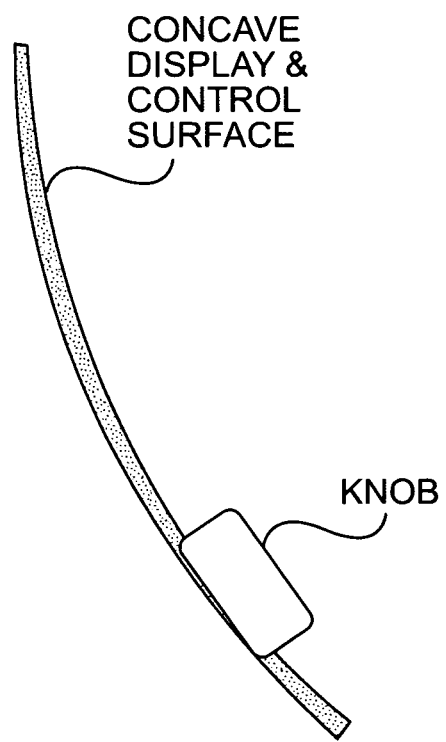

FIG. 18b illustrates a concave cross section which can also be used rather than the generally convex shape of FIG. 18a. Even combinations of sectional shapes can be used, as long as the projector image can be sufficiently in focus for the intended purposes. The camera image focus is typically not as important as the datums on the knobs or finger images and the like can generally be quite defocused and still register. In fact some degree of defocusing can be useful in some cases to average over a number of pixels allowing more subpixel resolution in the vision processor.

Also illustrated in FIG. 18a is a unique capability, namely that in region 1830 (dotted lines) the camera 1820, or even a second camera not shown, can be used to see two measures of person identification. In the first the finger print is read of the person pressing in on the screen in this region (which region can be projected as an appropriate region for such if desired under control of the projector, and can be varied from time to time to avoid buildup of finger data on the screen which could be lifted off or otherwise used by a potential thief), and in the second, a finger gesture on the screen of the person in this region can be determined by analysis of a sequence of finger locations, or movements, or the juxtaposition of two or more fingers. Such a gesture is easier to detect (due to limited resolution when only one camera is used for the whole screen), can be taught to the camera-computer system, and can be very simple or as complex as the owner of the vehicle might wish.

There are many possible sequences of finger gestures that can be used as well. If a time delay was built in between each try, this could be an effective theft prevention device. And some gestures would require a degree of dexterity which could guard against drunk drivers as well.

Gestures could be rotational or pinch gestures with thumb and forefinger, sweep gestures with ones forefinger in any prestored direction. And so forth. One could also draw with ones finger ones name or a portion thereof. Any or all would serve to identify the person, at no added cost.

For example, illustrating a gesture 1848 of this type could be wherein the user draws a "Z-like" gesture on the screen, shown in dotted lines. This then can be followed with another gesture if desired for example another letter or some other sign. The gesture can be remembered after being taught, or a sophisticated hand writing recognition program can be employed such as in a tablet PC to detect actual writing with ones finger. This can also be used to communicate or do more in commanding the control system as well, as an alternative to voice input for example.

FIG. 19

It is also possible to use electro-optical sensing to determine movement of the screen related to force caused by touching, and in so doing determine either that a touch has occurred, or if more sophisticated processing is used, to determine where it occurred in the area of the screen.

FIG. 19a illustrates optical sensing of touch occurrence or position from quasi rigid body movement of the screen/control surface. As shown screen member 1901 (here illustrated as a flat screen for convenience, though any shape is possible) is mounted to the instrument panel housing 1902 at its four corners, 1905-1908, using compressible supporting members as further described below, which allows displacement under the load caused by the touch of for example, finger 1910 directly on the screen 1901, or alternatively on a physical detail such as knob 1911. The screen is observed through a suitably sized opening in the instrument panel housing by TV camera 1920 whose image information is processed by computer 1921. Both the camera and computer can be the same one as used in other embodiments herein for knob position and the like. Data is projected by projector 1915.

In one version of the invention of this type, the location of the screen edges can be sensed using the method disclosed in FIG. 15 above. And fixed datum's on the screen such as a reflective spot 1922 on the rear surface of the screen can additionally or alternatively be sensed to move in their movement in the z direction under touch load, and used to determine said condition. Where a single camera sees movement at all points required, and is the same camera as used for knobs and other physical details, this typically results in a very low cost system.

If the supporting members supporting the screen are designed to constrain movement to be effectively only in the z direction, it is relatively simple to solve for the position of touch, assuming all members have the same resistance to force.

When used in automotive applications, It is desirable to have the supporting members be as stiff as possible, to avoid excitation of the screen due to vibration of the vehicle. This in turn implies small displacements under the load of touch, following Hookes law (assuming the support member is completely elastic). And thus the resolution of displacement by the camera system has to be quite good. Or multiple cameras used each covering smaller zones, for example encompassing just one of the supporting members. Alternatively other types of sensors of displacement can be used, but this adds cost.

Figure 19B:
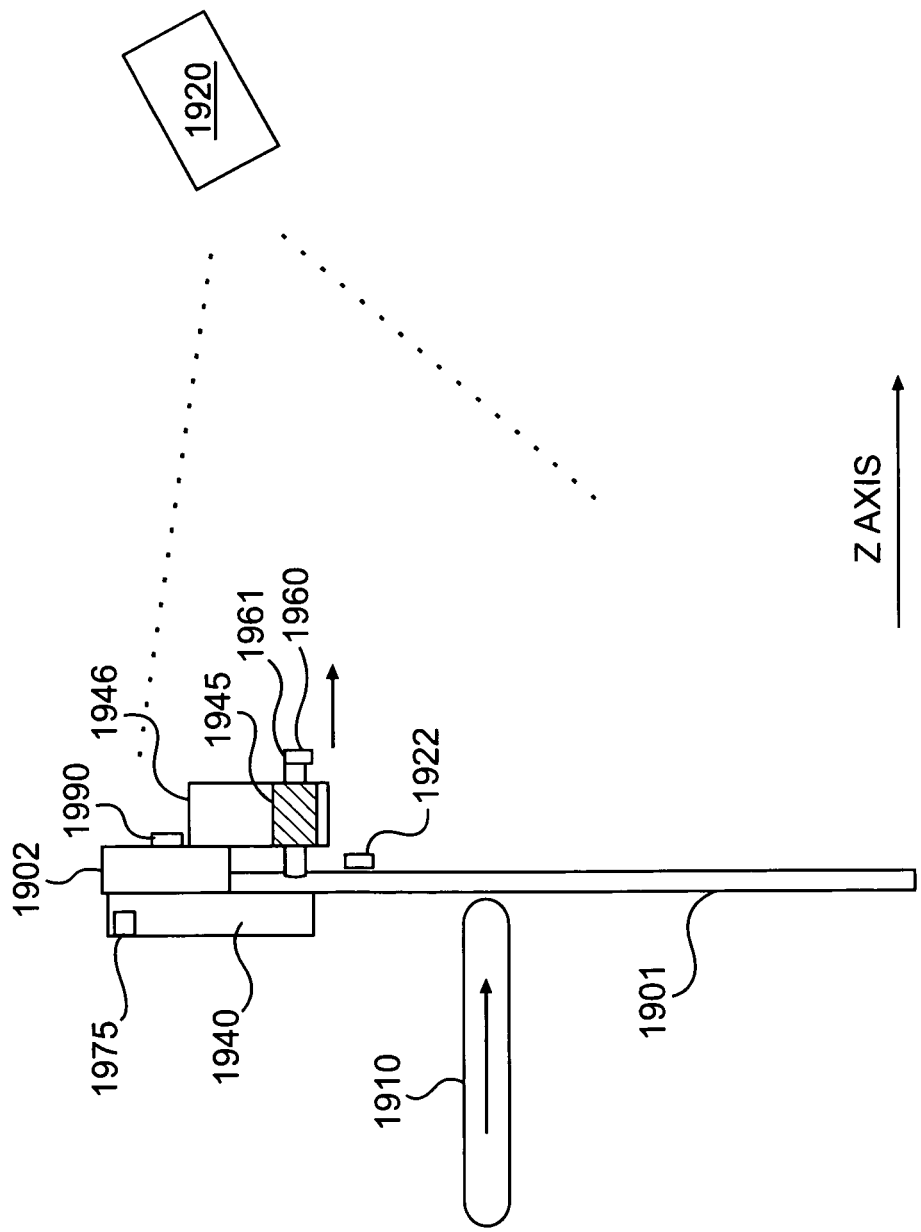
FIG. 19 illustrates optical sensing of touch occurrence or position from quasi rigid body movement of the screen/control surface.

In one example, shown in FIG. 19b, a single camera 1920 is used to observe all four corners of the screen 1901, of which only one 1940 is illustrated in this view, which is supported by support member 1941 in this case comprised of a coil spring 1945 acting in a housing 1946, secured to instrument panel 1902. When finger 1910 presses on the screen the z axis component normal to the screen and parallel to the housing acts to move the datum's observed by the camera Two types of datum's moving under load are shown in this drawing. First is the reflective or otherwise observable datum 1960 attached to the end of rod 1961 secured to the screen and passing thru the center of the coil spring. As noted relative to FIG. 1 above, a z axis movement of 0.010 inches can be detected using a 1000×1000 pixel element camera to observe the complete screen of 10×10 inches in extent. In order to see accurately, the datum should be large enough so that many pixels of the camera can be used to determine its location to sub-pixel resolution, in which case a movement of as low as 0.001 inch can be determined. See for example, US Patents by the inventor and his colleagues for details on methods to achieve this.

The datum used can also be a point such as reflective dot 1922 permanently attached to the screen itself, preferably near the corners or other locations which are supported. This too will move inward in Z when the finger touches the screen.

It is desirable to have a portion of the instrument panel such as 1975 extend past the screen 1901 as shown in order to shadow the datum's from sunlight such as 1978 coming from inside the passenger compartment. Alternatively a surface of the screen can be blackened in the region to block the sun.

The support can be of a plastic or rubber or other such compound which is compressible, rather than elastic members such as steel springs. This is much less costly, but creates a more difficult solution for touch location due a less predictable response to touch forces, which further may not be purely in the z direction.

For solution of touch presence, one only need detect that any of the 4 corners has moved from a previous position. The normal untouched position (in the absence of vibrational effects) can be detected on car startup or any other time desired. One can sum the movements of all corners as well. And one can additionally look at other datum's internal such as locations of knobs, switches and the like, since they too will move under the force of touch if secured to a screen which moves in a rigid body manner.

If touch presence is solved for, this can be useful if only one touch icon box is projected for example. And, as pointed out in previous applications, if one knows a touch has occurred, one can use vision techniques disclosed elsewhere herein and in other cases to see the finger location directly. Such touch "Pre-sensing" using force is useful to avoid touch signals which can possibly be falsely generated when ones finger or objects are close to the screen but not touching.

For actually solving touch location, this requires in general analysis of all 4 signals from the support members, and possibly other points as well internal to the surface, in order to determine where the touch has been. For example in FIG. 19a, the touch of a radio button is determined to be, for example, 3 inches from the location of supported edge 1905, and 7 inches from support 1906. If all the touch buttons to be pressed are in a horizontal line such as dotted line buttons (e.g. radio buttons) 1980-1983 extending from one side to the other, then it could be expected that button 1980 had been selected, since movement of datum relative to 1905 was proportionately more than that relative to 1906

It should also be noted that the camera can determine the location of datum's relative to a housing that surrounds the screen, rather than to itself. This allows the camera to vibrates slightly without affecting measurements of displacement. For example not only could datum 1960 in FIG. 19b be determined as to position, but also the datum 1990 on fixed member secured to the instrument panel nearby, with the distance between them in the camera image solved to provide information as to displacement. This value changes due to the angulation of the camera in this case. Such a fixed member could be a support ring continuing around the whole circumference of the screen for example.

If the screen does not move as a rigid body under touch action, then solution of the position equations is more difficult. But typically in many applications, the degree of accuracy needed to discern what is needed is low (e.g. the choice of 4 radio buttons above). And too, the camera by virtue of its whole field measuring capability allows one to see intermediate parts in the screen surface if needed to aid the solution, for example added datum 1971 in FIG. 19a which can be put there particularly to aid such solution (and for example could even be a fixed point on a knob holding member of knob 1911 which would be there for another reason, and which would also serve to shadow the point.

Figure 19C:
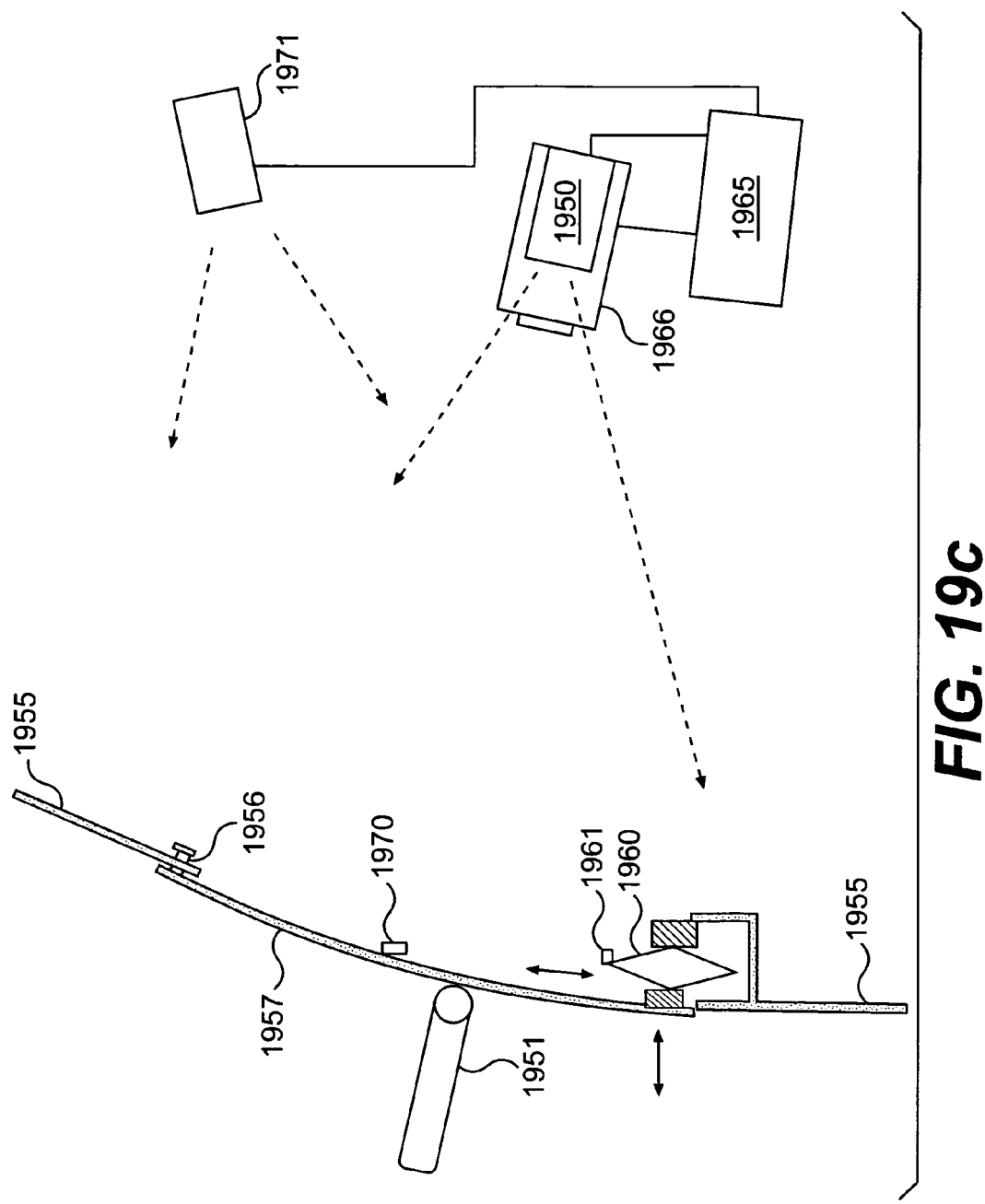

It should also be noted that one can calibrate a screen and its mounting for its deflection characteristics once built. One can just touch the screen with known touch type forces at all the points one would like to sense touch (or z axis knob location, or z axis switch location) at, or at a representative grid of points, and determine the response in terms of displacement. By storing in computer memory the values of displacement obtained, also perhaps at multiple points across the screen surface, in addition to the points supported, one can correlate any future touch to these values. This is particularly effective since one also in many applications has control over where on the screen the touch point icon boxes one might use (e.g. the radio buttons in FIG. 19) are to be projected. It is often not needed to have a table of more than 50 positions where displacement vs. force is calibrated. Some systems can make do with 10 or less. And one can just assume in many cases a unitary value of force for a typical persons touch. This is not costly in terms of either processing time, or calibration and test in factory. It alternatively can be done in situ after the car is manufactured.

This can be done too with neural nets as pointed out elsewhere in other contexts.

It is noted that the calibration of the screen using a digital matrix array of photo detectors as the sensor, avoids analog calibration drift experienced in many touch screen designs, while still allowing high resolution.

FIG. 20

Figure 20A:
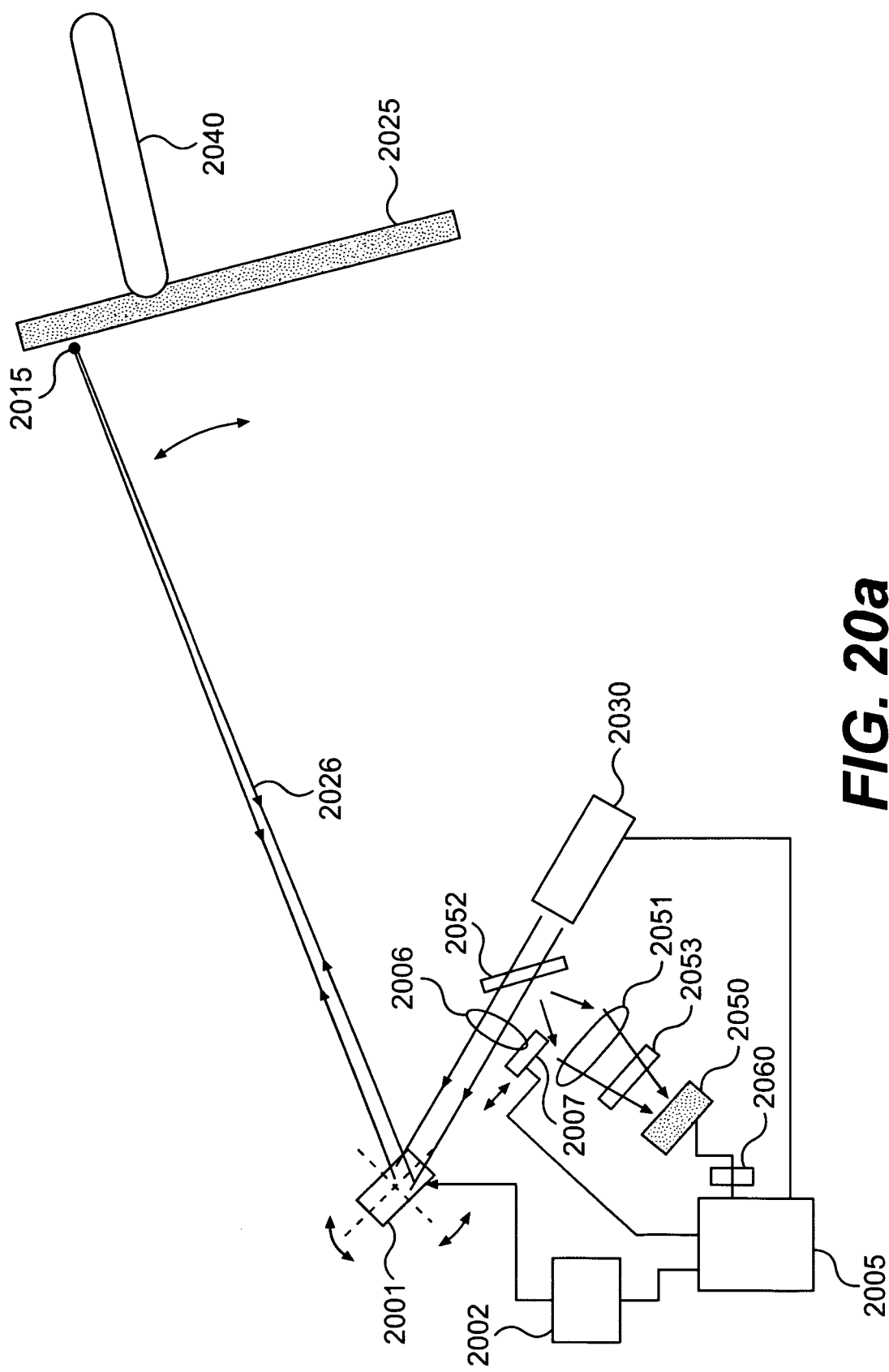
FIG. 20 illustrates an alternative display device employing a MEMs based flying spot scanner and laser or LED sources and the additional use of such scanners to perform sensing of both control details and fingers or other touching objects.

FIG. 20 illustrates an alternative display device employing a flying spot scanner and laser or LED sources and the additional use of such scanners to perform sensing of both control details and fingers or other touching objects.

As shown in the figure, a Microvision brand MEMS based xy mirror scanner 2001 driven by drive controller 2002 controlled by computer 2005, is driven so as to sweep a focused beam 2015 from lens 2006 combined from one or more diode lasers raster fashion across screen/control surface of the invention 2025. In one example of such a flying spot scanner, 4 Diode laser beams of different colors are combined by combiner 2030 using the apparatus of FIG. 15*b*, dichroic mirrors, or other suitable means known in the art. Three of the lasers colors are typically are red green and blue, in order to allow multiple colors to be generated by appropriate combination of intensities from each laser. The $4^{th}$ is purposely chosen to be outside the visible wavelengths (e.g. IR at 880 nm) in order to act as an interrogation beam for finger and knob position which can be energized independent of projection color and unseen by the driver.

The reflected IR light 2026 from objects such as a knob or ones finger 2040 in contact with screen surface 2025 is sensed by detector 2050 whose associated lens 2051 aperture is such that light only from a region around the point being swept is accepted, since the lens also looks down the same beam path by virtue of beam splitter 2052. Narrow band Interference filter 2053 accepts only the IR laser wavelength at 880 nm in this case, and rejects virtually everything else.

Signal processing in the simplest cases looks for abrupt changes in reflectance, either due to the presence of fingers, or from datum's on knobs and other physical details of the type disclosed above and in copending applications. Such abrupt change detection (e.g. using a high frequency AC filter) coupled with the wavelength filter, effectively eliminates slowly changing sunlight and other optical noise. The use of a single detector with the flying spot device, also allows one to modulate the light source and correspondingly demodulate the detection at a very high frequency which can further discriminate against background light. It is noted one can also use projector light for the sensing purpose, without the added IR source. However, this requires coordination of projection with sensing which otherwise is not required.

This arrangement is thought to be the most attractive from a cost and optical noise rejection point of view. The September 2002 issue of Worth magazine indicates that Microvision Corp. believes the RGB version could cost only $40 in high volume, of a size capable of replacing a conventional TV set. This includes the lasers, optics and scanner, and maybe the scanner driver. Thus the version herein, even with the optional IR laser and detector would cost only $50 lets say, at which price the whole RTD based instrument panel becomes extremely cost competitive with all known alternatives.

It should be noted that a flying spot type scanning projector can be used even if the sensing is done with a camera as disclosed elsewhere. Conversely, such a detector equipped scanner can be used in any of the embodiments above as a sensing device only, in place of the camera.

This scanner can also be used for another form of optical touch sensing, based on light reflected from a member deformed by the finger touch. As can be appreciated as shown in FIG. 20*b*, when an outer screen member 2070 is deflected even slightly by a finger 2075, the light beam coming from scanner 2071 is reflected as ray 2072 in a quite different direction than it was 2073 (dotted lines) from the undisturbed surface. By comparing the return signal of an initial no touch state, to that with touch a determination of touch can be made. In the case where the distortion tends to increase the signal, this adds to any signal from the direct reflection from the finger as well.

The sensing ability can be operational while projection of images is taking place, or alternatively performed during dwell times when it is not.

Another discussion of a related embodiment may be found in my copending application Ser. No. 09/568,554.

It should also be noted that the use of logarithmic or other sensitivities in sensors used to scan the surface of the screen in a flying spot manner can be used as well. However most single photodiodes can be made to operate with very high dynamic ranges so this may not be necessary, even where sun load is high. Detector output too can be used to gain control the projection sources (eg semiconducting lasers or leds), in order to put more energy on the screen when viewing conditions are difficult due to high ambient light.

FIG. 21

Figure 21:
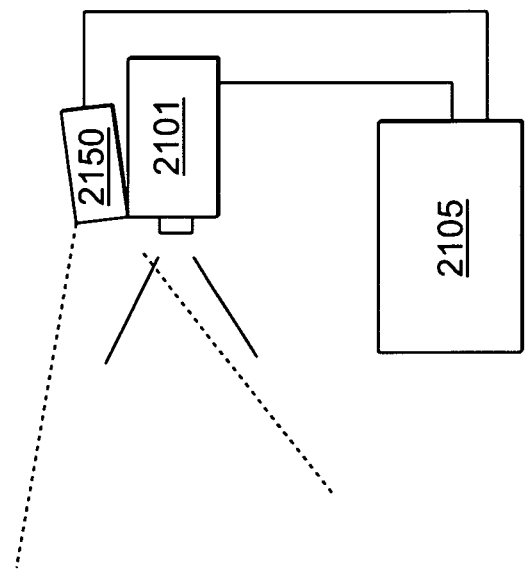
FIG. 21 illustrates embodiments for control of vision and projection processing steps, including methods for determining finger touch and physical detail location also in the presence of significant sunlight or other background radiation.
Figure 21:
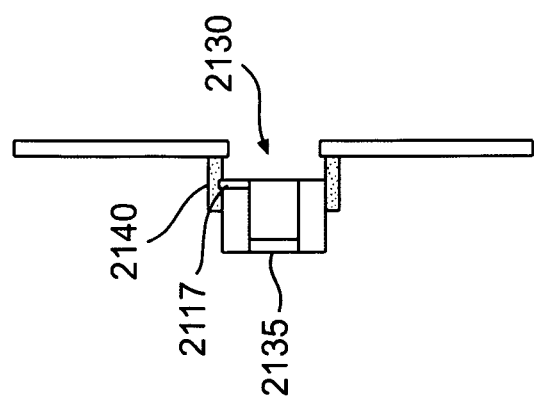

FIG. 21 illustrates embodiments for control of sensing and projection, and image processing steps, including methods for determining finger touch and physical detail location also in the presence of significant and variant background illumination.

There are basically two issues. First is to see the correct data with the camera or other detector, in the presence of what can be strong background coming from inside the passenger compartment. This situation is discussed further in FIG. 22 below.

The second is to identify from this data the physical detail position or finger location, or the movement of either. This can be done using relatively simple machine vision processing algorithms, such as image subtraction, blob analysis, edge transforms and the like. For the physical details this is made much easier as the knob/slider or switch datum's can be chosen to be of good or excellent contrast, and further can be made in easily recognized shapes, or colors (if colored light source is used). In addition they in locations known apriori to the system, such that one can look for the desired characteristic(s) in that location. For example in a certain annular ring, three targets on a knob, or alternatively one radial rectangular target on a knob would have to exist.

In the case of the fingers it is more complex and this is the subject of several figures below. But in the simplest case, and in the absence of strong background, one again is just looking for a round or oblong shaped blob in a certain range of sizes (typically just defined as an pixel area of blob) represented by the finger in contact with the screen The reflection from flesh in contact with the screen works well in this way, though using IR led sources at 940 nm I have found too that gloves, even many black gloves can also be seen.

As pointed out elsewhere and in co pending cases it may be useful to subtract the background with or without the illumination source on from the instant data. Because this can take longer, a higher frame rate than 30 frames per second typical of TV cameras is desirable for best results. This can be achieved locally with ease (e.g. in the region of a knob) using a pixel addressing CMOS camera for example, which can easily provide data to the computer to allow it to do several hundred alternate background subtracts per second Shown in FIG. 21 are processing steps to determine physical detail location. In this first example, the projector is the light source for sensing as well. The projector 2101 is fed data by computer 2105 to cause it to display on the screen 2110 whatever image is desired for viewing (which could be a blank image as well). In the back region of knob 2115 an annular ring of light from the projector illuminates the annular ring of the knob where datum's lie. In this case only one datum 2117 is shown, a radial line shaped one, but more datum's and other shapes can be used as desired to suit the accuracy requirements needed. The datum's can lie on the back of the knob on the driver side of the screen as shown above, which allows the knob to be transparent in its center. Or as shown in this figure the screen can be cut out to form hole 2130 in the center with the actual diffusing portion of the knob 2135 located on the knob itself, which rotates in a bearing 2140 affixed to the screen with adhesive or other means. In this case the datum's, such as line target 2117 are rotating radially like a clock hand.

Camera 2150 images the reflection back from the datum 2117 to obtain an image of the datum which is analyzed by computer 2155 to determine the circumferential location of datum and thence the knob, and thus the selection or value desired by the user. This datum may be in reference to optional targets on the corners of the screen or elsewhere used to register location, independent of camera position and vibration if present.

It should be noted that since measurement can be made very quickly using suitable cameras, that the projector need only be on for a short time, e.g. 10 msec.

For the sensing of finger locations, generally speaking the touch can be anywhere allowed by the projection program (typically indicating to the person where to touch) or alternatively in areas preprinted on the screen or on an overlay placed on the screen. These latter two alternatives are less generic and less likely to be used.

The touch location can be either of an icon box, or on a indent or bump on the screen, or more generally a random gesture such as sliding ones finger along a line of action, possibly guided by an indent or raised ridge on the screen.

For the generic case, one must be looking anywhere a touch can be registered and deciphering images obtained of the total available region in order to find the touch location. This can be either by directly looking at fingers, or alternatively by looking at something the finger does to cause variation in the electro-optical signal received, either in the intensity of reflected light, or in the position of imaged datum's. Both of these alternatives will be discussed further below, and have been treated to a degree in other copending applications.

For the direct viewing case, there are several possibilities, some of which have been discussed above. One can look for example for the characteristic shadow produced by the finger when illuminated from behind using light from the users side. Alternatively, and or in addition, one can search the camera image for the characteristic round or somewhat round blob forming a closed polygon when illuminated from the projector or an independent light source such as a LED from the rear. This characteristics can be assumed or in some cases taught, by just asking the driver to touch the screen in his unusual manner in a certain areas, and memorizing in the computer 120 say, the image signature. This too can act as a theft prevention mode too by going through this routine each time the car is started.

One can also train a computer based camera system, for example at the factory, said system having a neural net with different sized drivers fingers and colors of fingers so that it can be taught to recognize all reasonably possible variants. Such training as well could be for all possible positions of knobs sliders and so forth as well, and in the case of different lighting, such as with sunlight effects.

The knob targets are typically bright on a black background, but they could be reversed. In this way (dark on bright background) they would not be confused by stray light brightness zones caused by large sunlight loads It should be noted that the camera sensor system of the invention can identify touch on the screen, or a short distance from the screen, if sensitivity is increased. One thus can operate the system in two modes, only touch (also the occurrence of which can be verified with force or acceleration sensing), or with gestures which are directly in front of the screen, without necessarily touching. This also allows one to place an overlay on top of the screen and view touch icons on it, by looking through the overlay.

This later situation is useful where one might for example wish to have a large screen with no knobs or other permanent physical details on it, which could be used as a large touch screen. For example a 16×9 inch screen in a Military "Humvee" Vehicle, used for display of a Tactical battlefield map. Then when desired, you can place an overlay over the screen, if desired itself large enough to cover the whole screen area, and by seeing through the permanent screen, identify the position of knobs, sliders, switches or fingers, for example on the overlay. This overlay for example, might be specific to a certain Humvee Variant, or for example an overlay created, with its accompanying software, for a particular mission. Alternatively, certain parts of the overlay could be cutout to allow the base touch screen beneath to be contacted.

FIG. 22

Figure 22:
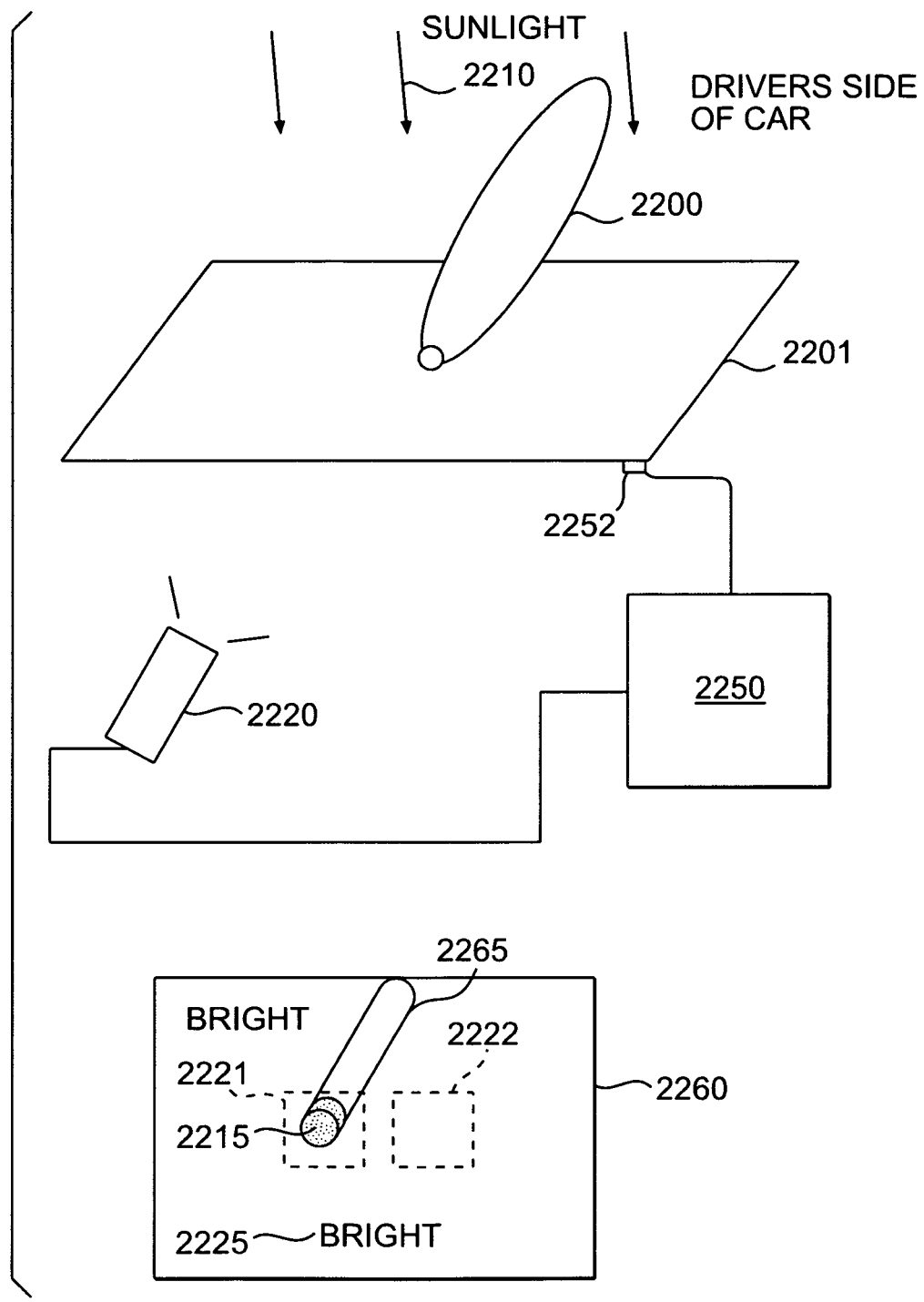
FIG. 22 illustrates further machine vision processing and screen aspects.

FIG. 22 illustrates further processing aspects relating to problem sensing areas, particularly lighting.

In a vehicle application, there is a particularly large variation in ambient lighting conditions in the passenger compartment to which the screen of the invention interfaces. This variation ranges from dead black at night, with no lights on in the car or in the vicinity, to bright sun pouring down thru the windshield, or a sunroof, directly on the screen. This situation can also occur with sun coming in from the side at certain times.

The question then is, what does it take to operate over this range? And secondarily for the bright direct sun case, is it required to so operate, since such lighting will wash out virtually any information displayed anyway, as it does today on displays which are in the open (and not hooded as most instrument clusters are for this reason). Prismatic films such as made by 3M optical products division can help with this.

I believe it is generally essential that the unit operate in all cases but the washout one, and even then I feel it should sense the physical details such as knobs, which then could be used for critical items to which washout of data was not an issue. In some cases this could require printing of characters on the screen (or an overlay) in addition of projected characters if it was necessary to always read something. In other cases the system optionally could, upon sensing via the camera of a super bright condition in the region of a certain knob (or the whole screen) switch over to a voice description of knob position for example if the actual the projected knob lettering could not be seen. Or the light energy projected can be increased in the problem region to allow visibility in sunlight condition.

In work to date, the invention in all embodiments has functioned well for sensing a night or in modest daylight conditions. And it has functioned in all cases for the sensing of physical details. This is largely because the datum's on the knobs for example, are shadowed by the knob itself.

But what about the fingers? Clearly direct bright sun can overpower the effect of any light source with in the unit. The answer to this is singularly or in combination to Use the peculiar shadow effect of the finger contact area;
Use the shadow outline of the finger;
Use specialized cameras or other detectors whose integration time or other sensitivity can accommodate the very wide dynamic range required;
Use a deflection based system which does not depend on light intensity for the answer;
Use another form of touch screen entirely, an appendage so to speak. This is always an option but is not "Free" like the optical ones (assuming the optical is used for knobs and such), and thus is not appealing for high volume use. A high grade touch screen of the capacitive field type can add $100 in volume.

Assuming as in the case of touch icon box actuation that we know the regions of interest where to look for touch apriori. In this case, we can modify camera function locally to optimize exposure for each region independently, and it should be noted this can be done in a general way, even if we don't know where to look a priori. One can also utilize a logarithmic response, or lin-log response CMOS or other camera (e.g. the FUGA 15 one also mentioned in a copending application) for this purpose, which is not bloomed or otherwise made unreliable, or inoperable by massive sun load.

I have found that by comparing the finger with the projection light on, to the projection light off, but shadowed, that a good answer can be found in almost all cases but enormous load. I have also found that just looking at the finger in the high sun load condition, without reliance on the projection light at all (From auxiliary IR source or the data projector) can also be used. Consider FIG. 22a, where finger 2200 is touching screen 2201 of the invention in a typical manner indicative of a push of a button, such as virtual radio presets. The camera 2220 observes the back side of the screen, and the image 2260 obtained is processed by computer 2250. In this case, the finger is flattened a bit at the end 2205 pressed by the person into contact with the screen, and this flattened area effectively shadows the sun light 2210, even though other portions of the screen are extremely bright. As a result shadow region 2215 in the camera image 2220 can be sensed and compared to the bright region 2225 around it.

In the case where we know where the shadow can be to make selections (E.g. on a projected preset) we can just look in those regions (e.g. 2221 and 2222 in image 2260), and if we have sensed a bright sun condition for example by looking at the sum of camera pixels in the image, if a shadow (i.e. a region of dark in a sea of bright) roughly round or somewhat oblong is there, like 2215, then one can assume that's a finger and determine if it is touching the button location in question. In this case it is determined that it is touching in the region of projected button 2221

Another way to do this is to sense the edges of the shadowed finger as shown in copending applications, and use the edge shape to predict where the finger is. This can make a prediction of location of the tip of the finger, even without the hard contact needed for the black shadow condition above. In this case with the edges off the screen, the finger shadow is grayer but still very distinguishable as a finger. This is also because the typical car of today has nobody in the front middle passenger position, and the drivers finger has to approach a screen in the center stack from a range of known angles from the drivers side. And thus the range of shadows in this manner is relatively limited. However, the variability of this is still a problem.

It should be noted that when a specific shadow condition is indicative of a finger in one instance, and a bright spot is indicative in another, then one can effectively solve for both, and if either is present, one can determine finger presence. And certainly if both are in the same place (this can occur when the finger reflects projected light from the region being shadowed due to finger contact, but where the background light is intense enough to shadow the remaining part of the finger around this zone, which does not reflect sufficiently as it is not in contact with the screen.

A shadow can be caused on the screen by something other than a finger, so it is important to look for shadows that have finger like shape and/or reflection characteristics. This also includes the unusual effects around the edge of the finger when strongly illuminated from behind which creates a gray boundary apparently due to light leakage around the finger and through the skin at the edge of the finger.

It is also or additionally possible to determine the general outline of this gray region and predict where the finger tip is, as has been described in copending applications. A Sobel transform of the image, for example, gives the outline in many cases of the total finger extension, particularly when the projection device (E.g. LEDS) is turned off such that no projected light returns from the finger. This technique can act as a check on a finger location determined from the black shadow indication or the projected light reflection or the comparison of those two. Other image transforms can also be used such as Houghs.

Another method of discriminating is to use a monochromatic wavelength of illumination, such as an IR LED or laser and to bandpass filter the return to the camera. This has been described in copending apps and previous embodiments herein. With the LED sources of choice this can by itself discriminate against most conditions other than direct sun. With laser sources, the band pass discrimination can be even better using narrow band interference filters.

Another method is to modulate the light source at a high frequency and demodulate the detection. With CMOS and other such TV cameras this can be achieved to a degree by electronically shuttering the camera, leaving it open, only when illumination light (e.g. from an IR LED) is projected Another method is to compare touch at different locations. For example, assume there are 5 radio buttons more or less in the same region of the screen. It is known logically that only one of the 5 will be touched and the other 4 purposely not touched. By cross comparison of light from the area of the buttons (no matter on what principle is used) one can find the one (touched) whose signal that does not correlate with the others (untouched).

Another method is to look for movement due to the touch, for example as one uses ones finger as a slider, moving across the screen. This is more difficult as a tracking function is required. But if one takes "N" readings of data, one can determine a trend in the data (e.g. movement from right to left on the screen). In many instances, even if a particular reading cannot be obtained, the function can be satisfactorily provided to the user (e.g. heat increased).

it should be noted too that the reflectors on the knobs/sliders switches if used can be retroreflecting corner cubes, or scotchlight material or alternatively diffuse reflective material, to suit the characteristics of lighting used to illuminate them.

To recap, for bright sun conditions, all knobs and other physical devices can typically be constructed in such a way that their very shape and location shadows light from the sun or other sources in the passenger compartment. Thus for those items, the projected light is what is typically used to sense, in any day or night condition.

For the case of fingers sensed by machine vision processing of direct camera images, then for sunlit conditions, it is useful to look for the black shadow of the contacted finger and compare that to the projected reflection image at the same location—which is thus shadowed. This answer can be further compared to the finger edge outline condition, which if present confirms the finger location. We note however, that sometimes other fingers can also be seen under such shadow conditions, so the edge outline case may not by itself be satisfactory.

To guard against extraneous indications of touch, which could occur in unusual lighting conditions or finger or hand movements in front of the screen, it should be noted that as disclosed in previous copending applications one can combine a force sensor or other sensor with the invention in order to tell that a touch has occurred. For example accelerometer 2252 located on screen 2201 can be used to sense that the finger has hit the screen (with a force significant enough to register a momentary detected wave in the screen). This signal can be used to tell the camera to read, and if more sophisticated processing is used, from multiple accelerometers, one can even predict the location of touch.

Acceleration may not be best for light touches which produce little shock to the screen member. In this case other alternative sensors can be used to indicate touch, for example resistive screen elements.

It should also be noted that for extreme sun conditions, when the screen washes out at least in ones ability to view it satisfactorily, that the invention comprehends sensing this condition, and increasing the projection or other display brightness or contrast. In addition, the display can change color, even to the point of switching to a negative image of what was previously displayed, if that aids in distinguishing data in sunlit conditions.

Figure 23:
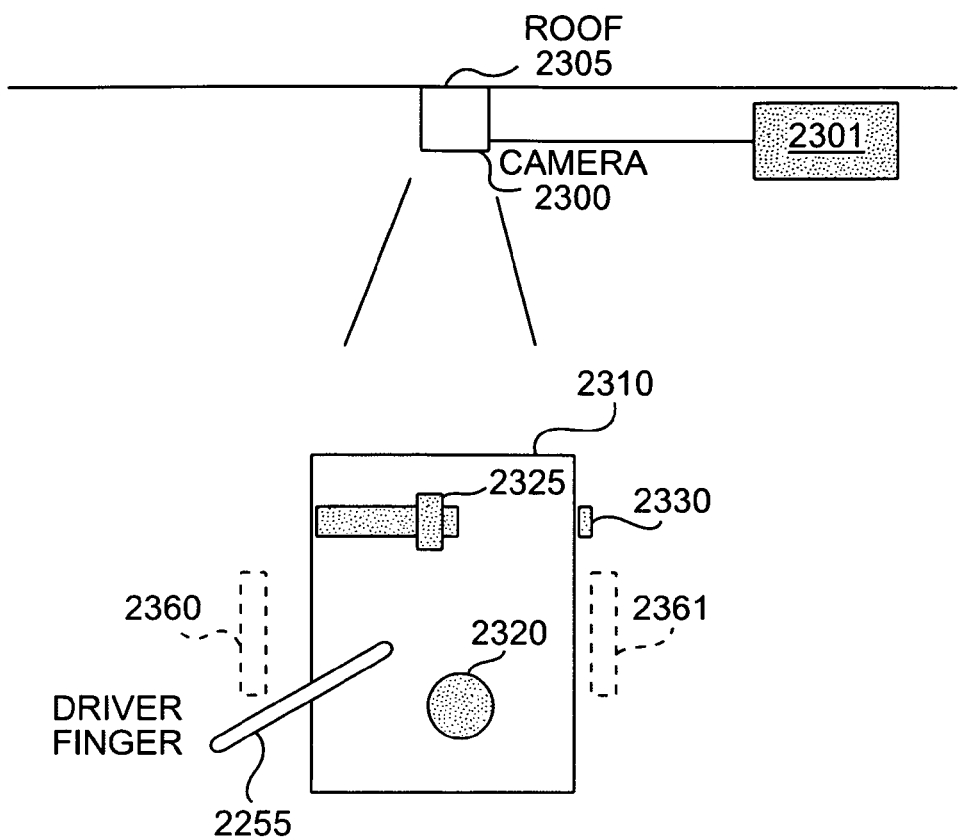
FIG. 23 illustrates an alternative instrument panel embodiment having a camera external to the display, and further illustrates other gesture and position based inputs.
Figure 23:
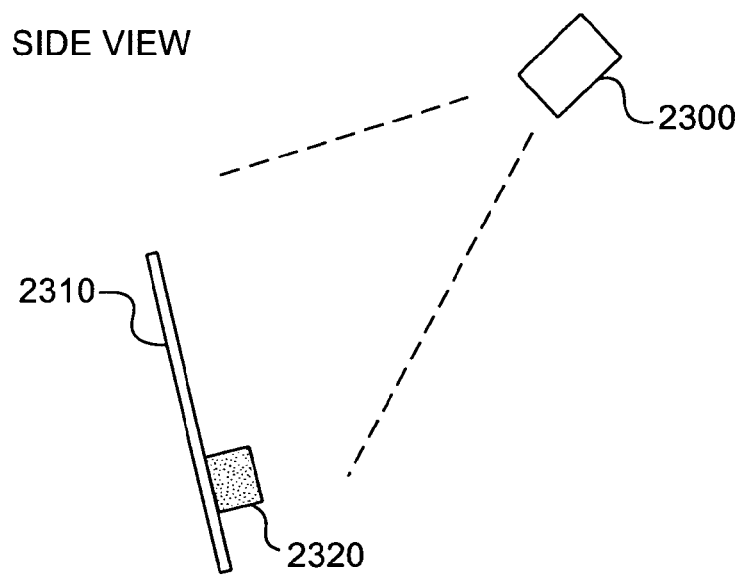

This change in brightness, contrast or color can also be performed selectively in those regions washed out, leaving the others unaltered, or not as much changed, to leave a degree of continuity with previous information. This is also true because in many cases the sun problem is fleeting, and adequate display conditions are restored after a short while. FIG. 23

FIG. 23 illustrates an alternative instrument panel embodiment having a camera external to the display which follows from the disclosures of the co-pending applications incorporated by reference herein.

As shown in FIG. 23 a camera 2300 connected to computer 2301 is located in the headliner or overhead housing of a vehicle roof 2305 and positioned so as to observe the instrument panel. The field of observation can be quite large but is limited in this example to the region of the center stack 2310, and the control display of the invention therein. (other co-pending applications have disclosed such cameras observing switch gear and hand gestures for example on the steering wheel and transmission lever area).

The use of such a camera type application has several appealing aspects. First it can look at a lot of different data, not just knobs, switches or fingers, but also the location of other parts of persons, and indeed other persons entirely. This can be used to detect for example, some ones head nodding off to sleep. And hand gestures in the passenger compartment can also be sensed While discussed here relative to the center stack in the front of the vehicle such an approach also allows one to provide added functions to rear seat passengers, without running wires or power. In short the camera image (or the similar flying spot generated image of FIG. 20) can be used to provide sensing at many points at once. This is useful for example if one has a DVD player overhead, and you want each person in 4 rear seats in a minivan to be able to operate it. Today, to do this safely (that is with each person buckled up) one would have to have two and possibly 4 control panels. All this costs a lot of money—and precious space. With the invention of this embodiment (and copending applications) a single camera and computer vision processor can do it, and the processing may be time shared with the control aspects of the RTD, saving cost.

To operate a camera one needs IR LED or other light sources, preferably invisible to illuminate the areas to be sensed when daylight conditions or other suitable lighting is not present. This can be easily provided by locating such sources typically in the headliner, for example even inside the housings of normal lighting of the vehicle. E.g. in a dome light.

The camera and computer in this embodiment example may accomplish several things. First it determines the location of physical details such as knob 2320 and slider 2325. Second it can determine the location of a finger such as 2255 touching the screen. This is particularly interesting here in that if the camera operates at a high enough rate, it sees the approach to the screen as well.

Third it can see a hand or other gesture. In other words one can signal the computer without touching the screen at all. For example one can determine the pointing direction of ones finger pointing at the screen or something in the vehicle which needs to be controlled. See also co-pending applications.

Another useful gesture is to nod ones head in certain manner, or move ones finger—for example when it positioned on the gear lever. Fourth it can see other things not on the screen.

The knob or finger location, or other datum location, can be determined relative to a previously determined position, or absolutely relative the cameras image field. Or as is often desirable, relative to some other point or points nearby on the screen which are fixed, such as trim indicia 2330 shown. Even if the camera should move a small amount, as it might due to vibration, the relative data is available in such manner as to determine the desired input from the relative location.

For directly viewed body gestures there is the possibility of having false signals. For this reason it may be desirable to only register such gestures when some other situation is present. For example ones hand on a gear lever. The finger can actually be a shift cue, like a paddle shifter in a race car. If you Flick your finger up it can be sensed by the image analysis software and the computer can tell the car to shift. FIG. 24

As can be appreciated, the machine vision based touch sensing disclosed in FIGS. 21 and 22 above can function with both hard and soft screen surfaces, as it depends on the image or other optical signal of the person's finger itself. And at the same time it can see the knobs and other physical details required for control.

FIG. 24 illustrates a touch sensing embodiment of the invention that utilizes deflection of the screen. This deflection can be measured in a number of ways, such as those of U.S. Pat. No. 6,008,800 by the inventor, also using if desired a computer camera based system which can see the knobs sliders and other physical controls as well. And a deflecting screen can have other functions providing tactile feedback by selectively expanding all or portions of the screen surface too as disclosed as well in referenced applications.

The screen outer member deflection under touch which is needed to be detected can be quite small (e.g. 0.010 inches, though this depends on the sensing method used), as is desirable I believe, i.e. that it not have too much "give" that the user feels it is too soft. It is however, noted that a soft deflecting surface may be safer in case of an accident than a harder one, and thus preferred at least to a degree.

We also note that it does not have to deflect in regions not touched. If touch activity is all in a certain area, the screen surface can be rigid elsewhere, and thus can be supported more easily.

Figure 24A:
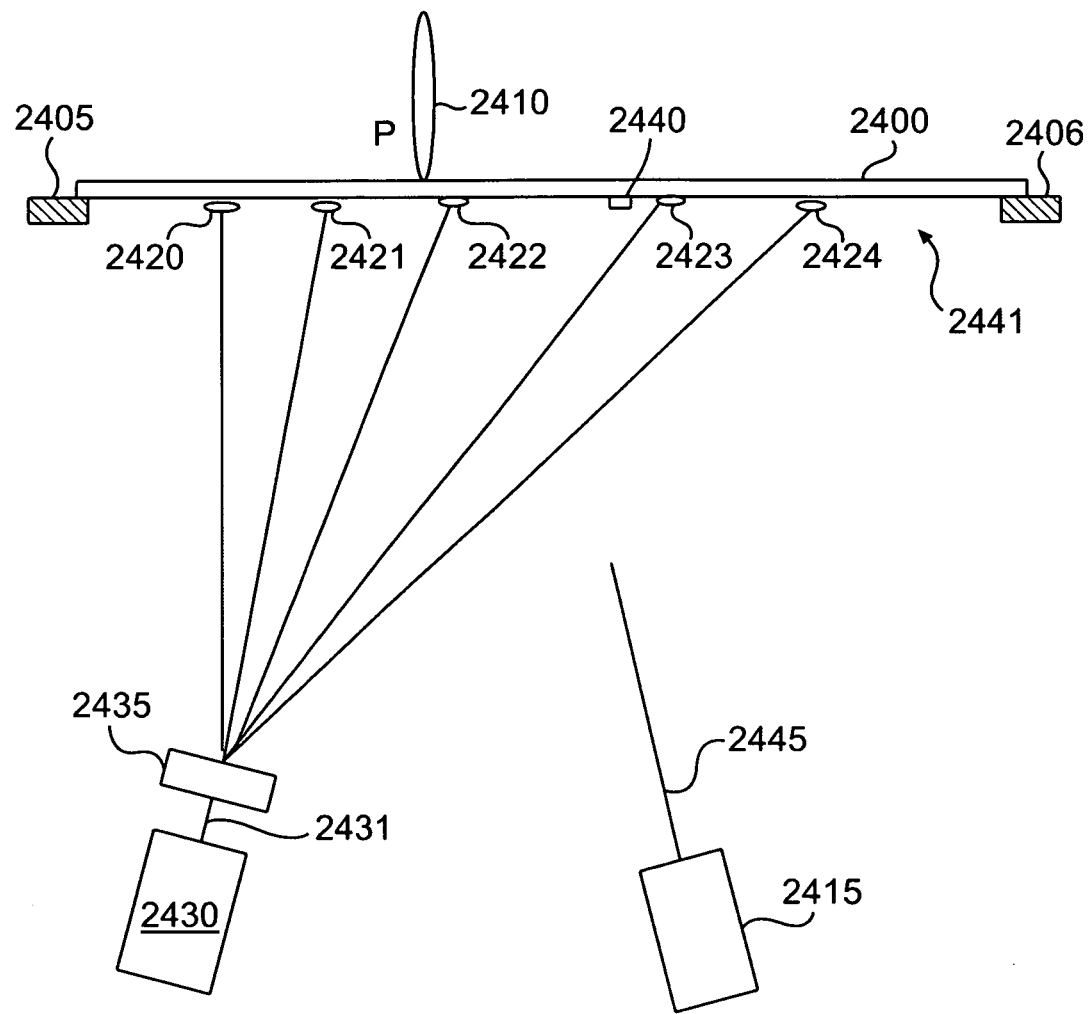

As illustrated in FIG. 24a, a screen 2400 is supported on its edges 2405 and 2406 (other edges not shown in this sectional view). As finger 2410 presses in the screen deflects around the finger and at all points between the supports, with the deflection at each point a function, for example, of the screen material, the support location and the cross sectional shape of the screen. Solution of the deflection equations can allow the finger location to be found in x and y, And if more involved calculation is undertaken, and enough data points are available, in z as well (which is thus related to the force of finger touch, since the more force, the more z deflection).

For simple systems, where deflection is expected in widely spaced regions, one can simply use the camera system to solve for maximum deflection, and where this is determined to exist, the touch is assumed more or less to be. For example in FIG. 24a camera 2415 observes a grid pattern of points such as 2420-2424 projected on the screen 2400 by ir laser 2430 whose beam 2431 is split into a pattern by grating 2435. This pattern and the camera field of view can extend, and normally would extend in both axes of the screen.

As the touch is made, the force of touch of finger 2401 acting on the screen 2400 supported at its edges causes the point P to move inward and this moves the projected point 2422 on a surface of the screen (in this case the rear surface 2441) more than the other points, which is determined by camera 2415 whose optical axis 2445 is spaced in angle from that of the laser and grating orders (and a computer associated therewith not shown) using for example triangulation processing contained in US patents by the inventor and his colleagues Alternative to projecting the points 2420-2424, one can have these points permanently a part of the screen, for example such as white mark 2440 on the back of the screen, which if a beaded 3M type blackened screen could be in a region where the glass beads were not present Alternatively the glass beads themselves can be used as such datum's, due to their reflection (and transmission, in the case of sun illumination from the passenger compartment). One can look at a single bead, but this requires high camera resolution (beads are typically only 0.002 inches in diameter). Easier is to correlate the movements of a group of beads, which effectively move together as the screen is deflected.

Figure 24B:
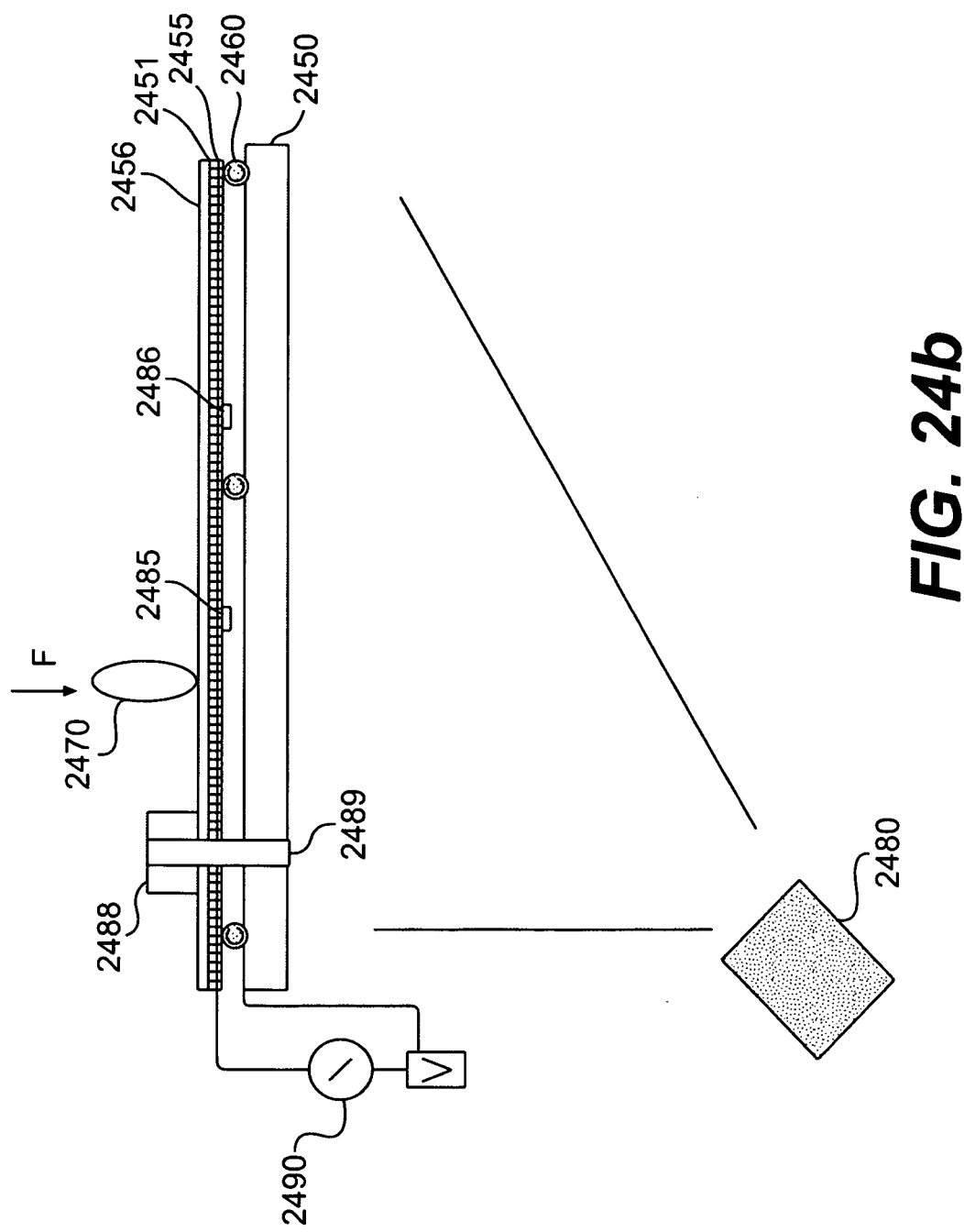

FIG. 24b illustrates a touch sensing embodiment of the invention that utilizes a relatively soft outer screen material such as disclosed in copending applications such as Ser. No. 09/568,554. This too is used with 3M beaded material which to function properly requires an air interface on the projection side.

As shown there is a rigid transparent backing member 2450 which supports a 3M screen material 2451 having beads on its blackened back side 2455, this screen material is further laminated to relatively softer plastic outside member 2456. The screen 2451 is spaced away from member 2450 by small spacers such as 2460 which are arrayed at suitable intervals. These spacers are small in diameter (E.g. a few thousandths of an inch and can be placed as needed, also considering the projection device). Spacing of beaded member from the rigid support member can also be achieved by air pressure, in addition or alternative to the spacers.

As finger 2470 presses in on the outer member 2460, it is deflected and eventually forced against the rigid member. This makes the projection not disperse properly at that point but doesn't matter as covered by the finger and cant be seen anyway. As disclosed above, camera 2480 can observe points projected onto the deflecting members or actually provided on them, for example datum's 2485 and 2486 whose movement under the force of touch allows one to predict finger location, since datum 2485 was observed for example to move 0.020 inches, while 2486 moved 0.010 inches or less given that the space was between it an the point of finger touch in one direction at least, meaning the finger touch was closer to datum 2485. This solution can be made in the other plane as well, where xy grids of datum's are employed (as is usually the case).

This soft screen does not impair knob or other physical detail function. A knob (or other physical detail) 2488 can be attached to the screen outer surface in an area where it is more rigid, or can be secured to rigid backing member 2450, as shown using a pin and post arrangement 2489.

It should be noted that moiré grids can be used to optically process grid data to determine changes due to touch by providing a reference. However one can also just remember in the computer memory where the previous points were located, and look for change in their position.

In the same vein one can calibrate a screen for its deflection characteristics once built. For example, one may indent the screen with known forces at a representative grid of spaced points, or if known apriori, at all the points one would like to sense touch (or z axis knob location, or z axis switch location) at, and determine the response in terms of deflection. By storing in computer memory the values, also at multiple points across the screen surface, one can correlate any future touch to these values. This is particularly effective since one also in many applications has control over where on the screen the touch point icon boxes one might use are to be projected. It is often not needed to have a table of more than 50 force positions where deflection is known and calibrated. Some systems can make do with 10 or less. This is not costly in terms of either processing time, or calibration and test in factory. It alternatively can be done in situ after the car is manufactured as well.

The calibration can also be specific to what is desired to see. For example if all that was desired was to determine which of four radio buttons across a screen were pushed, this could be done by just calibrating the deflection seen at different points on the screen, when a typical contact force was exerted at those points in succession. The data taken is then used to correlate future events to those touch indications, when radio buttons are projected in those locations.

(or in general). The deflection is compared at each of the locations and to the known ratio of deflection at the time of calibration.

Since the spacer such as 2460 separate the two members, it should also be noted that these members on their adjacent faces can further incorporate resistor elements to register presence of a touch signal, or the location of touch, the latter in a manner similar to conventional touch screens of the resistive type.

For example consider optional transparent electrodes on adjacent faces of members 2450 and 2451 respectively, connected so as to register a current flow in meter 2490 if they are in contact when a voltage V is applied.

In operation, one can purposely not utilize camera 2480 to sense touch until computer detects some minimum level of current flow in the circuit between the transparent electrodes. If presence of contact is all that is required, the electrodes can be relatively far a part on the surface of the screen, since the accuracy of location is not solved by the resistive device. A simple matrix type of resistive touch screen technology known in the art can be used in this case, particularly since one has in many instances apriori knowledge of where on the screen the user is to touch (i.e. where projected data occurs).

In this mode and others described herein, When a force or current or other touch condition is detected, the system is programmed to look, minimizing the chance of false signals due to unusual lighting conditions. It is also noted that one or more modulated break beam type LED and detector pairs external to the screen, such as 2360 and 2361 shown in dotted lines can be used to detect the touch presence, as can cameras external such as also described in FIG. 23.

Discussed now is an embodiment utilizing an organic light emitting diode (OLED) display, which is self emitting and has a more compact layout than that of a rear projection versions, while still having many useful features thereof.

FIG. 25

FIG. 25 illustrates an alternative OLED based display device employing camera based physical detail sensing of the invention and touch sensing also using deformable screen based touch capability described in the referenced patents and applications.

Shown in FIG. 25 an OLED Display 2501, for example of the type described in U.S. Pat. No. 5,739,545 by Guha et al, including a backing member 2502 mounted in automobile instrument panel 2503. In this case the pixel elements of the display 2501 are self luminous and no back lighting is required, as it is with LCD flat panel displays. In addition, many papers predict that such OLED displays will also be able to be economically made curvilinear, rather than flat panels, a very desirable feature for instrument panel use, especially when large in size so as to conform stylistically with the rest of the vehicle.

To utilize this type of display, the form described by Guha with a transparent substrate and at least partly transparent cathodes and anode structures is desirable as it allows a degree of transparency to certain wavelengths such as that of light source 2504 on the rear side, where also is located camera 2510 which in this invention is used to sense control detail positions and persons touch locations. To avoid problems with human vision seeing the source, a desirable wavelength of source 2504 is in the near infrared, for example at 880 nm. But it is recognized that the choice of illumination wavelength also may depend on the construction of the OLED device itself.

It should be noted that one can also light the datum's on the knob, or the finger touch, using the light from the OLED elements themselves, assuming such light can be retransmitted back thru the OLED display to the camera or other sensing device used. For example a group of OLED pixels 2511 can be used to illuminate datum 2550, in addition or alternative to the use of light source 2504.

In this example, the camera 2510 is used to see both datum's such as 2550 on the rear of knob 2520 or the finger 2525 touching the OLED display front surface 2526 (or an overlay 2527 thereon). The knob is secured to the display by appropriate means, and a bearing 2551 it rotates on or in can be bonded to the front of the display or overlay. Alternatively, a pin through the substrate 2531 of the display may be used to secure the knob, and if desired transmit rotation of the knob to a datum on the rear of the substrate which rotates with the knob and can be sensed by the camera, as taught above.

As noted elsewhere, in this example the determination of touch and touch location is by direct view of the finger. However, to effect this it is not necessary to see the finger in total. For example, due to the OLED structure, there may be circuit regions which are not transparent which prohibit one from seeing the finger (or physical detail such as a knob, if datum's are located on the drivers side, rather than transferred for example by the pin to a rotating member on the rear of the display such as taught in figures above) at all points. However enough points can generally be seen, such that a sufficient estimate of finger location or knob position can still be made. As one processing example, a finger shape and size template can be stored in the computer and sequentially matched to the instant image, to find the point of best match and thus the likely finger location Another way of optically sensing finger location on the OLED display shown is to determine deflection of the display when finger force is applied. This has been shown in co-pending applications and other embodiments herein. Alternatively, the whole screen force based displacement can be solved as noted above to obtain touch location.

The invention herein can be used with inorganic electro luminescent displays as well as organic ones.

It should also be noted that LED sources can be utilized with a normal white light projector to be used as a back up to a white light bulb, so that in the case of bulb failure, the LED or LEDs can be used to provide usable screen illumination if need be. The LED can be on all the time as a supplemental source, or energized when bulb burn out is detected. And it may not be necessary in this case to have all colors displayed, thus LEDs with particularly powerful and visible wavelengths may be used, with out regard for having a beautiful white balance. To a degree this is true in all cases, if one does not wish to represent true color images on the screen. The later is desirable surely, but not needed for control or other vehicle operational purposes.

Another method of helping keep things going in case of bulb failure is to illuminate only key portions of the RTD screen with the LED or LEDs.

Finally, another example is the case of an RTD control using virtual controls on the touch screen portion, and physical controls (knobs, dials, sliders, switches, any or all) on another portion (which also may have touch capability too). Typically the virtual portion would be the top portion, the physical the lower, but not necessarily. The reason for this would be to put the expansive image portion capable of providing backup and other images in the line of sight of the driver. This portion would not be cluttered with physical devices, generally speaking. And key controls could be a bit lower and out of main the sunlight load (see below).

It is desirable that the most critical controls be physical, since they are easiest for people to understand today, and importantly, they can be easily grasped and worked, even if the total control space is brightly illuminated by sunlight which can tend to wipe out both the displayed image and cause potential trouble for some kinds of touch sensing. One can also used the sensed data from the camera of the invention to control the illumination power to increase same where sunlight is tending to wash the display out. In some cases this could mean changing colors of the display as well in order to produce colors such as green which are more readily viewable by the person, assuming that the projector itself can produce green as efficiently as red, for example.

It is desirable to make the display optimally bright in critical areas where control functions need to be executed. In is not necessary on a large area display having video image areas not used at a given time for control purposes, to necessarily increase all areas at once. Thus in some cases such as scanned laser projectors disclosed as FIG. 6 above, one would then scan for example only the key areas, but one could scan them at a higher repetition rate or other ways effectively increasing the duty cycle for those regions and thus the perceived light in them.

As noted in copending applications, the invention can be used as well for home control applications, for example of ones range, microwave, fridge, washer, dryer, stereo, TV etc. This desirably shares economies of scale with the automotive application, as well as potentially its control layout which allows ease of operation of both car and home, since the knowledge of its use is also shared with historic devices, particularly washers, dryers, and ranges almost all of which have knob based control panels.

The screen of the invention too can show TV programs, especially nice for a control mounted in the Kitchen as it likely would be. With a lens/mirror change a projector version of the invention can even be reconfigured to project large screen TV images on a wall of an adjacent family room for example.

The video display can also serve to see live video of baby's room or front door (assuming cameras are placed there and properly interfaced by wireless or other means), access the internet (also using the computer in the invention, see general purpose discussion below), wireless video feeds from cell phones, etc.

Where the computer used in the RTD invention for image processing and display is a general purpose processor (e.g. Intel Pentium 4 based) and software (such as a Microsoft Windows), it is possible for the computer to be used for general use in the home, or in the car when stopped, and the system is easily integrated with other optional hardware or software from others. And because the machine vision processing is include to solve for knob or finger location, it is possible to use the image processing function to solve for other events as well. This is especially true, since the demands for control per se using turning of physical details or finger touch are relatively infrequent.

For example, It can be used to monitor baby position, in the car or in the home. It can be used for a variety of vehicular tasks such as lane following, observation of cars on the right or left and their position, and so forth. All this is possible as the vision is essentially free, if one has it there anyway and provides it in general purpose form.

In this situation, where processing capability is being shared, it is desirable to prioritize the tasks to be performed, giving priority to acting on the drivers commands, and safety issues such as imminent crash threats exterior to the vehicle, with relatively lesser priority to those not related to vehicle control or crash situations, such as monitoring persons or objects in the vehicle Interestingly, many useful functions which use processing power available "for free" can be accomplished in periods which control issues normally addressed by the RTD Touch or Physical details are not required.

One such optional machine vision processing use mentioned in previous applications has been for backing up. A task which can have high priority as it is stressful, but only lasts a short while. It is unlikely any other control functions are required while doing this. The vision processor can find the edges of vehicles or other objects potentially in the way, and particularly where stereoscopic cameras are employed, determine in real time the distances to them as an aid to the driver. This is much more data than possible with simple ultrasonic sensors used for backing warnings today, and in addition can show on the video display, where the problem is. Conversely, as also noted previously, the driver can touch the problem portion of the image he sees on his backing up view displayed and the camera and vision processing portion of the invention can continually monitor that location.

Another example, is at intersections, where cameras located near the headlights for example and pointed outwardly from the vehicle to the right and left can be used to look for likely signatures of vehicles in motion, and a signal, such as a sound or light given when such motion exists (the absence of motion meaning the cars entering the intersection from the right or left have come to a stop, or there are no cars on the intersecting road in the vicinity)

As a lower priority item, but one to be undertaken constantly, the Machine vision processing of the invention can also monitor switch locations of controls in the front or back seat areas if cameras are placed there for observing same.

It should be noted that the big horizontal display space in the region at the top portion of the instrument panel afforded invention, is optimal for providing two side by side images. In the case of the intersection, it can be from the two cameras one in each direction. Or it can be from one camera and some data concerning the image or some completely separate data, both displayed at once—a big advantage.

Another point is that because the screen may be a touch screen, the user may touch an object image displayed (eg a car ahead) or with a finger gesture he can quickly draw a circle around the object, which data can be sensed and the appropriate action taken, such as locking the system on that image to track it (and the object it represents) relative to the users car.

It is noted that a general purpose vision processor to share tasks can be provided independent of the Instrument panel tasks. In addition another display than that of the RTD can be used to display video data or information. However when all these functions are combined, maximum cost effectiveness results.

On another note, it has been estimated that 60% of the vehicles on the highway have only the driver in them. It would thus be safe to say that 80% or more have only the driver and the passenger in the right front seat. The typical provision of the vents high in the center stack, in the middle of the dash, is likely to provide the best air distribution to the 20% or less of the passengers in the rear seat, as well as fresh air to the face of the driver and passenger, thought this is also achievable with vents in other places. And these vents for the purpose of rear seat passengers could be even less required, given the trend toward special rear compartment vents in cars having rear seats. (today nearly all higher class vehicles have this now)

So then is it necessary to have vents high in the center stack? They are there to give best distribution at lowest cost, and to allow the driver and passenger to direct them on their face. But I feel they are also there because there is no really valuable thing to put in their place. In other words to make having an alternative arrangement valuable enough to compensate for the relatively small disadvantage entailed.

I feel that the invention changes this equation. The valuable thing for both safety and convenience to provide an interactive display, such as that of the invention, in the drivers best line of sight high on the centerstack/dash. The invention is not limited to this arrangement, however it is thought that location of the vents to the sides, or to the bottom, or somewhere else entirely (e.g. a user controllable pop-up vent on the top of the dash) frees up this very valuable space.

It also should be noted that for a larger instrument panel display (e.g. 12-15 inches diagonal, assuming a pure rectangular format, which it doesn't have to be), only two technologies seem today to cost effectively apply (neither one of which is the conventional LCD Flat Panel Display used for navigational displays and the like and generally 5-7 inches diagonal today). The first is rear projection on to a simple passive screen/control surface, in which a small low cost display chip so to speak with a large number of pixels is magnified by projection optics to fill the screen, or alternatively one or more beams (of different colors) is swept raster fashion by a simple xy mirror scanning device which itself may be a semiconductor or other chip (e.g. a Microvision company MEMS type). Both types used for rear projection can use solid state light sources, such as lasers or LEDs, particularly if a wide range of color fidelity is not required, the case in many control system applications using the invention.

The second method thought to be economic in the future, will be Organic light emitting diode displays (OLEDs) which may contain a large number of low cost addressable emitting elements. Here again, we can expect to employ this technology sooner if color fidelity is not needed.

It should be noted that for near term use in automobile instrument panels, full color presentation is desirable, but not required. The same holds true for high display resolution. The invention can use monochrome, two color, three color or any combination of colors including full renditions, as the financial justification of the application allows. This issue is particularly of interest as one considers ultra long lifetime solid state sources which today may not have high grade color rendition For most automotive control applications studies by transportation researchers suggest that lettering for controls in the center stack more or less on the drivers line of sight, should at least 5 mm×5 mm per letter, and larger perhaps for elderly drivers and others who benefit by it. For a resolution density of 5×5 pixels (25 total) per character for example, 5 mm high letters would thus mean only 250×250 pixels need to be projected for a 250×250 mm (10×10 inch) display. This is easily achieved with even modest display technology today. Of course, higher resolution allows more dense displays, for various navigational data and other images that could be desirable.

The invention allows the commonly used controls, like the climate control or radio to be utilized in a conventional manner, compliant with FMVSS 101. But the space is shared with other control functions. In addition, a large display is provided in addition, which serves as well as an auxiliary control surface to have virtual controls The large display surface also allows one to have some windows type control screens side by side, rather than sequentially addressed by a joystick. And one can have them operated by touch as opposed to with a joystick selection as well, as used in the BMW I-Drive This is much more intuitive and safer, and quicker.

BMW makes claim that a large number of things aren't done while driving, and thus you don't need to have a very intuitive means of easily performing them. But I take issue with this. Many people on road trips would like to make a small change to occupy their time on the road productively. FIG. 26

FIG. 26 illustrates an advantageous arrangement of the RTD in a sloped instrument panel control and display surface 2610 of the invention including power operated vents 2611 and control knobs 2612 and 2613. In this illustration, the display/control surface is approximately 13 inches high and 10 inches wide. The 13 inch height extends up to the point int the instrument panel so as to use the space commonly occupied by vents in many vehicles.

For those vehicles which have the dash sloping away as shown (to give a desirable feeling of extra space) it may be difficult for a belted driver to reach at the uppermost point. Thus the display in this region would be primarily for display rather than control purposes.

A set of one or more vents 2611 are located near the base of the windshield in the sloping away portion of the instrument panel. While mechanical cables can be used with driver controlled levers for example to actuate them, in the example shown the vents are activated via electric motors which may be controlled for example using control features on the RTD surface to save cost. Such vents can be provided in such a way as to sweep back and forth or up and down automatically to aid air distribution. Or they may also move to desired memorized preset situations for different drivers or passengers, also adding perceived value to the vehicle.

By providing vents in such a way, the key area of the instrument panel is reserved for important display of data, and the ability to act on the data, for example when data is touched in a relevant location using the invention to confirm or acknowledge or otherwise act on the data.

Also shown in FIG. 26 is a front view of an example of an instrument panel area (shown in dotted lines) which extends approximately 1-2 inches to the left of where the aforementioned RTD would be. This can be achieved for example, if the steering wheel 2640 is made smaller in diameter, allowing one to see and actuate controls such as virtual or physical buttons in the extended region 2670 shown in dotted lines. The steering wheel of smaller diameter may itself be enabled by providing the speedometer and other typical instrument cluster gages on the surface of the RTD itself, thus making it unnecessary to look thru the steering wheel at them (a factor which requires larger diameter steering wheels).

While it can be appreciated that the display and control surface 2610 can extend further down, The display at the bottom is shown to approximately end at the point at which vision is difficult without taking eyes off the road, and as well in some vehicles the point at which a gear lever can be in the way.

Finally a note on force feedback. The Immersion Corp patent on which the I-drive is apparently based discloses a force feedback function to the person operating the device as, in effect, a glorified mouse. This motorized detent function feedback is the big feature distinguishing this control from those before it. But in reading over 20 different descriptions of I-drive motoring experiences in the automotive press, I have yet to hear one mention of this feature. In other words, it has apparently brought little or no utility to the new or casual user of the system.

The instant invention also has the ability to provide force feedback to the user also disclosed in copending applications. The force function is most simply applied thru the screen to a finger touching the screen, fingers turning a knob, or sliding a slider or touching a rocker switch or what ever. We thus need to ask, will these features be also ignored in the press (and thus of little utility to the motoring public) and if so why?

I don't think this will be the case for the following reason. The force feedback, vibratory or otherwise, is generally applied such that it can be felt at the point at which the person is physically touching something that displays directly what it is. Thus the force function in the instant invention serves primarily to reinforce a quick glance, though in some cases the control display could be used entirely by feel. This seems to be quite different than the purpose of I-Drive force feedback, which apparently is to reinforce something you already know, (e.g. that you are turning something, or selecting a menu category found by moving the stick to the right). In the primary application of the instant case, we are glancing briefly and then using the force feedback to assist us by taking over the function if needed.

It should also be noted that the scanning unit of FIG. 20 has a large depth of field, and together with a convex screen shape, it is possible to project sufficiently focused information on this screen over a wide angle from a short distance behind the screen, from a position toward the center of the arc of the screen, often without the need for mirrors and other elements. This simplifies the system, reducing depth and lowers costs. Costs are also reduced with convex display surfaces as expensive fresnel lenses are not required to collimate incident radiation in the situation where limited angles of acceptance of screen diffusing material (such as 3M Vikuti) are used The screen can even have as noted a variation in depth in the direction toward the driver, which might be a jutting out ridge, or an indented large oval screen or whatever. This allows a great deal of stylistic variation in the display and control features provided the automobile manufacturer or user.

In some cases it is also possible to project data over a wide angle on a convex surface, not just using a flying spot projector scanner of FIG. 20, but from whole field light valve based projectors such as LCD, LCOS or DLP chips for example, I feel the RTD invention herein can save cost it is felt even over conventional instrument panels today, as well as the reconfigurable ones having displays with which it directly competes. This is because, for example, it allows one to replace some of the switch gear, wiring, and other components of the vehicle, reduce the complexity of the installation, and minimizes design and retooling costs.

The elimination of components also can result in a weight saving of the vehicle, further reducing cost.

In situations of high sun load for example, When the camera or other detector of the invention senses increased radiation on the screen from inside the passenger compartment of the vehicle, the display intensity can be turned up, or added illumination sources switched in to augment the normal one. Or the display can purposely illuminate the region of the screen with high sun (or other ambient light source) load more than others. This can be done for example with a flying spot scanner such as FIG. 20 by just scanning that region 3 times, for every one scan of another region say. Or by controlling intensity as one scans. Or by adding the light of other sources.

FIG. 27

Figure 27A:
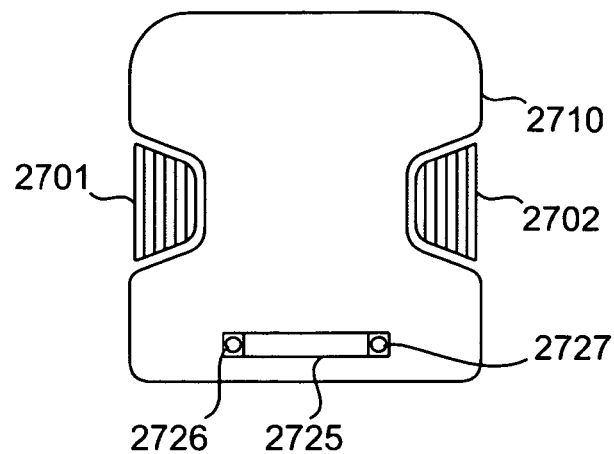

Because the screen can be irregular in shape, it is possible, as shown in FIG. 27a to have air vents such as 2701 and 2702 at the sides of the screen/control surface 2710, which can fit around the vents, thus conserving space. Alternatively or in addition, the screen can wrap around vents located at the bottom or top or other locations. This arrangement also allows one to label the vent itself in a programmable way. For example showing high—for high velocity air from the vent, or showing the vent direction. And the temperature from the vent (which might be sensed individually at the vent) could be shown as well. Such capability is not present in current vehicles, and could be a selling feature.

Figure 27B:
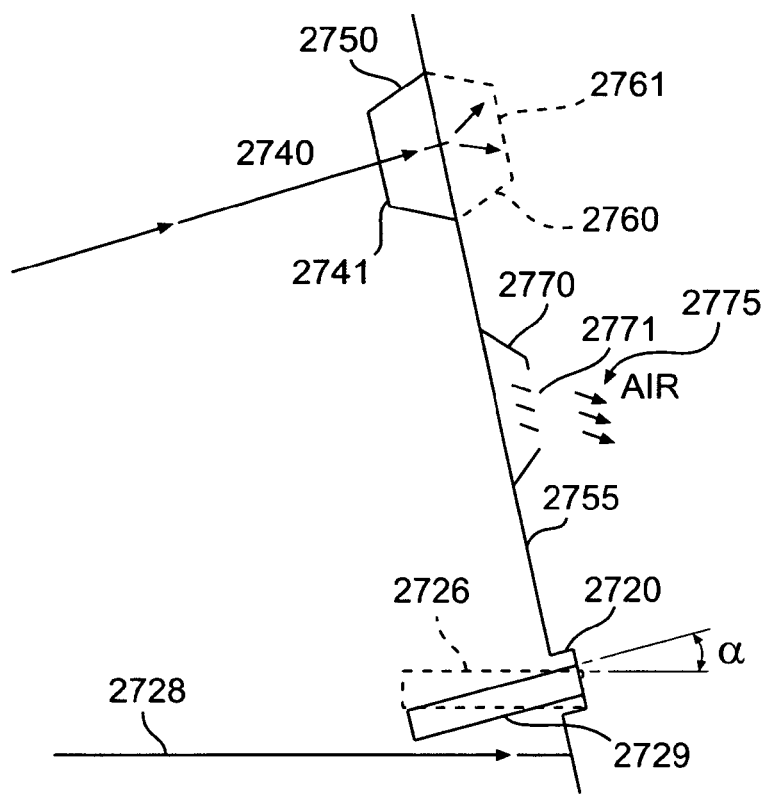

In some cases it may be desirable to have air distribution vents located on the screen itself, which is made possible in the invention as shown in FIG. 27b. As shown light from the projection source 2740 passes thru the rear surface 2741 of clear plastic vent plenum 2750 and out through the screen 2755. Alternatively the plenum can be in front of the screen as shown in dotted lines 2770. Where vent louvers are desired, illustrated by a second such plenum 2770 having louvers 2771 (emitting air blast 2775) in the section of the drawing, the projector would generally be programmed to project no light there. Otherwise the projected image passes thru the plenum and is observed by the driver on the other side.

Because of air condensation possibly on the plenum walls it may not in some cases be possible to project high resolution data in this region. Version 2760 can also work with LCD or other flat panel displays, with the plenum attached in front thereof. But these generally do not allow projection thru to a scattering surface which can be on the plenum front itself, such as surface 2761. Where this is done, the scattering material of the screen in the region of the plenum 2745 is deleted such that light passes through to the front to be scattered by surface 2761.

FIG. 27 also illustrates another point namely that one can have a slot or other shaped cutout 2720 in the screen, in to which is mounted a device such as CD Player 2725, into which a user can insert data storage media for example. The player can be mounted right to the screen as shown if a sufficiently sturdy screen is provided. Fastening means such as bolts 2726 and 2727 may for example be used. In this situation, it may be desirable to mount the device as shown in dotted lines 2726, at an angle alpha to the normal to the screen surface such that its sidewalls are more or less parallel to the diverging projection radiation 2728, in order that obscuration of the projection by the cross section of the player is minimized. Just as in the vent case, one can project data 2730 concerning the media or the player state right next to the player on the screen.

FIG. 28

FIG. 28 illustrates further TV camera based applications also including near IR light sources, which may if desired, use the computer processor of the RTD. In many countries some critical markings are poorly illuminated or of minimal contrast and cause difficulty when driving. Or in other cases it is desired to rapidly see a sign, for example of a store while driving down an expressway at high speed.

Consider for example the name of a street 2800, etched in stone on a house 2801 on a street corner in Italy. Typically there is low contrast of the street marking and it is poorly lighted. When driving in traffic at night such a marking is often impossible to see while keeping ones eyes on the road.

Using the invention, herein a camera 2820 connected for example to the vision processor 2821 of the RTD (or another suitable processor) is aimed outward from the side of the car 2825. And if desired, another camera (not shown) is aimed looking outward from the other side of the vehicle. A sufficiently powerful Near IR LED light source 2840 (which may be strobed and synchronized with the camera if desired) illuminate the house markings up to the second story. (they are usually on a wall just below the second story). As the car travels down the street, the camera continues to read the images coming in (say every 0.05 second) and character recognition software such as that provided by Cognex company in Natick, Mass., determines the name of the street it finds and displays it on the screen of the rtd or vocally annunciates it). If sufficient light power, and slow enough car speed, the data can be gathered on the fly without blurring beyond the ability of the software to determine the name.

The picture of the street sign can also be displayed on the RTD screen 2850 in the vehicle. This also provides a manual back up in case the system can recognize the existence of the sign (and cue the RTD to display it), but the software cannot discern the alphabetic characters. The sign image can be held in memory as well to give the driver a much longer time to view the image than he would other wise have had using eyesight alone. In the simplest case one can use only a visually displayed image, but if this is the case one would have to display a stream of images which could be distracting to the driver when in motion.

To aid in such activity it would be helpful to have retro-reflective street signs (or other markings as desired). This would vastly increase the ability to make such readings quickly and with certainty that it was a sign of interest being read. Color or other types of codes can be used as well to indicate this. Many signs on freeways are made in this way now and can also be read in this manner, through the cameras would need to be pointed ahead.

Also shown in FIG. 28 is the addition of a one or more additional cameras such as camera 2860 looking forward into the path of the vehicle over a wide angle. Typically, but not necessarily, this camera might be reasonably close and parallel to the drivers line of sight when driving normally down the road, such that the display of the cameras image would be centered on the display in this manner as well. This camera may have IR bandpass filter 2861 in front of it (as could 2820) in order to preferentially accept IR Radiation. In this case however, it is the radiation from two sources external to the vehicle, namely the IR headlamps (or Tail lamps) such as 2870 of oncoming cars or cars ahead and the IR radiation of stationary "light houses" such as 2880 located along the road. 2880 for example could be near a railway crossing and either always on, or caused to be illuminated, perhaps with a 5 HZ flashing light, when a train is coming. Or it could be at an intersection when cars coming are sensed. There are a great many examples where this could be valuable, and it does not require radio communication to the vehicle (such as a wireless intelligent highway proposed warning device would).

The RTD not only contains the ability to process the images so obtained to aid the driver, but to also display them in a size large enough to be useful. The display screen at night, might normally be programmed to be black in a certain region which the driver could easily see, in the absence of any IR of the set wavelength being acquired by the camera. Repetition rate or other criteria could also be screened by the RTDs processor if it was desired to discriminate the inputs further (eg a headlight on continuously, versus a lighthouse near a crossing blinking at 5 HZ.). When an IR video image meeting the criteria set was obtained, this would be immediately displayed in the window of the screen. This image would stand out, especially at night, and be itself like a warning light. But if the image had meaning, for example flashing (at a repetition rate lower than the camera frame rate typically) or moving up or down, or if it was of a certain shape, or if it was obviously coming closer, then the driver would also be more informed. And he also can immediately see the relative position of the image on the screen, relative to his vehicle. And this image could be acquired from a long distance thanks to the camera sensitivity and the IR source power (which, like 2880, can be high without blinding anyone in the visible). This gives an added margin of safety over what is possible today.

From a military view point it is noted that an interesting feature of the invention is that the core elements—computer, projector and camera (or other sensing device) may all be in one small, armor plated box. The screen and physical controls if hit by shrapnel or the like can easily be replaced or fabricated locally. This is particularly interesting as the screen size increases in vehicles or other weapons systems. An alternative LCD or plasma screen of large size is difficult to protect. In addition the screen of the invention can be of bullet proof transparent material, and the knobs etc can be Kevlar if desired.

It should also be noted that the display of the invention can be entirely in the near infrared which allows it to present no visible target to enemy fire, but may be operated by troops having night vision goggles or other equipment on. The printing size on the screen can be increased in this situation if the goggle resolution is lacking (going back to normal size, when the display is switched back to the visible, easily accomplished with IR and Visible lasers such as in the display of FIG. 20). As noted the invention is excellent for allowing maximum operation efficiency in stressful situations needing quick reaction, possibly to large amounts of data. It is both intuitive and easy to see and work.

The driver passenger in the front seats of a vehicle are in relatively fixed positions, it is possible to generate on the screen of the invention an autostereoscopic image using lenticular or other techniques known in the art which can be viewed by the driver in such a manner as to provide more information to the driver, and/or to allow controls of the invention which can be sensed for example in various z axis positions into the screen, to be used to control 3-D data images on the screen as well as controlled functions of the vehicle.

It is also noted that reflection of light from datums (also called targets or markers if put on specially for this purpose) on knobs and sliders and other physical details has largely been described herein as the means for determining their linear or rotational position with respect to a fixed point on the control surface, or with respect to the camera or other sensing device used to determine datum location. However points on knobs for example detected by the camera are typically reflective, but can be self-luminous. This can be done either by providing electrical wiring or fiber optic wiring to the knob to do so, or by using light from illuminated nearby portions of the screen to flow into the knob, and back to the camera. This can be done by designing the knob out of plastic for example having suitable optics within it to cause this to occur. In other words the projector projects on the screen, (or through the screen directly, if no scattering material is in the path under the knob portion in question)

and this light is effectively re routed in the knob such that the re-emitted portion can be viewed by the camera.

This is an alternative to direct reflection of light which could also be from the projector, back to the camera and can be useful in some instances.

FMVSS 101 is contained in USA CFR Title 49 part 571

"Light" as used herein includes all electromagnetic wavelengths from ultraviolet to near infrared.

The foregoing discussion should be understood as illustrative and should not be considered to be limiting in any sense. While this invention has been particularly shown and described with references to preferred embodiments thereof, it will be understood by those skilled in the art that various changes in form and details maybe made therein without departing from the spirit and scope of the invention.

What is claimed:

1. A method for coordinating and associating system functions in a touch-sensitive device, the method comprising:
    displaying a plurality of icons on a touch-sensitive display of the touch-sensitive device, each icon representing a unique application for performing an operation at the touch sensitive device;
    detecting positions of a plurality of objects in contact with the touch-sensitive display, wherein the objects are in contact at the same time;
    determining two or more icons corresponding to the detected positions of the plurality of objects;
    determining an interconnected operation based on the applications represented by the determined icons; and
    causing the touch-sensitive device to perform the interconnected operation.

2. The method of claim 1, wherein the two or more icons corresponding to the detected positions of the plurality of objects are at least partially covered by the plurality of objects.

3. The method of claim 1, wherein the detected plurality of objects initiate contact with the touch-sensitive display in sequence.

4. The method of claim 1, wherein the detected plurality of objects initiate contact with the touch-sensitive display at about the same time.

5. A non-transitory computer-readable storage medium storing program code for coordinating and associating system functions in a touch-sensitive device, the program code for causing performance of a method comprising:
    displaying a plurality of icons on a touch-sensitive display of the touch-sensitive device, each icon representing a unique application for performing an operation at the touch sensitive device;
    detecting positions of a plurality of objects in contact with the touch-sensitive display, wherein the objects are in contact at the same time;
    determining two or more icons corresponding to the detected positions of the plurality of objects;
    determining an interconnected operation based on the applications represented by the determined icons; and
    causing the touch-sensitive device to perform the interconnected operation.

6. The non-transitory computer-readable storage medium of claim 5, wherein the detected plurality of objects initiate contact with the touch-sensitive display in sequence.

7. The non-transitory computer-readable storage medium of claim 5, wherein the detected plurality of objects initiate contact with the touch-sensitive display at about the same time.

8. An apparatus, comprising:
a touch screen; and
a processor coupled to the touch screen, the processor programmed for
    displaying a plurality of icons on the touch screen, each icon representing a unique application for performing an operation at the apparatus;
    detecting positions of a plurality of objects in contact with the touch screen, wherein the objects are in contact at the same time,
    determining two or more icons corresponding to the detected positions of the plurality of objects,
    determining an interconnected operation based on the applications represented by the determined icons; and
    causing the apparatus to perform the interconnected operation.

9. The apparatus of claim 8, wherein the two or more icons corresponding to the detected positions of the plurality of objects are at least partially covered by the plurality of objects.

10. The method of claim 8, wherein the detected plurality of objects initiate contact with the touch-sensitive display in sequence.

11. The method of claim 8, wherein the detected plurality of objects initiate contact with the touch-sensitive display at about the same time.

12. A method for associating different applications triggered by concurrent touch inputs, the method comprising:
    displaying a plurality of application icons on a display of a computer system, each application icon signifying a unique application capable of being performed by the computer system;
    receiving two or more concurrent touch inputs on a touch-sensitive surface coupled to the computer system;
    identifying two or more displayed application icons corresponding to the two or more concurrent touch inputs; and
    determining a single interconnected operation based on the two or more application icons.

13. The method of claim 12, further comprising causing the computer system to perform the interconnected operation.

14. A computing system configured for associating different applications triggered by concurrent touch inputs, the computing system comprising:
    a processor programmed for
        controlling a display device coupled to the processor to display a plurality of application icons, each application icon signifying a unique application capable of being performed by the computer system,
        receiving two or more concurrent touch inputs from a touch-sensitive surface coupled to the computing system,
        identifying two or more displayed application icons corresponding to the two or more concurrent touch inputs, and
        determining a single interconnected operation based on the two or more application icons.

15. The computing system of claim 14, the processor further programmed for performing the interconnected operation.

* * * * *